DATA TRANSFER APPARATUS

Filed Jan. 24, 1956

INVENTORS
JOHN W. HAANSTRA
ROY L. HAUG
MURRAY L. LESSER
LOUIS D. STEVENS
WILLIAM W. WOODBURY

BY: John B. Clark
ATTORNEY

March 20, 1962 J. W. HAANSTRA ET AL 3,026,036

DATA TRANSFER APPARATUS

Filed Jan. 24, 1956 87 Sheets-Sheet 2

March 20, 1962 J. W. HAANSTRA ET AL 3,026,036

DATA TRANSFER APPARATUS

Filed Jan. 24, 1956 87 Sheets-Sheet 6

March 20, 1962 J. W. HAANSTRA ET AL 3,026,036

DATA TRANSFER APPARATUS

Filed Jan. 24, 1956

87 Sheets-Sheet 8

NORMAL SEQUENCE

March 20, 1962 J. W. HAANSTRA ETAL 3,026,036

DATA TRANSFER APPARATUS

Filed Jan. 24, 1956 87 Sheets-Sheet 12

LOCATOR WAVEFORMS

March 20, 1962 J. W. HAANSTRA ET AL 3,026,036

DATA TRANSFER APPARATUS

Filed Jan. 24, 1956 87 Sheets-Sheet 16

March 20, 1962 J. W. HAANSTRA ET AL 3,026,036

DATA TRANSFER APPARATUS

Filed Jan. 24, 1956 87 Sheets-Sheet 18

March 20, 1962 J. W. HAANSTRA ET AL 3,026,036

DATA TRANSFER APPARATUS

Filed Jan. 24, 1956 87 Sheets-Sheet 19

March 20, 1962 J. W. HAANSTRA ET AL 3,026,036

DATA TRANSFER APPARATUS

Filed Jan. 24, 1956

87 Sheets-Sheet 21

March 20, 1962 J. W. HAANSTRA ET AL 3,026,036

DATA TRANSFER APPARATUS

Filed Jan. 24, 1956 87 Sheets-Sheet 26

March 20, 1962 J. W. HAANSTRA ETAL 3,026,036

DATA TRANSFER APPARATUS

Filed Jan. 24, 1956 87 Sheets-Sheet 28

March 20, 1962 J. W. HAANSTRA ETAL 3,026,036

DATA TRANSFER APPARATUS

Filed Jan. 24, 1956 87 Sheets-Sheet 29

March 20, 1962 J. W. HAANSTRA ETAL 3,026,036

DATA TRANSFER APPARATUS

Filed Jan. 24, 1956 87 Sheets-Sheet 30

March 20, 1962 J. W. HAANSTRA ET AL 3,026,036

DATA TRANSFER APPARATUS

Filed Jan. 24, 1956 87 Sheets-Sheet 35

March 20, 1962 J. W. HAANSTRA ET AL 3,026,036

DATA TRANSFER APPARATUS

Filed Jan. 24, 1956 87 Sheets-Sheet 37

March 20, 1962 J. W. HAANSTRA ET AL 3,026,036

DATA TRANSFER APPARATUS

Filed Jan. 24, 1956 87 Sheets-Sheet 38

Character Coding, Disk and Drum.

| | 0 | X | 1 | 2 | 4 | 8 | R |
|---|---|---|---|---|---|---|---|
| 0 | / | | | | | | |
| 1 | | | / | | | | |
| 2 | | | | / | | | |
| 3 | | | / | / | | | / |
| 4 | | | | | / | | |
| 5 | | | / | | / | | / |
| 6 | | | | / | / | | / |
| 7 | | | / | / | / | | |
| 8 | | | | | | / | |
| 9 | | | / | | | / | / |
| A | / | / | / | | | | |
| B | / | / | | / | | | |
| C | / | / | / | / | | | / |
| D | / | / | | | / | | |
| E | / | / | / | | / | | / |
| F | / | / | | / | / | | / |
| G | / | / | / | / | / | | |
| H | / | / | | | | / | |
| I | / | / | / | | | / | / |
| J | | / | / | | | | / |
| K | | / | | / | | | / |
| L | | / | / | / | | | |
| M | | / | | | / | | / |
| N | | / | / | | / | | |
| O | | / | | / | / | | |
| P | | / | / | / | / | | / |
| Q | | / | | | | / | / |
| R | | / | / | | | / | |
| S | / | | | / | | | / |
| T | / | | / | / | | | |
| U | / | | | | / | | / |
| V | / | | / | | / | | |
| W | / | | | / | / | | |
| X | / | | / | / | / | | / |
| Y | / | | | | | / | / |
| Z | / | | / | | | / | |
| & | / | / | | | | | / |
| . | / | / | / | / | | / | |
| ¤ | / | / | | | / | / | / |
| - | | / | | | | | |
| $ | | / | / | / | | / | / |
| * | | / | | | / | / | |
| / | / | | / | | | | / |
| , | / | | / | / | | / | / |
| % | / | | | | / | / | |
| # | | | / | / | | / | |
| @ | | | | | / | / | / |

March 20, 1962 J. W. HAANSTRA ETAL 3,026,036

DATA TRANSFER APPARATUS

Filed Jan. 24, 1956 87 Sheets-Sheet 46

March 20, 1962 J. W. HAANSTRA ETAL 3,026,036

DATA TRANSFER APPARATUS

Filed Jan. 24, 1956

87 Sheets-Sheet 48

March 20, 1962 J. W. HAANSTRA ET AL 3,026,036

DATA TRANSFER APPARATUS

Filed Jan. 24, 1956

87 Sheets-Sheet 52

DATA TRANSFER APPARATUS

March 20, 1962 J. W. HAANSTRA ETAL 3,026,036

DATA TRANSFER APPARATUS

Filed Jan. 24, 1956 87 Sheets-Sheet 55

March 20, 1962 J. W. HAANSTRA ETAL 3,026,036

DATA TRANSFER APPARATUS

Filed Jan. 24, 1956 87 Sheets-Sheet 57

March 20, 1962 J. W. HAANSTRA ET AL 3,026,036

DATA TRANSFER APPARATUS

Filed Jan. 24, 1956 87 Sheets-Sheet 59

March 20, 1962 J. W. HAANSTRA ET AL 3,026,036

DATA TRANSFER APPARATUS

Filed Jan. 24, 1956 87 Sheets-Sheet 62

March 20, 1962 J. W. HAANSTRA ETAL 3,026,036

DATA TRANSFER APPARATUS

Filed Jan. 24, 1956 87 Sheets-Sheet 63

March 20, 1962 J. W. HAANSTRA ET AL 3,026,036

DATA TRANSFER APPARATUS

Filed Jan. 24, 1956 87 Sheets-Sheet 65

March 20, 1962 J. W. HAANSTRA ET AL 3,026,036

DATA TRANSFER APPARATUS

Filed Jan. 24, 1956 87 Sheets-Sheet 69

March 20, 1962 J. W. HAANSTRA ETAL 3,026,036

DATA TRANSFER APPARATUS

Filed Jan. 24, 1956 87 Sheets-Sheet 72

March 20, 1962 J. W. HAANSTRA ETAL 3,026,036

DATA TRANSFER APPARATUS

Filed Jan. 24, 1956 87 Sheets-Sheet 76

March 20, 1962 J. W. HAANSTRA ET AL 3,026,036

DATA TRANSFER APPARATUS

Filed Jan. 24, 1956 87 Sheets-Sheet 77

March 20, 1962 J. W. HAANSTRA ETAL 3,026,036

DATA TRANSFER APPARATUS

Filed Jan. 24, 1956

87 Sheets-Sheet 78

March 20, 1962 J. W. HAANSTRA ETAL 3,026,036

DATA TRANSFER APPARATUS

Filed Jan. 24, 1956 87 Sheets-Sheet 79

$E_2$ ERROR

March 20, 1962 J. W. HAANSTRA ETAL 3,026,036

DATA TRANSFER APPARATUS

Filed Jan. 24, 1956 87 Sheets-Sheet 80

March 20, 1962 J. W. HAANSTRA ETAL 3,026,036

DATA TRANSFER APPARATUS

Filed Jan. 24, 1956 87 Sheets-Sheet 81

DATA TRANSFER APPARATUS

Filed Jan. 24, 1956

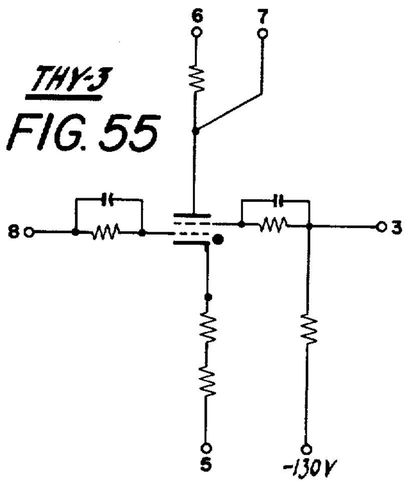
THY-3 FIG. 55
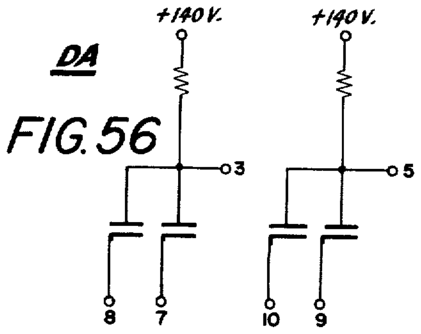
DA FIG. 56
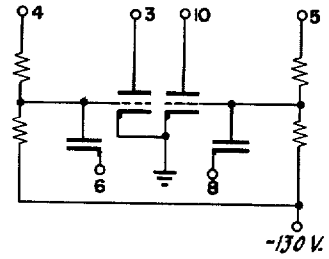
ID-1 FIG. 57
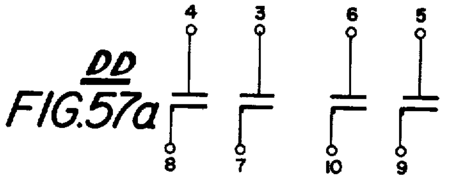
DD FIG. 57a
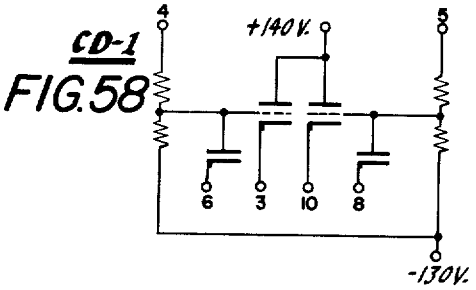
CD-1 FIG. 58
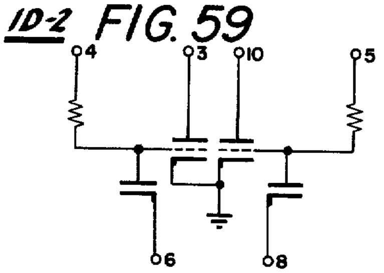
ID-2 FIG. 59
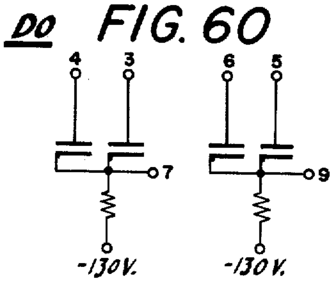
DO FIG. 60
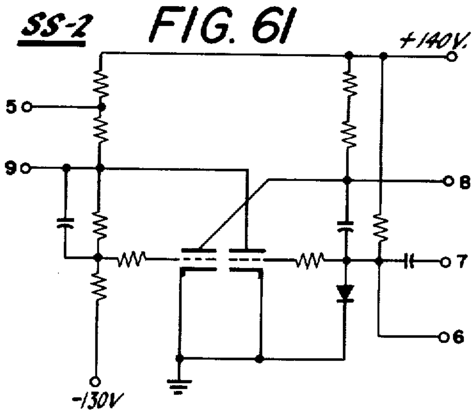
SS-2 FIG. 61

United States Patent Office 3,026,036

Patented Mar. 20, 1962

3,026,036
DATA TRANSFER APPARATUS

John W. Haanstra and Roy L. Huag, San Jose, Murray L. Lesser, Palo Alto, and Louis D. Stevens and William W. Woodbury, San Jose, Calif., assignors to International Business Machines Corporation, New York, N.Y., a corporation of New York Filed Jan. 24, 1956, Ser. No. 565,293
14 Claims. (Cl. 235—157)

This application is a continuation-in-part of the copending U.S. patent application Serial No. 525,446, now abandoned, filed August 1, 1955, and the invention disclosed herein relates generally to data processing machines. More particularly, this invention pertains to a data processing device adapted to handle technical business transactions sequentially as they occur and to reflect each transaction concurrently into all accounts which it affects.

This processing technique, referred to herein as "in-line" data processing, is made possible by the utilization of a high capacity random access memory device such as is disclosed in the copending U.S. patent application Serial No. 477,468, filed December 24, 1954, to any portion of which reference may be made in a short period of time, together with the novel data processing unit disclosed herein. The ability to obtain any record stored in the memory without appreciable loss of time makes possible the posting of transactions as they occur and leads to the availability of more timely information. Consequently, a closer control over business transactions may be had. In the area of inventory control and billing, for example, the machine may, from a single order, determine availability, price each item, adjust stock balances, invoice the customer, prepare accounts receivable records, accumulate data for sales analysis, and credit salesmen's commission accounts, etc. The procedures made possible by the ability to store a large quantity of data, any portion of which may be obtained at random in a short period of time, eliminates the need for sorting, collating and successive runs, as is the practice in business installations utilizing present day machines. Current processing of data means dynamic accounting instead of a history for management to review. Closer control over inventory, for example, results in reduced inventory charges and increased service to customers by reducing back orders. Continuous processing made possible by the machine of the invention eliminates the need for data to accumulate before making a run, as is now customary. This makes possible the continuous flow of data through an office and results in a smoother, more efficient operation.

The present invention is additionally concerned with a unique magnetic data processing apparatus wherein data is transferred within the machine in fully variable word lengths, such transfer being accomplished under the control of both internal and external instructions, whereby such control is selectively exercised in response to logical decisions reached by the apparatus during processing.

It is one object of the present invention, therefore, to provide an improved data processing machine.

Another object is to provide an in-line data processing machine wherein individual transactions are processed as they occur in a more useful and economical manner than is possible with machines presently in use.

A further object is to provide a data processing machine having an improved access time to a desired portion of a storage medium whereby data is processed in an in-line fashion with ready reference to master data recorded in the storage medium.

Another object is to provide an improved data processing machine having a large capacity addressable memory, to any portion of which access may be had at random under control of both data being processed by the machine and programmed instructions.

Still a further object is to provide a data processing machine having a random access memory wherein the data entered in the machine is processed together with selected data stored in the momory under the control of the entered data and stored program.

Another object is to provide an apparatus wherein data of variable word lengths determined by stored programs is transferred from predetermined storage locations to other predetermined storage locations with unlimited flexibility.

A still further object of the invention is to provide a machine of the type described wherein data is processed under control of both internal and external instructions selectively employed according to a command of the apparatus based upon findings yielded by data in process.

Still another object is to provide a machine wherein data is entered for processing under control of programmed instructions, which machine is adapted to seek additional data from storage for processing together with entered data, the identity of the location of the additional data being under control of both the entered data and the programmed instructions.

A further object is to provide a data processing machine employing a high capacity magnetic storage medium wherein instructions programmed in the machine are arranged to cause a magnetic transducer associated with the storage medium to move to a location adjacent the recording surface controlled by the identity of data entered for processing, whereby entered data is processed together with selected data from storage determined by the entered data and in a manner controlled by the programmed instructions.

Another object is to provide a novel data processing apparatus operable under the control of sequences of simple and straight-forward instructions, each of which defines the source and destination of data to be transferred.

In general, machines of the type under consideration are based on one of two techniques: a fully stored program, or a fully wired (control panel) program, each of which has its advantages and disadvantages. It is another object of this invention, therefore, to provide a data processing machine utilizing an optimum combination of the stored program and control panel techniques.

Another object is to provide a data processing machine wherein data transfer is under the control of stored program and decisions are made by wired program.

A further object is to provide a data processing machine arranged to automatically check the accuracy of data recorded in selected portions of the storage of the machine upon the recordation thereof, without the provision of additional program steps, to thereby aid in the maintenance of accurate records with a minimum of programming.

Still another object is to provide a machine of the type described arranged to initiate operations such as read-in, read-out, etc., either directly in response to instructions taken from stored program or indirectly in response to the condition of decision elements examined as a result of an instruction taken from stored program.

A still further object is to provide such a machine adapted to compare selected fields of alphabetic and/or numeric data under the control of a single instruction.

Other objects of the invention will be pointed out in the following description and claims and illustrated in the accompanying drawings which disclose, by way of example, the principle of the invention and the best mode which has been contemplated of applying that principle.

In the drawings:

FIG. 1 is a perspective view of the machine of the invention.

FIG. 2 discloses a block diagram of the machine disclosed in FIG. 1.

FIGS. 2*a* and 2*b* disclose a more detailed block diagram of the machine disclosed in FIG. 1.

FIGS. 3*a* and 3*b*, when placed adjacent each other, disclose the circuitry for controlling the basic timing of the present machine.

FIGS. 4*a* and 4*b*, when placed adjacent each other, disclose circuitry for providing various interlocks utilized in the operation of the machine.

FIG. 5 is a timing chart which discloses the normal sequence of operation of the various relays shown in FIGS. 3, 4 and 6.

FIGS. 6*a* and 6*b*, when placed adjacent each other, disclose the primary sequence relays for defining the various operating cycles utilized herein.

FIG. 7 discloses various hubs associated with the control panel, together with associated circuitry.

Figure 10:
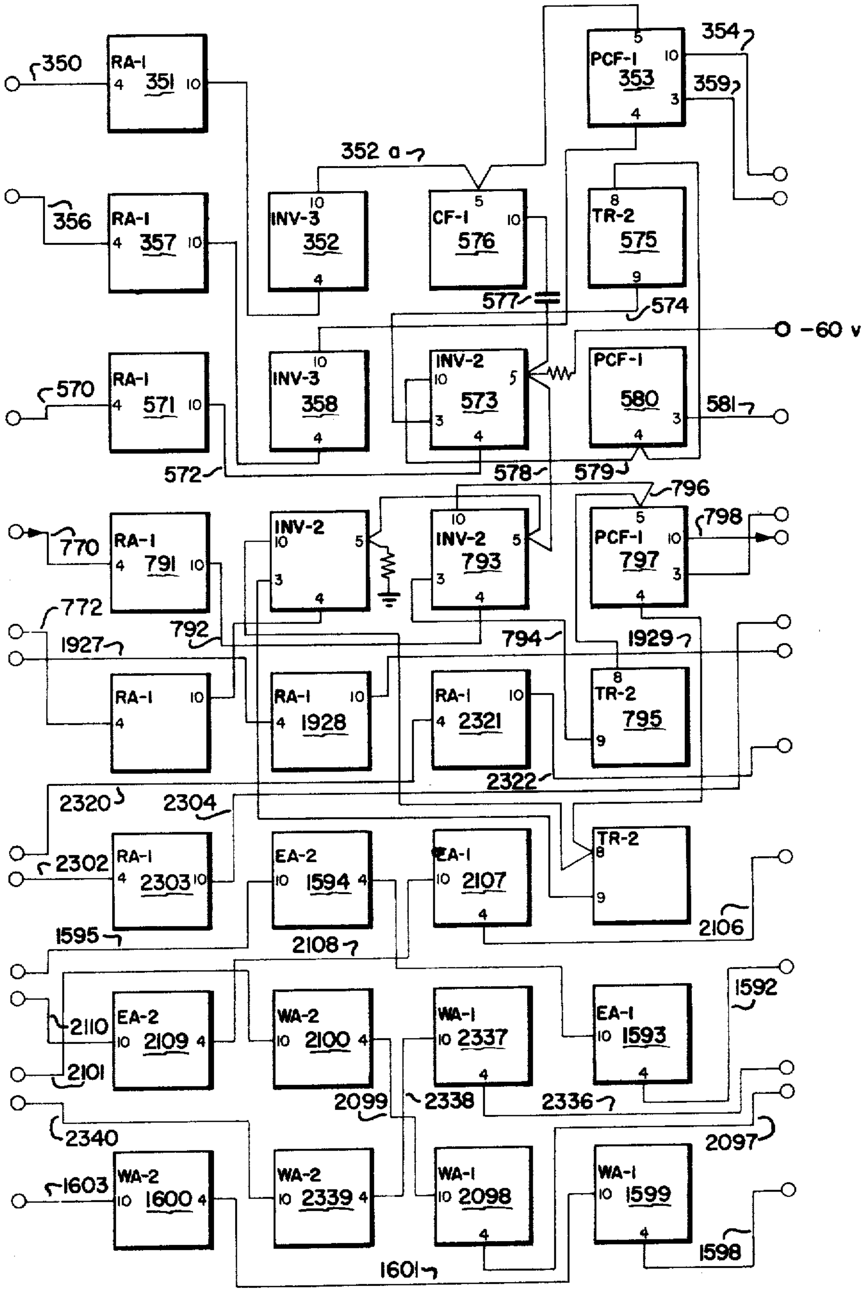

FIG. 10 discloses various read and write amplifier circuits utilized in connection with the various magnetic recording tracks.

Figure 11A:
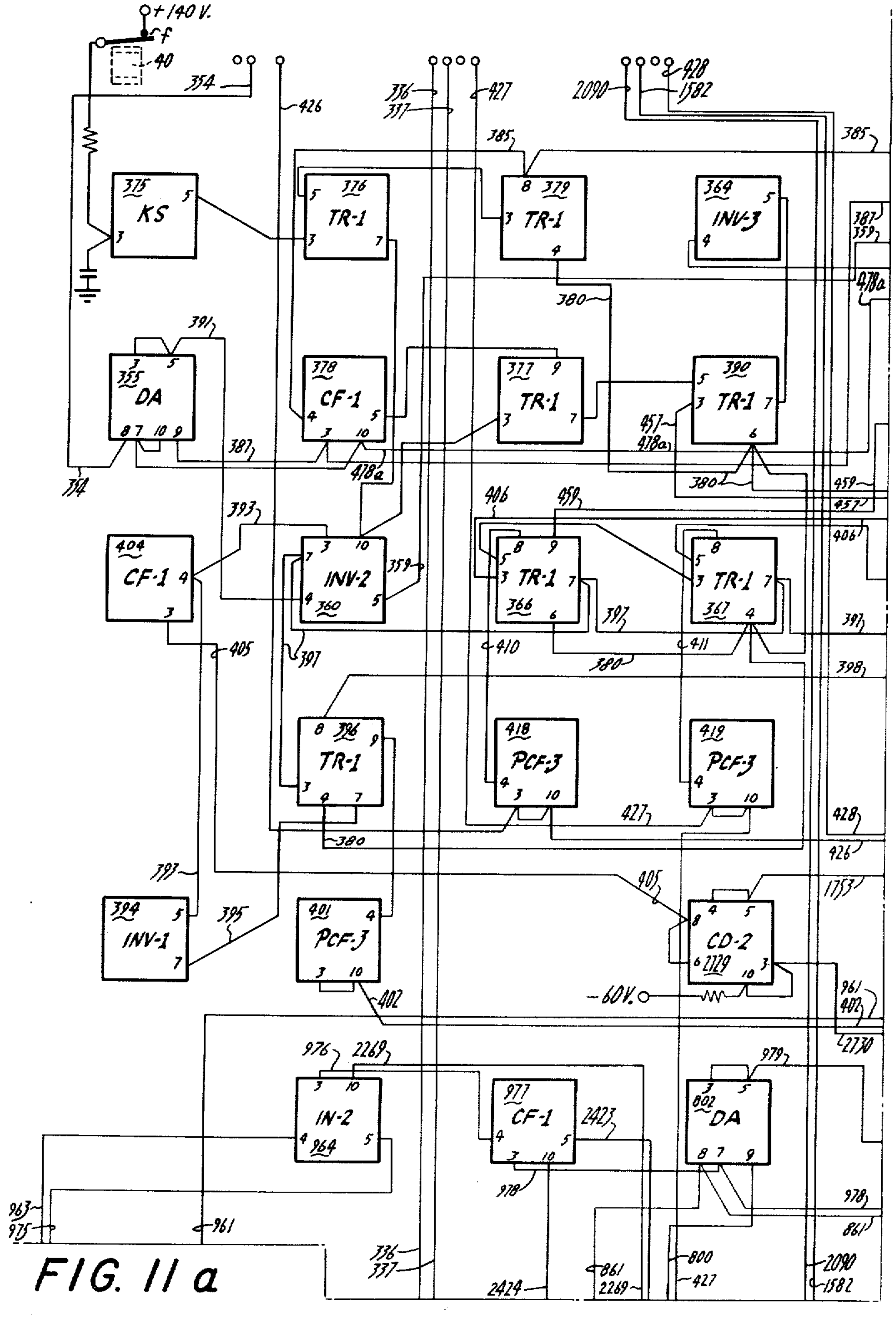
Figure 44:
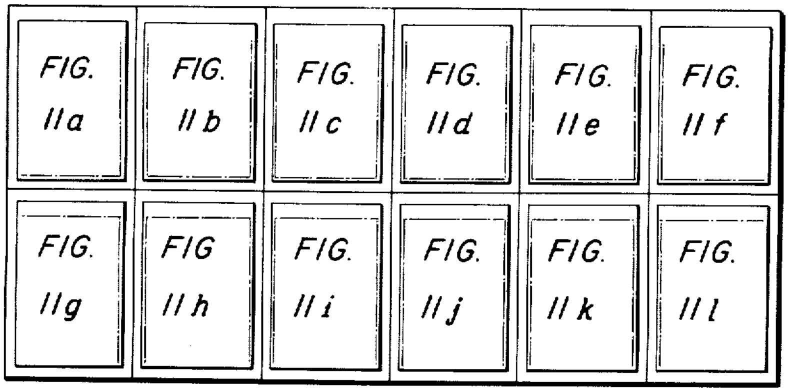

FIGS. 11*a* through 11–*l*, when arranged as shown in FIG. 44, comprise a schematic diagram of a portion of the information transfer circuits of the invention.

Figures 12, 23:
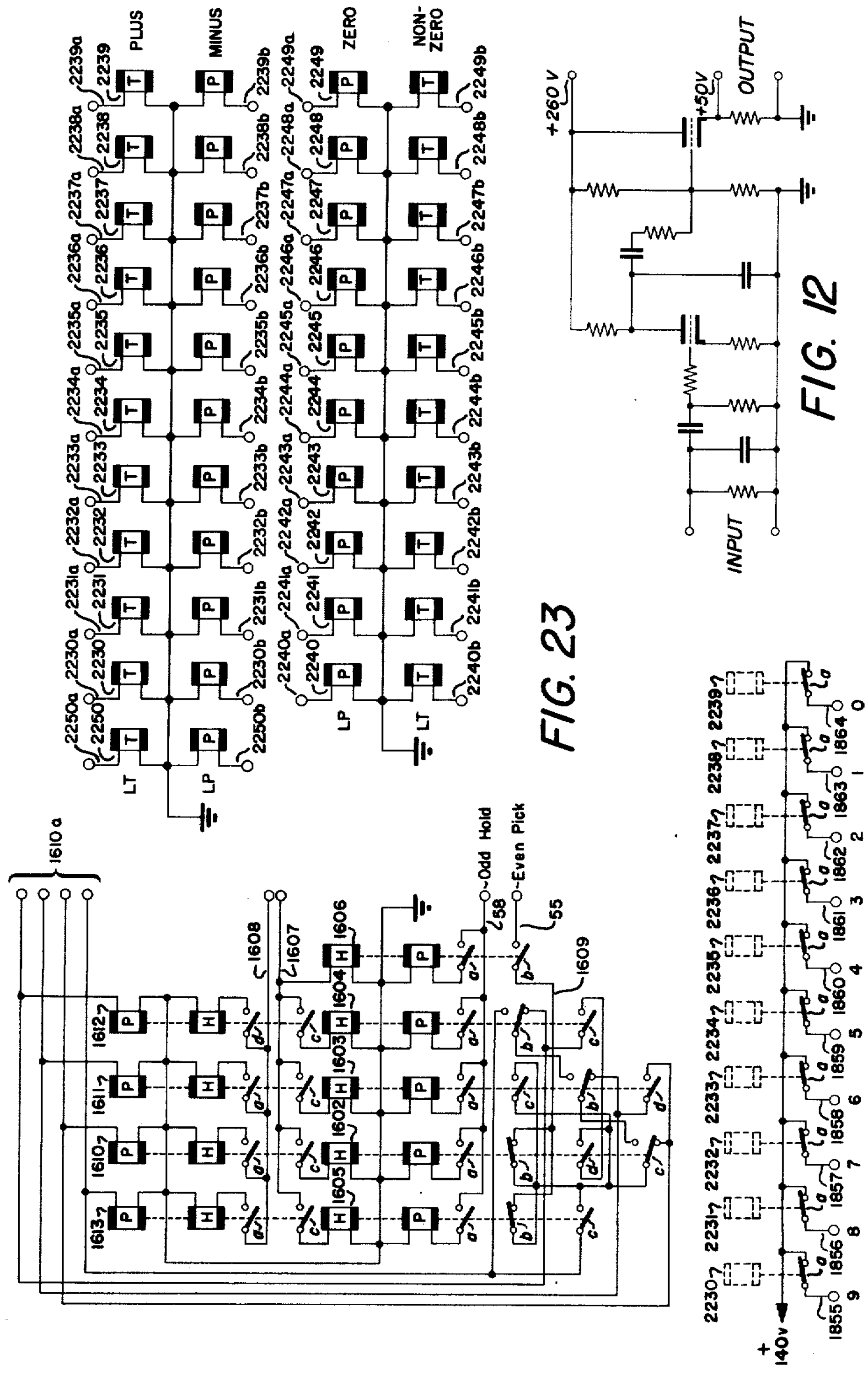

FIG. 12 is a schematic diagram of a preamplifier suitable for use in connection with each of the magnetic transducers associated with the process drum.

Figure 13:
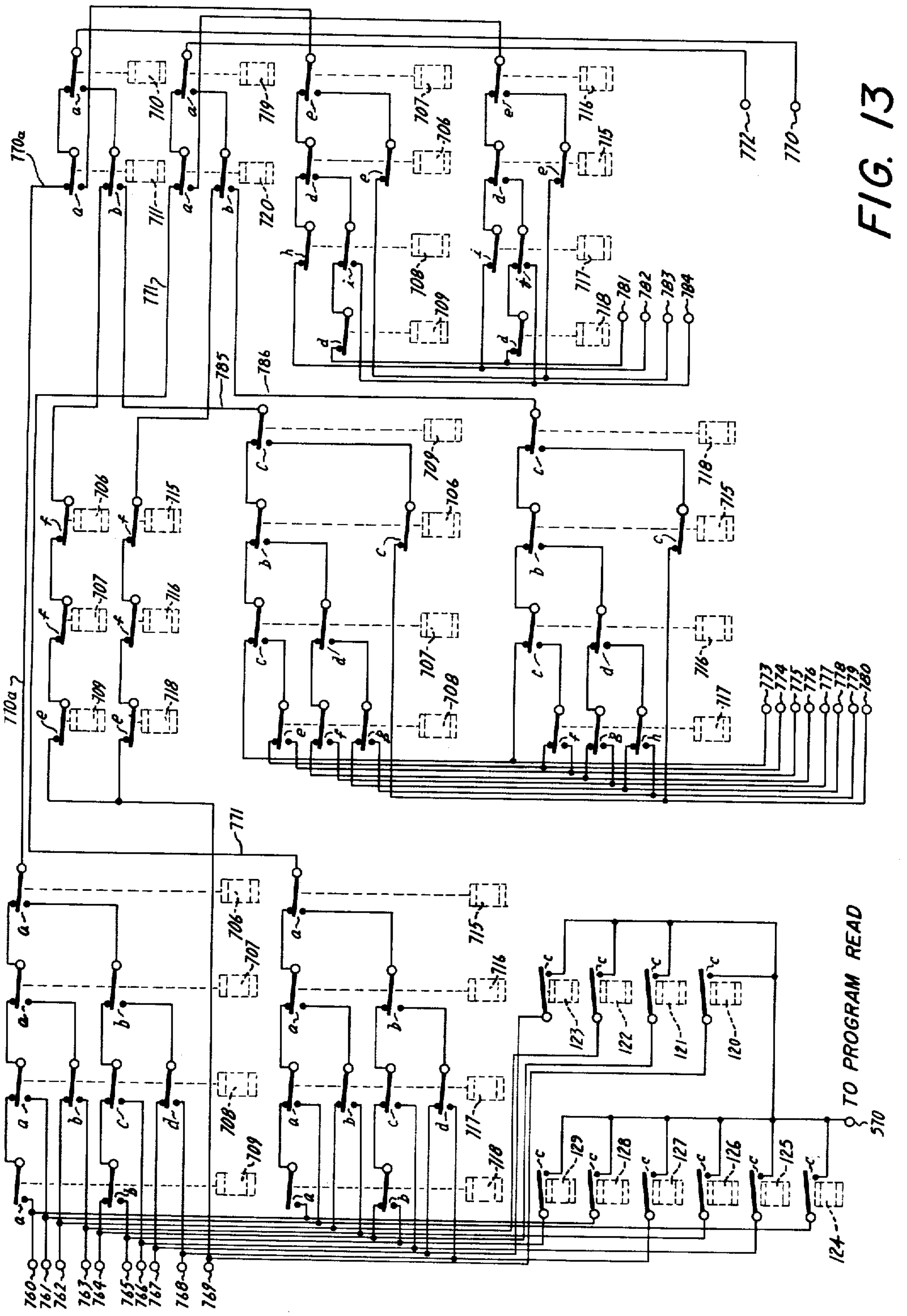

FIG. 13 is a schematic diagram of the $T_1$ and $T_2$ "read" relay trees.

Figure 45:
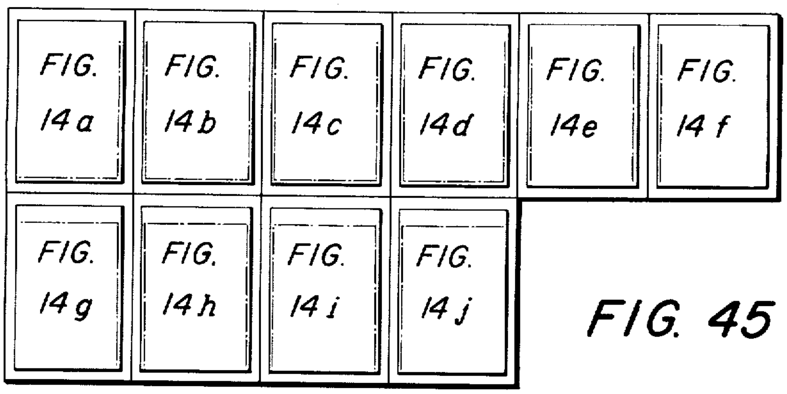

FIGS. 14*a* through 14*j*, when arranged as shown in FIG. 45, comprise a schematic diagram of a portion of the information transfer circuits.

Figure 15:
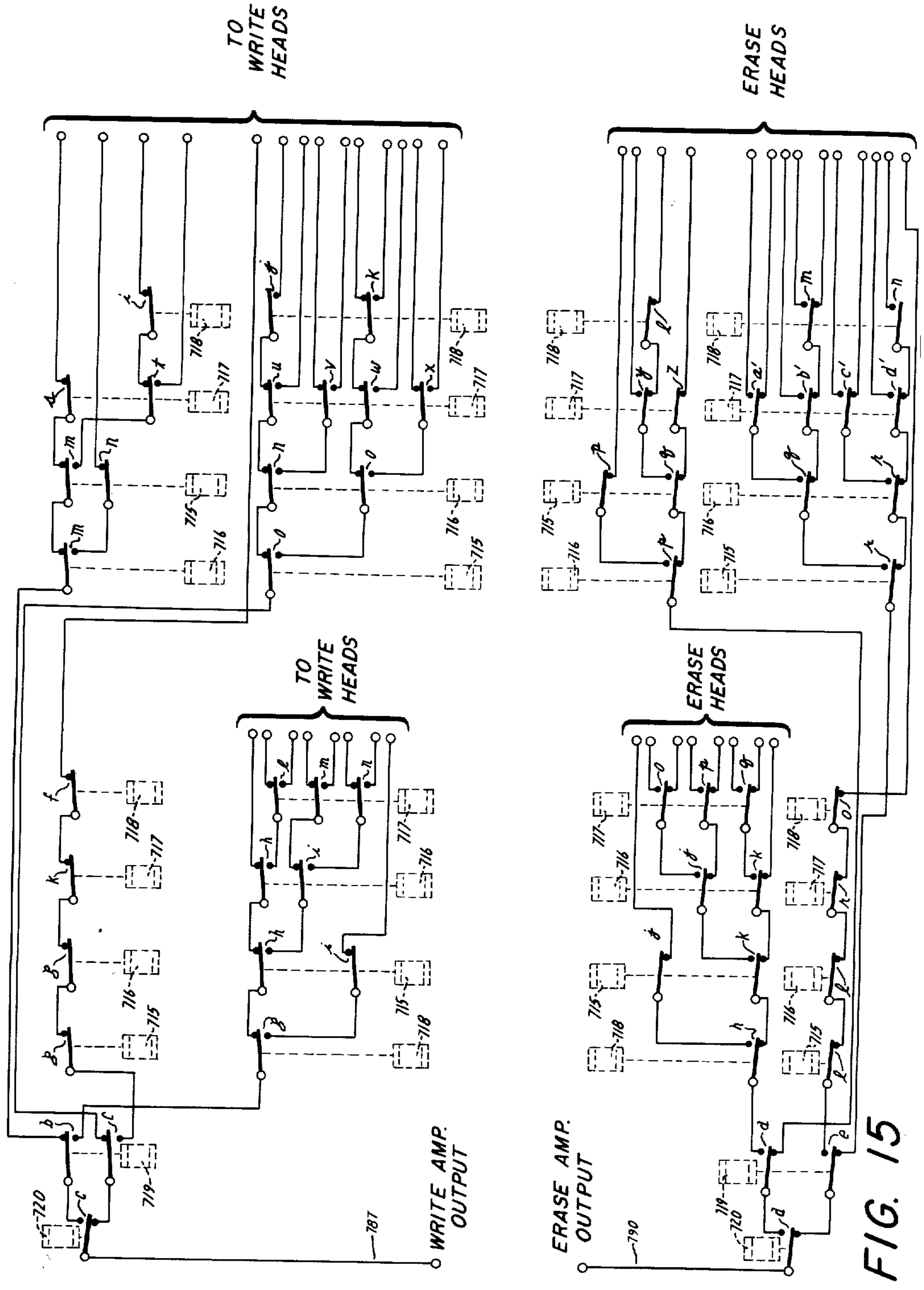

FIG. 15 is a schematic diagram of the "write" relay trees.

Figures 16, 19:
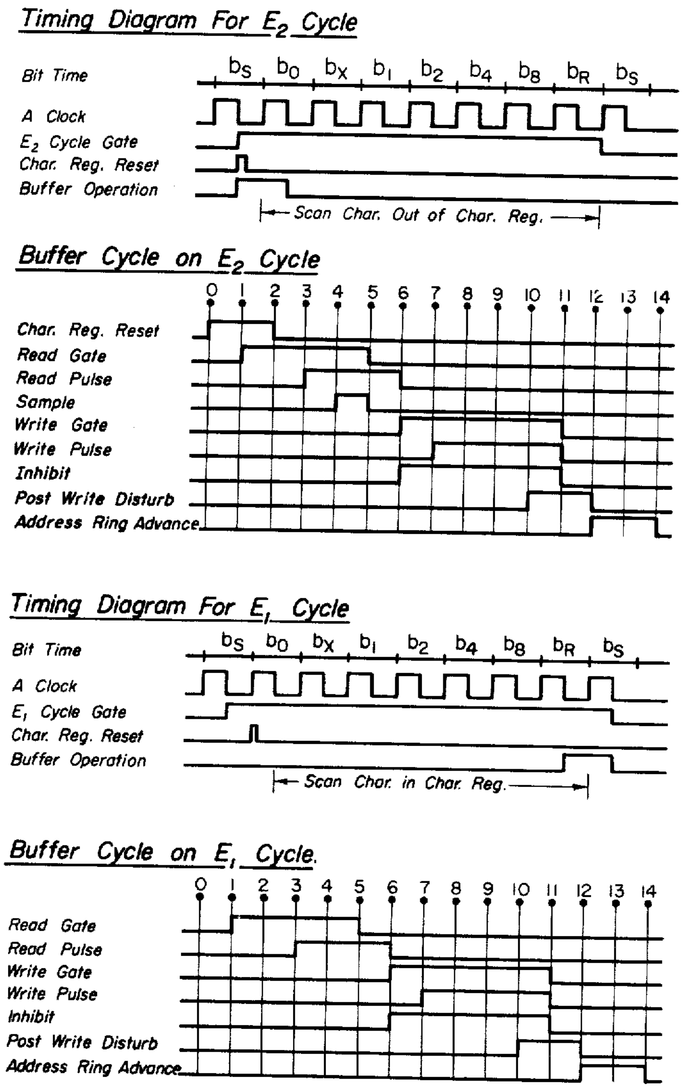

FIG. 16 discloses the code utilized in the machine of the invention.

Figure 17:
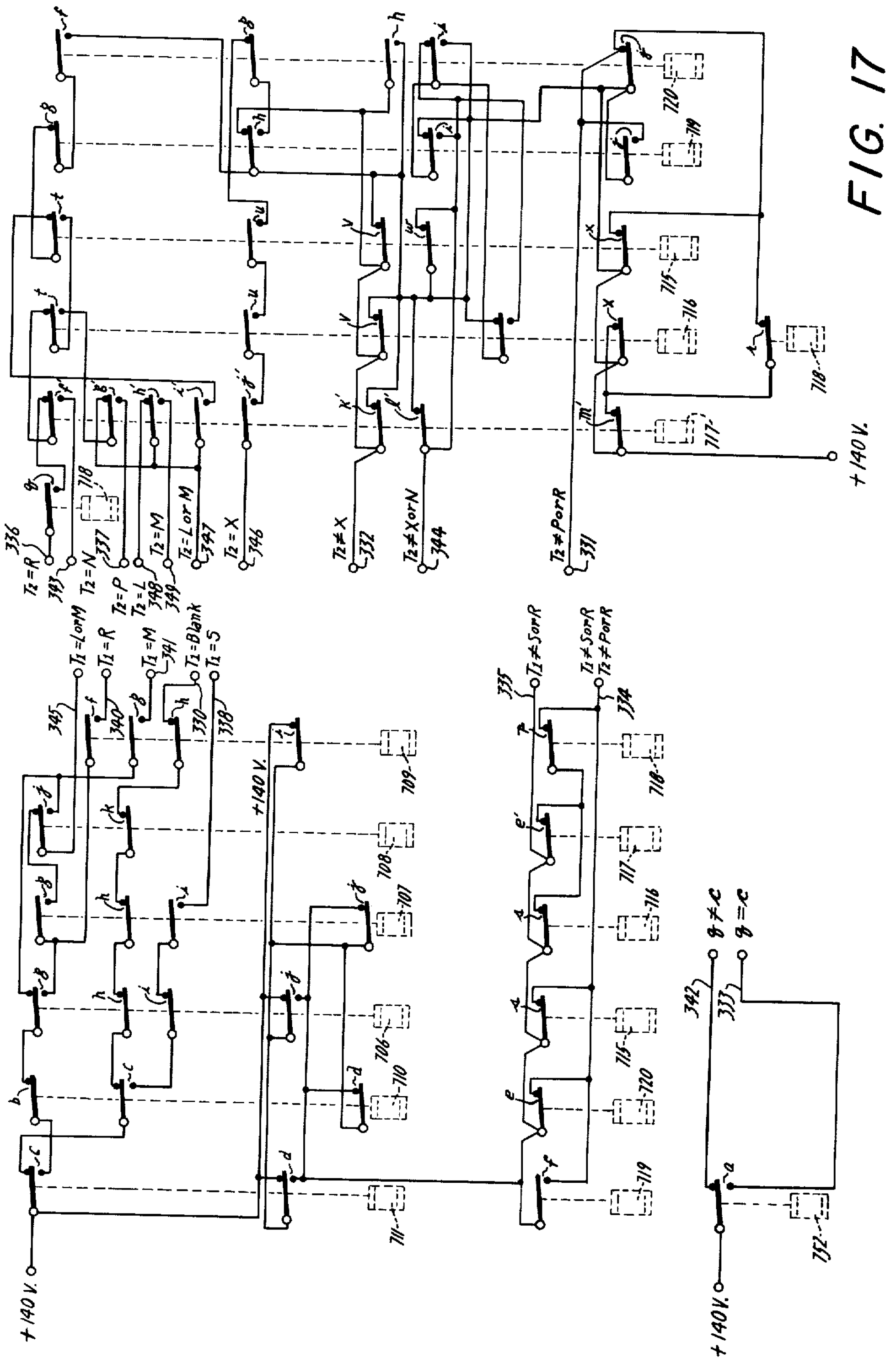

FIG. 17 is a schematic diagram of the control voltage circuitry utilized herein.

Figure 18:
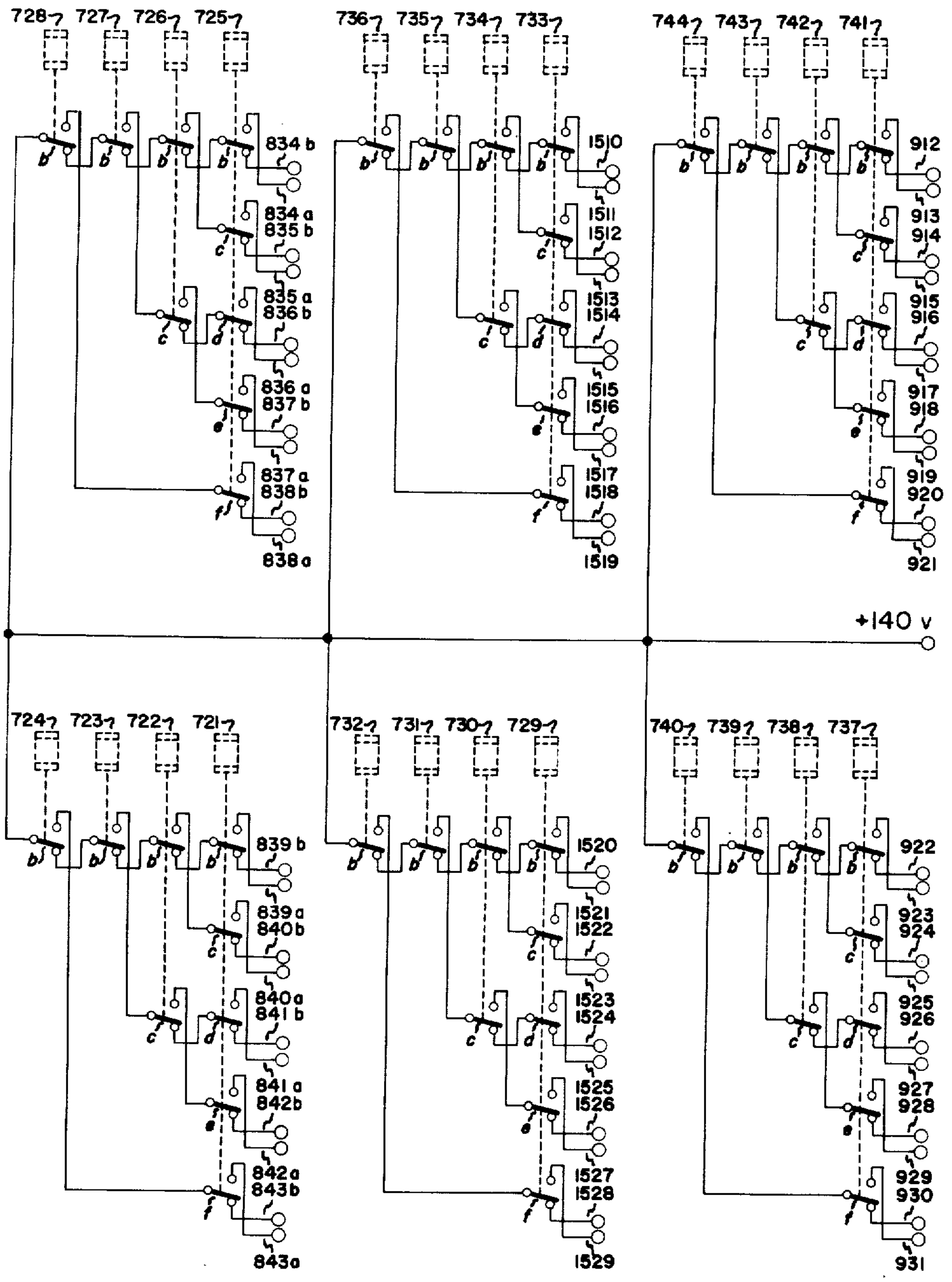

FIG. 18 discloses the $a_1b_1$, $a_2b_2$ and $mn$ relay trees.

FIG. 19 is a timing diagram of the $E_1$ and $E_2$ buffer cycles.

Figure 20A:
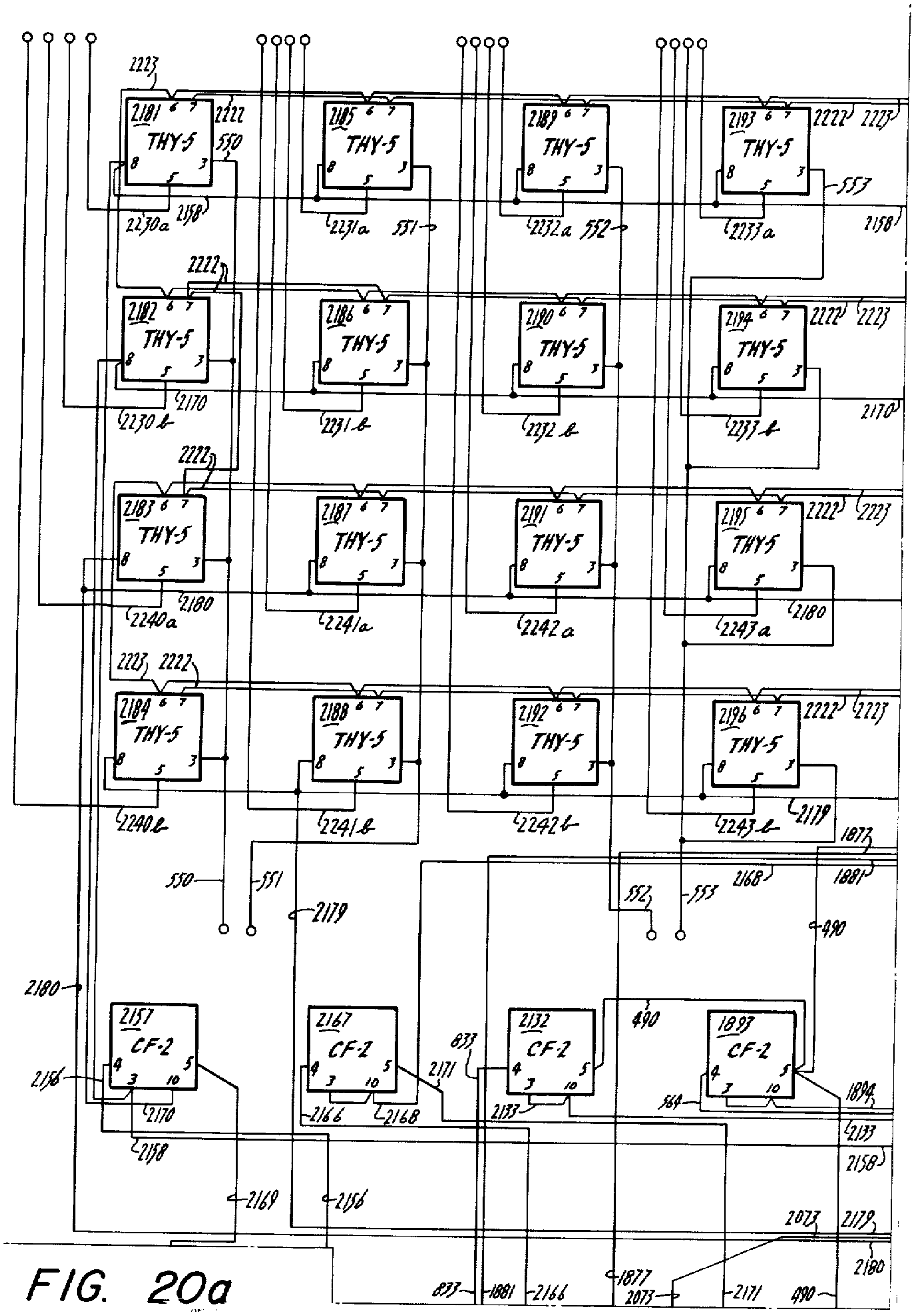
Figure 46:
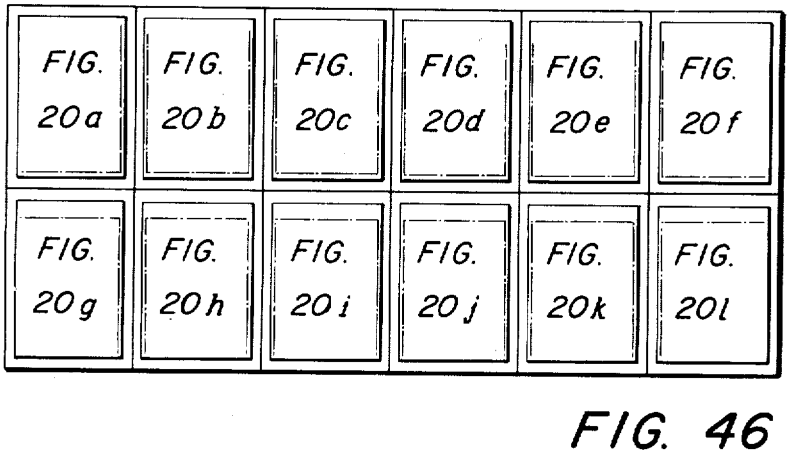

FIGS. 20*a* through 20–*l*, when arranged as shown in FIG. 46, disclose the arithmetic circuitry of the invention.

Figure 21:
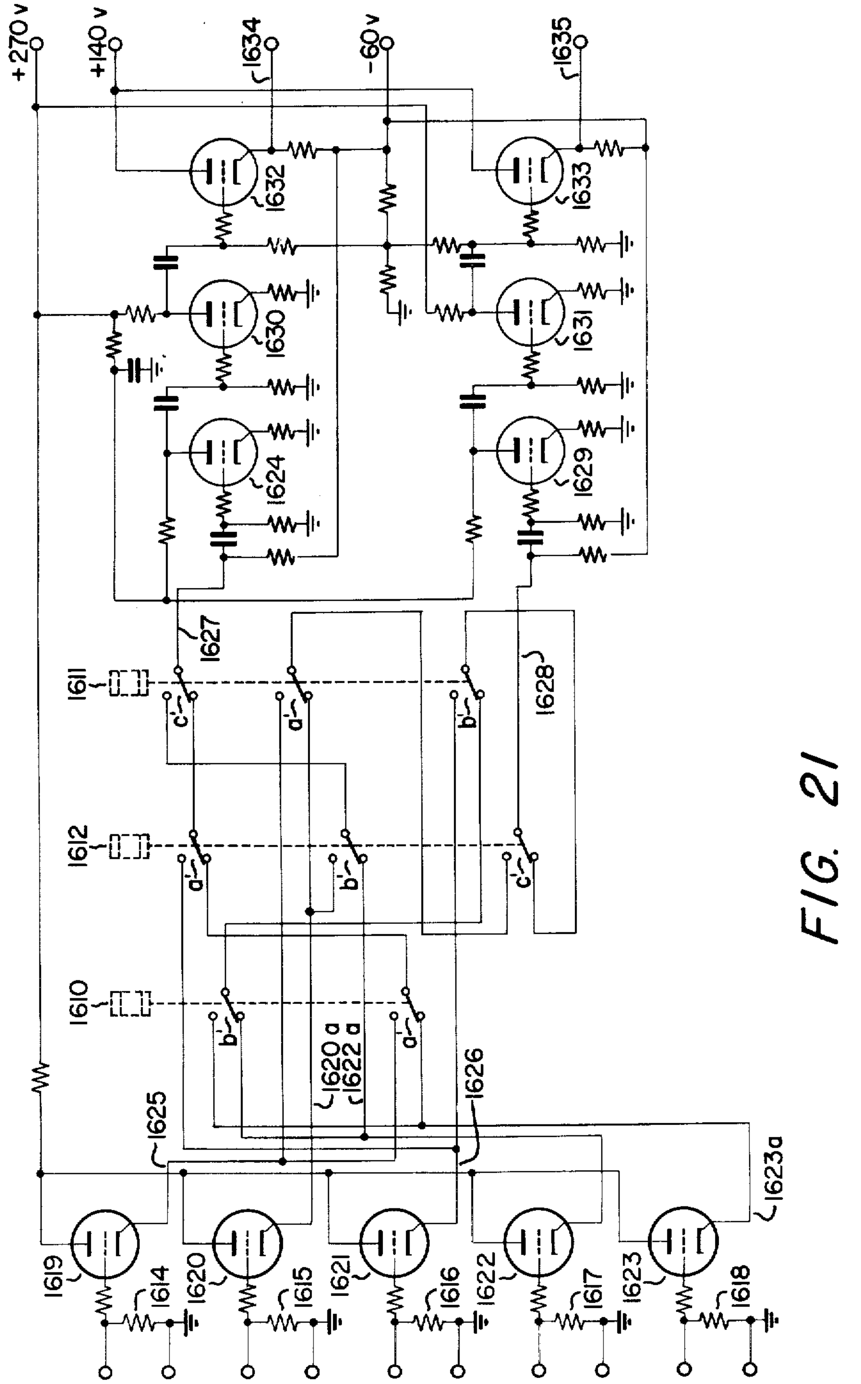

FIG. 21 is a schematic diagram of the sector selection circuitry.

Figure 22:
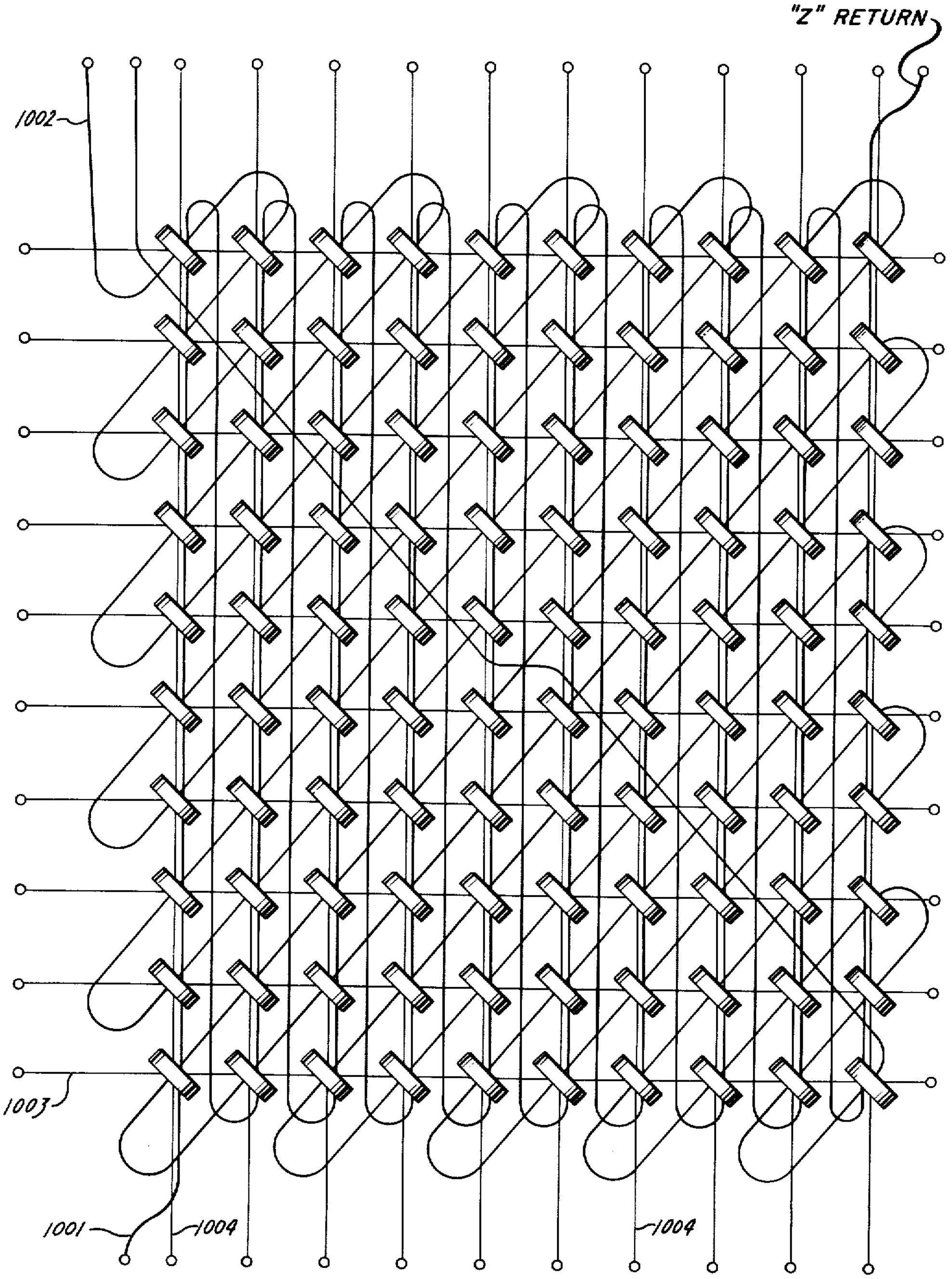

FIG. 22 is a schematic diagram of one of the seven planes of ferromagnetic cores utilized in the core buffer.

FIG. 23 is a schematic diagram of the sector relays together with various accumulator relays and circuitry associated therewith.

Figure 24:
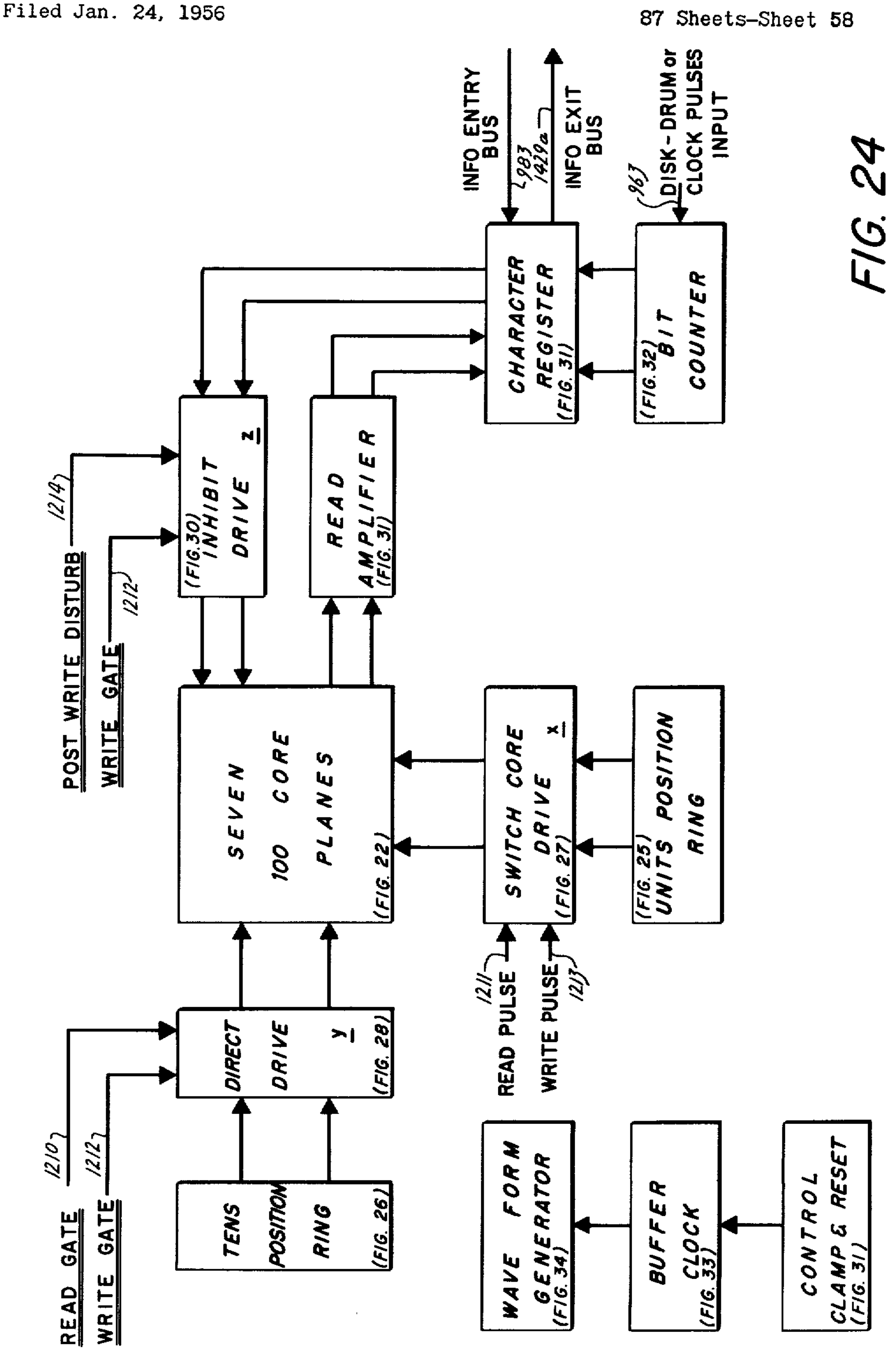
Figure 25:
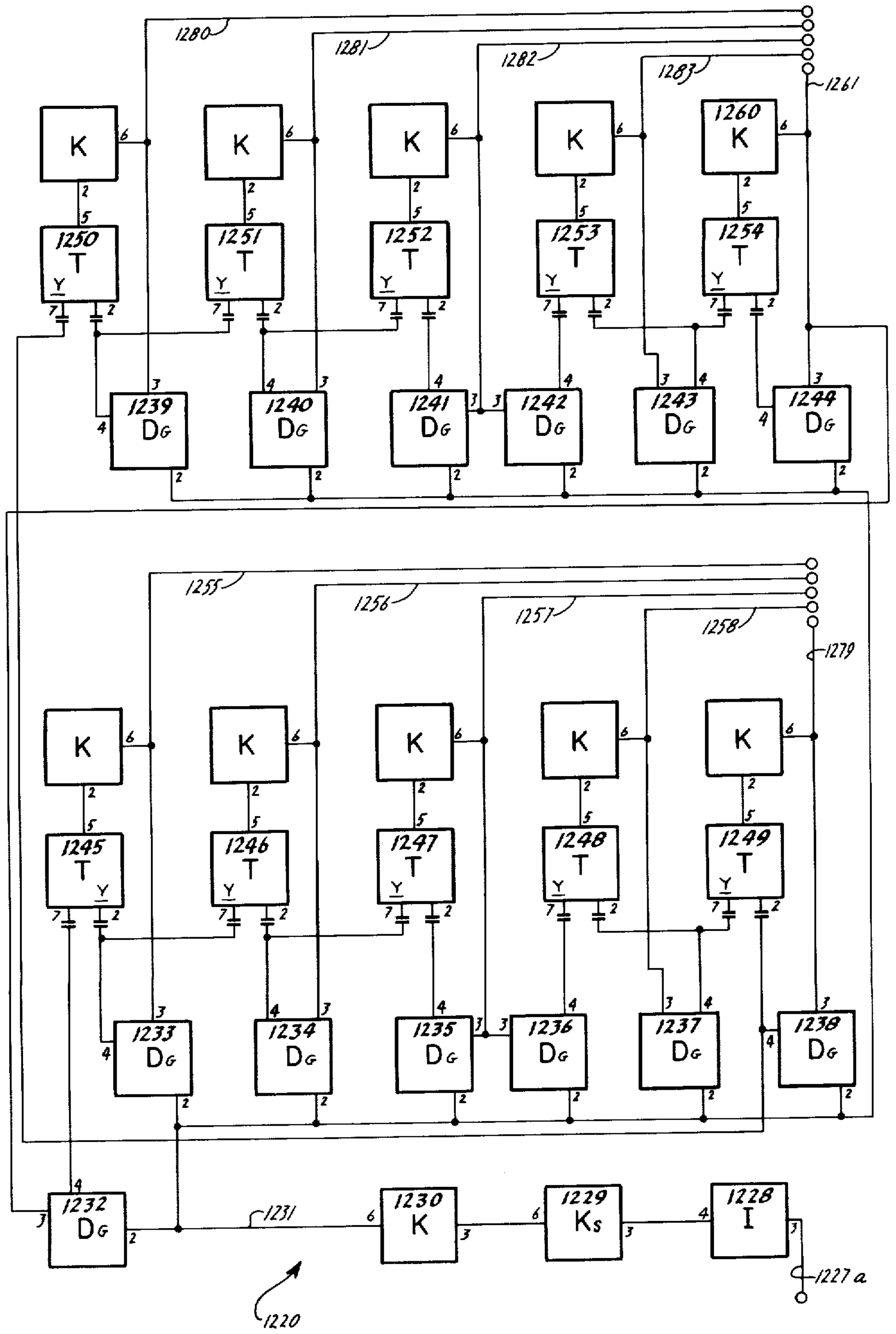

FIG. 24 is a block diagram of the core buffer.

FIGS. 25 through 28 and 30 through 34 comprise a schematic diagram of the core buffer circuitry.

Figure 29:
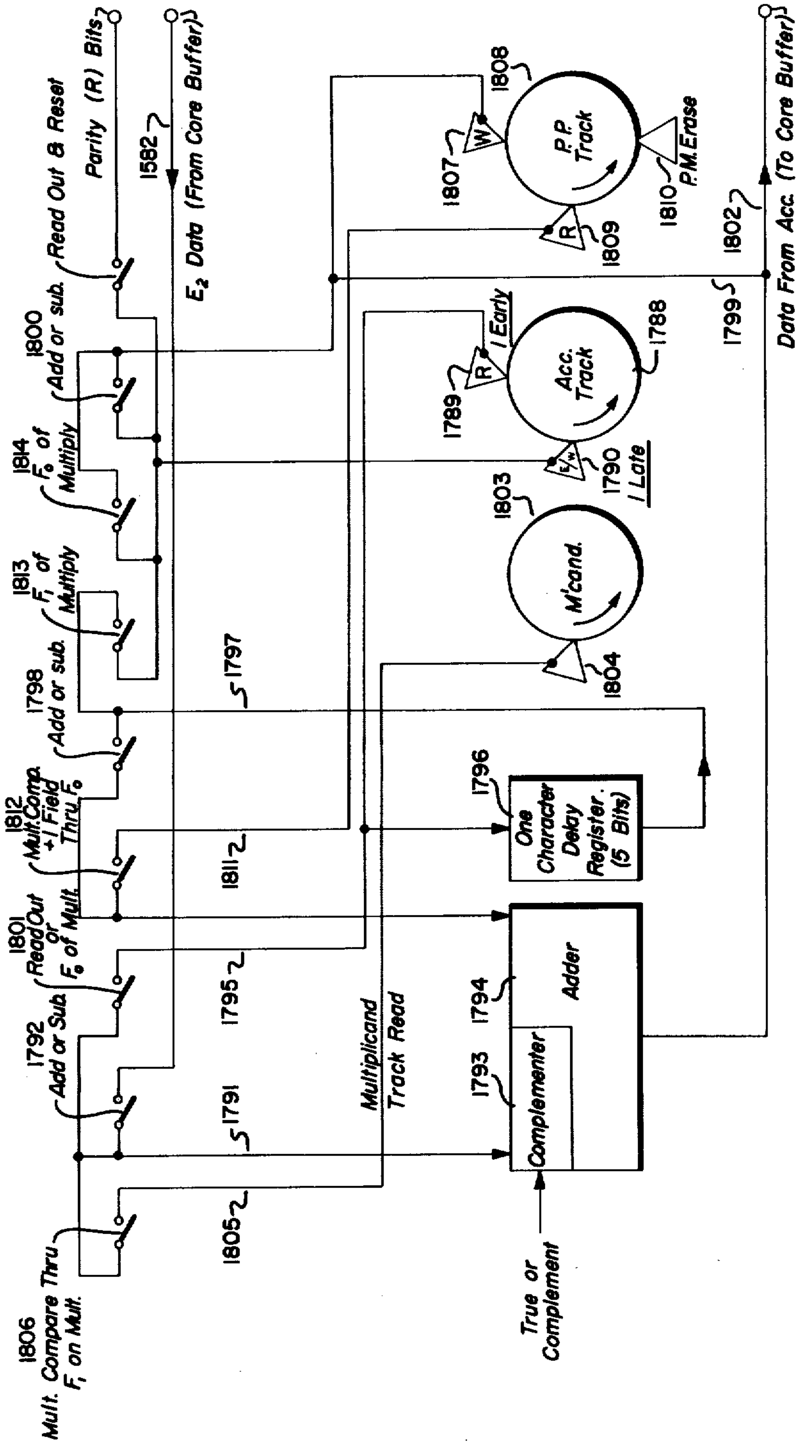

FIG. 29 is a block diagram of the arithmetic circuitry of the invention.

Figure 35:
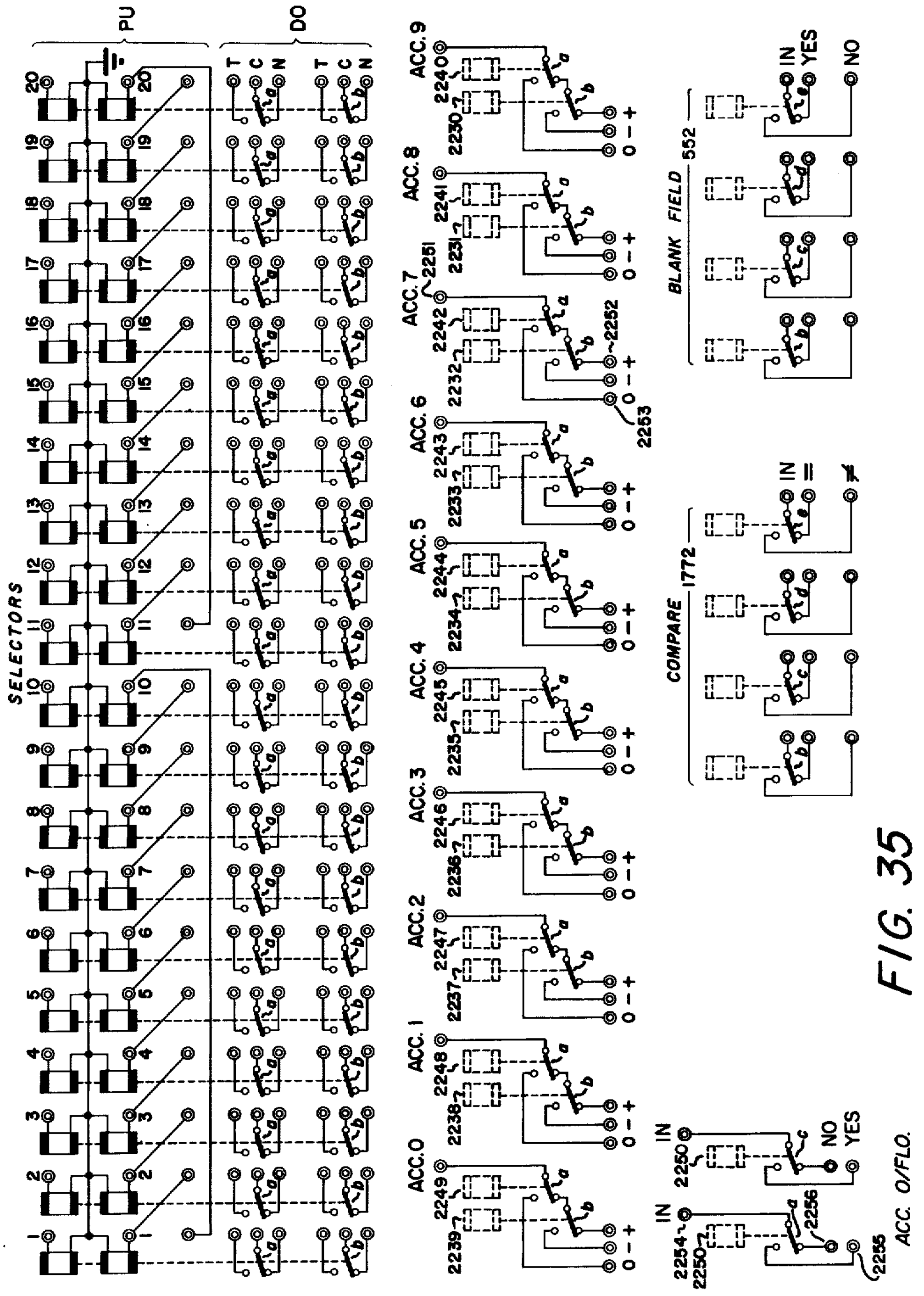

FIG. 35 discloses selector and accumulator hubs of the control panel, together with associated circuitry.

Figure 36:
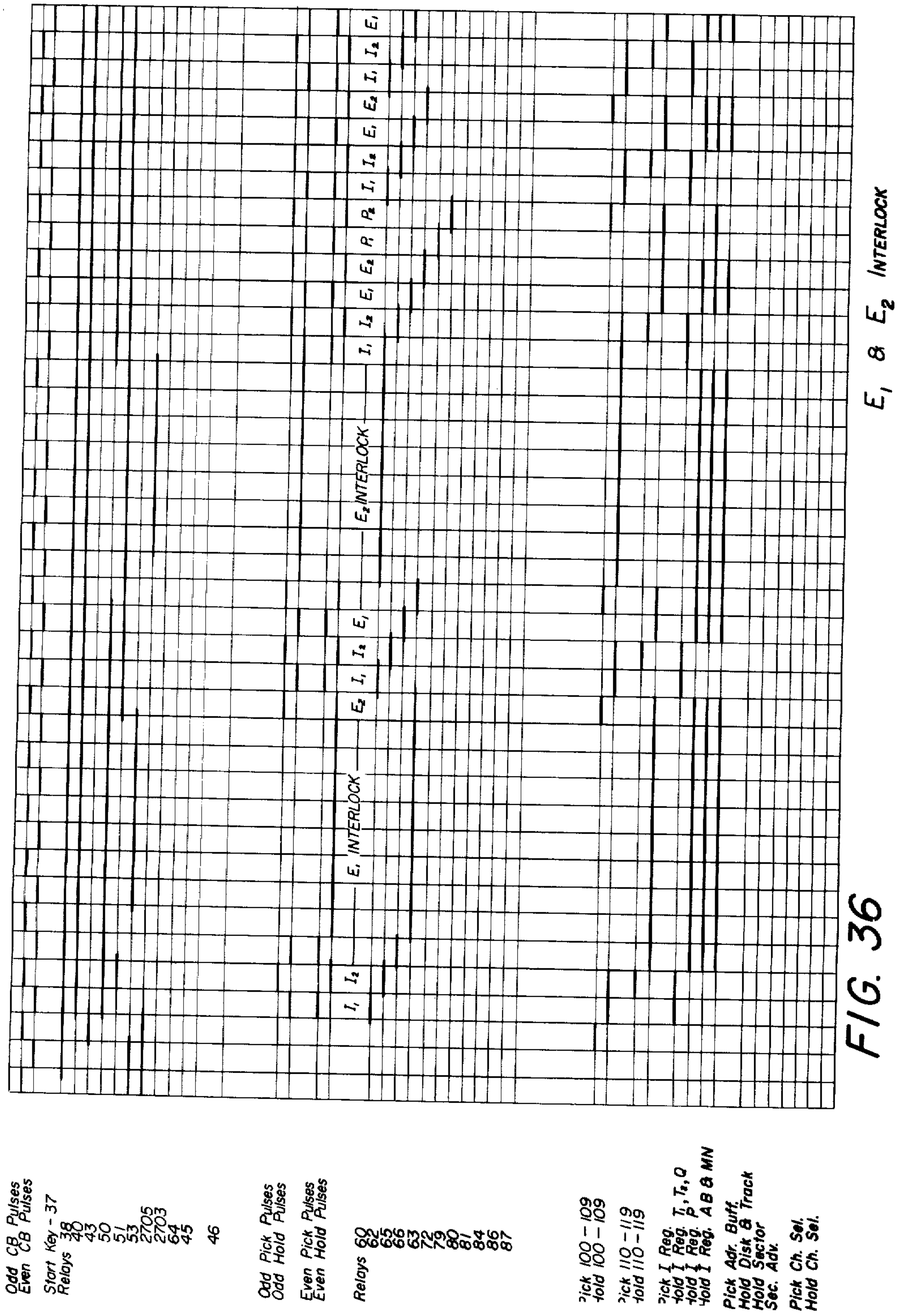

FIG. 36 is a timing chart disclosing relay sequences on an $E_1$ and $E_2$ interlock.

Figure 37:
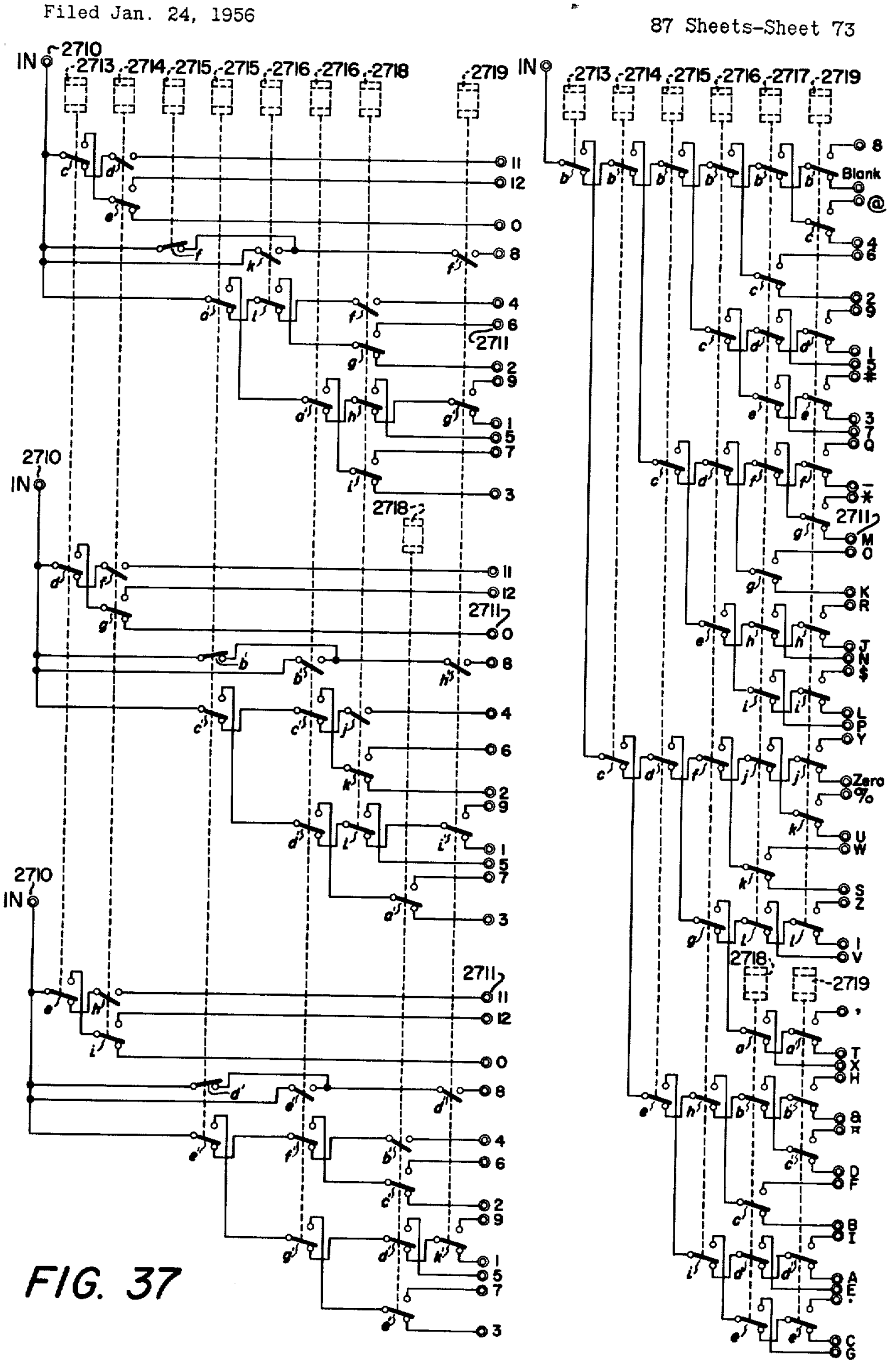

FIG. 37 is a schematic diagram of a portion of the character selector circuitry.

Figure 38:
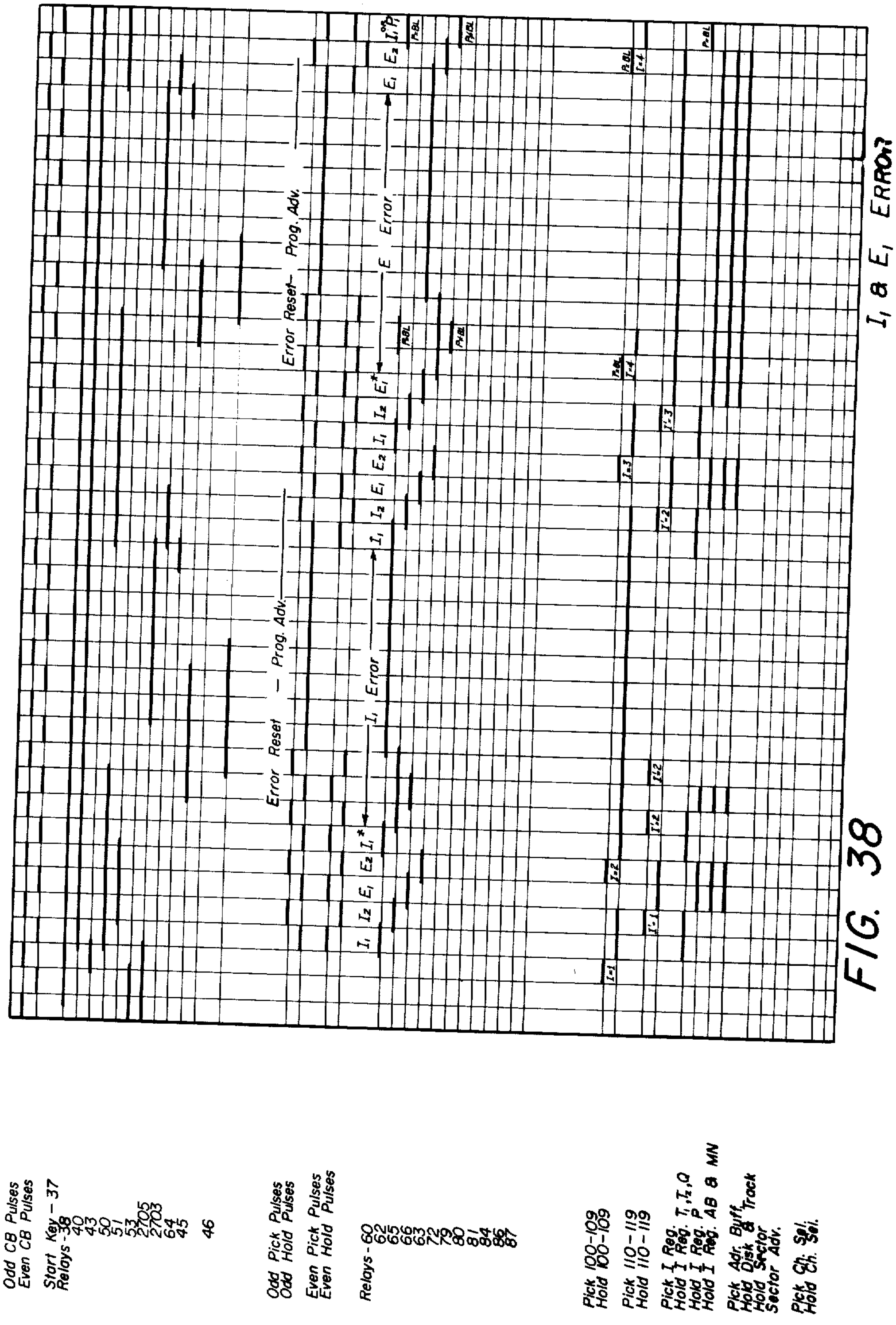

FIG. 38 is a timing chart disclosing relay sequences on an $I_1E_1$ error.

Figure 39A:
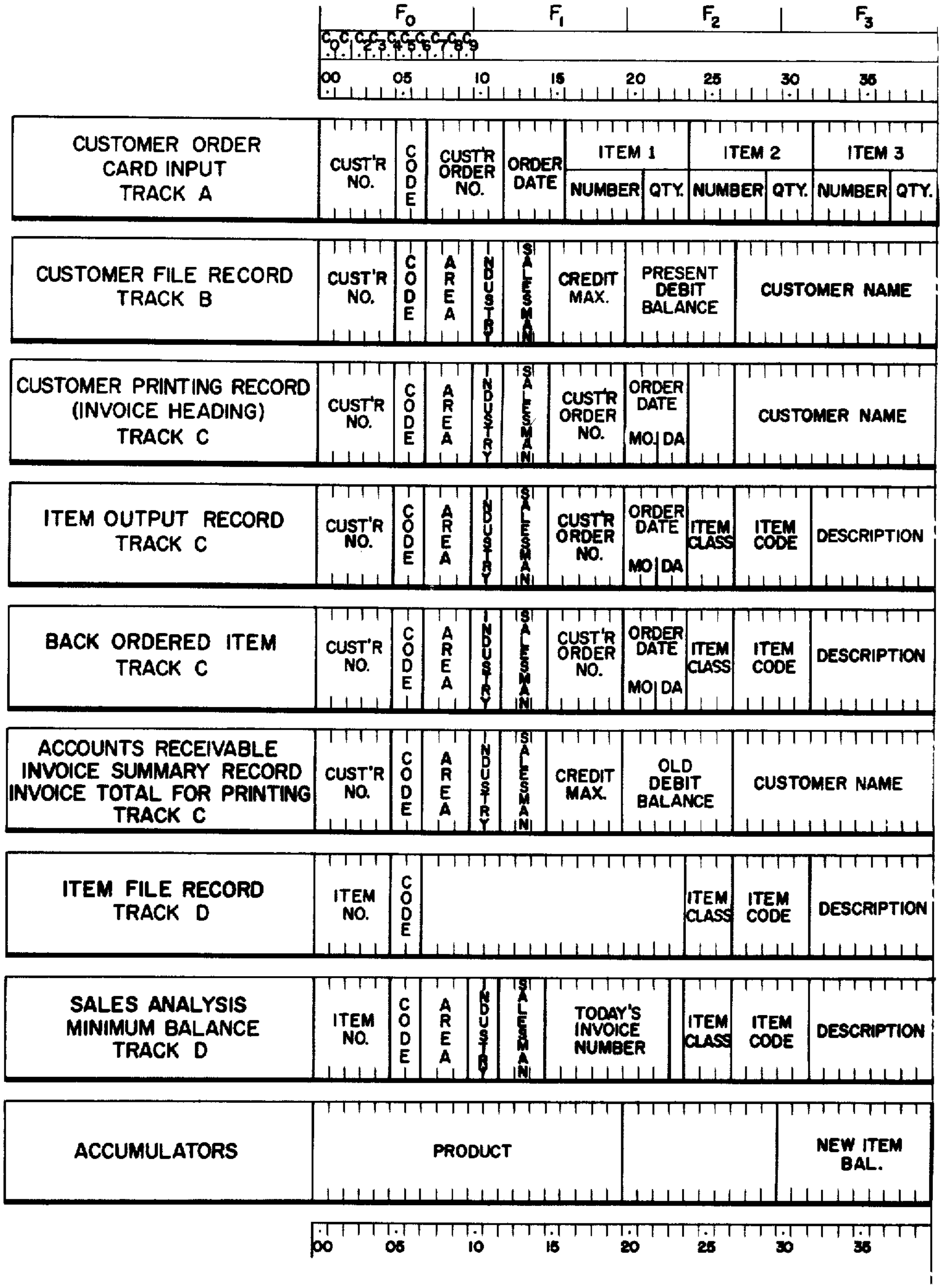
Figure 39B:
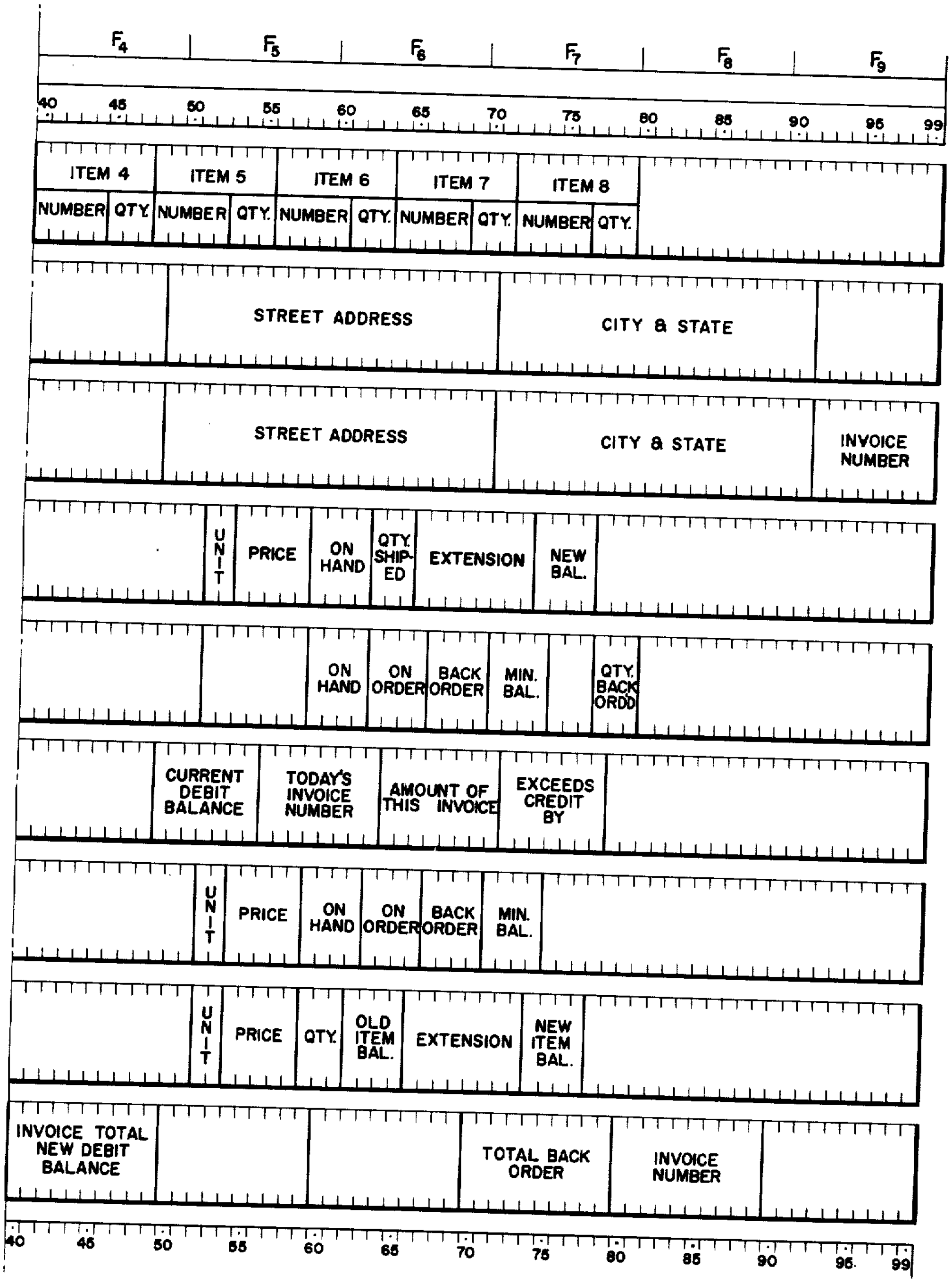

FIGS. 39*a* and 39*b*, when placed adjacent each other, are a pictorial sketch of various drum tracks and data recorded thereon during a typical application of the machine of the invention.

Figure 40:
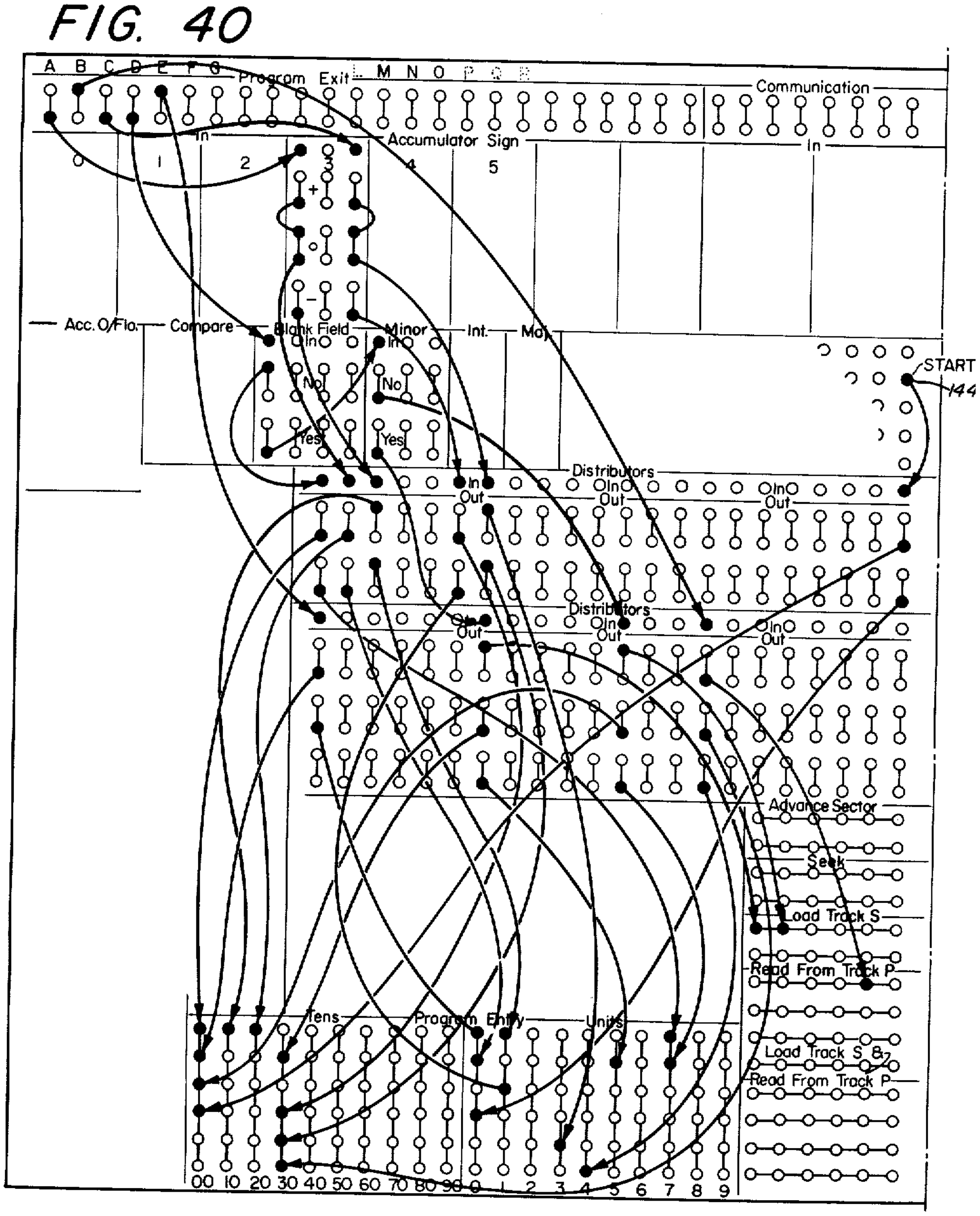

FIG. 40 discloses a portion of the control panel wired according to a typical application of the machine of the invention.

Figure 41:
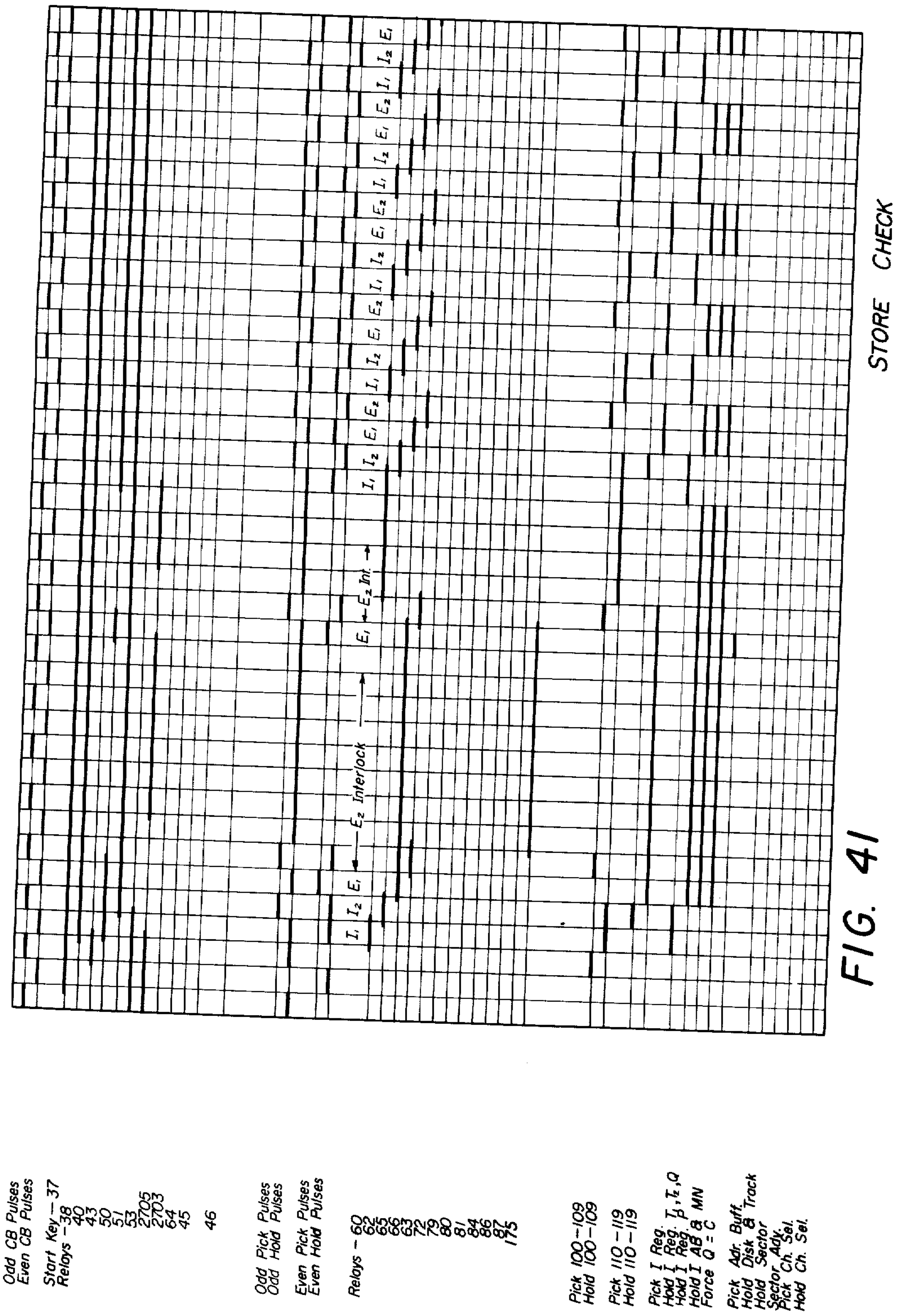

FIG. 41 is a timing chart disclosing relay sequences when $q=c$ is forced, i.e., when $T_2=R$.

Figure 42:
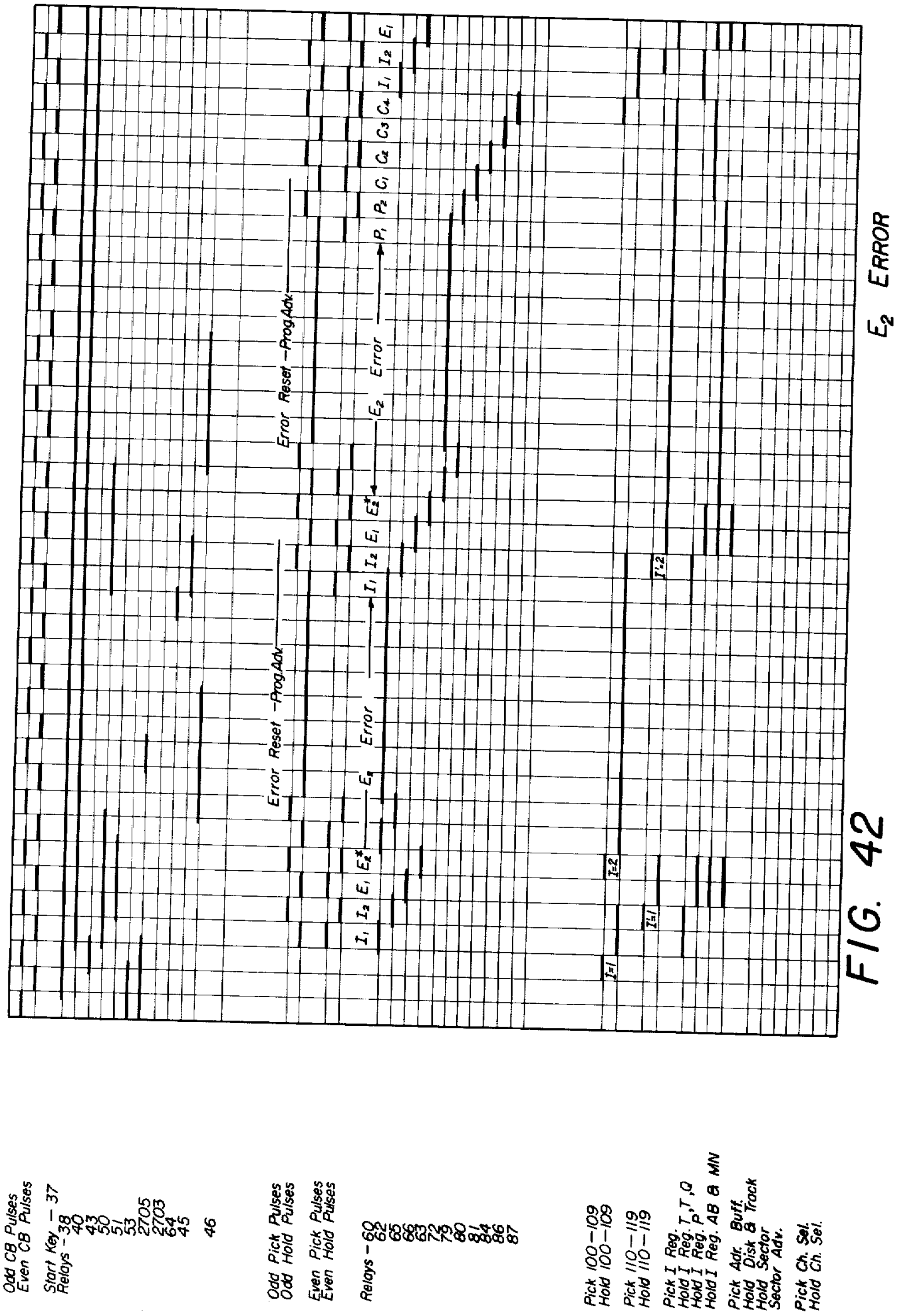

FIG. 42 is a timing chart disclosing relay sequences on an $E_2$ error.

Figure 43:
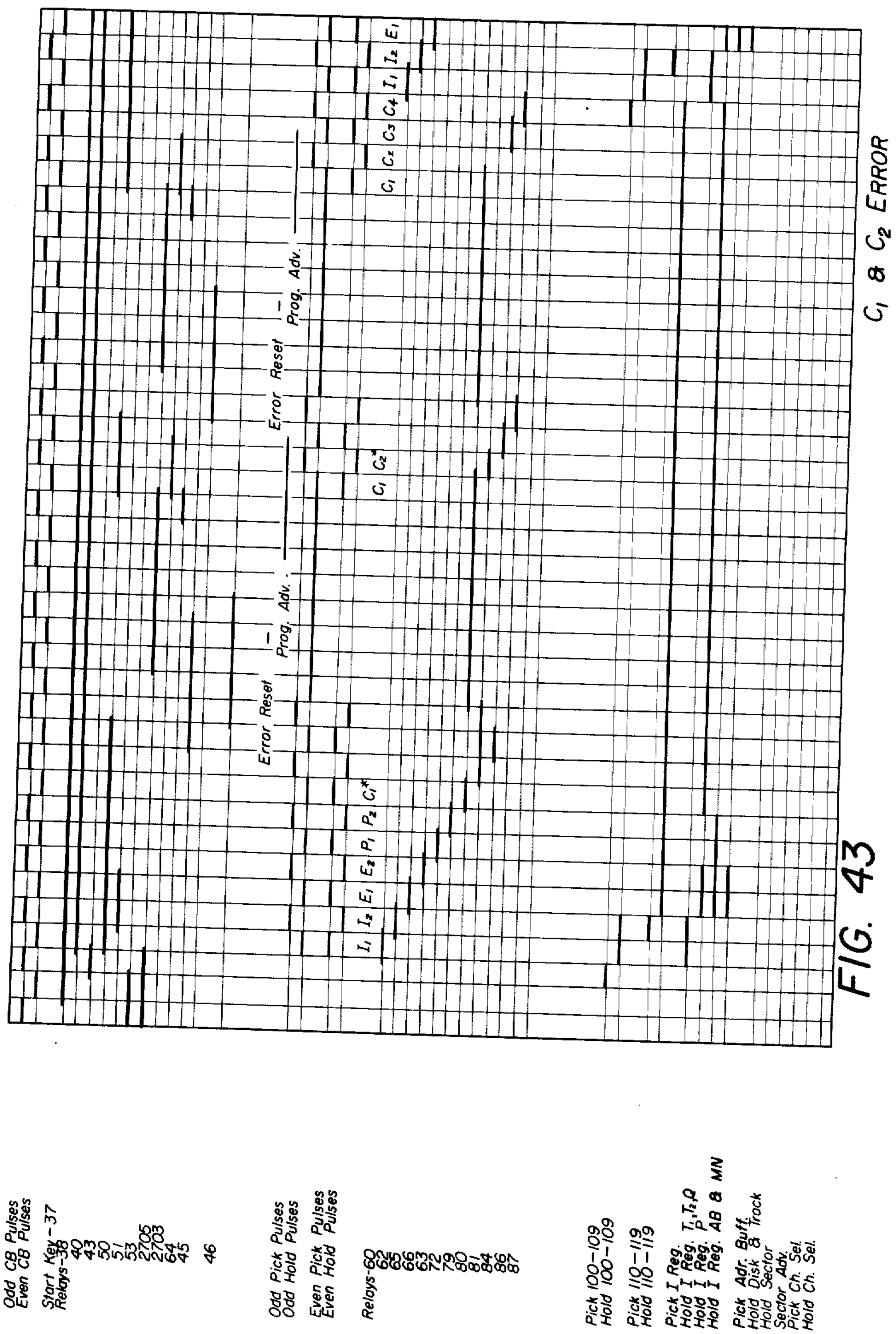

FIG. 43 is a timing chart disclosing relay sequences on $C_1$ and $C_2$ errors.

FIG. 44 discloses the layout of the drawings associated with FIG. 11.

FIG. 45 discloses the layout of the drawings associated with FIG. 14.

FIG. 46 discloses the layout of the drawings associated with FIG. 20.

FIGS. 47 through 96 are schematic diagrams of various electronic components utilized herein.

Figure 1:
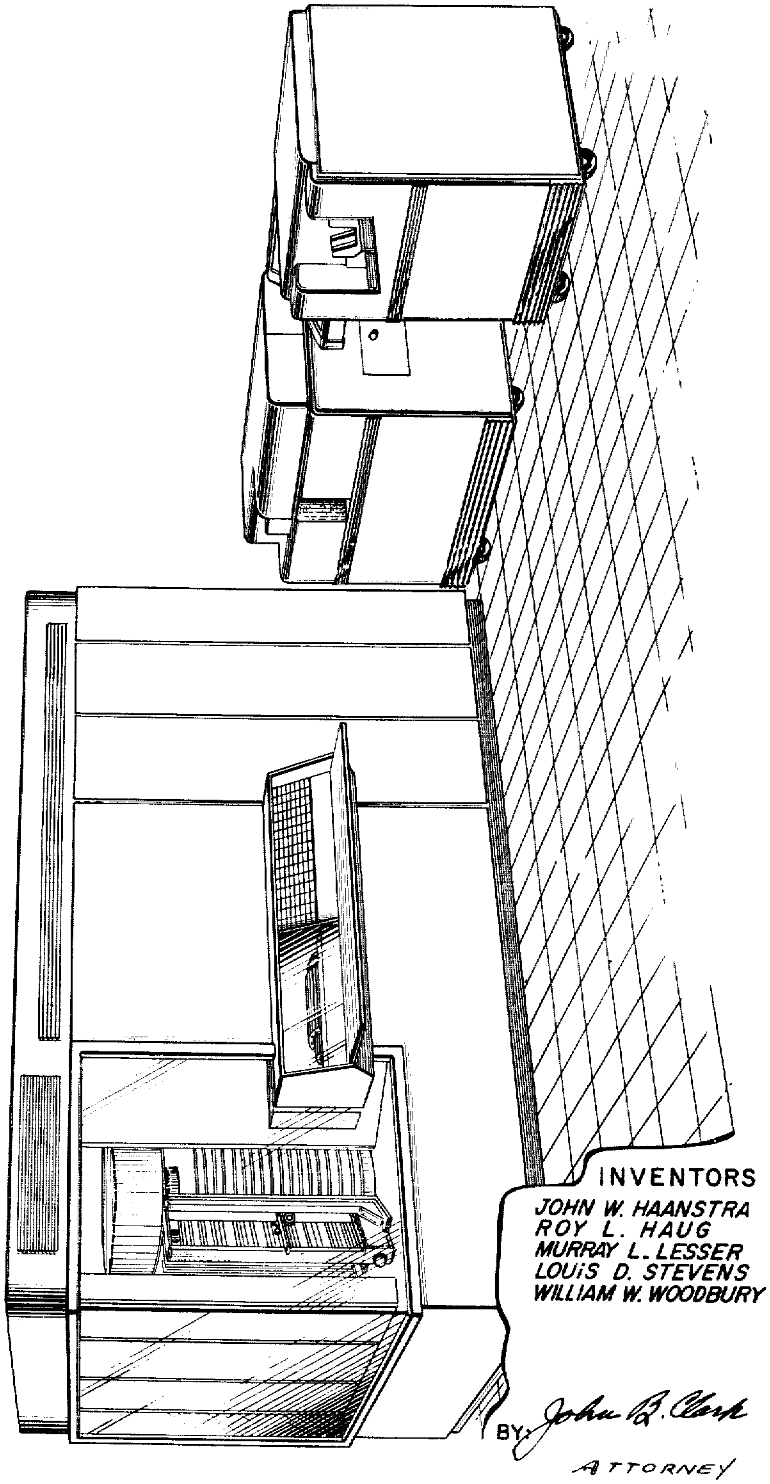
Figure 2:
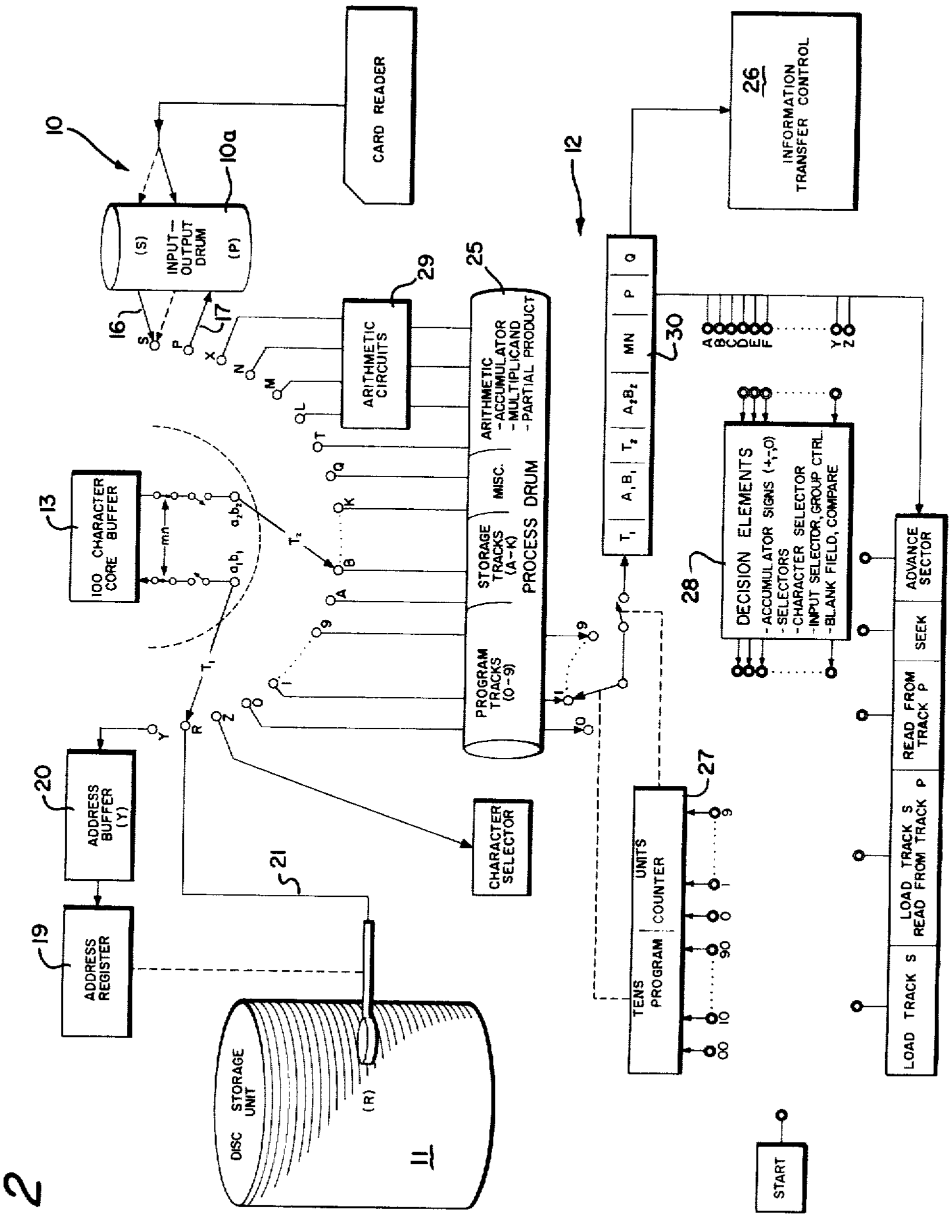
Figure 2A:
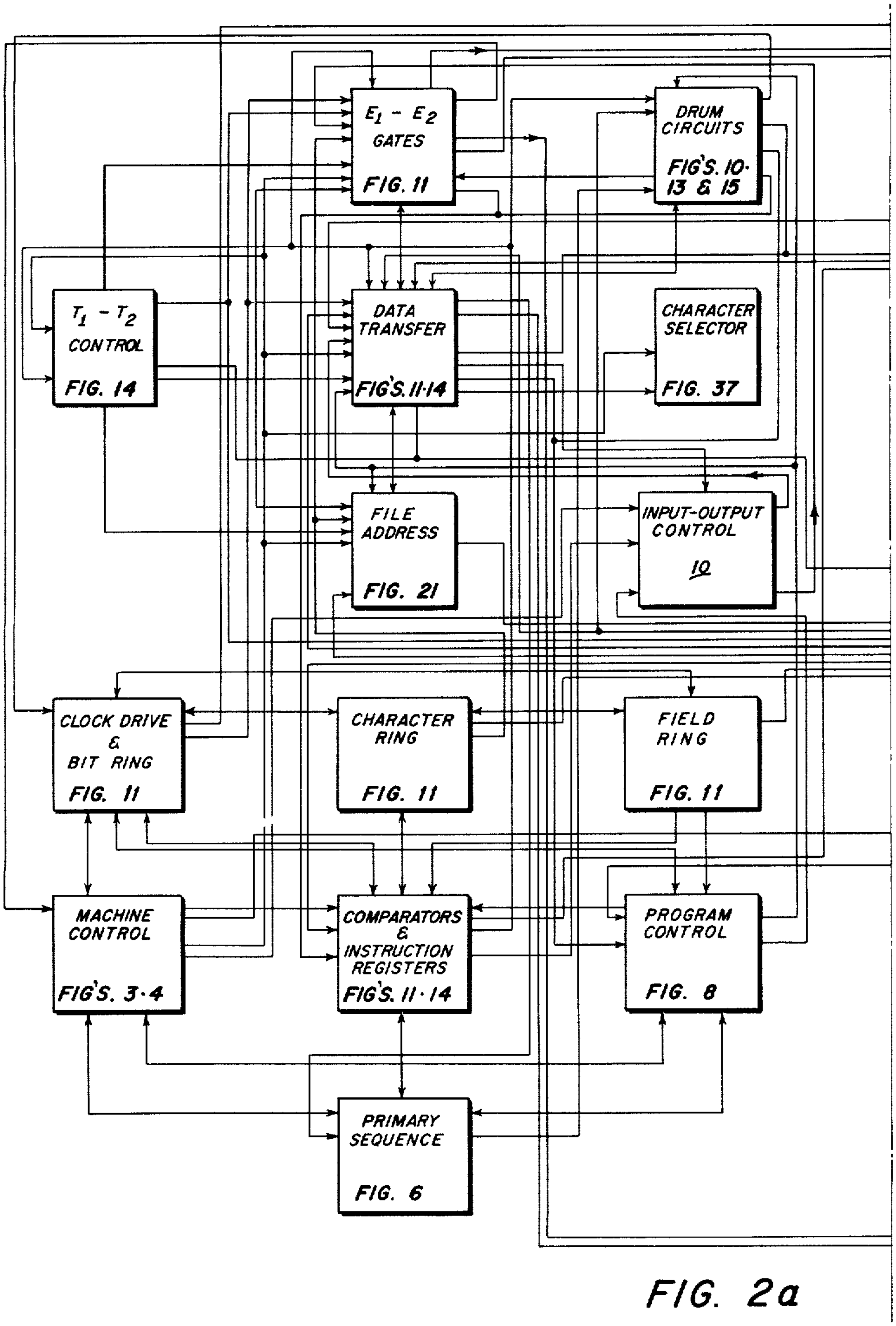
Figure 2B:
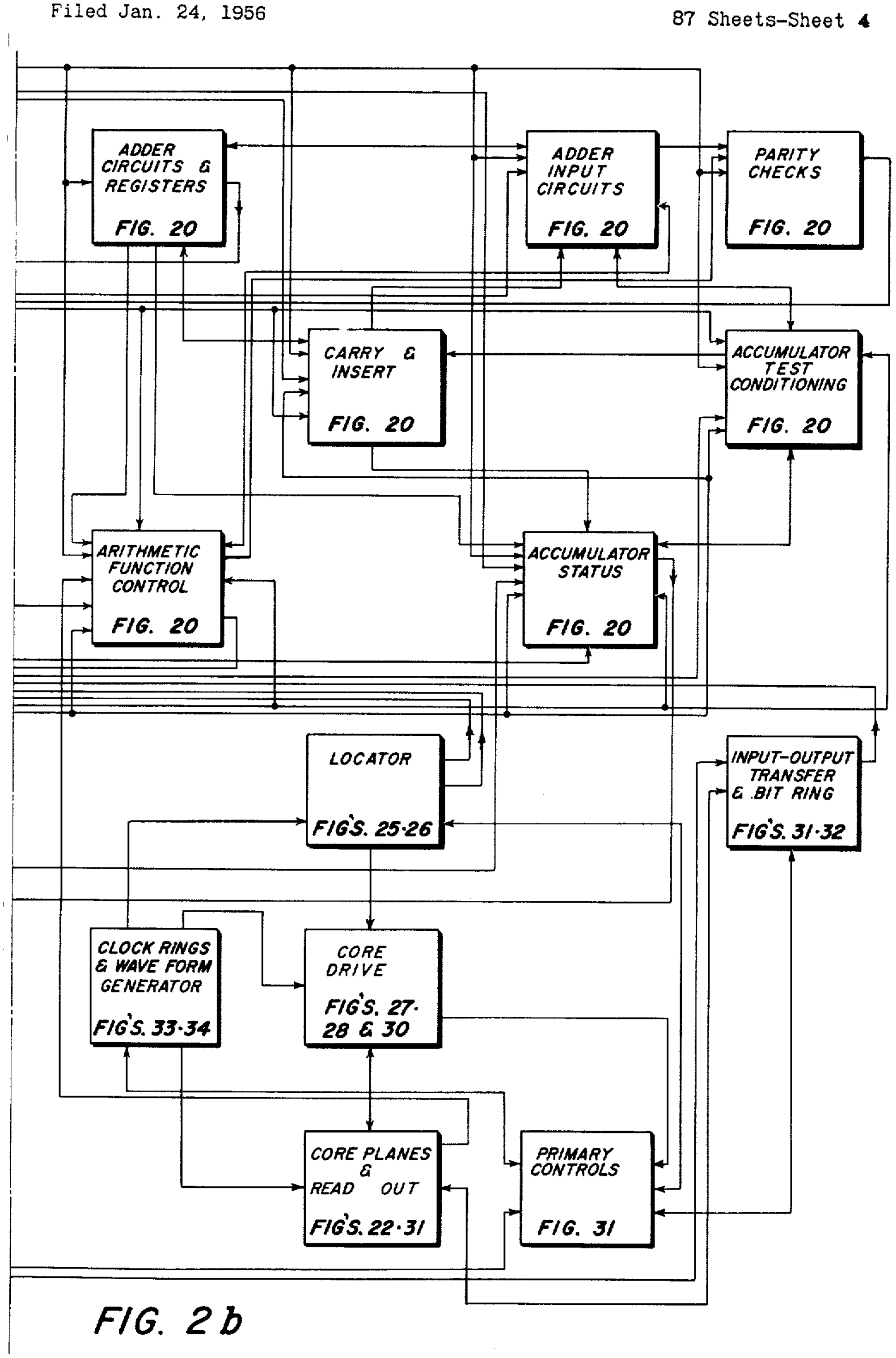

Referring now to FIG. 2, the machine of the invention generally comprises an input-output unit 10, a large capacity, random access, magnetic disc storage unit 11, a processing unit 12 for coordinating data transfer between the several units, and a 100-character magnetic core buffer storage unit 13 through which all data is moved when transferred from one unit to another or from one place to another within the processing unit 12. The unit 13 provides the necessary synchronizing and realigning facilities and, in addition, performs certain arithmetical, logical and selection operations.

In the present embodiment the input-output unit 10 includes a drum **10*a*** having three magnetic tracks for data storage, i.e., two input tracks S and an output track P, in addition to a timing or clock track $CT_1$. Data is entered on or taken from the drum tracks in any convenient manner. For example, the input may be made via punched record cards and a card feed, card reader and associated circuitry, such as that used in connection with the drum disclosed in the copending U.S. Patent No. 2,946,504, application Serial No. 555,026, filed December 23, 1955, may be utilized. Similarly, the output track P might be arranged to operate a printer in a manner taught in the above mentioned copending application or to control the operation of other apparatus, such as a punch, in a well known manner.

Each of the data tracks of the input-output drum **10*a* is adapted to store 100 eight-bit characters, each track being divided into 800 bit positions. By using two input tracks S which are alternately loaded with successive data sets to be processed, the next data set to be processed is always present on one or the other of these tracks. Thus, when data is being loaded on one track S, the read-out transducer associated with the second track S′ is operative to read the data recorded thereon therefrom, the read-out transducer associated with the first track S being inoperative at this time. However, when the input-output unit 10 is instructed by the machine to load the next data set onto the drum, means are actuated to cause the next data set to be loaded onto the track S′ and to render the read-out transducer associated with the track S operative. The actual structure provided for accomplishing these operations is not disclosed herein, it being fully disclosed in the aforementioned copending U.S. Patent No. 2,946,504, application Serial No. 555,026, and it will be assumed herein that when the input-output unit is instructed to load data by means to be described, the next data set to be processed may be taken from a line 16 extending from the input-output unit 10 serially by bit and serially by character. Additionally, output data to be printed or punched is transferred serially from the machine by a line 17** to the output track P.

The disc storage unit 11, together with the access mechanism therefor, is similar to the structure disclosed in a copending U.S. Patent application Serial No. 477,468, filed December 24, 1954, and, since reference may be made to that case, only that information relative thereto which is necessary to an understanding of the present invention is given herein. The disc array comprises 50 metallic discs coated on each side with a ferrous oxide material well known in the magnetic recording art and provides storage for 5,000,000 eight-bit characters. Each side of each disc is arranged with 100 concentric magnetic recording tracks, there being 10,000 such tracks in all, and each track is divided into five sectors, each of which will accommodate a "record" of 100 eight-bit characters. Thus, storage is provided for 50,000 100-character records.

A five-digit address is utilized to select a given record to be read from or recorded upon, four of which are necessary to control the access mechanism (address register) 19 to position the transducers associated with the disc storage unit adjacent the desired track of the selected disc, and one of which controls the selection of the proper record. The discs are numbered 00 through 49 and are addressed by similar numbers. The tracks are identified by numbers 00 through 99, each number referring to corresponding tracks on each side of a disc. Thus, each track includes ten records, i.e., five on each side of the disc, which are referred to and are addressed by the numbers 0 through 9. The first two digits of a record address, therefore, control the access mechanism 19 to position the transducers adjacent the selected disc, the second pair of digits control the mechanism 19 to dispose the transducers opposite the selected track of the selected disc, and the last digit of the record address controls which of the two transducers is selected for operation as well as the selection of one of the five sectors on the selected side of the disc.

By entering the address of a particular record into an address buffer 20 which controls the operation of the access mechanism 19 and by giving the access mechanism an instruction to seek, the transducers are positioned adjacent the track within which the desired record is contained. The head defined by the last digit of the address is rendered operative and a gating mechanism, to be described, is controlled to gate the data recorded on the desired record onto a line 21 or to gate data coming in on the line 21 onto the desired record.

The processing unit 12 is provided to process data and to coordinate and control the flow of data through the various portions of the machine, and includes a magnetic drum 25, information transfer circuits 26, a program control unit 27, a control panel 28, and arithmetic circuits 29. The drum is provided with 25 tracks, each of which is arranged to store 100 eight-bit characters, in addition to a timing or clock track $CT_2$. Three of the drum tracks are associated with the arithmetic circuits 29, eleven tracks are provided for general storage, one track serves as an emitter from which any selected character may be taken, and ten tracks are utilized for program storage.

FIG. 2 shows generally the paths over which data may travel in the present machine. Input information taken from the input track S may be transferred through the magnetic core buffer 13 into either the processing unit 12 or the disc storage unit 11. Similarly, information from the disc storage unit may be entered through the buffer to either the output track P of the unit 10 or the processing unit 12. In the processing unit, information is processed, modified, and rearranged as desired under the control of the internally stored programs, and the results of these operations may be transferred through the core buffer either to the output track P or to the disc memory.

The flow of information through the machine is controlled, as mentioned above, by programming, the best features of internally stored programming and of wired control panels being combined herein to obtain maximum flexibility. The primary means of processing information herein is by transferring it from one location to another under the control of the internally stored program instructions. Ten tracks of the magnetic drum in the processing unit may be used to store a series of instruction for controlling the operation of the machine. Since ten-digit instructions are utilized, each of the program tracks will store ten instructions, thereby providing storage for 100 ten-character instructions. These instructions are referred to herein as instructions 00 through 99. After executing a given instruction, the machine proceeds to the next higher numbered instruction unless it is transferred by the control panel to another instruction. For example, if the machine is started from instruction 24 and instruction 27 has a supplementary signal which is wired to transfer the series to instruction 51, the machine obeys the sequence of instructions: 24, 25, 26, 27, 51, 52, etc. This transfer may be made dependent upon logical decisions made on the control panel of the process control unit. The drum tracks used to store programs are identified by the numbers 0 through 9 and are arranged to store instructions 00 through 09, 10 through 19, etc., as set forth below.

| Drum track: | Program number |
|---|---|
| **0** | 00–09 |
| **1** | 10–19 |
| **2** | 20–29 |
| **3** | 30–39 |
| **4** | 40–49 |
| **5** | 50–59 |
| **6** | 60–69 |
| **7** | 70–79 |
| **8** | 80–89 |
| **9** | 90–99 |

(It should be noted that program tracks not used to store instructions may be used for the storage of information.)

The various storage tracks on the process drum are used for recording information being processed. As mentioned above, these tracks contain 100 character positions and are identified by the letters A through H, J, K and Q. Each character recorded on a track is identified by a position number, a two-digit address being used to define each of the 100 character positions on a track. Thus, the first character position on each track is defined by the address 00, the second position being defined by the address 01, etc., and the 100th position is defined by the address 99. The address B10, therefore, defines the position of the 11th character on general storage track B.

The ten-character instructions utilized herein are arranged as follows: $T_1a_1b_1\ T_2a_2b_2\ mn\ pq$. The first or $T_1$ position identifies the track from which information to be processed or transferred is to be taken, and $a_1b_1$ sets forth the address of the first character on that track to be transferred under the control of the instruction. In a similar manner, $T_2a_2b_2$ specifies the track to which information is to be transferred as well as the position in which the first character transferred is to be recorded. The seventh and eighth character positions of each instruction, i.e., *mn*, define how many characters are to be transferred (it being understood that the instruction "00" in these positions specifies the transfer of 100 characters and that "01" calls for the transfer of but a single character). The remaining positions, *pq*, are provided to relate certain modifying and control instructions which will be explained later. Thus, the first three positions are referred to as the FROM portion of the instruction, the second three positions define the TO portion of the instruction. The seventh and eighth positions define the number of characters to be transferred. For example, to transfer data recorded in positions 05 through 09 of general storage track C into positions 29 through 33 of track J, the instruction would be as follows: C09 J33 05 – –. This instruction controls the transfer of the character recorded in address 09 of storage track C into address 33 of storage track J. Similarly, the character recorded in C08 is transferred to J32, etc.

Alphabetic code addresses are given to the other units through or to which there is data flow as follows:

| | From— | To— |
|---|---|---|
| Input storage track | S | ---- |
| Output storage track | ---- | P |
| Disc memory | R | R |
| Address buffer | ---- | Y |
| Multiplicand | N | N |
| Multiplier | ---- | X |
| Character emitter | T | ---- |
| Accumulator add | ---- | L |
| Accumulator subtract | ---- | M |
| Accumulator read-out | L | ---- |
| Accumulator read-out and reset | M | ---- |

As an example of the use of these codes, let us suppose that it is desired to read data into the machine and transfer it to track C of the processing unit. If it is assumed that an earlier instruction has caused the data to be entered onto one of the input storage tracks S, the machine is given an instruction such as S99 C99 00 – –. This controls the machine to take 100 characters, starting from position 99 and extending through position 00, from the input storage track and to transfer it to the corresponding positions on track C.

In a normal transfer operation, data from the $T_1$ address is transferred into the core buffer 13 during what is referred to herein as an $E_1$ cycle and is transferred therefrom to the $T_2$ address during an $E_2$ cycle, and upon completion of this transfer, there being no modifying instruction in the *pq* portion thereof, the machine immediately prepares to execute the next successive instruction.

If a modifying instruction occurs in the *pq* portion of an instruction, selectors on the control panel 28 are tested to control the machine to proceed to one of a number of alternate programs. This operation, in which the machine selects the next sequence of programming, is called "branching," after which the machine proceeds immediately to the next instruction. Modifying instructions may be numerical or alphabetical. If a numerical code is placed in the ninth or *p* column of the instruction, the machine executes the instruction, performs the operation specified by the numerical code, and then proceeds to the next consecutive program step. The numerical control codes are as follows:

1 ---------------- Load track S
2 ---------------- Seek
3 ---------------- Advance sector
4 ---------------- Read from track P
8 ---------------- Load track S and read from track P If no modifying control is desired, the *p* column of the instruction is left blank. As an example of the use of the modifying instruction, let us suppose that it is desired to transfer the data on track C of the drum 25 to the output track P and cause it to be read out for printing or punching as may be desired. In this case the machine is given the instruction: C99 P99 00 4–. This causes the 100-character record on track C to be transferred to the output track P from where it is taken to control printing or punching.

When information is to be transferred from the disc memory to a storage track on the process drum, an entire 100-character record must be transferred. To cause the disc memory to locate the desired information, the address thereof is entered into the address buffer 20 and the seek control code is added to the instruction. Assuming that the address of the desired record in the disc file is presently located in positions 04 through 00 of general storage track A, such as instruction would appear as follows: A04 Y99 05 2–. This instruction causes the address recorded in the last five positions of track A to be transferred to the address buffer 20. The control code 2 then causes the access mechanism to move the transducers associated with the file 11 adjacent the disc and track defined by the first four digits of the address and to locate the desired record, as discussed earlier. (It should be noted that the 99 recorded in the $a_2b_2$ positions of the instruction is used only to fill these positions, there being no meaning therefor in this instance.) Since it takes time for the access mechanism to position the transducers according to an address, it is desired that the machine be given this instruction as soon as the address is known. In this way processing may continue until the information is actually needed, thereby permitting utilization of the access time for other processing, which reduces the effective time required for a given operation. To transfer the disc record to the processing unit, an instruction such as R99 E99 00 – – is utilized. This instruction causes the entire 100-character record specified by the number in the address buffer to be transferred to the track E.

When successive records on the same disc storage track are to be read, it is not necessary to move the access arm physically and the number in the address buffer may be advanced one address at a time either by using the *p* control code 3 or by control panel wiring, as will be explained. Thus, when the arm has been physically located, all ten records on the track being scanned may be read out on successive operating cycles. For example, if the record address is 12340, record 12340 is first read out. Simultaneously, if the 0 is changed to a 1, the record 12341 is read out on the next cycle. Subsequently, records 12342 through 12349 may be read out in a similar manner. Note that the advance sector operation affects only the low order position of the address buffer and does not carry over into other positions, since, if it did carry over, a relocation of the access arm would be required and such relocation is accomplished only by a seek operation.

A track T, referred to herein as the emitter track, on the processing drum is provided with various numerals, letters and special characters previously recorded thereon and is used as a source from which selected characters are taken for use when desired. The address of these characters is known and they are referred to by suitable instructions. If, for example, it is desired to record a "5" for record identification, etc., perhaps in character position 21 of track J, and assuming that a "5" is recorded in character position 43 of the emitter track T, the instruction would be T43 J21 01 – –.

The numerical *p* codes discussed above control automatic operations such as loading the input track S and positioning the access arm. If an alphabetic *p* code is utilized, however, an impulse is emitted from a corresponding program exit hub on the control panel 28 of the processing unit 12 and the program sequence is cancelled. This impulse may be wired through various selectors to make logical decisions according to the results of previous operations and, as in other control panel operations known in the art, these selectors may be tested in combination and the impulse wired to cause different operations for different selector conditions. This allows branching to one of any number of possible alternate programs. The impulse from the program exit hub must be returned to a pair of program entry hubs, as will be described, to initiate the new sequence of programs. Thus, a program exit hub emits an impulse whenever the corresponding alphabetic *p* code is attached to an instruction. This impulse is used to make tests on the control panel, and when it is emitted, the program sequence is cancelled and is reestablished by wiring to the proper program entry hubs.

Program entry hubs are provided to accept the program exit impulse which sets up the first program step of a new sequence. When an alphabetic *p* code is attached to an instruction, the machine stops operation unless a new program is initiated by impulsing the program entry hubs. The new program step is set up by impulsing the two hubs that correspond to the address of the desired instruction number. Thus, for example, if the impulse taken from program exhit hub B is to initiate a new sequence of program steps beginning with step 62, hub B is wired to the entry hubs which control the selection of program 62, as will be explained.

Latch type selectors are utilized herein to provide for storage and for analysis of control. Each selector has a common hub, a pick hub, a drop hub, a normal hub, and a transferred hub, the common hub being connected to the normal hub until the selector is picked up by impulsing the pick hub. At this time the common hub is connected to the transferred hub where it remains until an impulse is sent to the drop hub. An impulse that is used to perform several functions on the plugboard is first wired through distributors which serve the same function as parallel wires but prevent back circuits.

As an example of branching, let us suppose that the machine has proceeded through program steps 90 *through* 14 and the need for a logical decision arises. Under one condition a first selector is transferred, and in this case the program is to be reinitiated at program step 19. Under another condition a second selector is transferred and the program is to be reinitiated at step 29. A third condition might be where neither selector is transferred, and in this case it will be assumed that the program should proceed to step 15. The instruction for step 14, therefore, is provided with an alphabetic $p$ control code such as A. The control code A causes an impulse to be emitted from the A program exit hub after the instruction has been carried out. Simultaneously, the program sequence is cancelled. If the first selector is transferred at this time, the impulse from program exit hub A emerges from the transferred side of this selector and is wired through a distributor to impulse the "1" hub in the tens program entry and the "9" hub in the units program entry, and program 19 is set up to control the next program step. If the first selector is normal, the impulse emerges from the normal side thereof and is wired to the common hub of the second selector. Thus, if this selector is transferred, the impulse emerges from the transferred hub thereof to impulse program entry hubs "2" and "9" and initiate program step 29. If neither selector is transferred, the impulse from the program exit hub A emerges from the normal side of the second selector and enters program entry hubs "1" and "5" to initiate program 15.

The $q$ portion of the instruction is utilized to control special operations as may be desired. In the present embodiment only one such operation is disclosed, and when $q=c$, data recorded at the $T_2$ address is compared with the data taken from the $T_1$ address. Thus, when $q=c$, a comparison is made between the $T_1$ data and the $T_2$ data to determine, for example, whether or not a transfer was correctly made. When $T_2=R$, a comparison is forced automatically after the data is recorded on the disc. This operation requires a second $E_1$ cycle, during which the $T_1$ data is again read into the buffer, and a second $E_2$ cycle during which the data is read from the $T_2$ address and compared with the data in the buffer to determine if they are identical.

The primary time base of the present machine is the rotating process drum 25, and all operations are timed to the process drum by cam operated circuit breakers driven from the drum shaft. Most gross control paths are set up through relay points and, in general, these relays are picked during one drum revolution and the signal is sent through their points during the next following drum revolution. Thus, the basic operation is made up of two drum revolutions. Successive revolutions or cycles are designated herein as "even" cycle, "odd" cycle, "even" cycle, etc., and since various segments of the control sequence are intimately associated with a given type of cycle, i.e., odd or even, any interruption in the normal control sequence must exist until the correct phase reoccurs.

A normal transfer operation, i.e., a transfer operation solely within the processing unit, requires four cycles for completion. The first cycle, an even cycle, is the $I_1$ cycle during which time an instruction is read from the appropriate ten-digit field of one of the program tracks under the control of the program counter 27 and into a static instruction register 30. The next cycle is referred to as the $I_2$ cycle (odd) and is used to provide "wait" time required to allow relays associated with the instruction to be picked in the event that the instruction occurs late in the $I_1$ cycle. The remaining two cycles of the trensfer operation include the $E_1$ (even) and $E_2$ (odd) cycles. During the $E_1$ cycle, information from the sending track $T_1$ is loaded into the magnetic core buffer, starting at the character address specified by $a_1b_1$ and continuing until $mn$ characters have been read into the buffer or until character position 00 has been passed, whichever occurs first. The unloading of the core buffer onto the receiving track $T_2$ occurs during the $E_2$ cycle in an analogous manner. Thus, a normal transfer operation requires four cycles for completion. In terms of the usual stored program concepts, the $I_1$ and $I_2$ drum revolutions constitute the "fetch" cycle and the $E_1$ and $E_2$ periods are the "execute" cycle. Provided that the $p$ column of the instruction is blank, the system proceeds to read the next instruction on the following cycle (even), and these four revolution sequences follow each other until interrupted by a $p$ "flag" or by an operation that cannot be accomplished within the basic cycle.

If the $p$ column of the instruction is not blank, i.e., if a relay in the $p$ section of the instruction register has been picked, an additional pair of control cycles, i.e., the $p_1$ and $p_2$ cycles, are added to the basic cycle following $E_2$. the $p_1$ cycle (even) is wait time provided primarily to allow any control panel relays of state that might have been affected during the $E_2$ cycle to reach their final condition. Also, if an alphabetic character is present in the $p$ portion of the instruction, the program counter relays are dropped out during the $p_1$ cycle. The actual control panel pulse is emitted during the $p_2$ (odd) cycle and may be used to actuate various control panel functions as well as to pick up the program counter relays at a new starting point. Once the program relays are picked, the normal $I_1$ cycle starts on the following drum revolution. If a numerical code is located in the $p$ column of the instruction, the program counter relays are not dropped out during the $p_1$ cycle. The appropriate functions are actuated during $p_2$ time and on the following drum revolution, an $I_1$ cycle is initiated which controls the entry of the next consecutive instruction into the register 30.

Means are provided herein for transferring data under the control of the control panel and without the use of the internally stored programs. Such transfers are limited to full records, however, and are initiated by pulsing suitable hubs on the control panel, as will become clear. These operations are referred to as copy operations and an obvious necessity therefor is to initiate the operation of the machine by loading a few internal instructions on one of the instruction tracks. A copy operation requires four cycles which are identified as the $C_1$, $C_2$, $C_3$ and $C_4$ cycles. The buffer is loaded during the $C_1$ cycle and is unloaded during the $C_2$ cycle. $C_3$ is provided as wait time and during $C_4$ a new control panel pulse is emitted for initiating further operation as may be desired.

Two additional cycles, $D_1$ and $D_2$, are provided for yielding a delay when necessary for some reason. When a control panel pulse is entered into a delay entry hub, it exits from an exit hub two cycles later and in this way a two-cycle delay is obtained. Where successive copy operations are to be taken, it is necessary to separate them by a delay to allow the various relays involved to be transferred. This is but one reason for the provision of the delay, others being obvious to those familiar with programming of such machines as the present one. Where more than a two-cycle delay is desired, the pulse taken from the delay exit hub may be utilized to initiate another two-cycle delay by entering it into a second delay entry hub.

When $T_1$ is either S or R, or when $T_2$ is P or R, the basic timing cycle of the machine is altered since the drum 10*a* of the input-output unit 10 and the various discs of the disc storage unit 11 are not synchronized with the process drum 25. The processing unit is arranged to proceed through the $I_1$ and $I_2$ cycles in the manner described above; however, when $T_1=S$ or $R$, the system is placed in an interlocked condition on the $E_1$ cycle which extends the $E_1$ cycle until a signal is obtained which indicates that the buffer has been loaded by the sending track. The next odd cycle after this signal is received is the normal $E_2$ cycle unless $T_2=P$ or $R$. Additionally, when $T_2$ is either P or R, the $E_1$ cycle occurs in the normal fashion (unless $T_1=S$ or $R$) and the $E_2$ cycle is extended. It will now be understood that if in a given instruction $T_1=S$ or $R$ and $T_2=P$ or $R$, both the $E_1$ and $E_2$ cycles are extended.

The basic timing of the present machine is under the control of 24 circuit breakers CB–1 through CB–24 (FIG. 3*a*) which are operated by corresponding cams 34 mounted on a shaft driven by the shaft upon which the process drum 25 is mounted. The cam shaft however, is driven at one-half the speed of the process drum. The various CB's are closed by the corresponding cam for slightly more than a full drum revolution, the odd-numbered CB's being closed from 350° to 190° of the cam shaft rotation and the even-numbered CB's being closed from 170° to 10° of the cam shaft rotation. The make and break of these CB's roughly defines the odd and even cycles referred to hereinabove.

One side of CB–2 is connected to +48 volts by a line 35, the other side thereof being connected through a line 36 to one side of a n/o start key 37 (FIG. 4*b*) which, when actuated, initiates the operation of the machine. The second side of the start key 37 is connected through the n/c *c* points of a relay 38 and through a line 39 to one side of the pick coil of a relay 40, the other side of which is connected to ground. Thus, when the start key is actuated, CB–2 makes and the pick coil of the relay 40 is energized. One side of the hold coil of the relay 40 is grounded and the other side thereof is connected through its n/o *a* contacts, through a line 41 and through CB–1 (FIG. 3*a*) to +48 volts, and when CB–1 makes the hold coil of the relay 40 (FIG. 4*b*) is energized (see FIG. 5). Thus, the relay 40 (FIG. 4*b*) is picked by an even CB pulse and is held by the following odd CB pulse.

When the relay 40 is picked, its *b* contacts are transferred and the same CB–1 pulse that holds relay 40 is connected from the line 41 through these contacts, through a line 42 and through the pick coil of the relay 38 to ground, thereby picking the relay 38 at this time. One side of the hold coil of the relay 38 is grounded and the other side is connected through its *a* contacts to the line 36 from which CB–2 pulses are taken. Thus, relay 40 is picked by the first even CB pulse after the start key is actuated and is held by the next following odd CB pulse. The relay 38 is picked by the first odd CB pulse after the relay 40 is picked and is held by the following even CB pulse, as described. It should also be noted that the pick coil of the relay 38 is connected by the line 42 through its n/o *b* contacts to the line 41, and under normal conditions the relay 38 is continuously energized, through either its pick or hold windings, by odd and even CB pulses, respectively, after the relay 40 has been picked. Additionally, it should be noted that the relay 40 drops out when the relay 38 picks since the *c* contacts of the relay 38 are opened at this time.

One side of the pick coil of a relay 43 is connected to ground, the other side thereof being connected through a line 44 and through the n/o *c* contacts of the relay 40 to the line 41, and the first odd CB pulse after the relay 40 is energized picks the relay 43. Since the hold coil of the relay 43 is connected between ground and through its n/o *a* contacts to the line 36, the relay 43 is held during the following even CB pulse since at this time its *a* contacts are transferred.

Figure 4A:
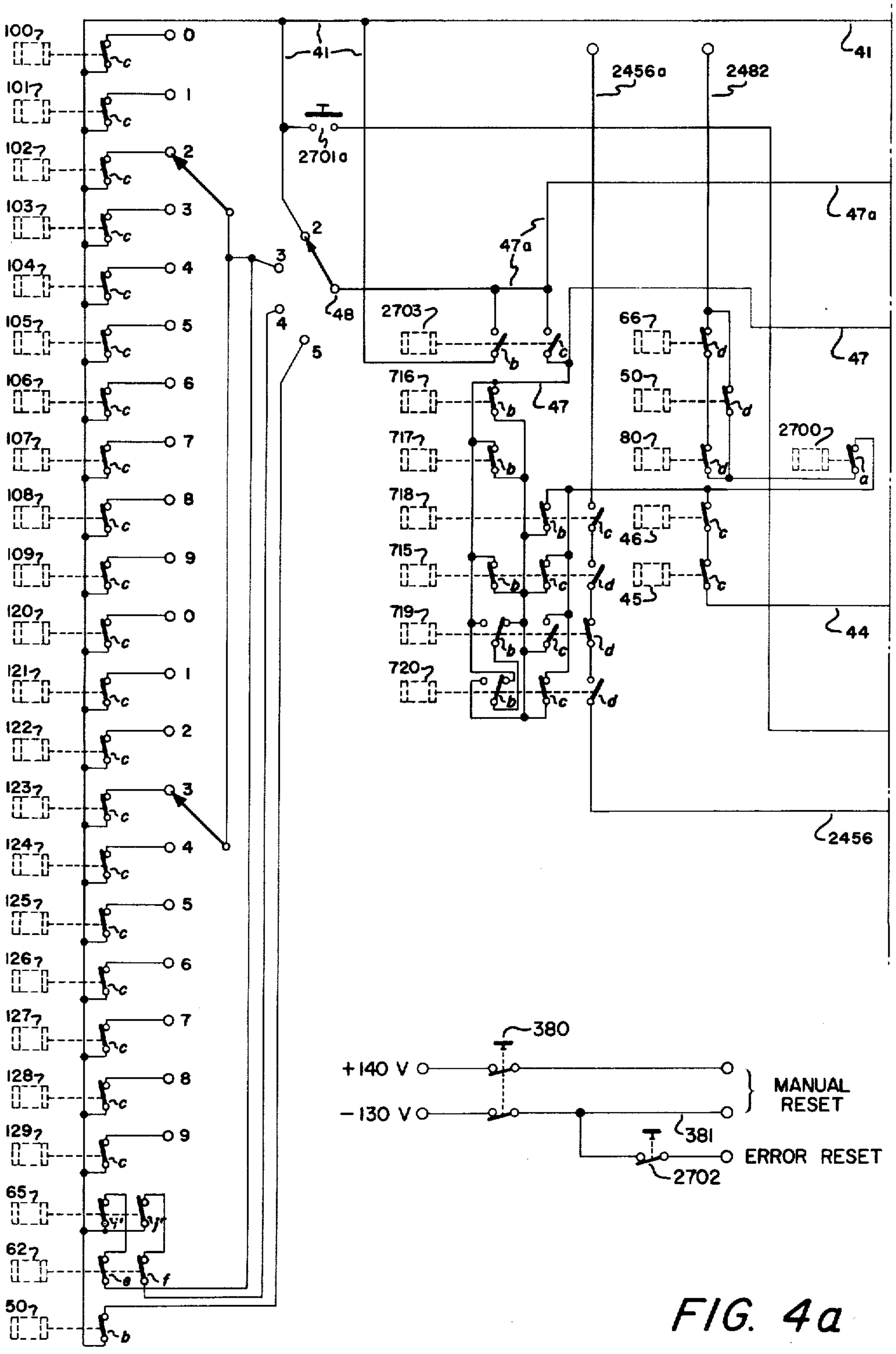

In addition to being connected to the line 44, the pick winding of the relay 43 is connected through the n/c *c* contacts of a relay 45 (FIG. 4*a*) and through the n/c *c* contacts of a relay 46 to one side of a matrix of relay points, the other side of which is connected by a line 47 through the n/o *b* contacts of the relay 43 (FIG. 4*b*) and by a line 47*a* through the armature and #2 contact of a switch 48 (FIG 4*a*) to the line 41. As will become clear later, the above mentioned matrix of relay points presents an open circuit when $T_2=P$, $X$ or $R$, it being closed under all other conditions. Additionally, the relays 45 and 46 are energized only in the event that an error has been made. Thus, assuming no error and assuming further that $T_2\neq P$, $X$ or $R$, the pick coil of the relay 43 (FIG. 4*b*) is connected through its *b* contacts to the CB–1 pulse line 41 when the switch 48 is in the condition shown. Under the conditions defined above, therefore, the relay 43 is continuously energized, from the time that the contacts of the relay 40 are transferred until one of these conditions is not met, at which time the machine is put in an interlocked condition as will be explained.

The line 36 (FIG. 4*b*) is connected through the n/o *d* contacts of the relay 38 and through a matrix of relay points to a line 39 which is connected to one side of the pick coil of a relay 50, the other side of which is grounded, and when the relay 38 picks, as described above, its *d* contacts are transferred and the pick coil of the relay 50 is energized, provided there is a path through the last mentioned matrix of relay points to the line 39. As will be explained later, the only time this matrix presents an open circuit is when $T_1$=either $R$ or $S$. Since the hold coil of the relay 50 is connected through its own n/o *a* contacts to the line 41, it should be clear that the relay 50 is picked by the first even CB pulse after the relay 38 is picked and that it is held during the following odd and even CB pulses as long as the relay 38 is energized, and as long as $T_1\neq S$ or $R$.

One side of the pick coil of a relay 51 is connected to ground, the other side being connected through a line 52, through the n/c *e* points of the relay 40, through the n/c *e* points of the relay 50 to the CB–1 pulse line 41. The hold coil of the relay 51 is connected between ground and one side of its n/o *a* contacts, the other side of these contacts being connected to the line 36. Thus, the relay 51 is picked by odd CB pulses and is held by even CB pulses until either relay 40 or relay 50 is energized, i.e., until the odd cycle following actuation of the start key 37 since at this time the contacts of the relay 40 transfer. After the relay 40 drops out, the relay 50 picks, thereby preventing further energization of the relay 51 as long as the relay 50 is energized.

The line 36 is connected through the n/c *e* contacts of the relay 43 to one side of the pick coil of a relay 53, the other side of which is grounded. Additionally, the line 41 is connected through the n/o *a* contacts of the relay 53 to one side of the hold coil of this relay, the other side thereof being grounded. Thus, the relay 53 is picked and held by even and odd CB pulses, respectively, until the *e* contacts of the relay 43 are transferred, at which time the relay 53 drops out.

Figure 3A:
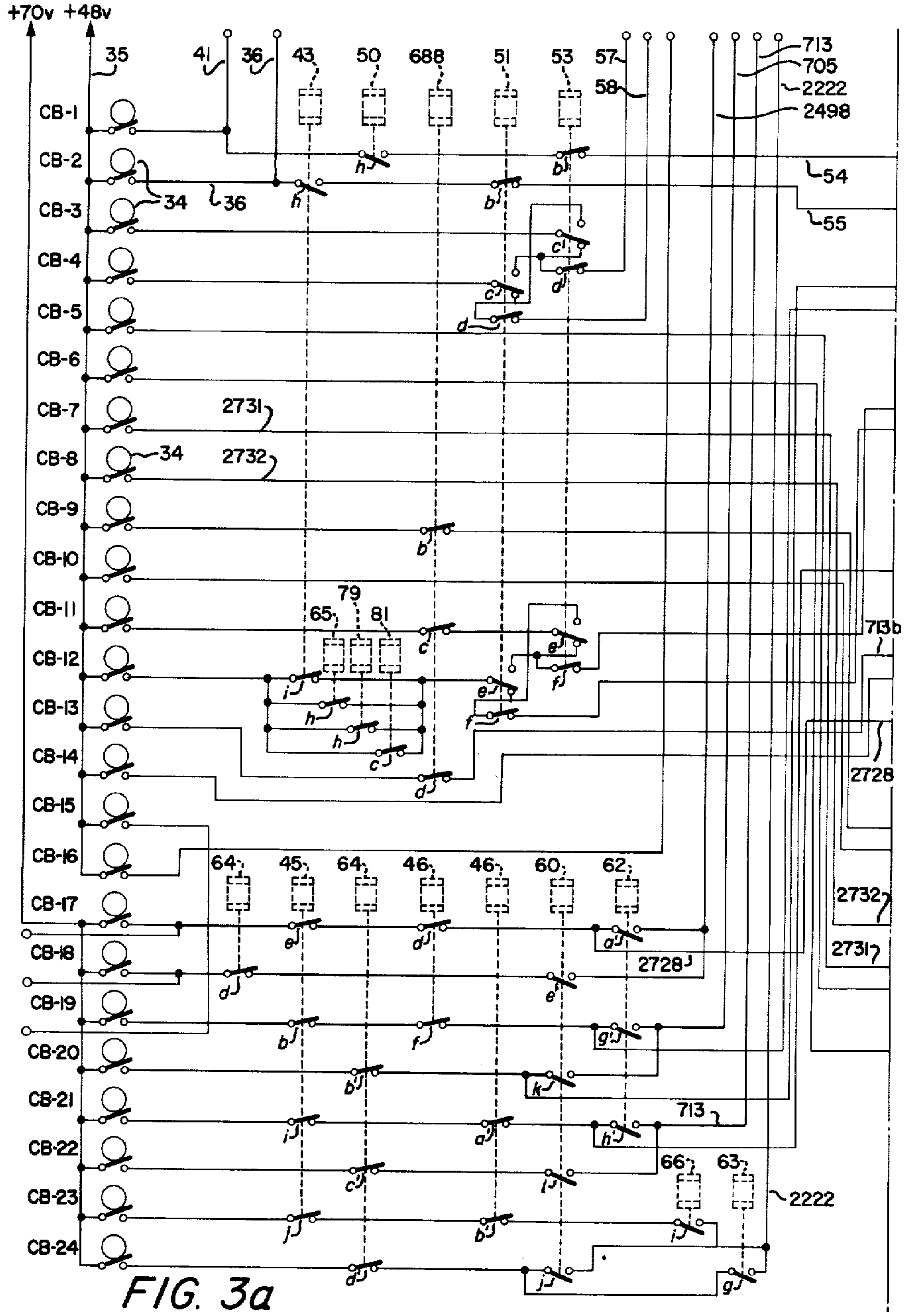

Referring now to FIG. 3*a*, the line 41 connected to one side of CB–1 is also connected through the n/o *h* contacts of the relay 50 and through the n/c *b* contacts of the relay 53 to a line 54, and as long as the relay 50 is energized and the relay 53 is not energized, as is the normal condition (see FIG. 5) soon after the start key 37 is actuated, odd CB pulses pass through these contacts and appear on the line 54 (FIG. 3*a*). Similarly, the line 36 connected to one side of CB–2 is connected through the n/o *h* contacts of the relay 43 and through the *n/c b* contacts of the relay 51 to a line 55 from which even CB pulses are taken as long as the relay 43 is energized and the relay 51 is deenergized. This again is the normal condition after the start key is actuated. Odd CB pulses also appear on a line 57 connected through the n/c *d* and *c* points of the relay 53 to one side of CB–3 and even CB pulses also appear on a line 58 connected through the n/c *d* and *c* points of the relay 51 to one side of CB–4 as long as the relays 53 and 51, respectively, are deenergized. It should be noted, however, that when the contacts of the relay 53 are transferred and when the relay 51 is deenergized, odd CB pulses appear on the line 58. Also, even CB pulses appear on the line 57 when the relay 53 is deenergized and when the contacts of the relay 51 are transferred.

The odd CB pulse taken from the line 54 is designated herein as an "odd pick" pulse, the pulse taken from the line 55 being called an "even pick" pulse. Additionally, the pulses taken from the lines 57 and 58 are referred to as "even hold" and "odd hold" pulses, respectively, it being remembered that these pulses are normally odd and even CB pulses, respectively. The pulses taken from the line 54, 55, 57, 58 are utilized to control the operation of various relays to be described, which define the $I_1$, $I_2$, $E_1$, etc., cycles mentioned previously.

Figure 6A:
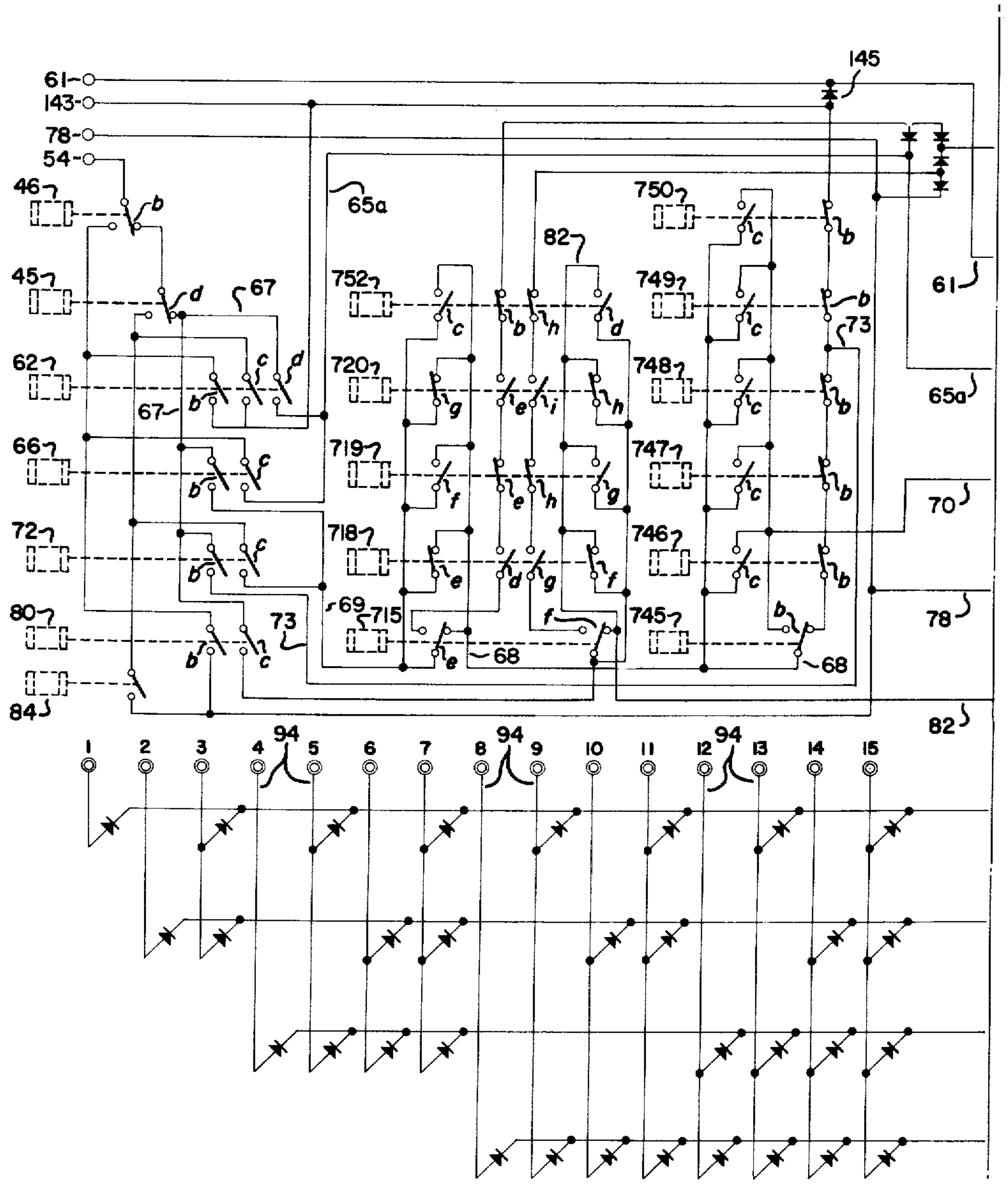
Figure 6B:
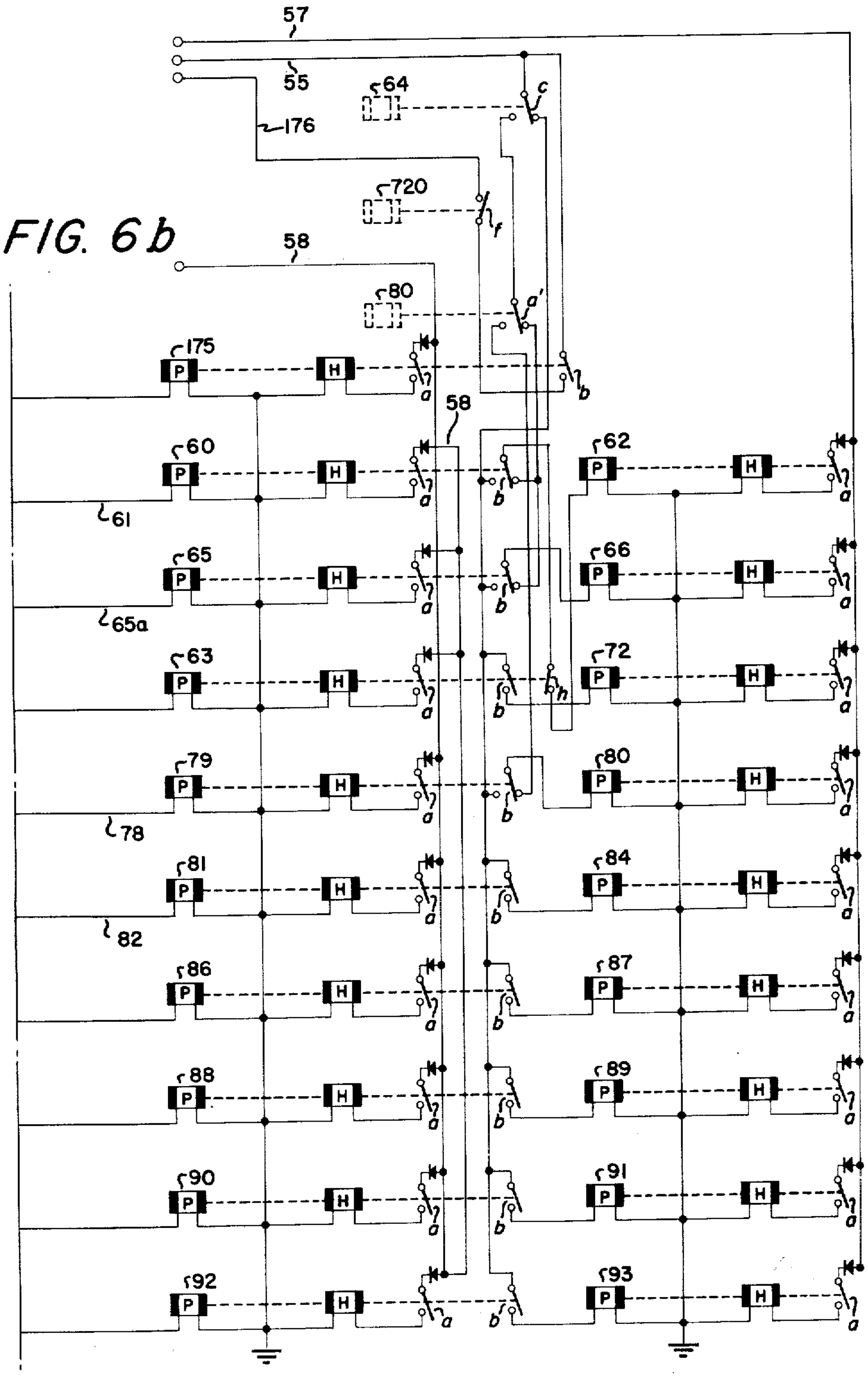

Referring now to FIG. 6*b*, if it is assumed that a 48-volt pulse is initially applied to one side of the pick coil of a relay 60 through a line 61, the source of which pulse will be described later, it will be clear that the relay 60 is picked thereby since the other side thereof is grounded. The relay 60 defines the $I_1$ cycle and, as will become clear, the pulse applied thereto is an odd CB pulse. When energized, the n/o *a* contacts of the relay 60 are transferred, and since the hold coil of this relay is connected between ground and the odd hold line 58 through these *a* contacts, the relay 60 is held by the odd hold pulse. The odd hold pulse is an even CB pulse, as described earlier, and the $I_1$ relay 60 is thus held during an even cycle, at the end of which time it drops out.

The pick coil of the $I_2$ relay, i.e., a relay 62, is connected between ground and through the n/c *h* points of a relay 63, through the n/o *b* contacts of the $I_1$ relay 60 and through the n/c *c* contacts of another error relay 64 to the line 55. Thus, the $I_2$ relay is picked by an even pick pulse following the energization of the $I_1$ relay 60 provided the relays 63 and 64 are deenergized. When this occurs, the n/o *a* contacts of the relay 62 are transferred and the hold coil thereof is connected between the even hold line 57 and ground, thereby energizing the hold coil for the duration of the next even hold pulse, i.e., odd cycle. The relay 62, like the relay 60, is therefore energized for only one cycle since as soon as the relay 60 drops out its *b* contacts open the circuit from the line 55 thereto, thereby causing the relay 62 to drop out at this time.

The $E_1$ and $E_2$ cycles are defined by two relays 65 and 66, respectively, in a similar manner. The pick coil of the relay 65 is connected between ground and by a line **65*a*** through the n/o *d* contacts (FIG. 6*a*) of the relay 62 to a line 67, which line is connected through the n/c *d* contacts of the error relay 45 and through the n/c *b* contacts of the error relay 46 to the odd pick line 54. Relays 45 and 46, it will be recalled, are picked only when an error has been indicated by the machine, and therefore under normal conditions these relays are deenergized and their contacts are in the condition shown in the drawing. Thus, when the $I_2$ relay 62 (FIG. 6*b*) is energized, its *d* contacts (FIG. 6*a*) are transferred and odd pick pulses are connected therethrough to the pick coil of the relay 65 (FIG. 6*b*). The hold coil of the relay 65 is connected between ground and through its n/o *a* contacts to the odd hold line 58. Thus, when the relay 62 picks, the next following odd pick pulse picks the relay 65 and the following odd hold pulse holds the relay 65 for the duration thereof. The relay 65, therefore, is energized for only one cycle, i.e., an even cycle, since prior to the next odd pick pulse the relay 62 drops out, thereby opening its *d* contacts (FIG. 6*a*) and opening the circuit to the pick coil thereof.

The pick coil of the $E_2$ relay 66 (FIG. 6*b*) is connected between ground and through the n/o *b* contacts of the relay 65, through the n/c *c* contacts of the error relay 64 to the even pick line 55, the hold coil of the relay 66 being connected between ground and through its n/o *a* contacts to the even hold line 57. Thus, as long as there is no error, i.e., as long as the relay 64 is deenergized, and if the contacts of the $E_1$ relay 65 are transferred, an even pick pulse energizes the pick winding of the $E_2$ relay 66, the next following even hold pulse being arranged to hold this relay for the duration thereof. Thus, the relay 66 is energized for one cycle and defines the $E_2$ cycle (odd).

In addition to being connected to a pulse source to be described, the line 61 (FIG. 6*a*) connected to one side of the pick coil of the $I_1$ relay 60 is also connected through a diode 145 and through a series of n/c points of several relays 750 through 745, to be described later, to a line 68 which is in turn connected through a plurality of parallelly arranged points of several relays 715, 718, 719, 720 and 752, to be described, to a line 69. The line 69 is connected through the n/o *b* contacts of the relay 66 to the line 67. The various aforementioned series of contacts provide a closed circuit between the line 61 and the line 68 when the *p* portion of the instruction is blank, the parallelly arranged points providing a closed circuit when either $T_2 \neq R$ or $q=c$. Thus, when the *p* portion of the instruction is blank and either $T_2 \neq R$ or $q=c$, the line 61 is connected to the line 69 and the $I_1$ relay is picked by the odd pick pulse following energization of the $E_2$ relay 66 since the *b* contacts of the relay 66 are transferred at this time.

When *p* is not blank, one of a plurality of n/o, parallelly arranged points of the relays 746 through 750, one side of each of which is connected to a line 70, is closed. The other side of these relay points is connected to the line 68, and since the line 70 is connected to one side of the pick coil of the relay 63 (FIG. 6*b*), the other side of which is grounded, the relay 63 is picked by the next following odd pick pulse when *p* is not blank and when either $T_2 \neq R$ or $q=c$, if the contacts of the $E_2$ relay 66 are transferred, there being no prior error. The relay 63 defines the $p_1$ cycle and is energized on the cycle following the $E_2$ cycle only if the *p* portion of an instruction is not blank. This relay is held by an odd hold pulse, the hold coil thereof being connected between ground and through its n/o *a* contacts to the odd hold line 58. Thus, the $p_1$ relay 63 defines the $p_1$ cycle (even) and when it is picked, its n/c *h* contacts are also opened, thereby preventing energization of the $I_2$ relay 62.

Also, at this time the n/o *b* contacts of the relay 63 are closed, thereby connecting one side of the pick coil of a relay 72, the $p_2$ relay, therethrough and through the n/c *c* contacts of the error relay 64 to the even pick line 55, and it will be clear that the next even pick pulse after the relay 63 is picked energizes the relay 72. The hold coil of the relay 72 is connected through its n/o *a* contacts to the even hold line 57, thereby holding this relay for the duration of the even hold pulse. Thus, neither relay 63 nor 72 is picked if *p* is blank, the relays 60, 62, 65 and 66 being arranged to repeat the above described sequence until *p* is not blank, at which time the relays 63 and 72 are sequentially energized as described, thereby defining the $p_1$ and $p_2$ cycles, respectively.

It will be recalled that when *p* is numeric it is desired to resume the program from the point where it left off and that when $p$ is alphabetic a new program is initiated. Thus, when $p$ is numeric, the $I_1$ relay 60 is picked following the $p_2$ cycle and the normal $I_1$, $I_2$, $E_1$, $E_2$ sequence is automatically resumed. This is accomplished in the following manner. The line 67 (FIG. 6$a$) is connected through the n/o $b$ contacts of the $p_2$ relay 72 to a line 73 which in turn is connected through two of the serially arranged contacts, i.e., contacts of the relays 749 and 750, and through the line 61 to one side of the pick coil of the relay 60. These two contacts are normally closed and are open only when there is either a "0" or an "$x$" bit in the $p$ portion of the instruction, i.e., only when $p$ is alphabetic, as will become clear. Thus, if $p$ is numeric, the odd pick pulse following the $p_2$ cycle energizes the $I_1$ relay 60 and the normal sequence $I_1$, $I_2$, $E_1$, $E_2$, $I_1$, etc., is resumed. If $p$ is alphabetic, the $I_1$ relay is not energized in this fashion since the circuit just described is open under these conditions.

When $p$ is alphabetic, a pulse is emitted from the corresponding hub on the control panel for use as may be desired, which pulse after use is connected to the desired ones of several program hubs to control the program to be resumed at the point defined by these hubs. This operation will be described in more detail later herein in connection with the description of the program counter, and for the present it will suffice to understand that the control panel pulse entered into the program counter is taken through the line 61 to the pick coil of the $I_1$ relay 60, and upon the occurrence thereof relay 60 is picked and the normal operating cycle is resumed.

Figure 3B:
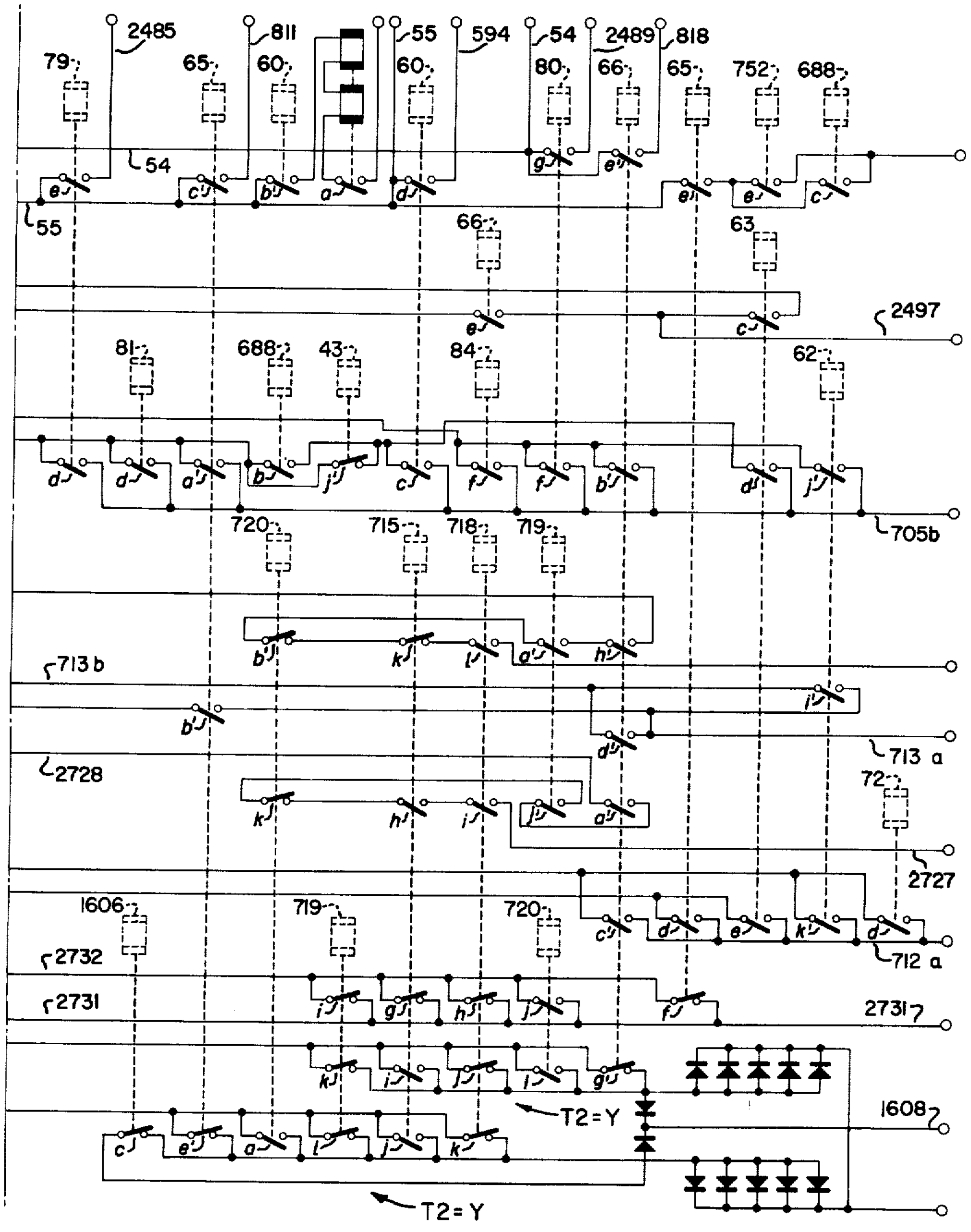

A copy operation, and thus the copy cycles $C_1$, $C_2$, $C_3$ and $C_4$, is initiated by a CB–1 pulse taken, for example, from the line 41 (FIG. 3$a$). When the relay 40 (FIG. 4$b$) is picked, as described previously, the line 41 is connected through the n/o $d$ contacts of the relay 40 to a start exit hub 144, and if the hub 144 is wired to desired copy entry hubs 77 (FIG. 14$a$) a copy operation is initiated. Each of the $T_2$ copy entry hubs is connected through a corresponding diode to a line 78 which connects to one side of a relay 79 (FIGS. 6$a$ and 6$b$), the $C_1$ relay, the other side of which is grounded. Thus, on a copy operation the relay 79 is picked by an odd CB pulse and since its hold coil is disposed between ground and the odd hold pulse line 58 through its $a$ contacts, it is held during the next even cycle. (It should be noted here that the pulse connected to the line 61 which initiates the normal operating sequence of $I_1$, $I_2$, $E_1$, etc., may be the odd CB pulse taken from the start exit hub 144, as will be explained later. This pulse is wired only to the copy entry hubs when a copy operation is to be performed, and the normal sequence of $I_1$, $I_2$, $E_1$, etc., does not occur due to the fact that this pulse is not wired to the pick coil of the relay 60 under these conditions.)

When the relay 79 (FIG. 6$b$) picks, its $b$ contacts are transferred and the pick coil of the $C_2$ relay, a relay 80, is energized since one side of it is grounded and the other side is connected through the n/o $b$ contacts of the relay 79 and through the n/c $c$ contacts of the error relay 64 to the even pick line 55. The relay 80 is held through its own $a$ contacts by an even hold pulse and thus defines a $C_2$ cycle (odd).

A relay 81, the $C_3$ relay, is connected through a line 82, through a matrix of points of the relays 715, 718, 719, 720 and 752 (FIG. 6$a$) which provides a closed circuit therethrough when $T_2 \neq R$ or when $q=c$, and through the n/o $c$ points of the relay 80 to the line 67. Thus, the relay 81 is picked by an odd pick pulse while the relay 80 is picked, if $T_2 \neq R$ or $q=c$, and since the relay 81 is held by an odd hold pulse, the $C_3$ cycle defined thereby is even. In a similar manner, the $C_4$ relay 84 (FIG. 6$b$) is picked by an even pick pulse and is held by an even hold pulse and thereby defines the $C_4$ cycle (odd). When the contacts of the relay 84 have transferred, its $c$ contacts (FIG. 7) are closed and the following odd pick pulse taken from the line 54 is connected therethrough, through the n/c $g$ contacts of the error relay 45 and through a matrix of points of the relays 715, 716, 718, 719 and 720 to one of several copy exit hubs 85. This pulse is then connected to initiate the desired sequence to follow, such as picking a new program and thereby starting the normal sequence of $I_1$, $I_2$, etc. If no connection is made from the copy exit hubs, operation of the machine stops after the $C_4$ cycle.

Figure 7:
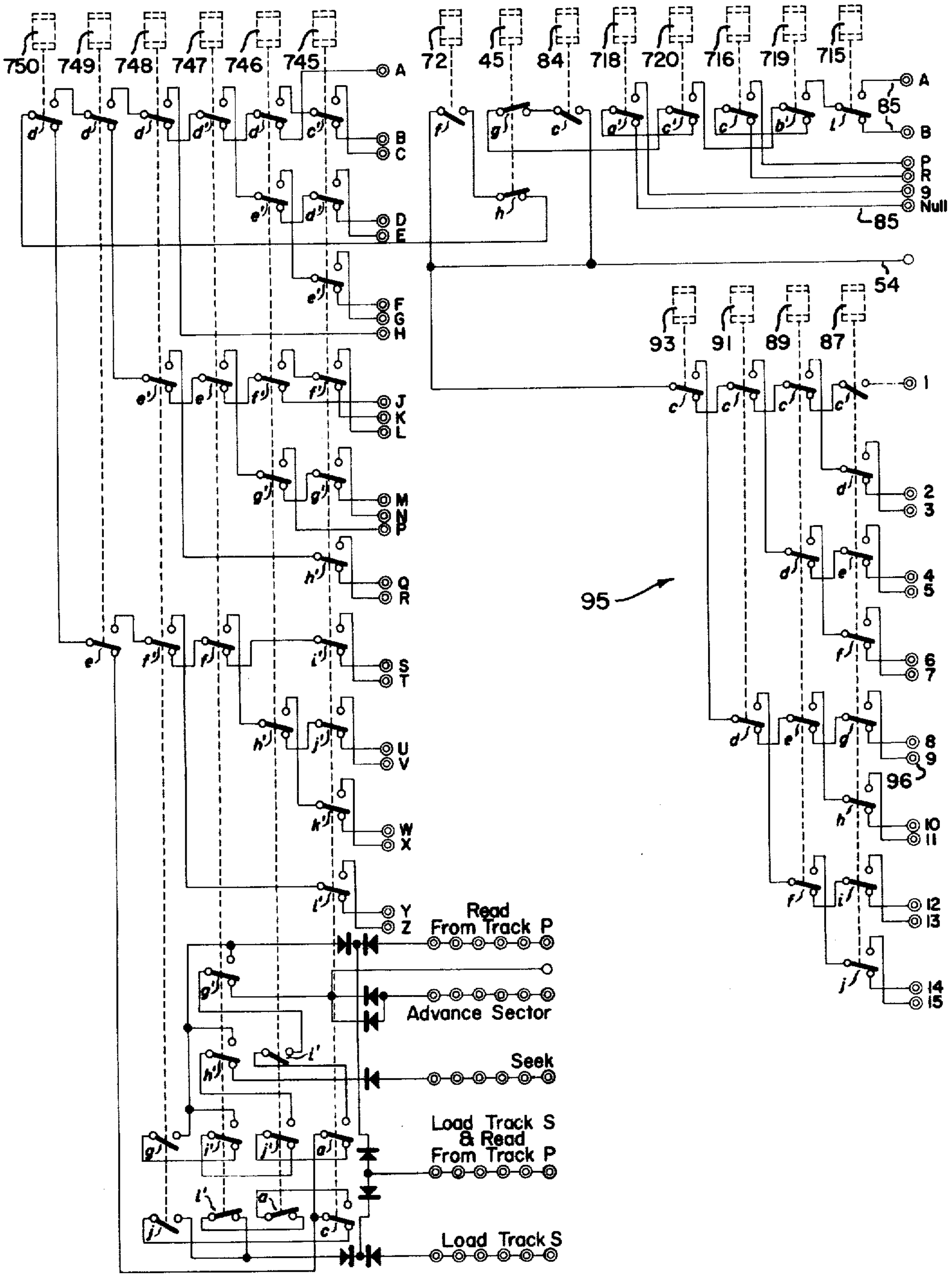

As mentioned earlier, means are provided for obtaining a two-cycle delay, which includes eight relays 86 through 93 (FIG. 6$b$). The pick coils of selected relays 86, 88, 90 or 92 are energized by an odd CB pulse applied to a selected one of the several delay entry hubs 94 (FIG. 6$a$), and these relays are held, when picked, during the following even cycle by the odd hold pulse taken from the line 58. Additionally, when one of the relays 86, 88, 90 or 92 (FIG. 6$b$) is picked, its corresponding relay 87, 89, 91 or 93 is picked by the following even pick pulse and is held during the next following odd cycle by an even hold pulse. Referring now to FIG. 7, it will be seen that the odd pick line 54 is connected through a matrix 95 of points of the relays 87, 89, 91 and 93 to the delay exit hubs 96. Thus, when a pulse from the control panel is entered into one of the delay entry hubs 94 (FIG. 6$a$), a pulse is present on the corresponding delay exit hub 96 (FIG. 7) two cycles later. To obtain a longer delay, it is necessary only to take the delay exit pulse and wire it into another delay entry hub, thereby providing delays of 2, 4, 6, etc., cycles as may be desired.

Figure 8:
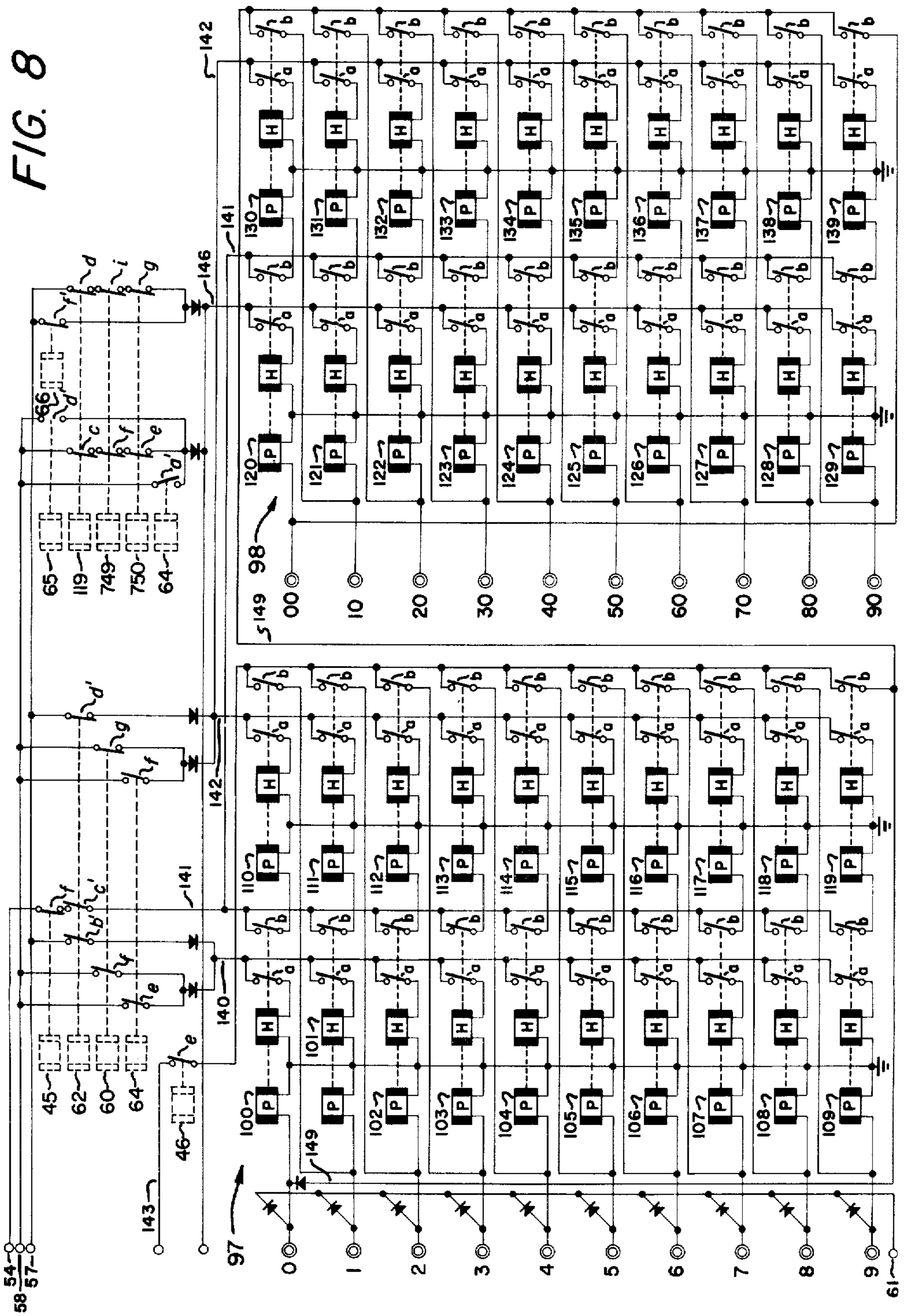
FIG. 8 is a schematic diagram of the program counter of the invention.

The program counter (FIG. 8) is provided to control the selection of one of the ten-digit instructions recorded on the various program tracks 0 through 9 of the process drum 25. Since there are 100 programs, i.e., ten track and ten programs per track, the program counter is a 100-position counter and includes two decade relay counters 97 and 98. The units order counter 97 is normally advanced during the odd cycle immediately preceding each $I_1$ cycle, and the tens order 98 is advanced each time the units order 97 carries. In the present embodiment the tens order 98 of the program counter controls the selection of the program track by rendering the magnetic transducer associated therewith operative. The units order 97 controls the selection of the field within the selected track containing the desired program. The manner in which the condition of the program counter controls the selection of the track and field will be explained later.

The units order 97 of the program counter includes 20 relays 100 through 119, the tens order 98 including 20 relays 120 through 139, and the pick coil of each of the relays 100 through 109 is connected between ground and a corresponding program entry hub 0 through 9 which is physically located on the control panel. The hold coil of each of these relays is connected between ground and through a n/o $a$ contact thereof to a line 140, and the line 140 is connected through the n/o $b'$ contacts of the $I_2$ relay 62 to the even hold line 57, as well as through the n/o $f$ contacts of the $I_1$ relay 60 and the n/o $e$ contacts of the error relay 64 to the odd hold line 58. The pick coils of the relays 110 through 119 are connected between ground and one side of the n/o $b$ contacts of the corresponding relay 100 through 109 to a line 141, which line is connected through the n/o $c'$ contacts of the $I_2$ relay 62 and through the n/c $f$ contacts of the error relay 45 to the odd pick line 54. The hold coil of each of the relays 110 through 119 is connected between ground and one side of its n/o $a$ contacts, the other side of each of these contacts being connected in common to a line 142 which is connected through the n/c $d'$ contacts of the $I_2$ relay 62 to the even hold line 57, as well as through the n/c $g$ contacts of the $I_1$ relay 60 and through the n/o $f$ contacts of the error relay 64 to the odd hold line 58.

The pick coils of the relays 100 through 109 are energized in one of two ways. One way is by putting a suitable pulse into the appropriate program entry hub 0 through 9 on the control panel. The second is to pulse a line 143 which is connected through the n/c *e* contacts of the error relay 46 to one side of each of the n/o *b* contacts of the relays 119 and 110 through 118, the other side of which is connected to the nongrounded side of the corresponding pick coil of the relays 100 through 109, respectively, as indicated in the drawing. The pulse utilized to pick a program relay 100 through 109 via the program entry hubs 0 through 9 may be taken, for example, from the start exit hub 144 (FIG. 4*b*) from which, it will be recalled, an odd CB pulse is taken when operation of the machine is initiated. If this pulse is wired to a desired one of the ten program entry hubs 0 through 9 (FIG. 8) of the units order of the program counter, the corresponding relay 100 through 109 associated therewith is picked. This pulse may also be wired to one of the program entry hubs 00 through 90 of the tens order of the program counter to pick a corresponding one of the ten relays 120 through 129 associated therewith in a similar manner, as will be clear later. It should be noted here that whenever one of the program entry hubs 0 through 9 is pulsed, this pulse is also connected through a suitable diode, which prevents back circuits, to the line 61 which, it will be recalled, is connected to one side of the $I_1$ relay 60 (FIG. 6*b*). Thus, when a program entry hub 0 through 9 is pulsed, the $I_1$ relay 60 is picked and the normal sequence of $I_1$, $I_2$, $E_1$, etc., is initiated.

As explained earlier herein, the relay 60 defines the $I_1$ cycle, the relay 62 being arranged to define an $I_2$ cycle. Since the *f* and *b'* contacts (FIG. 8) of the relays 60 and 62, respectively, are transferred during an $I_1$ and $I_2$ cycle, respectively, the odd hold line 58 and the even hold line 57 are connected therethrough to the line 140. Assuming, for example, that the program entry hub 2 of the units order of the program counter is pulsed in the manner described above, the relay 102 is picked and its *a* contacts transferred, thereby connecting odd hold and even hold pulses taken from the line 140 therethrough and across the hold coil of the relay 102. Thus, the relays 100 through 109 are picked during the odd cycle immediately preceding the $I_1$ cycle (refer to the timing diagram shown in FIG. 5) and are held throughout the $I_1$ and $I_2$ cycles.

The line 141 (FIG. 8) is connected to the odd pick line 54 during an $I_2$ cycle, and it will be clear that in the present example the pick coil of the relay 112 is energized by the odd pick pulse occurring during the $I_2$ cycle. The relays 110 through 119 are held by odd hold pulses during the $E_1$ cycles and by even hold pulses during $E_2$ cycles, the *g* and *d'* contacts of the relays 60 and 62, respectively, being in the closed condition shown at these times. Thus, in the present example the relay 102 is picked just prior to the $I_1$ cycle and is held for the duration of the $I_1$ and $I_2$ cycles. Also, the relay 112 is picked during the $I_2$ cycle and is held throughout the $E_1$ and $E_2$ cycles or until the next $I_1$ cycle. It is in this way that the units order of an initial program step is entered into the program counter.

The second method of picking the various relays 100 through 109 is utilized to advance the counter one unit at a time, each pulse entered on the line 143 being arranged to advance the counter by one unit. The line 143 is connected through the diode 145 (FIG. 6*a*) and through the line 61 to one side of the pick coil of the $I_1$ relay 60 (FIG. 6*b*), and it will be understood that each time the $I_1$ relay is picked by a pulse passing through the diode 145, the line 143 is pulsed. To resume with the example discussed above, assuming that the relay 112 (FIG. 8) is picked, the *b* contacts thereof are transferred and the pulse taken from the line 143 therethrough preceding the next following $I_1$ cycle picks the relay 103. This relay is therefore picked in the same manner in which the $I_1$ relay is picked and is held throughout the $I_1$ and $I_2$ cycles as described above in connection with the relay 102. Thus, each time the line 143 is pulsed, the condition of the units order of the program counter is advanced one position.

The tens order 98 of the program counter, which includes the 20 relays 120 through 139, operates in a similar manner. Each of the program entry hubs 00 through 90 is, as mentioned above, connected to one side of the pick coil of the corresponding relay 120 through 129, the other side of each of these coils being grounded. Also, the hold coil of each of the relays 120 through 129 is connected between ground and through its n/o *a* contacts to a line 146 which is connected through the n/c *f'* contacts of the $E_2$ relay 66 as well as through a series of contacts of the relays 119, 749 and 750 to the even hold line 57. Additionally, the line 146 is connected through the n/c *d'* contacts of the $E_1$ relay 65 as well as through the n/o *a'* contacts of the error relay 64 and also through a series of n/c contacts of the relays 119, 749 and 750 to the odd hold line 58.

The line 143 is connected through the n/c *e* contacts of the error relay 46, through the n/o *b* contacts of the relay 119, and through a line 149 to one side of each of the n/o *b* contacts of the relays 139 and 130 through 138, the other side of these relay points being connected to one side of the corresponding pick coil of the relays 120 through 129, respectively. The line 141 is connected through the n/o *b* contacts of the relays 120 through 129 to one side of the corresponding pick coil of the relays 130 through 139, respectively. The other side of each of the pick coils of the relays 130 through 139 is connected to ground. Additionally, the line 142 is connected to one side of the hold coil of each of the relays 130 through 139 through a corresponding n/o *a* contact thereof, the other side of these hold coils being grounded. Thus, assuming that the program entry hub 30 of the tens order of the program counter is pulsed by means such as a start pulse taken from the start exit hub 76, the relay 123 is picked and is held by following odd and even hold pulses taken from the lines 57 and 58, until the relay 119 of the units order of the program counter is energized. When the relay 119 picks, the *c* and *d* contacts thereof are opened, thereby disconnecting the line 146 from the lines 57 and 58. When the relay 123 is picked, its *b* contacts are closed, and during the following $I_2$ cycle the relay 133 is picked, since the line 141 is connected through the n/o *c'* contacts of the $I_2$ relay 62 and through the n/c *f* contacts of the error relay 45 to the odd pick line 54. The relay 133 is then held in the same manner in which the relays 110 through 119 are held, it being connected through its transferred *a* contacts to the line 142. This pulse, it will be recalled, is interrupted only during the $I_1$ and $I_2$ cycles. Thus, the relay 133 is held until the relay 60 (FIG. 6*b*) is energized.

In the above example, the 2 program entry hub and the 30 program entry hub of the units and tens portions of the program counter were excited by a start pulse, thereby picking the relays 102 and 123, respectively, and causing the relays 112 and 133 to be picked and held until the next following $I_1$ cycle. (It should be remembered that the relay 123 is held until the relay 119 is picked, thereby controlling the relay 133 to be picked during each successive $I_2$ cycle and held until the next following $I_1$ cycle.) Thereafter each pulse applied to the units order of the program counter through the line 143 causes the relays 103, 104, . . . through 109 to be energized successively in that order. When the relay 109 is energized, the relay 119 is picked during the next following $I_2$ cycle and is held until the next $I_1$ cycle, as described above. When this occurs, the *b* contacts of the relay 119 are transferred and the line 143 is connected therethrough to the line 149. Since the relay 133 is being held at this time, its *b* contacts are transferred and the pulse taken from the line 143 is connected through the line 149 and through the *b* contacts of the relay 133 to the pick coil of the relay 124, thereby picking this relay and advancing the tens portion of the program counter one position. Thus, it will now be obvious that the relays 100 through 109 are successively energized, the relays 120 through 129 being energized successively each time the relay 109 is picked. It should also be noted that the pulse utilized to initiate a program sequence need not be taken from the start exit hub 76 but may be a pulse taken from the control panel.

Figure 9:
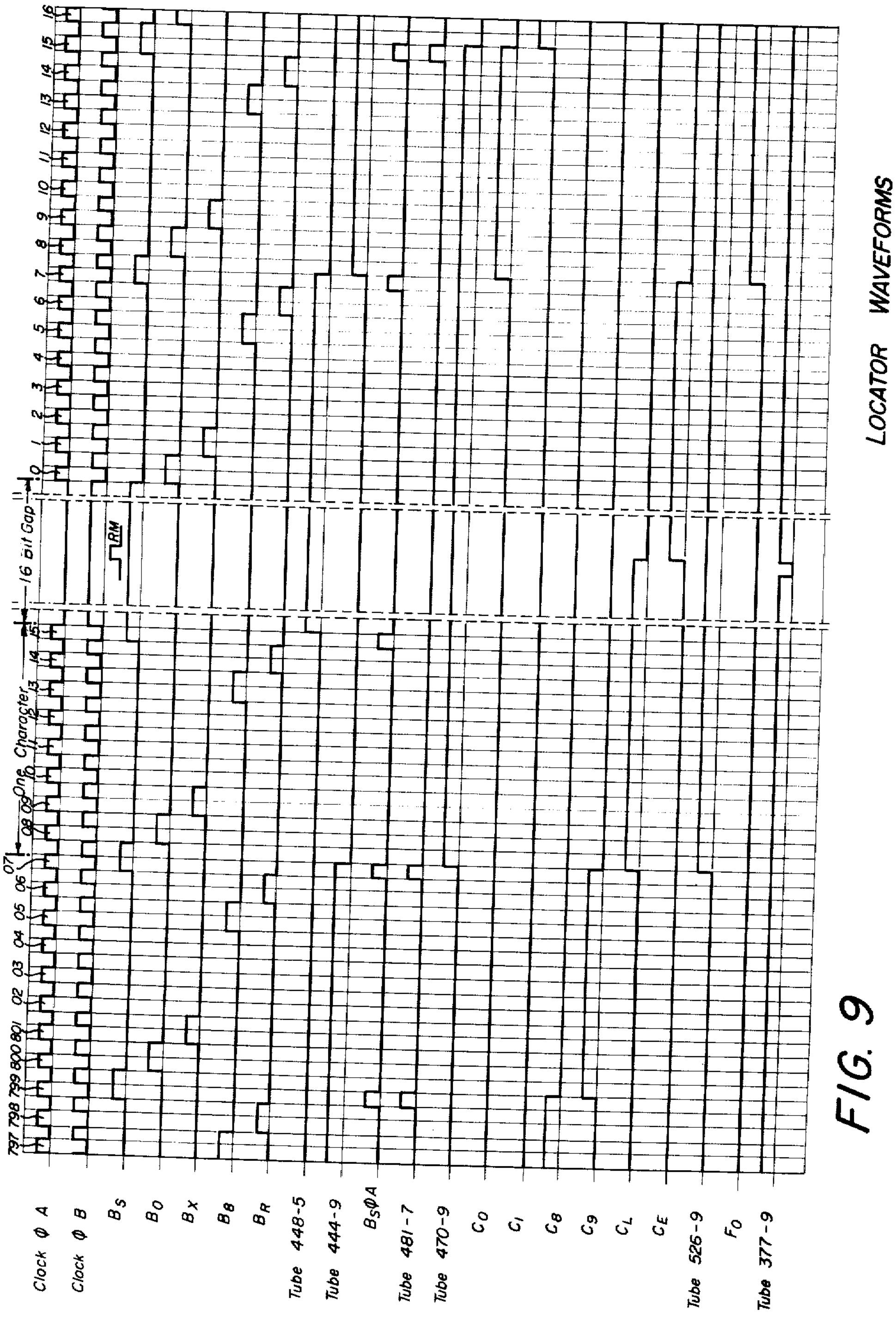
FIG. 9 is an electronic timing diagram of the present machine.

As discussed earlier herein, timing in the processing unit is under the control of the clock track $CT_2$ recorded on the process drum 25. The track $CT_2$ has, in the present embodiment, 832 bit positions therearound, there being 816 successive bits recorded thereon at equal intervals. The remaining 16 bit positions are left blank. The 816 bits are numbered from 0 through 815 and, referring to FIG. 9, it will be seen that there is a 16-bit gap between bit 815 and bit 0. In addition to the clock track $CT_2$, a second timing track $CT_{2a}$ is provided upon which there is recorded a single bit which is disposed timewise in the center of the 16-bit gap. This bit is referred to herein as the "reference mark" and occurs once each drum revolution.

The bit or clock pulses are read from the track $CT_2$ by means of a suitable magnetic transducer (not shown) and are fed therefrom to the #4 tap of an RA–1 unit 351 (FIG. 10) by a line 350. The #10 tap of the unit 351 is connected through an INV–3 unit 352 to the #5 tap of a PCF–1 unit 353, the #10 tap of which is connected to a line 354. In a similar manner, reference marks are read from the timing track $CT_{2a}$ by a suitable transducer and are taken therefrom through a line 356 to the #4 tap of an RA–1 unit 357, the #10 tap of which is connected through an INV–3 unit 358 and through the PCF–1 unit 353 to a line 359. Thus, clock pulses appear on the line 354 and reference marks appear on the line 359 while the machine is in operation.

It will be recalled that when the start key 37 (FIG. 4*b*) is actuated the relay 40 is energized, thereby opening its n/c *f* contacts (FIG. 11*a*) and removing the +140 volts connected therethrough to the #3 tap of a KS unit 375. When this occurs, the #5 tap of the unit 375 drops sharply, and since the #5 tap of the unit 375 is connected to the #3 tap of a TR–1 unit 376, this trigger is turned off at this time, thereby raising the potential of the #5 tap thereof. The leading edge of the first reference mark to occur after this time, however, is arranged to turn the trigger 376 on again since the reference mark line 359 (FIG. 10) is connected through an INV–2 unit 360 (FIG. 11*a*) to the #7 tap of the unit 376, the reference mark being inverted by the unit 360. Thus, on the leading edge of the first reference mark after the #5 tap of the unit 375 drops, the #5 tap of the unit 376 drops in potential. It should also be noted that the leading edge of each reference mark is arranged to turn off a TR–1 unit 377 as well as to turn on the unit 376, thereby lowering the #7 and #10 taps of a DA unit 355, since the #10 tap of the INV–2 unit 360 is connected to the #3 tap of the TR–1 unit 377 and since the #9 tap of the unit 377 is connected through a CF–1 unit 378 to the #7 and #10 taps of the unit 355. The clock pulse line 354 (FIG. 10) is connected to the #8 tap of the unit 355 (FIG. 11*a*), and it will be clear, therefore, that clock pulses cannot pass through the unit 355 until the unit 377 is turned on and until the #9 tap of the unit 355 is up.

The #5 tap of the TR–1 unit 376 is connected to the #3 tap of a TR–1 unit 379, which unit is reset in an "on" condition when a bias line 380 connected to the #4 tap thereof is opened momentarily by means of a manual reset control 381 to be described. The #8 tap of the unit 379 is connected by a line 385 to the #4 tap of the CF–1 unit 378, the #3 tap of which is connected by a line 387 to the #4 tap of a CD–2 unit 361 (FIG. 11*b*), to the #8 tap of an ID–2 unit 362 and to the #9 tap of the DA unit 355 (FIG. 11*a*). On the leading edge of the first reference mark after the start key 37 is actuated, therefore, the #8 tap of the TR–1 unit 379 goes up, thereby raising the potential of the #4, #8 and #9 taps of the units 361, 362 and 355, respectively, at this time.

Figure 11B:
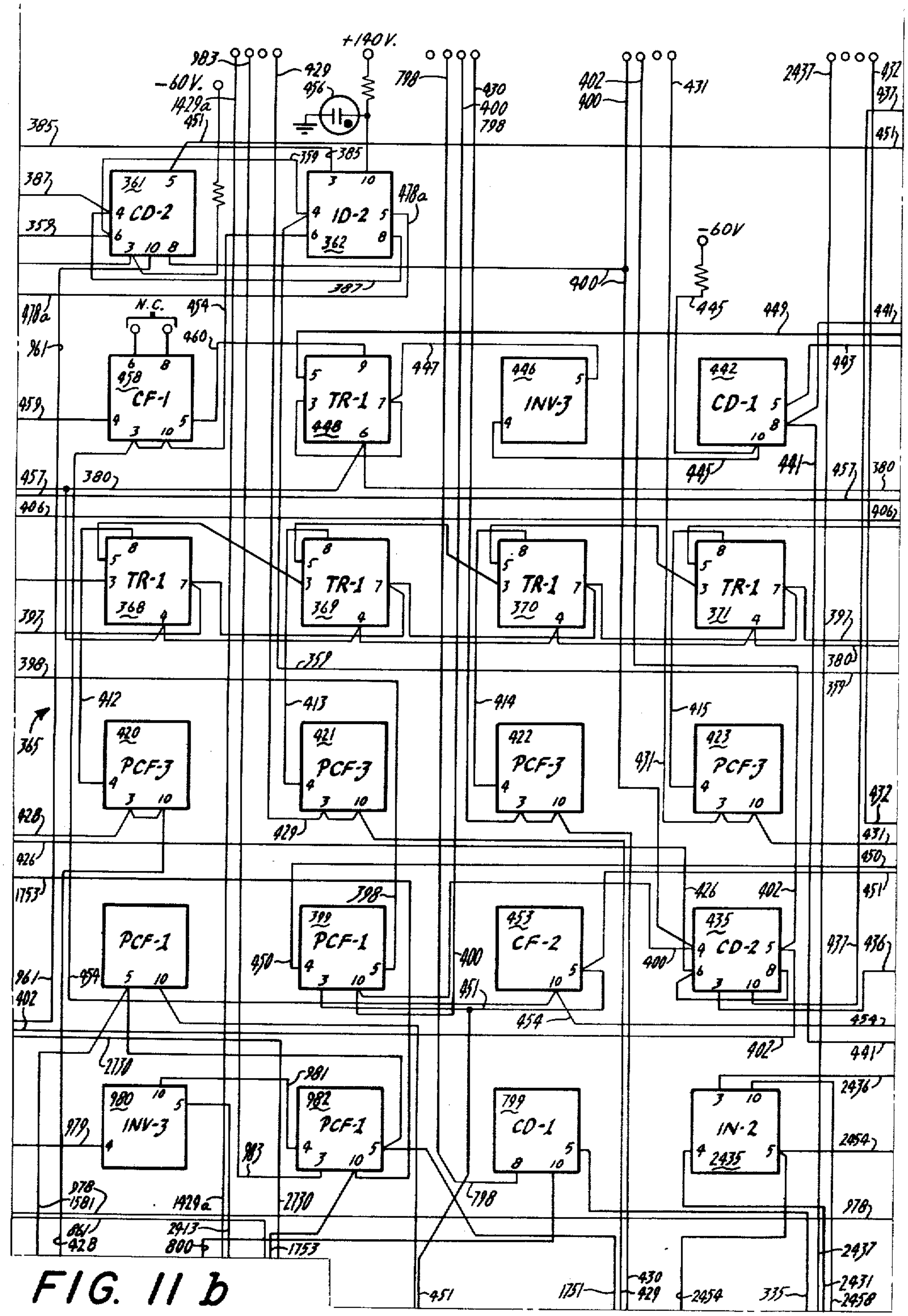

A TR–1 unit 390 (FIG. 11*a*), the #5 tap of which is connected to the #7 tap of the TR–1 unit 377, is reset by the manual reset control 381 in an "off" condition, since the reset line 380 is connected to the #6 tap thereof. Thus, the #5 tap of the TR–1 unit 390 is initially high; however, when the #7 tap thereof goes negative, the unit 390 is turned on and the #5 tap drops, thereby turning on the TR–1 unit 377 and raising the #7 and #10 taps of the DA unit 355. Reference marks are applied to the #6 tap of the CD–2 unit 361 (FIG. 11*b*) through the line 359. Additionally, the #3 tap of the CF–1 unit 378 (FIG. 11*a*) is connected by the line 387 to the #4 tap of the CD–2 unit 361 (FIG. 11*b*). The #3 tap of the unit 361 is connected to the #4 tap of an INV–3 unit 364 (FIG. 11*a*), the #5 tap of which is connected to the #7 tap of the TR–1 unit 390. Thus, since the line 387 rises on the leading edge of the first reference mark after the start key is actuated, this reference mark passes through and is taken from the #3 tap of the CD–2 unit 361 (FIG. 11*b*) as a positive-going pulse. On the trailing, negative-going edge of this pulse the #7 tap of the TR–1 unit 390 (FIG. 11*a*) drops, thereby turning this unit on and lowering the potential of the #5 tap thereof to cause the TR–1 unit 377 to be turned on, as discussed above.

As mentioned earlier, the #9 tap of the DA unit 355 goes up on the leading edge of the reference mark. This is true unless there was an error during the previous cycle, in which instance means to be described are provided to lower the #9 tap. Additionally, the #7 and #10 taps of the DA unit 355 go up after the reference mark, i.e., on the trailing edge thereof, and at this time, assuming there was no error during the previous cycle, the clock pulses applied to the #8 tap of the unit 355 pass through and are taken from the #3 and #5 taps thereof by a line 391.

The line 391 is connected to the #4 tap of the INV–2 unit 360, and clock pulses are taken from the #7 tap of the unit 360 by a line 397 to drive a ring 365 which defines the various bits $B_r$, $B_s$, $B_0$, $B_x$, $B_1$, $B_2$, $B_4$ and $B_8$, as will be described. Clock pulses are also taken from the #3 tap of the unit 360 which is connected by a line 393 to the #5 tap of an INV–1 unit 394. The #7 tap of the unit 394 is connected by a line 395 to the #7 tap of a TR–1 unit 396 and the line 397 is connected to the #3 tap of the unit 396. The trigger 396 is reset in an "on" condition, the #4 tap thereof being connected to the reset line 380, and the positive-going edge of the first clock pulse to pass through the unit 355, therefore, turns the trigger 396 off, the following negative-going edge being arranged to turn it on again, etc., as long as the DA unit 355 is open. Thus, the #8 tap of the trigger 396 is initially low, the #9 tap being initially high, and each clock pulse raises and then lowers the #8 tap. The pulses taken from the #8 tap by a line 398 and through a PCF unit 399 (FIG. 11*b*) to a line 400 are referred to as phase A clock pulses, the pulses taken from the #9 tap through a PCF–3 unit 401 (FIG. 11*a*) to a line 402 being termed phase B clock pulses. It should be noted that original phase A clock pulses are taken from the line 395. These pulses occur slightly prior to the phase A clock pulses taken from the line 400 since they are not derived through the TR–1 unit 396 but come directly from the DA unit 355. Similarly, early phase B clock pulses are taken from the #3 tap of a CF–1 unit 404 by a line 405 since the line 393 is connected through the unit 404 to the line 405. The purpose of early phase A and phase B clock pulses will become clear later herein.

Figure 11C:
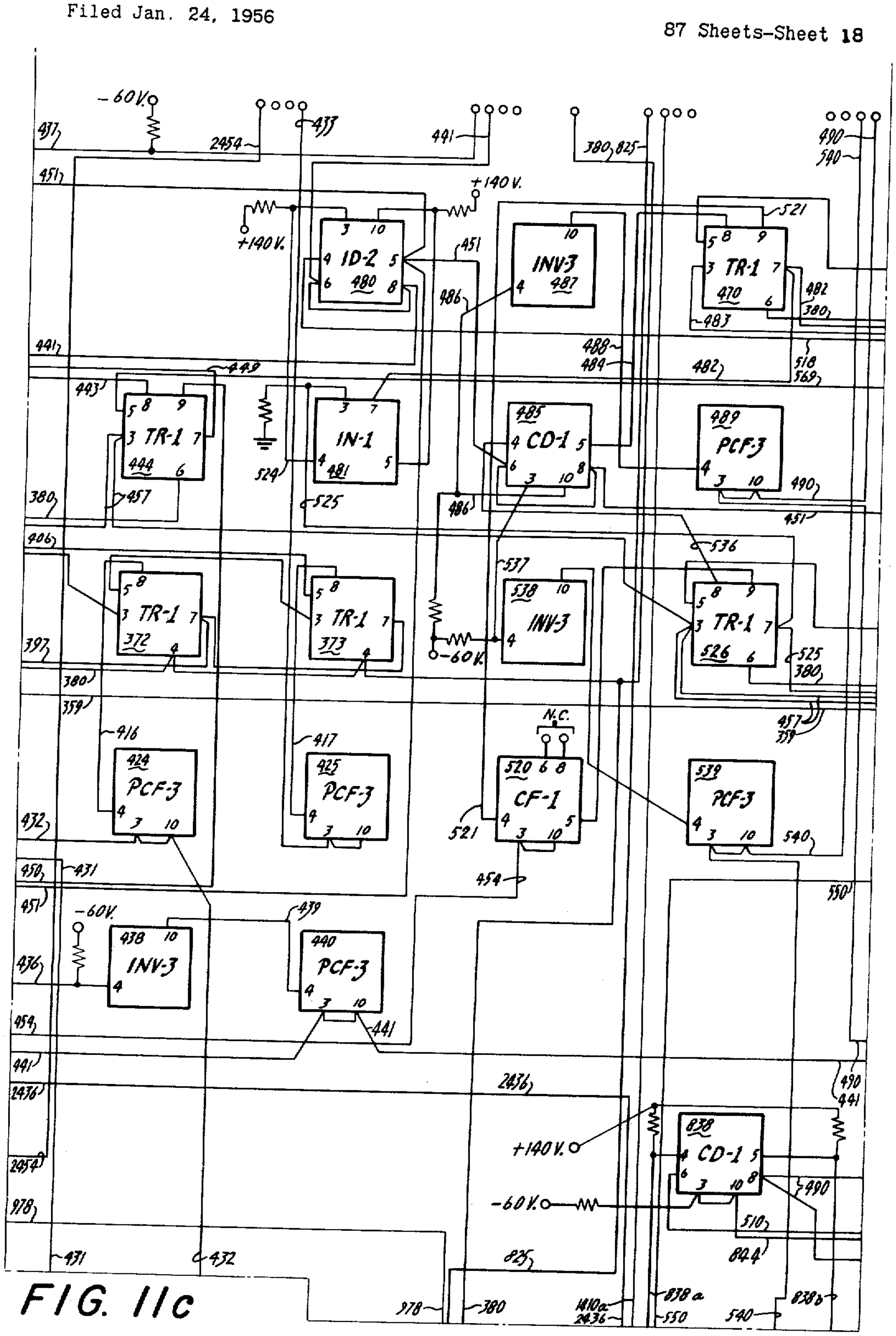

As mentioned earlier, the clock pulses taken from the #7 tap of the INV–2 unit 360 by the line 397 are utilized to drive the bit ring 365 which includes eight TR–1 units 366 through 373 (FIGS. 11*a*, 11*b* and 11*c*). The units 367 through 373 are reset in an "on" condition by the manual reset 381 since the #4 taps of these units are connected to the reset line 380. The #6 tap of the unit 366, however, is connected to the line 380, thereby resetting this unit in an "off" condition. The line 397 is connected to the #7 tap of each of the units 366 through 373, these units being arranged in a conventional Overbeck ring circuit, and it will be understood that the trailing, negative-going edge of the first clock pulse taken from the #7 tap of the unit 360 turns the unit 366 on, thereby turning the unit 367 off, and that successive clock pulses turn successive units 368 through 373 off. The #5 tap of the unit 373 is connected through a line 406 to the #3 tap of the unit 366, and it will be clear, therefore, that as long as clock pulses appear on the line 397 successive triggers of the ring are continuously turned off and then on.

The #8 tap of each of the units 366 through 373 of the bit ring 365 is connected through lines 410 through 417, respectively, to the #4 tap of a corresponding PCF–3 unit 418 through 425. The #3 and #10 taps of each of these PCF units are connected to a corresponding line 426 through 433. Since the #8 tap of the TR–1 unit 366 is initially high, the leading, positive-going edge of the first clock pulse to be taken from the DA unit 355 causes the #8 tap of the trigger 366 to drop at that time, thereby lowering the potential of the line 426 until the trigger 366 is turned off again. The pulses taken from the line 426 are $B_s$ pulses, the pulses taken from the lines 427 through 433 being $B_0$, $B_x$, $B_1$, $B_2$, $B_4$, $B_8$ and $B_r$, respectively. The bit pulses $B_s$ through $B_r$ taken from the lines 426 through 433, respectively, are therefore, full bit pulses.

It will be recalled that phase A clock pulses are present on the line 400. This line is connected to the #4 tap of a CD–2 unit 435 (FIG. 11*b*). Similarly, phase B clock pulses are connected through the line 402 to the #5 tap of the unit 435. The #6 and #8 taps of this unit are connected to the line 426 from which $B_s$ pulses are taken. Thus, $B_s$ phase A pulses are present on and are taken from the #3 tap of the unit 435 by a line 436 connected thereto, and $B_s$ phase B pulses are present on and are taken from the #10 tap of this unit by a line 437 connected thereto. The line 436 is connected between the #3 tap of the unit 435 and the #4 tap of an INV–3 unit 438 (FIG. 11*c*). The INV–3 unit serves only to restore the signal level of the $B_s$ phase A pulses, there being no inversion in this unit, and the output thereof is connected through a line 439 to the #4 tap of a PCF–3 unit 440. It will now be clear that $B_s$ phase A pulses are also taken from a line 441 connected to the #3 and #10 taps of the unit 440.

Before proceeding with a description of the character and field rings utilized herein, it will be noted that the $B_s$ phase A line 441 is connected to the #8 tap of a CD–1 unit 442 (FIG. 11*b*), the #5 tap of which is connected by a line 443 to the #8 tap of a TR–1 unit 444 (FIG. 11*c*). The unit 444, as well as a TR–1 unit 448 (FIG. 11*b*), is reset in an "off" condition by the manual reset 381, the #6 tap of each being connected to the line 380, and after reset, therefore, the #8 taps thereof are high. Thus, as long as the #5 tap of the unit 442 is up, $B_s$ phase A pulses pass therethrough to a line 445 which is connected between the #10 tap thereof and the #4 tap of an INV–3 unit 446. The #5 tap of the unit 446 is connected by a line 447 to each of the #3 and #7 taps of the unit 448. Thus, on the trailing, negative-going edge of the first $B_s$ phase A pulse the TR–1 unit 448 is turned on, thereby lowering the potential of the #5 tap thereof and turning on the TR–1 unit 444 (FIG. 11*c*), the #5 tap of the unit 448 being connected to the #7 tap of the unit 444 by a line 449. Since the $B_s$ line is initially high and drops on the leading edge of the first clock pulse, and since the phase A clock pulse line 400 is initially low and rises on the leading edge of the first clock pulse, it will be clear that the first $B_s$ phase A pulse applied to the #8 tap of the unit 442 (FIG. 11*b*) is not initiated until the leading edge of the eighth clock pulse to pass through the unit 355 (FIG. 11*a*), and it is at this time that the trigger 448 (FIG. 11*b*) is turned on, i.e., on the trailing edge of this $B_s$ phase A pulse.

When the unit 444 (FIG. 11*c*) is turned on, the #8 tap thereof drops, thereby preventing further $B_s$ phase A pulses from passing through the CD–1 unit 442 (FIG. 11*b*) until the unit 444 (FIG. 11*c*) is again turned off. Also when the unit 444 is turned on, the #9 tap thereof rises, thereby raising the potential of a line 450 connected thereto and also raising the potential of a line 451, the line 450 being connected through the PCF–1 unit 399 (FIG. 11*b*) to the line 451. The line 451 is connected through a CF–2 unit 453 to a line 454, and each of the lines 451 and 454, therefore, rises at the end of $B_s$ phase A and remains high as long as the trigger 444 (FIG. 11*c*) is on. The trigger 444 is turned off when a line 457 connected to the #3 tap thereof drops. As will become clear, this line drops at the end of $F_0$ time, i.e., after ten fields, if the character and field rings are operating properly.

Assuming that the character and field rings are operating as they should, the line 457 drops at the end of the 808th clock pulse, i.e., clock pulse 807 since they are numbered from 0 through 815 as explained above, since this time defines the end of $F_0$. At this time, therefore, the trigger 444, together with the trigger 390 (FIG. 11*a*) is turned off, the #3 tap of the trigger 390 being connected to the line 457, thereby raising the potential of the #5 tap of the unit 442 (FIG. 11*b*) to permit the passage of $B_s$ phase A pulses therethrough. The first such $B_s$ phase A pulse to occur after this time occurs during clock pulse 815 (see FIG. 9) and therefore turns the trigger 448 (FIG. 11*b*) off at this time.

It was mentioned above that the trigger 390 (FIG. 11*a*) was turned off at the end of $F_0$ time, i.e., when the line 475 drops, and since the trigger 379 is still off (it remains off until an error is signified as will be explained) the line 387 is high and the next following reference mark taken from the line 359 which passes through the unit 361 and the unit 364 to the #7 tap of the trigger 390 turns this trigger on. Since the trigger 377 is turned off on the leading edge of each reference mark, and since the trigger 390 is turned on on the trailing edge of each reference mark as long as the trigger 379 is off, the trigger 377 is turned on by the trailing edge of the reference mark. Thus, the DA unit 355 is closed only during the reference mark, when there is no error, and clock pulses pass therethrough at all other times.

At this point it should be clear that the lines 451 and 454 (FIG. 11*b*) rise at the beginning of phase B time of the number seven clock pulse and it should be understood that pulses defining character position $C_9$ and field position $F_9$ are initiated at this time. Also, the lines 451 and 454 drop at the end of $F_0$ time which is also the end of $C_0$ time. Thus, the lines 451 and 454 are up from $F_9$ through $F_0$.

If the line 457 does not drop at the end of $F_0$ time, however, neither of the triggers 444 (FIG. 11*c*) or 390 (FIG. 11*a*) is turned off thereby. If this occurs, it will be seen that the trigger 377 is not turned on at the end of the reference mark and, therefore, that the DA unit 355 is closed and will prevent the passage of further clock pulses to the bit ring. Additionally, if the trigger 444 (FIG. 11*c*) is not turned off, the line 454 remains high after $F_0$ time. This line is connected to the #6 tap of the ID–2 unit 362 (FIG. 11*b*) and the following reference mark applied through the line 359 to the #4 tap of this unit causes the line 385 connected to the #3 tap thereof to drop, thereby turning the trigger 379 (FIG. 11*a*) on, and preventing passage of further clock pulses through the DA unit 355 since the line 387 connected to the #9 tap thereof drops at this time.

The trigger 379 is similarly turned on if either of the triggers 366 or 448 (FIG. 11*b*) is on during the reference mark since the #9 taps thereof are connected to the #4 and #5 taps, respectively, of a CF–1 unit 458, the #3 and #10 taps of which are connected to the line 454. Thus, if the bit ring is not operating properly or if the $B_s$ phase A pulse is not applied to the #3 tap of the unit 442 for some reason, the triggers 366 and 448 are left on during the reference mark and the trigger 379 is turned on to prevent passage of further clock pulses to the bit ring.

It will now be clear that the line 387 is normally high and that it drops only when something is wrong. Similarly, the #10 tap of the CF–1 unit 378 (FIG. 11*a*) is high, except during the reference mark, unless the line 457 does not drop when it should. The line 387 is connected to the #8 tap of the ID–2 unit 362 (FIG. 11*b*), the #5 tap of which is connected by a line **478*a* to the #10 tap of the CF–1 unit 378** (FIG. 11*a*). A neon bulb 456 is connected between the #10 tap of the unit 362 (FIG. 11*b*) and ground, and when either the #5 or #8 tap thereof drops, the bulb 456 is ignited, thereby indicating an error in the timing circuits. (Note that the bulb 456 is continuously ignited when there is an error and that the momentary ignition thereof during the reference mark has no significance since the line **478*a*** drops during the reference mark under normal conditions.)

The character ring (FIGS. 11*c* through 11*f*) comprises ten TR–1 units 470 through 479 arranged in a conventional Overbeck ring circuit and is substantially identical to the bit ring just described. $B_s$ phase A pulses taken from the line 441 are entered on the #8 tap of an ID–2 unit 480 (FIG. 11*c*), the #5 tap of which is connected to the line 451. It will be recalled that the line 451 is up from $F_9$ through $F_0$ under normal conditions and when it is up $B_s$ phase A pulses pass through the unit 480 and through an INV–1 unit 481 to a line 482 connected to the #7 tap of the unit 481. The line 482 is additionally connected to the #7 tap of each of the TR–1 units 470 through 479.

The unit 470 is reset in an "off" condition and the remaining units 471 through 479 are reset in an "on" condition by the manual reset 381 mentioned previously. Thus, the first $B_s$ phase A pulse to pass through the unit 480 turns the TR–1 unit 470 on, which causes the unit 471 to be turned off, and successive $B_s$ phase A pulses cause successive TR–1 units to be off and on in the conventional manner, the TR–1 unit 479 being arranged to turn the TR–1 unit 470 off when it is turned on, since the #5 tap of the unit 479 is connected by a line 483 to the #3 tap of the unit 470, thereby completing the ring. Since the line 451 does not rise until phase B time of the number seven clock pulse, it will be clear that the first $B_s$ phase A pulse to pass through the unit 480 occurs during phase A time of the number fifteen clock pulse and that it is the trailing edge of this pulse that initiates the operation of the character ring by turning the trigger 470 on at this time.

The #8 tap of the TR–1 unit 470 (FIG. 11*c*) is high on reset and is connected by a line 484 to the #5 tap of a CD–1 unit 485, the #10 tap of which is connected by a line 486 through an INV–3 unit 487, through a line 488 and through a PCF–3 unit 489 to a line 490. The line 451 is connected to the #6 and #8 taps of the unit 485 and it will be clear, therefore, that the line 490 rises with the line 451, i.e., at the middle of the number seven clock pulse which is the beginning of $F_9C_9$. Eight bits later, the trigger 470 is turned on, thereby lowering the line 490 at this time. The pulse taken from this line is referred to herein as the $C_9$ pulse. It occurs ten times each drum revolution and defines the first character position in each field.

The #8 tap of each of the TR–1 units 471 through 479 is connected through lines 491 through 499, respectively, to the #4 tap of a corresponding PCF–3 unit 500 through 508, respectively. The outputs, i.e., the #3 and #10 taps, of each of the PCF–3 units 500 through 508 are connected to lines 510 through 518, respectively, and timing pulses $C_8$ through $C_0$ are taken from these lines. Each of the pulses $C_8$ to $C_0$ inclusive defines its respective character location in the same manner that $C_9$ does.

During each field, the last $B_s$ phase A pulse, i.e., the tenth one, turns the trigger 479 on and thereby turns the trigger 470 (FIG. 11*c*) off, and it should be noted here that if it is not turned off at this time, the #4 tap of a CF–1 unit 520 will be high since the #9 tap of the unit 470 is connected by a line 521 to the #4 tap of the unit 520. When the #4 tap of the unit 520 is high, the line 454 is high, thereby permitting the reference mark to pass through the ID–2 unit 362 (FIG. 11*b*) and cause the error indicating bulb 456 to be ignited as well as to cause the operation of the bit ring to cease, as discussed above.

The line 518 (FIG. 11*f*), therefore, is high during $C_0$ time only, thereby raising the potential of the #4 tap of the ID–2 unit 480 (FIG. 11*c*) for this period, the #6 tap of which is connected to the $B_s$ phase A line 441. Since each character pulse $C_9$ through $C_0$ is initiated and terminates at $B_s$ phase B time, as described, it is not until the end of $C_0$ time that a $B_s$ phase A pulse passes through the unit 480. At this time, however, the #3 tap of the unit 480 drops, thereby lowering the potential of the #4 tap of the INV–1 unit 481 which is connected to the #3 tap of the unit 480 by a line 524. The INV–1 unit 481 serves to invert a signal applied to the #4 tap thereof, and it will be understood that a positive $B_s$ phase A pulse is taken from the #3 tap of this unit at the end of each $C_0$ time. This pulse is used to drive the field ring.

The #3 tap of the unit 481 is connected by a line 525 to the #7 tap of each of ten TR–1 units 526 through 535 (FIGS. 11*c* through 11*f*), which units comprise the field ring and are arranged in an Overbeck ring circuit in the conventional manner. Further description of the field ring is deemed unnecessary, it being substantially identical to the character ring just described, and it will be necessary to note only that the unit 526 is reset in an "off" condition and that the remaining units 527 through 535 are reset in an "on" condition. Thus, on the trailing, negative-going edge of each $B_s$ phase A pulse occurring during $C_0$ time the "off" TR–1 unit is advanced one position.

The #8 tap of the unit 526 (FIG. 11*c*) is connected through a line 536 to the #4 tap of the CD–1 unit 485, the #3 tap of the last mentioned unit being connected by a line 537 through an INV–3 unit 538 and through a PCF–3 unit 539 to a line 540 from which a pulse defining field 9, referred to hereinafter as the $F_9$ pulse, is taken. The trigger 526 is reset off and is also turned off each time the trigger 535 (FIG. 11*f*) is turned on, and it will be clear that the potential of the #8 tap of the trigger 526 (FIG. 11*c*) might well define more than the field $F_9$. It is for this reason that the signal taken from the #8 tap is mixed with the signal taken from the line 451 in the CD–1 unit 485. Since this line rises at $F_9$ time and drops at the end of $F_0$ time, it should be clear that the pulse taken from the line 540 defines field 9. The #8 tap of each of the TR–1 units 527 through 535 is connected through a corresponding PCF–3 unit 541 through 549 to a corresponding line 550 through 558. These lines are designated the $F_8$ through $F_0$ lines, respectively, and the pulses taken therefrom define field 8, field 7, etc., through field 0.

Figure 11D:
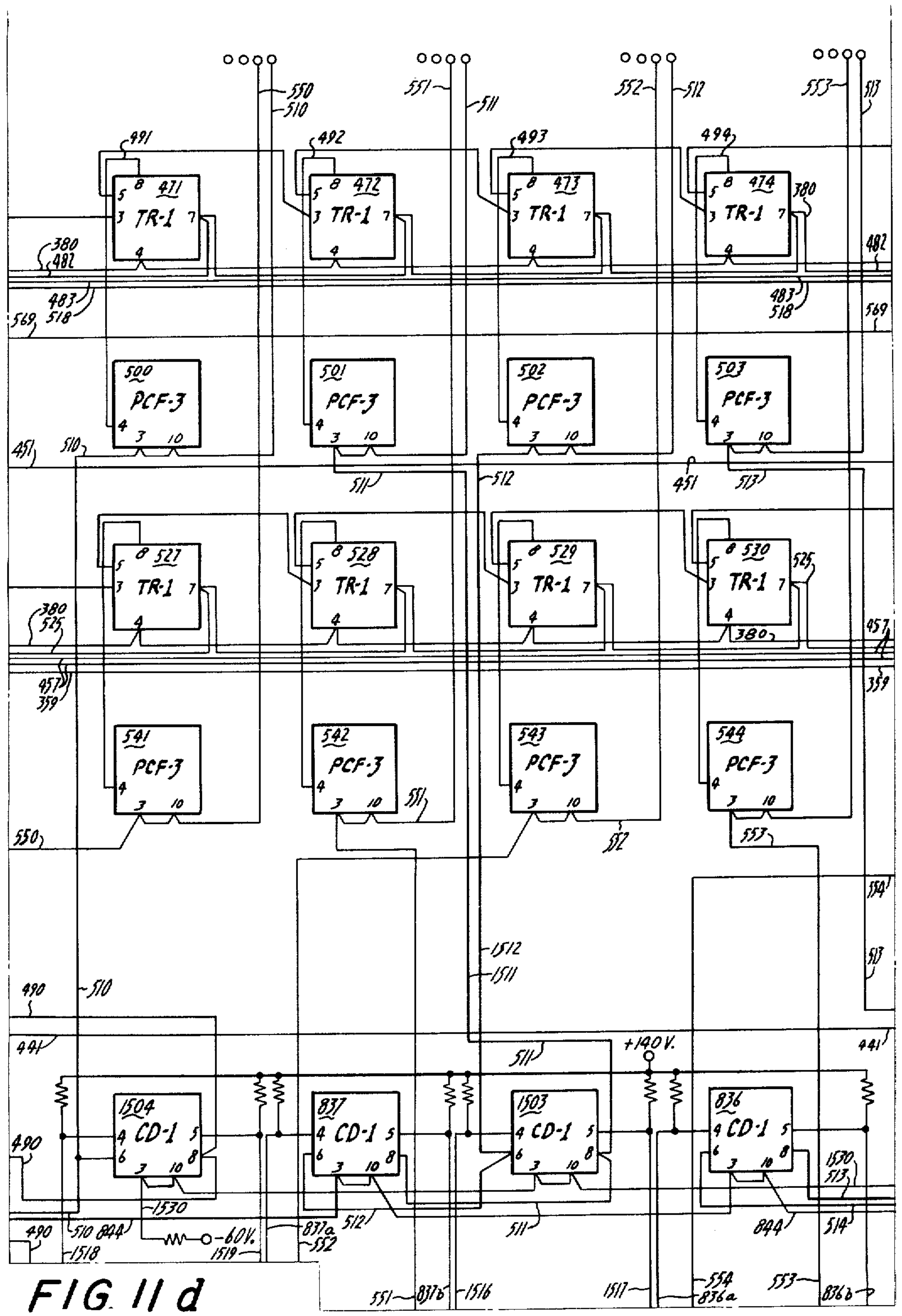
Figure 11E:
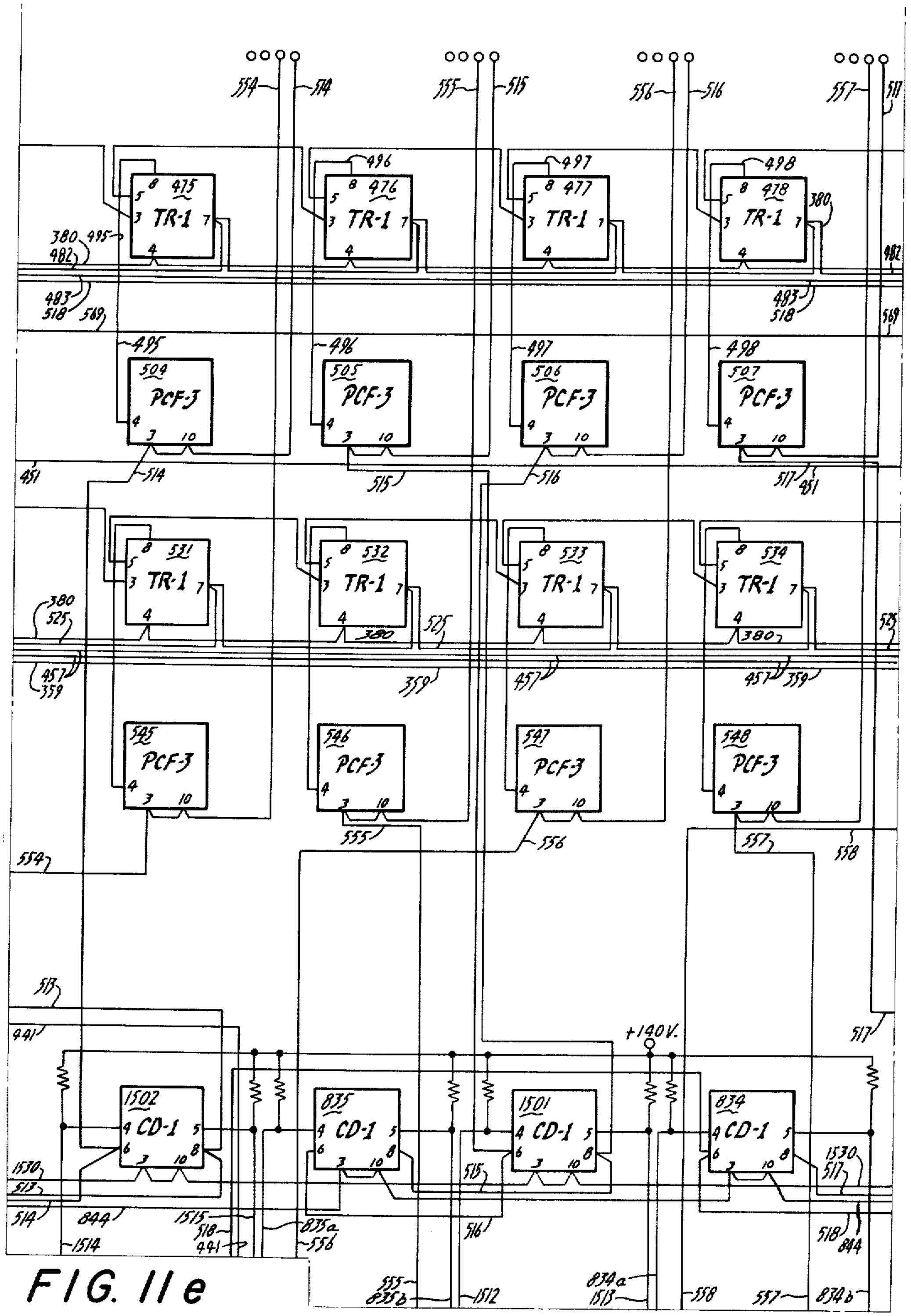
Figure 11F:
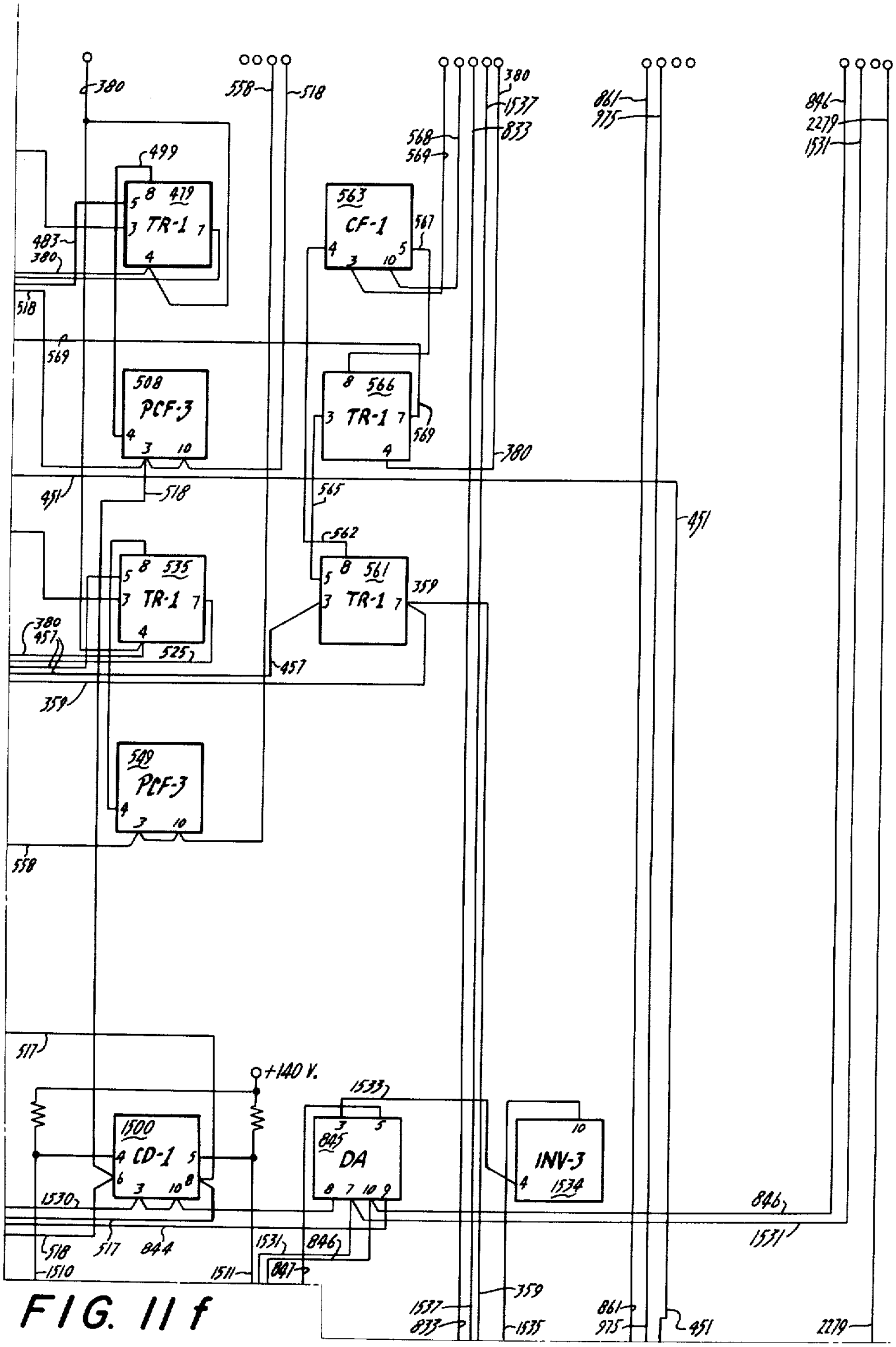

The #5 tap of the TR–1 unit 535 (FIG. 11*f*) is connected by the line 457 to the #3 tap of the unit 526 (FIG. 11*c*), thereby completing the field ring circuit, as well as to the #3 tap of a TR–1 unit 561 (FIG. 11*f*). At the end of the tenth field, i.e., $F_0$, the trigger 535 is turned on, thereby causing the line 457 to drop at this time, as described earlier. The TR–1 unit 561 is, therefore, turned off by the pulse taken from the line 457.

This results in raising the potential of the #5 and #8 taps thereof. The #7 tap of the unit 561 is connected to the reference mark line 359 and the trailing, negative-going edge of each reference mark turns the TR–1 unit 561 on, thereby lowering the potential of the #5 and #8 taps. The #8 tap of the unit 561 is connected through a line 562 to the #4 tap of a CF–1 unit 563, the #3 tap of which is connected to a line 564. The pulse taken from the line 564, therefore, defines a period existing from the end of $F_0$ time until the trailing edge of the reference mark and is designated $C_L$ (character late).

The #5 tap of the TR–1 unit 561 is connected by a line 565 to the #3 tap of a TR–1 unit 566, the #8 tap of which is connected by a line 567 to the #5 tap of the CF–1 unit 563. The unit 566 is reset in an "on" condition by the manual reset 381, as noted in the drawing, thereby rendering the #8 tap thereof initially low. However, when the #3 tap drops, as it does when the trigger 561 is turned on, the #8 tap, and thus the line 567, rises, thereby raising the potential of a line 568 connected to the #10 tap of the CF–1 unit 563. The #7 tap of the TR–1 unit 566 is connected by a line 569 to the #5 tap of the TR–1 unit 444 (FIG. 11*c*), and it will be recalled that the #5 tap of this unit drops in potential at $B_s$ phase B time just prior to $C_9$ time. Thus, the line 568 (FIG. 11*f*) connected to the #10 tap of the CF–1 unit 563 is up from the trailing edge of the reference mark until $B_s$ phase B just prior to $C_9$. The pulse taken from the line 568 is referred to herein as "character early" and is designated $C_E$.

It will be recalled that instructions stored on the drum 25 are numbered 00 through 99, there being 100 instruction locations, ten of which are located on each of the ten tracks provided therefor. Ten magnetic transducers are utilized in connection with the instruction tracks, one for each track, and the tens order of the instruction address is used to select the proper track, the units order being used to control the selection of the field in that track defined by the instruction address. Thus, the condition of the tens portion of the program counter controls the selection of the transducer associated with the corresponding program track, and the condition of the units portion of the program counter controls the gating of the field of the selected track defined thereby. Each of the transducers associated with the ten program tracks is connected through a corresponding read amplifier, of the type shown in FIG. 12, through a corresponding line 760 through 769 (FIG. 13) and through the n/o *c* contacts of the program counter relays 120 to 129 inclusive to a line 570. Thus, when one of the relays 120 through 129 is energized, the signal from the corresponding program track is connected to the line 570.

The line 570 connects to the #4 tap of an RA–1 unit 571 (FIG. 10), the #10 tap of which is connected by a line 572 to the #4 tap of an INV–2 unit 573. The #3 tap of the unit 573 is connected by a line 574 to the #9 tap of a TR–2 unit 575. The signal taken from the #3 tap of the INV–2 unit 573 is utilized to plate-pull-over the unit 575 to an "off" condition, the negative-going edges of the signals applied thereto being arranged to accomplish this.

It will be recalled that clock pulses are taken from the #10 tap of the INV–3 unit 352 by a line **352*a*. In addition to being connected to the #5 tap of the PCF–1 unit 353, the line 352*a* is connected to the #5 tap of a CF–1 unit 576, the #10 tap of which is connected through a 150-$\mu\mu$f. condenser 577 to a line 578. The condenser 577 is utilized to differentiate the clock pulses taken from the #10 tap of the unit 576, and the differentiated pulses are applied through the line 578 to the #5 tap of the INV–2 unit 573. These pulses are inverted by the unit 573 and are applied through a line 579 to the #4 tap of a PCF–1 unit 580 as well as to the #8 tap of the TR–2 unit 575. Thus, the leading edge of each clock pulse is arranged to turn on the TR–2 unit 575 and it remains on until a data pulse turns it off. This unit is provided for shaping the waveform of the signal taken from the line 570, which signal after shaping is taken from the #3 tap of the PCF1 unit 580 by a line 581, the next following clock pulse being arranged to immediately turn the TR–2 unit 575 on again. Thus, data pulses taken from the selected program track appear on the line 581** and are positive in form.

Figure 14A:
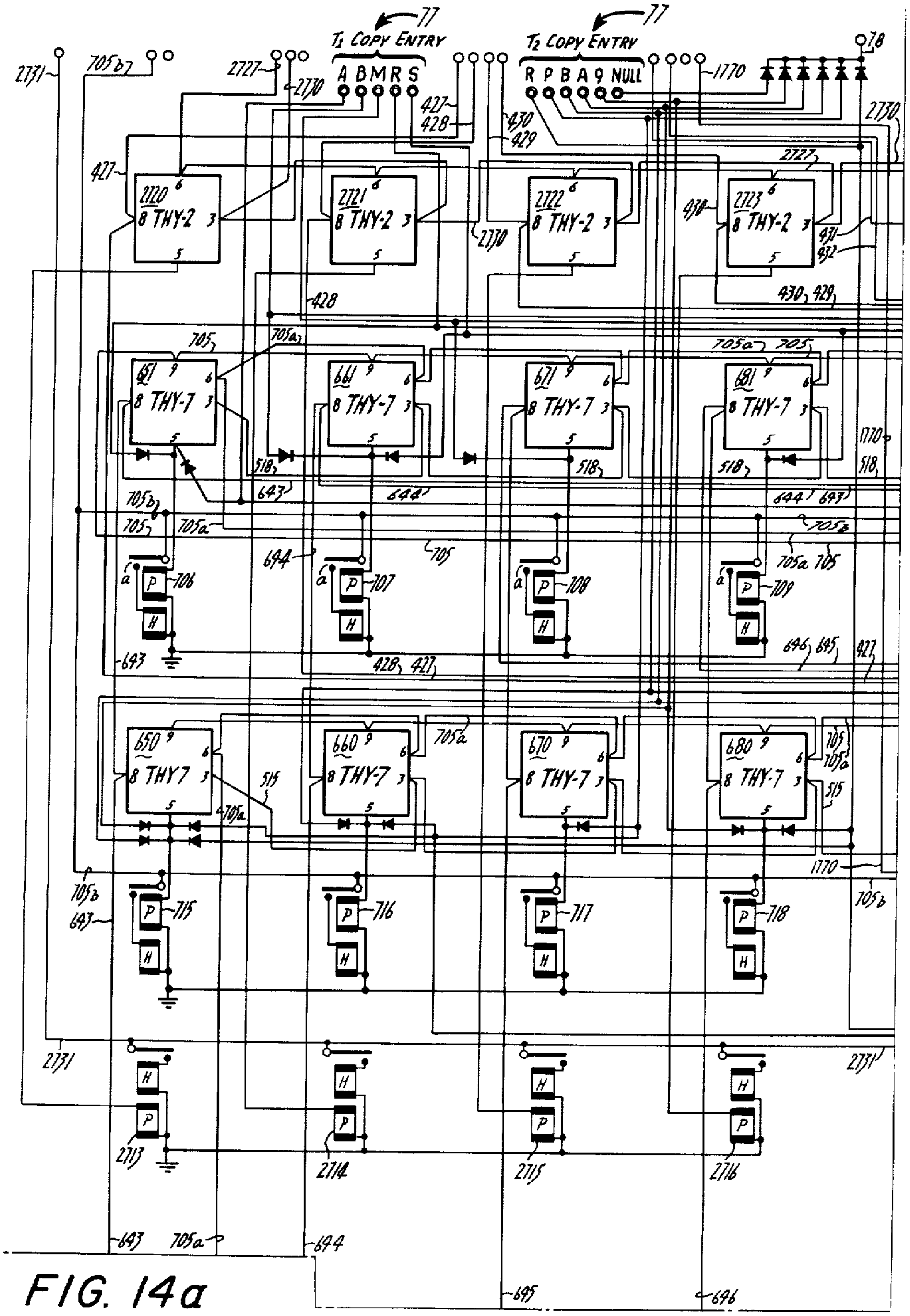
Figure 14B:
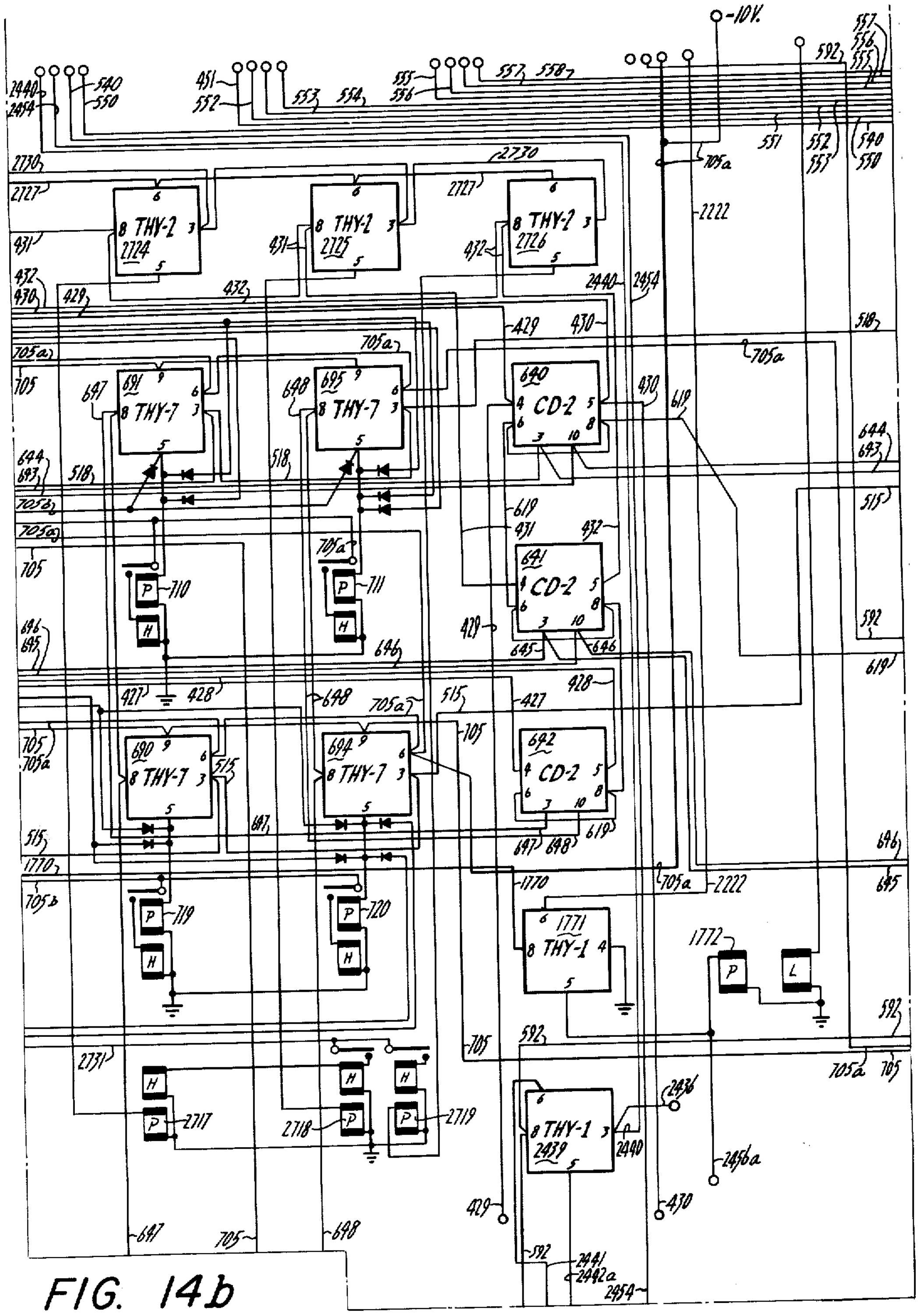
Figure 14C:
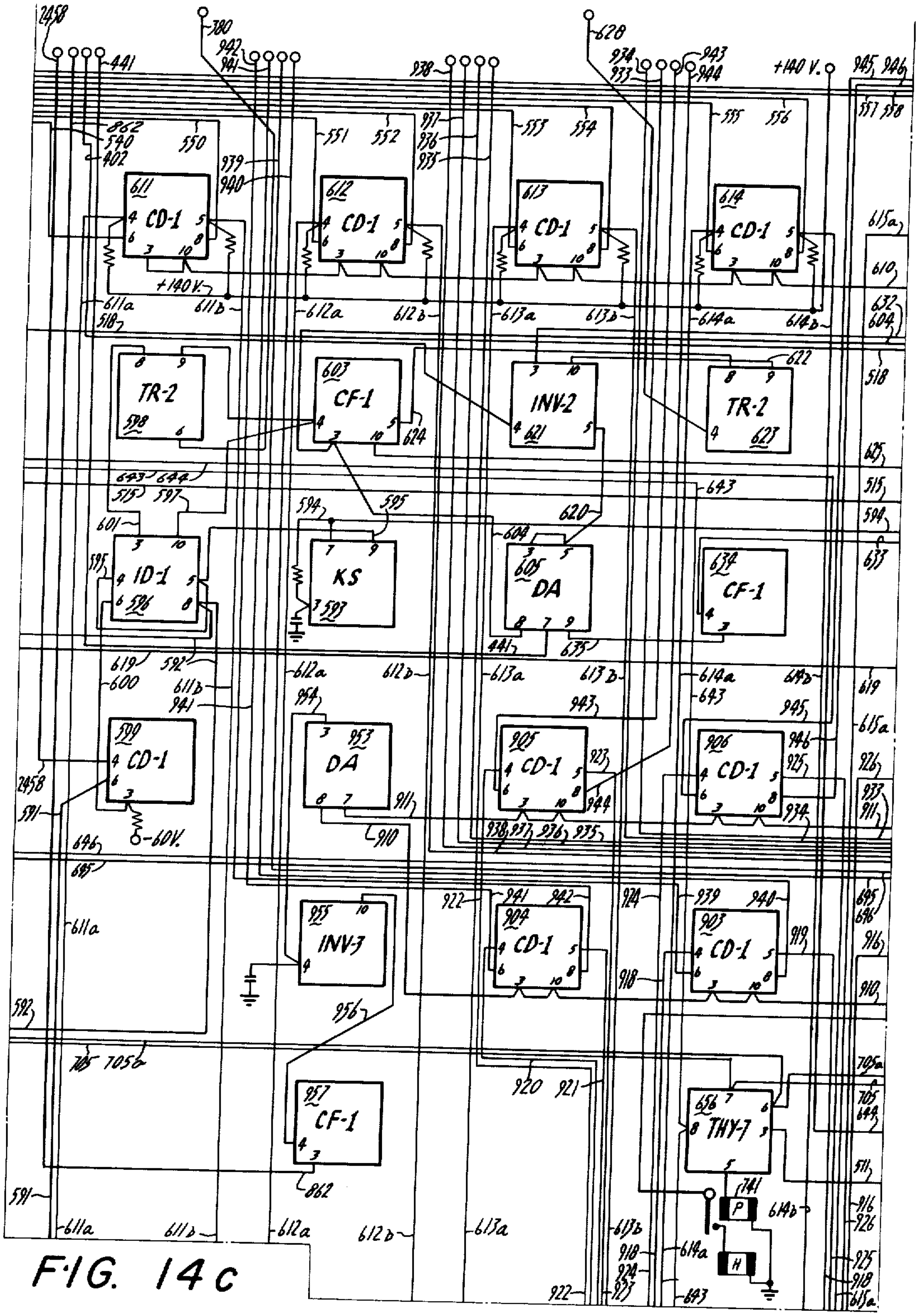
Figure 14D:
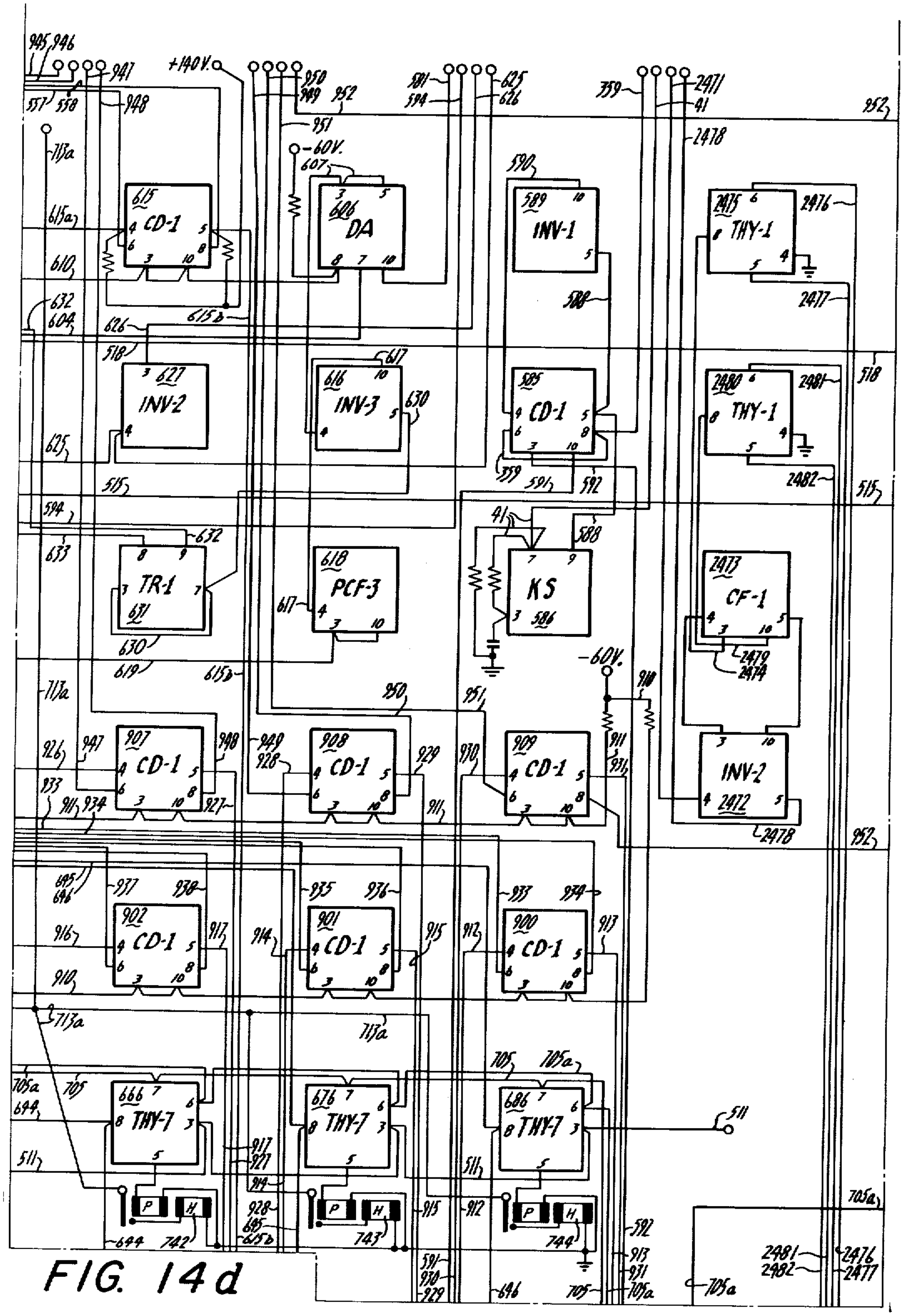

Referring now to FIG. 14*d*, it will be seen that the reference mark line 359 is connected to the #6 and #8 taps of a CD–1 unit 585. Additionally, the line 41 connected to one side of CB–1 (FIG. 3*a*) is connected to the #3 tap of a KS unit 586 (FIG. 14*d*), and when CB–1 makes, 48 volts is connected to the #3 tap of the unit 586. The #9 tap of the unit 586 is connected by a line 588 to the #5 tap of an INV–1 unit 589 and to the #5 tap of the CD–1 unit 585, the #10 tap of the INV–1 unit 589 being connected by a line 590 to the #4 tap of the unit 585. Thus, on every odd CB pulse the unit 586 is triggered to emit a positive pulse, taken from the #9 tap thereof, which extends for the duration of the CB pulse. During an odd cycle, therefore, the #5 tap of the unit 585 is high and reference marks taken from the line 359 pass therethrough to a line 591. Also, at this time it will be noted that the #4 tap of the unit 585 is low, due to the inverter, thereby preventing reference marks from appearing on a line 592 connected to the #3 tap of the unit 585. However, during an even cycle the #9 tap of the KS unit 586 is low, thereby rendering the line 590 connected to the #4 tap of the unit 585 high, and under these circumstances, i.e., on an even cycle, reference marks will appear on and are taken from the line 592. The pulse taken from the line 591 is referred to as the "even home" pulse, the pulse taken from the line 592 being the "odd home" pulse.

Referring now to FIG. 14*c*, the #3 tap of a KS unit 593 is connected by a line 594 (FIGs. 14*c* and 14*d*) through the n/o *d* contacts (FIG. 3*b*) of the $I_1$ relay 60 to the line 55 from which even CB pulses are normally taken. Thus, the #3 tap of the unit 593 (FIG. 14*c*) goes up during the $I_1$ cycle. The #9 tap of the unit 593 is connected by a line 595 to the #4 and #5 taps of an ID–1 unit 596, the #6 tap of which is returned to −60 volts and the #8 tap of which is connected to the odd home pulse line 592 (FIG. 14*d*). Even home pulses taken from the line 591 are applied to the #6 tap of a CD–1 unit 599 (FIG. 14*c*), the #4 tap of which is connected to a line 2458 which is high if there was no $E_2$ error preceding the $I_1$ cycle, as will be described later. This prevents the entry of the next instruction into the instruction register when there was an $E_2$ error since the line 2458 is low at this time. Thus, if no $E_2$ error, the even home pulses pass through the unit 599 to a line 600 connected between the #3 tap thereof and the #6 tap of the unit 596. When this occurs, the #3 tap of the unit 596 drops, and since it is connected by a line 601 to the #8 tap of the TR–2 unit 598, the unit 598 is turned on by the leading edge of each even home pulse. Odd home pulses pass through the ID–1 unit 596 when the #9 tap of the KS unit 593 is up, as it is during an $I_1$ cycle, and this pulse is arranged to plate-pull-over the TR–2 unit 598 to an "off" condition, the #10 tap of the unit 596 being connected by the line 597 to the #9 tap of the unit 598. Thus, the trigger 598 is on throughout the drum revolution which occurs during the $I_1$ cycle.

The #9 tap of the unit 598 is connected by the line 597 to the #4 top of a CF–1 unit 603, the #3 tap of which is connected by a line 604 to the #8 tap of a DA unit 605 and to the #7 tap of another DA unit 606 (FIG. 14*d*). It will be noted that the line 581 (FIG. 10) from which data from the program tracks is taken is connected to the #10 tap of the DA unit 606 (FIG. 14*d*). Since the line 597 is high during an $I_1$ cycle, the TR–2 unit 598 being on at this time, it will be seen that when the #8 tap of the DA unit 606 is high, data taken from the line 581 passes therethrough to a line 607 connected to the #3 and #5 taps thereof.

The #8 top of the DA unit 606 is connected by a line 610 to the #3 and #10 taps of each of five CD–1 units 611 through 615 (FIGS. 14*c* and 14*d*) which are utilized to create a gate for selecting the field of an instruction track under control of the units portion of the program counter. The #6 and #8 taps of the various CD–1 units 611 through 615 are connected to a corresponding one of ten lines 540 and 550 through 558, respectively, as indicated in the drawing, from which lines, it will be recalled, pulses defining the ten fields $F_9$ through $F_0$, respectively, are taken. Thus, during $F_9$ time the #6 tap of the CD–1 unit 611 is high, the #8 top thereof as well as the #6 and #8 taps of the remaining CD–1 units 612 through 615 being low at this time. Similarly, during $F_8$ time, the #8 tap of the unit 611 is high, the remaining #6 and #8 taps of these units being low at this time, etc.

The #4 and #5 taps of the units 611 through 615 are connected by lines 611*a*, *b* through 615*a*, *b* through the n/o *e* contacts of the corresponding relays 109 through 100 (FIG. 8) of the units order of the program counter to +140 volts, and when one of these relays is picked, it will be understood that the corresponding #4 or #5 tap of one of the units 611 through 615 (FIGS. 14*c* and 14*d*) goes up. Assuming, for example, that the relay 107 is picked, the $F_7$ pulse applied through the line 551 to the #6 tap of the CD–1 unit 612 (FIG. 14*c*) will pass through this unit to the line 610 from which it is taken as a positive-going pulse. Thus, the #8 tap of the DA unit 606 (FIG. 14*d*) rises during the appropriate field determined by the condition of the units portion of the program counter, thereby gating the program determined by this portion of the counter onto the line 607, and during an $I_1$ cycle the selected program is connected through the line 607 to the #4 tap of an INV–3 unit 616, the #10 tap of which is connected through a line 617 and through a PCF–3 unit 618 to a line 619.

The #6 tap of the TR–2 unit 598 (FIG. 14*c*) is connected to the line 380 which, it will be recalled, is connected to the manual reset control 381, and on manual reset this TR–2 unit is turned off. It was mentioned earlier that the line 604 connected to #8 tap of the DA unit 605 is high during an $I_1$ cycle. $B_8$ phase A pulses are applied to the #7 tap of the unit 605 through the line 441, and if the #9 tap of this unit is high, it will be understood that $B_8$ phase A pulses pass therethrough to a line 620 during an $I_1$ cycle.

The line 620 is connected through an INV–2 unit 621 to a line 622 which is connected to the #9 tap of a parity error trigger, a TR–2 unit 623. If a $B_8$ phase A pulse passes through the unit 605 and 621 to the #9 tap of the unit 623, this unit is turned off, thereby raising the potential of the #8 tap thereof which is connected through a line 624 to the #5 tap of the CF–1 unit 603. When the #8 tap of the unit 623 is high, there has been a parity error and a line 625 connected to the #10 tap of the CF–1 unit 603 is high. When the line 625 goes up, various operations occur, as will be described hereinafter. For the present, however, it will be understood that this line is high when there is a parity error during an $I_1$ cycle. A second line 625 (FIG. 14*d*) is low under these conditions since the line 625 is connected thereto through an INV–2 unit 627. To reset the TR–2 unit 623 (FIG. 14*c*) an error reset control line 628 connected to the #4 tap of the unit 623 is opened momentarily by means to be described, thereby raising the potential of the #9 tap and lowering the #8 tap of the unit 623.

It will be recalled that a parity error is indicated by the circuitry just described only if the #9 tap of the DA unit 605 is high during and $I_1$ cycle. The #5 tap of the INV–3 unit 616 (FIG. 14*d*) is connected by a line 630 to the #3 and #7 taps of a TR–1 unit 631, which unit provides a bit check of the program data entered on the line 607. The unit 631 is reset during $B_8$ phase B time by lowering the potential of the #9 tap thereof at this time. $B_8$ phase B pulses taken from the line 402 are connected to the #4 tap of the INV–2 unit 621 (FIG 14*c*) and are taktn from the #3 tap thereof through a line 632 to the #9 tap of the TR–1 unit 631 (FIG. 14*d*). Thus, on each $B_8$ phase B pulse the unit 631 is reset in an "off" condition.

An odd bit check is utilized herein, and bits taken from the line 607 are applied to the #3 and #7 taps of the trigger 631 since the #5 tap of the unit 616 is connected thereto. If there are an even number of bits in any character the #8 tap of the trigger 631 is high at $B_8$ phase A and a parity error is indicated as explained, since the #8 tap of the unit 631 is connected by a line 633 and through a CF–1 unit 634 (FIG. 14*c*) and a line 635 to the #9 tap of the DA unit 605. Thus, if any character of an instruction taken from the line 607 has an even number of bits, the #9 tap of the unit 605 will be up at $B_8$ phase A and will cause the TR–2 unit 623 to be turned on, which indicates an error as described above. However, if each character of an instruction has an odd number of bits, the #9 tap of the unit 605 is low during $B_8$ phase A of each character and no error is indicated.

The line 619 (FIG. 14*d*) from which the instruction determined by the condition of the relays of the program counter is taken during an $I_1$ cycle is connected to each of the #6 and #8 taps of three CD–2 units 640 through 642 (FIG. 14*b*). $B_1$ pulses are applied to the #4 tap of the unit 640 through the line 429, $B_2$ pulses being applied to the #5 tap of this unit through the line 430. Similarly, $B_4$, $B_8$, $B_0$ and $B_x$ pulses are applied through the lines 431, 432, 427 and 428, respectively, to the corresponding #4 or #5 taps of the CD units 641 and 642, as indicated in the drawing. The CR–2 units 640 through 642 are used to mix bit pulses with the data pulses appearing on the line 619, and upon the occurrence of a pulse taken from the line 619 simultaneously with a $B_1$ pulse, for example, a line 643 connected to the #3 tap of the unit 640 rises, thereby indicating the occurrence of a "1" bit. Similarly, "2" bits, "4" bits, "8" bits, "0" bits and "*x*" bits in an instruction are indicated by a rise in potential of several lines 644 through 648, respectively, connected to the #10 tap of the unit 640 and to the #3 or #10 taps of the units 641 and 642, respectively.

The #3 tap of the unit 640 is connected by the line 643 to the #8 tap of each of nine THY–7 units 650 through 657 and 659 (FIGS. 14*a*, 14*c*, 14*g* and 14*i*), and the line 644 is connected to the #8 tap of each of ten THY–7 units 660 through 669 (FIGS. 14*a*, 14*d*, 14*g* and 14*j*). The line 645 is connected to the #8 tap of each of nine THY–7 units 670 through 677 and 679 (FIGS. 14*a*, 14*d*, 14*g* and 14*j*). The line 646 is connected to the #8 tap of each of nine THY–7 units 680 through 687 and 689 (FIGS. 14*a*, 14*d*, 14*g* and 14*j*). The line 647 is connected to the #8 tap of each of three THY–7 units 690, 691 and 693 (FIGS. 14*b* and 14*h*), and the line 648 is connected to the #8 tap of each of three THY–7 units 694, 695 and 697. Each of the units 650 through 697 is utilized to control the operation of the various relays of the instruction register, as will be seen.

A ten-character instruction includes $T_1a_1b_1$ $T_2a_2b_2$ *mn pq*, and the $T_1$ portion of the instruction is recorded in character "0" position and is therefore entered into the instruction register during $C_0$ time. The $C_0$ line 518 is connected to the #3 tap of each of the units 651, 661, 671, 681, 691 and 695 (FIGS. 14*a* and 14*b*) associated with the $T_1$ portion of the instruction register, thereby conditioning these units to fire during $C_0$ when a bit pulse is present on the corresponding #8 tap thereof during $C_0$ time, providing that voltage is then present on the #9 tap thereof. The #9 tap of each of the aforementioned THY–7 units is connected by a line 705 through the n/o *k* points of the $I_1$ relay 60 (FIG. 3), through the n/c *b'* points of the error relay 64 and through the points of CB–20 to +70 volts. Each of these units is additionally connected by the line 705 through the n/o *g'* contacts of the $I_2$ relay 62, through the n/c *f* contacts of the error relay 46, through the n/c *b* contacts of the error relay 45 and through the points of CB–19 to +70 volts, and as long as there has been no error, it will be clear that the line 705, and thus the #9 taps of the above mentioned THY–7 units, are connected to +70 volts throughout the $I_1$ and $I_2$ cycles.

The #5 tap of each of the units 651, 661, 671, 681, 691 and 695 (FIGS. 14*a* and 14*b*) is connected through the pick winding of a corresponding relay 706 through 711, respectively, to ground, and when the #8 tap of one or more of these units goes up during $C_0$ time on an $I_1$ cycle, as it does upon the occurrence of a corresponding bit in the $T_1$ portion of the instruction, the relay or relays 706 through 711 associated therewith are picked, thereby entering $T_1$ in these relays.

The hold coil of each of these relays is connected between ground and through its n/o *a* contacts, through a line 705*b* to one side of the *c* contacts of the $I_1$ relay 60 (FIG. 3*b*), the *j'* contacts of the $I_2$ relay 62, the *a'* contacts of the $E_1$ relay 65, the *b'* contacts of the $E_2$ relay 66, the *d* contacts of the $p_1$ relay 63, the *d* contacts of the $C_1$ relay 79, the *f* contacts of the $C_2$ relay 80, the *d* contacts of the $C_3$ relay 81 and the *f* contacts of the $C_4$ relay 84. The other sides of these contacts associated with the relays 62, 66, 80 and 84 are normally connected through the points of CB–11 to +48 volts, the other sides of these contacts associated with the relays 63, 65, 79 and 81 being normally connected through the points of CB–12 to +48 volts. It will be noted that the other side of the *c* points of the $I_1$ relay 60 is normally connected through the n/c *j'* points of the relay 43 and through the points of CB–12 to +48 volts. It will now be clear that the line 705*b* is connected to +48 volts during the $I_2$, $E_1$, $E_2$, $p_1$, $C_1$, $C_2$, $C_3$ and $C_4$ cycles and that it is connected to +48 volts during and $I_1$ cycle only when the relay 43 is deenergized. This occurs, it will be recalled, only when $T_2$=*P*, *X* or *R*. Thus, when the $T_1$ portion of the instruction is entered into the relays 706 through 711, it is held therein through the $E_2$ cycle, it being dropped at this time if there is nothing present in the *p* column of the instruction and if no copy operation is to be performed. This thereby permits the entry of the next instruction therein during the next $I_1$ cycle as is desired at this time. If a copy operation is being performed, the $T_1$ portion of the instruction is maintained in the instruction register through the $C_4$ cycle, and if there is something present in the *p* column of the instruction, the $T_1$ portion of the instruction is maintained in the relays through the $p_1$ cycle, at the end of which time the line 705*b* is disconnected from the 48-volt suply, thereby causing these relays to drop out at this time.

$T_2$ is stored in the character position corresponding to $C_3$ time. The #9 tap of each of the THY–7 units 650, 660, 670, 680, 690 and 694 (FIGS. 14*a* and 14*b*) associated with the $T_2$ portion of the instruction register is connected to the line 705. Thus, the $T_2$ portion of the instruction register is conditioned in the same manner as the $T_1$ portion, i.e., voltage is supplied to the #9 taps thereof during the $I_1$ and $I_2$ cycles if no error. The $C_3$ line 515 is connected to the #3 tap of each of these units (FIGS. 14*a* and 14*b*), and when the #8 tap of one or more of these units goes up during $C_3$ time on an $I_1$ cycle a corresponding relay 715 through 720 connected to the #5 taps thereof is picked, thereby entering the $T_2$ portion of the instruction therein. These relays are held in the same manner in which the $T_1$ relays are held, and it will be understood, therefore, that the same conditions apply thereto.

The #3 tap of each of the THY–7 units 653, 663, 673 and 683 (FIGS. 14*i* and 14*j*) is connected to the $C_1$ line 517, the #7 taps thereof being connected to the line 705, and when one of the lines 643 through 646 rises during $C_1$ time the $a_1$ portion of the instruction is entered into the corresponding one of four relays 721 through 724. The hold coil of each of these relays is connected between ground the through its n/o *a* contacts to a line 713*a*, which line is connected through the n/o *i'* contacts of the $I_2$ relay 62 (FIG. 3) as well as through the n/o *d'* contacts of the $E_2$ relay 66 to a line 713*b*, the line 713*b* being connected through the *d* points of a relay 688 and through the points of CB–13 to +48 volts. The line 713*a* is additionally connected through the n/o *b'* contacts of the $E_1$ relay 65 and through the points of CB–14 to +48 volts. Thus, the $a_1$ relays of the instruction register are held during $I_2$, $E_1$ and $E_2$ only, these relays being arranged to drop out after the $E_2$ cycle.

The $b_1$ portion of the instruction is entered into the corresponding one of four relays 725 through 728 (FIG. 14*i*) during $C_2$ time, in a similar manner, as are the $a_2$, $b_2$, *m*, *n*, *p* and *q* portions of the instruction entered into relays 729 through 732, 733 through 736, 737 through 740, 741 through 744 (FIGS. 14*c* and 14*d*), 745 through 750 (FIGS. 14*g* and 14*h*), and 752, respectively, during $C_4$, $C_5$, $C_6$, $C_7$, $C_8$ and $C_9$ times in that order. It will be noted that the relays associated with the $b_1$, $a_2$, $b_2$, *m* and *n* portions of the instruction register are held in the same manner in which the $a_1$ relays are held, since the line 713*a* is connected through the n/o *a* points of each of these relays to one side of the hold coil thereof, and that the relays associated with the $b_1$, $a_2$, $b_2$, *m* and *n* portions of the instruction register are picked in the same manner as the relays associated with the $a_1$ portion since the line 705 is connected to the #7 taps of the THY–7 units associated therewith. Additionally, it will be noted that the relay associated with the *q* portion of the instruction is picked and held in the same manner in which the $T_1$ relays are picked and held, and that the *p* relays are picked in the same manner in which the $T_1$ relays are picked.

The *p* relays are held, however, while a line 712*a* is connected to +48 volts. This line is connected to one side of the n/o *e* contacts of the $p_1$ relay 63 (FIG. 3*b*) as well as to one side of the n/o *d* contacts of the $E_1$ relay 65, to one side of the n/o *d* contacts of the $p_2$ relay 72, to one side of the *c'* contacts of the $E_2$ relay 66 and to one side of the *k'* contacts of the $I_2$ relay 62. The other sides of these contacts associated with the $p_1$ and $E_1$ relays are connected through the points of CB–10 (FIG. 3*b*) to +48 volts, the other sides of the contacts associated with the $I_2$, $P_2$ and $E_2$ relays being connected through the points of CB–9 to +48 volts. Thus, the *p* relays are held during the $I_2$, $E_1$, $E_2$, $p_1$ and $p_2$ cycles, and it is not until after the $p_2$ cycle that they drop out.

Referring now to FIG. 13, it will be seen that various points of the $T_1$ relays 706 through 709 of the instruction register are arranged to selectively connect one of the ten lines 760 through 769 to a line 770*a* which is connected through the n/c *a* points of the relays 711 and 710 to a line 770. It will be recalled that the signal taken from each of the transducers associated with the program tracks 0 through 9 of the process drum 25 is connected to one of the lines 760 through 769, and it will be understood that when the points of one or more of the relays 706 through 709 are in the transferred condition a selected transducer corresponding to the $T_1$ address stored in the instruction register is connected therethrough to the line 770*a*. Similarly, various points of the relays 715 through 718 associated with the $T_2$ portion of the instruction register are arranged in a similar relay tree to selectively connect the lines 760 through 769 to a line 771 which is connected through the n/c *a* points of the relays 720 and 719 to a line 772.

The tracks A through H, J, K, N and Q are read by a corresponding transducer (not shown), the output of which is connected through a corresponding preamplifier, such as the one disclosed in FIG. 12, to one of twelve lines 773 through 784 (FIG. 13). The lines 773 through 780 are connected through various contacts of the $T_1$ relays 706 through 709 to a line 785 which is connected through the n/o *b* contacts of the relay 711 and through the n/o *a* contacts of the relay 710 to the line 770, as well as through various contacts of the $T_2$ relays 715 through 718 to a line 786 which is connected through the n/o *b* contacts of the relay 720 and through the n/o *a* contacts of the relay 719 to the line 772. Similarly, the lines 781 through 784 are connected through various contacts of relay groups 706 through 711 and 715 through 720 to the lines 770 and 772, respectively. Thus, a signal taken from any one of the 22 drum tracks 0 through 9, A through H, J, K, N and Q may be taken from the line 770, the particular track to be read being determined by the condition of the $T_1$ relays of the instruction register. Also, for a purpose to be described later, the data recorded at the $T_2$ address may be read therefrom and taken from the line 772 selectively under the control of the $T_2$ relays of the instruction register.

In the present embodiment of the invention means are provided to erase when not writing on a drum track, i.e., the write winding is not energized and the erase winding of the transducer is energized. As will be disclosed later, the data to be recorded on a drum track is applied to a line 787 (FIG. 15). The line 787 is connected through various contacts of the $T_2$ relays 716 through 720 to the write winding of the selected transducer determined by the condition of the $T_2$ relays. In a similar manner, the erase signal is taken from a line 790, as will be shown, and is applied to the selected transducer through various other points of the $T_2$ relays 715 through 720.

The line 770 (FIG. 13) from which data taken from the various drum tracks is taken is connected to the #4 tap of an RA–1 unit 791 (FIG. 10), the #10 tap of which is connected by a line 792 to the #4 tap of an INV–2 unit 793 where the signal is inverted. The output or #3 tap of the unit 793 is connected through a line 794 to the #9 tap of a TR–2 unit 795, and the negative-going edge of the signal taken from the #3 tap of the unit 793 is utilized to plate-pull-over the unit 795 to an "off" condition. It will be recalled that clock pulses taken from the #10 tap of the CF–1 unit 576 are differentiated by the condenser 577 and are applied to the line 578. This line is connected to the #5 tap of the INV–2 unit 793, the #10 tap thereof being connected by a line 796 to the #8 tap of the TR–2 unit 795. Thus, on each phase A time the #8 tap of the TR–2 unit 795 drops, thereby turning this unit on. However, if a bit is entered via the line 770 and the RA–1 unit 791, the line 794 drops at phase B time, thereby raising the potential of the line 796 for the duration of phase B.

The line 796 is additionally connected to the #5 tap of a PFC–1 unit 797, the #10 tap of which is connected to a line 798. Thus, phase B data taken from the selected drum track is present on the line 798 at all times. This line is connected to the #8 tap of a CD–1 unit 799 (FIG. 11*b*) and the data from the track defined by the $T_1$ address is taken from the the #10 tap of the unit 799 via a line 800 while, and only while, a line 335 connected to the #5 tap of the unit 799 is high. This line is high, as will be described, when $T_1 \neq S$ or $R$, i.e., when $T_1$ defines a drum track. The line 800 is connected to the #9 tap of a DA unit 802 (FIG. 14*a*) wherein data taken from the line 800 is mixed with various control signals to be described shortly.

For use as will be described later herein, contacts of the various relays of the $T_1$ and $T_2$ portions of the instruction register are additionally arranged to place +140 volts on various lines to indicate the condition of the $T_1$ and $T_2$ relays. Referring to the code utilized herein (FIG. 16), it will be seen that various lines 331 through 349 (FIG. 17) are high, i.e., at +140 volts, when the $T_1$ or $T_2$ relays are in a condition corresponding to the notation recorded adjacent each line. Thus, for example, when $T_1 = R$, the "8" relay 709 is picked, the "1" relay 706 is picked and the "*x*" relay 711 is picked, thereby connecting +140 volts through the n/o *c* contacts of the relay 711, through the n/c *b* contacts of the relay 710, through the n/o *g* contacts of the relay 706 and through the n/o *f* contacts of the relay 709 to the line 340. The various other lines 331 through 339 through 349 are raised to +140 volts under the control of the $T_1$ and $T_2$ relays in a similar manner, as, for example, when $T_2 = M$ the line 349 is at +140 volts, and when $T_2 \neq X$ or $N$ the line 344 is at +140 volts.

As mentioned earlier herein, data is read from the $T_1$ location and into the core buffer during an $E_1$ cycle, data being read out of the core buffer and into the $T_2$ location during an $E_2$ cycle. When data transfer is made from one track of the process drum to another, the data transferred from the $T_1$ address is determined by the $a_1b_1$ and *mn* portions of the instruction, and it is recorded in positions of the $T_2$ address determined by the $a_2b_2$ and *mn* portions of the instruction. On an $E_1$ cycle the data is gated by a pulse referred to herein as the $E_1$ cycle gate, which pulse is initiated on an $a_1b_1$ comparison and extends for *mn* characters thereafter. During an $E_2$ cycle, the data is gated by a pulse referred to as the $E_1$ cycle gate, which gate extends from an $a_2b_2$ comparison for *mn* characters. Thus, the data in character positions $a_1b_1$ through $a_1b_1+mn$ is taken from the $T_1$ track during an $E_1$ cycle and is entered into character positions $a_2b_2$ through $a_2b_2+mn$ on the $T_2$ track during the following $E_2$ cycle.

Figure 11G:
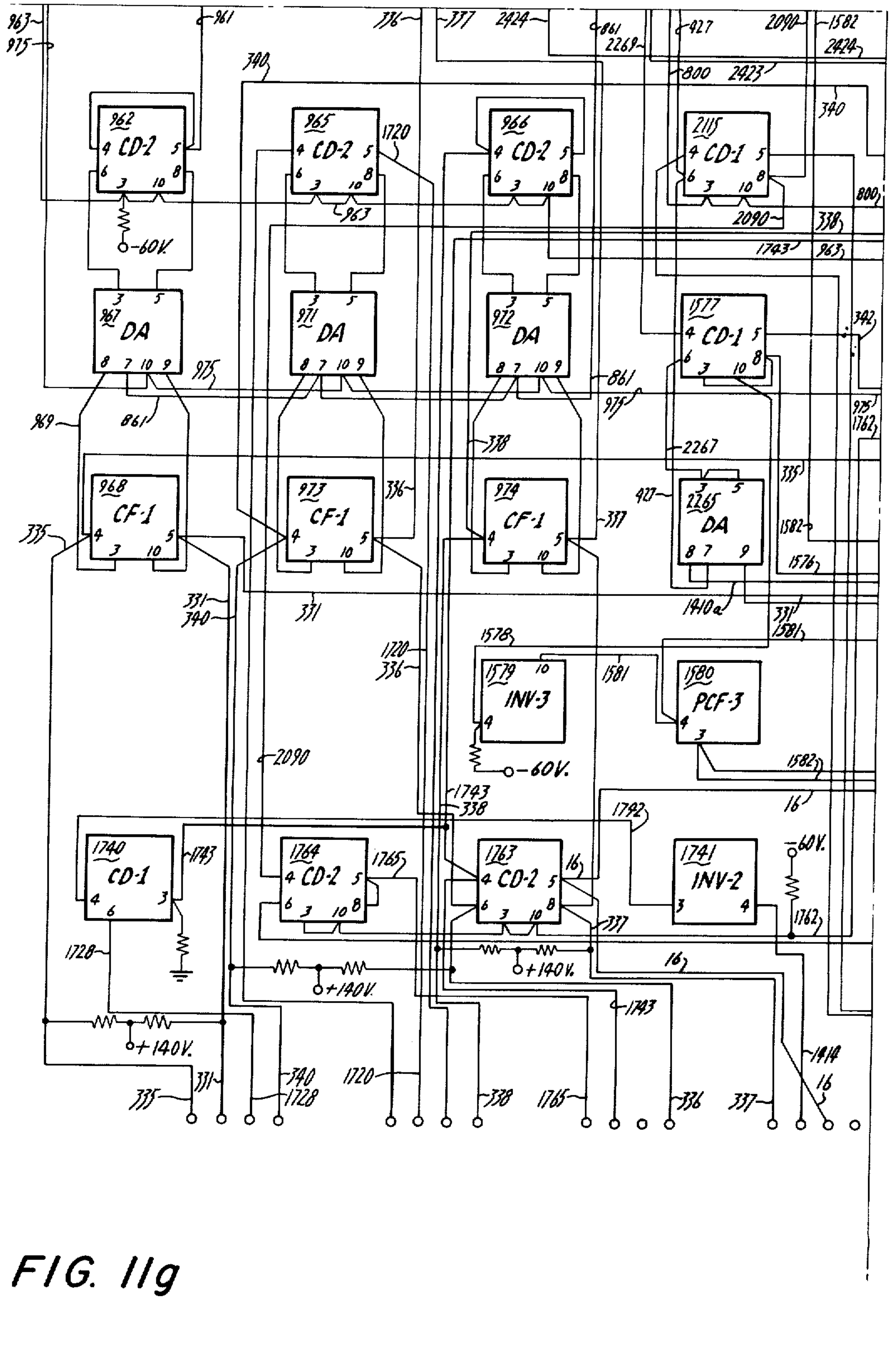
Figure 11H:
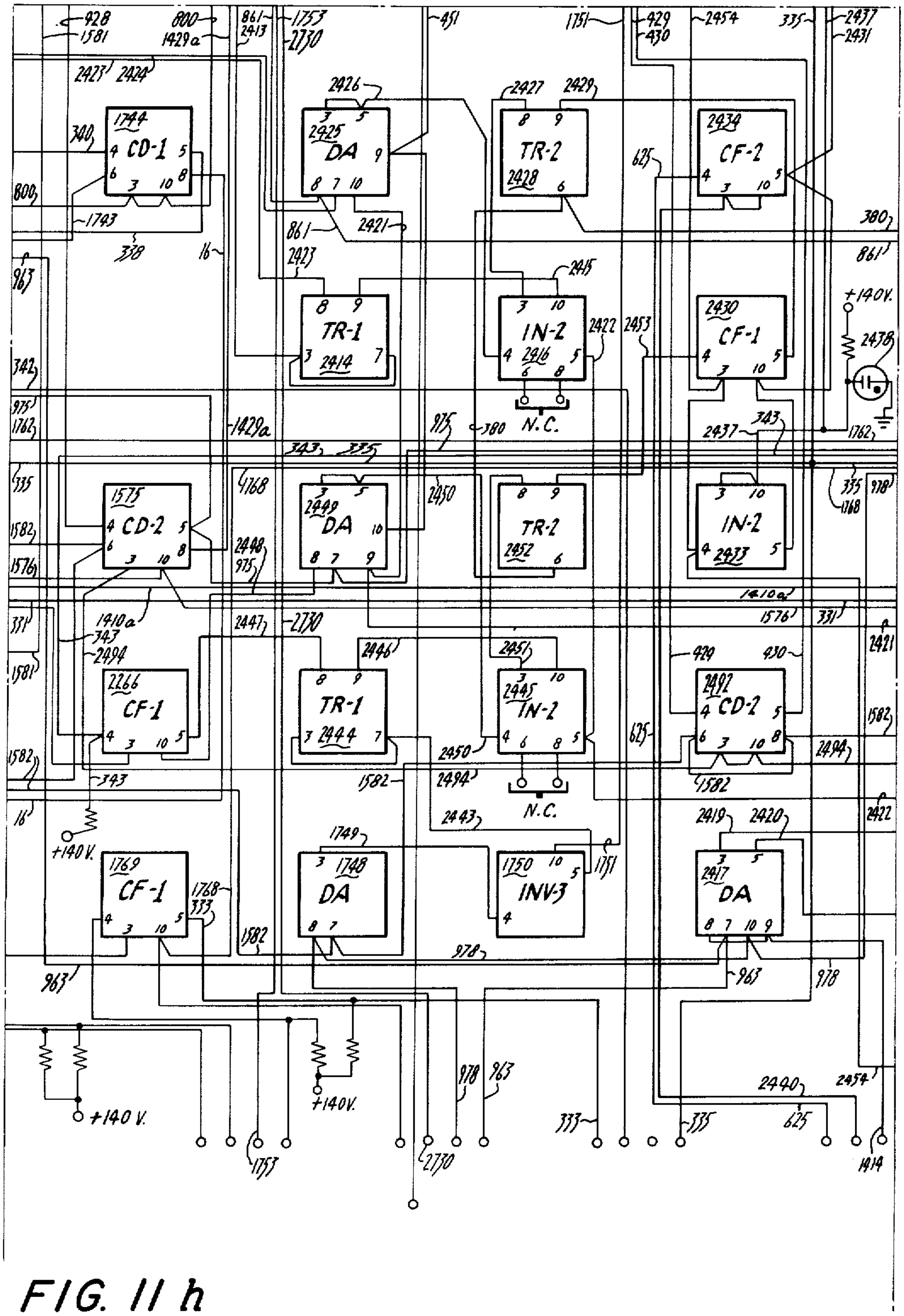
Figure 11I:
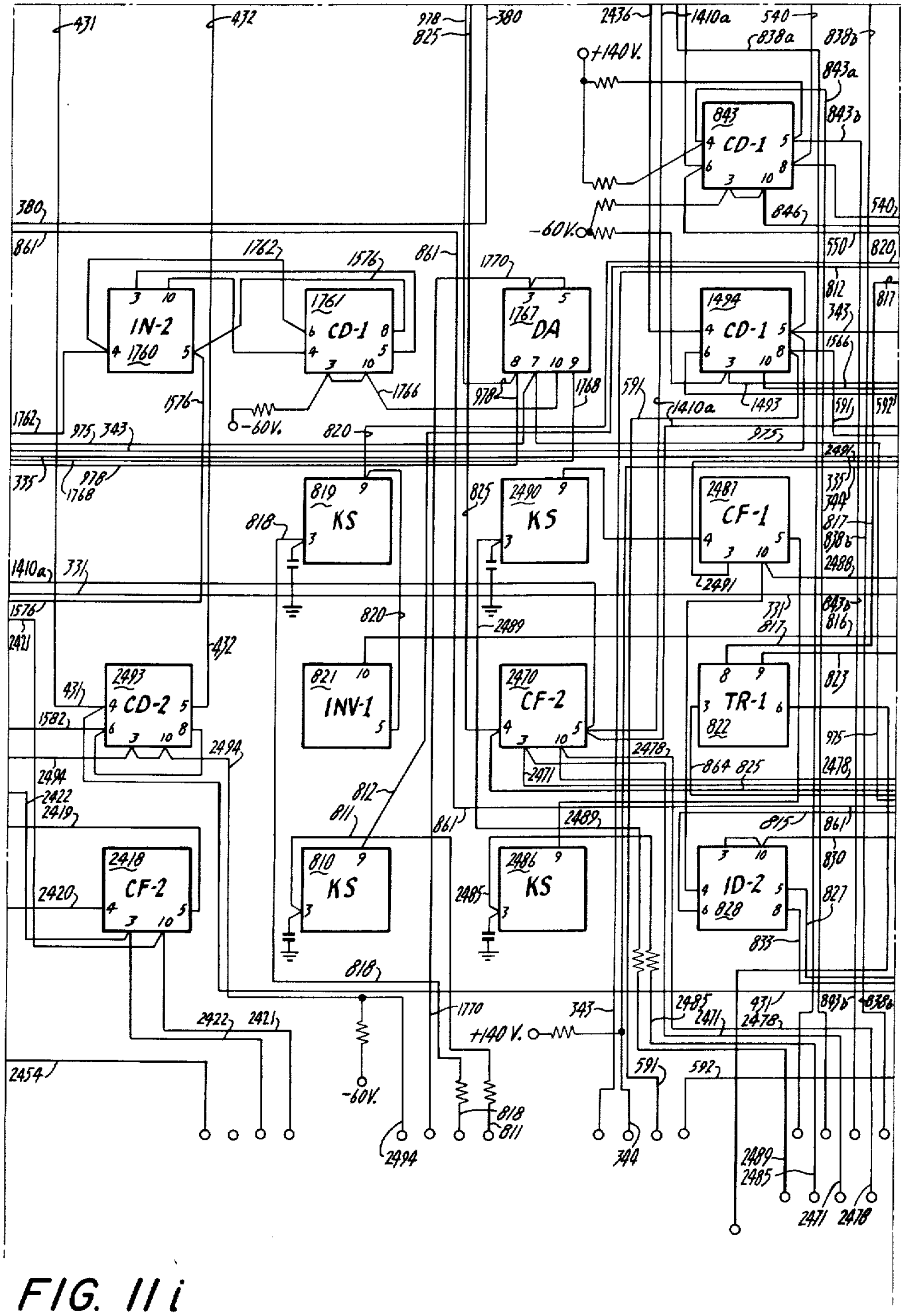
Figure 11J:
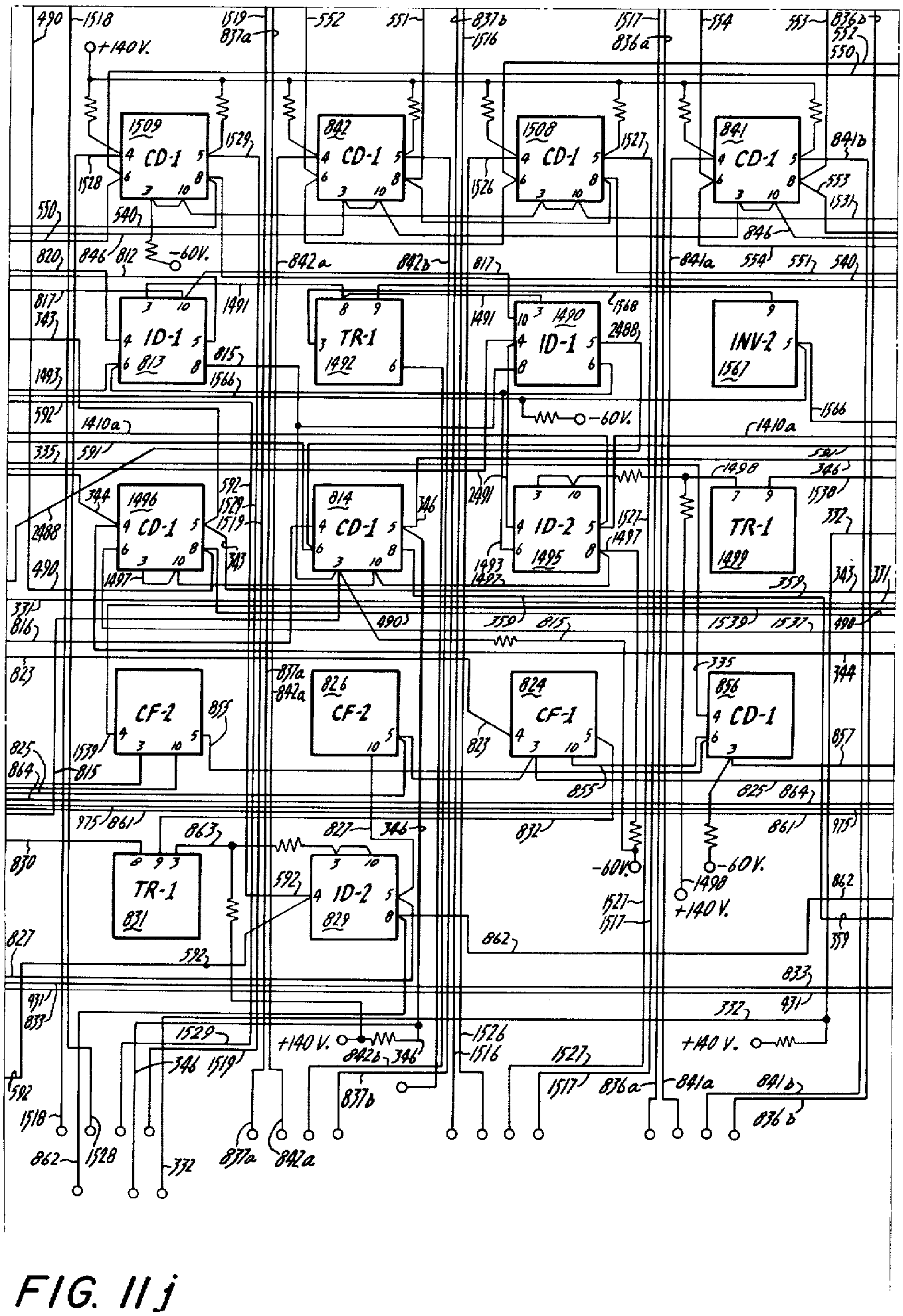

Referring now to FIG. 11*i*, the #3 tap of a KS unit 810 is connected through a line 811 and through the n/o *c* points of the $E_1$ relay 65 (FIG. 3) to the line 55 which, it will be recalled, is connected through CB–2 to +48 volts. When the #3 tap of the unit 810 (FIG. (11*i*) goes up, the #9 tap thereof rises and remains up as long as the contacts of the relay 65 are transferred, i.e., throughout the $E_1$ cycle. The #9 tap of the unit 810 is connected by a line 812 to the #5 tap of an ID–1 unit 813 (FIG. 11*j*). Even home pulses are connected by the line 591 (FIG. 14*d*) to the #6 tap of a CD–1 unit 814 (FIG. 11*j*), the #3 tap of which is connected through a line 815 to the #8 tap of the ID–1 unit 813. When a line 816 is connected to the #4 tap of the CD–1 unit 814 is high, even home pulses are applied through the line 815 to the #8 tap of the unit 813 and are taken from the #10 tap thereof during $E_1$ cycles.

As will be explained, the line 816 is high during an $E_1$ cycle and even home pulses, therefore, are taken from the #10 tap of the unit 813 during $E_1$ cycles by a line 817. On an $E_1$ cycle a line 818 (FIG. 11*i*) connected to the #3 tap of a KS unit 819 is low since it is connected through the n/o *e* points of the $E_2$ relay 66 ( FIG. 3) to the line 54 which is connected through the points of CB–1 to +48 volts. Thus, on an $E_1$ cycle the #9 tap of the KS unit 819 (FIG. 11*i*) is low, thereby maintaining the #5 tap of an INV–1 unit 821 low during this period, the #5 tap being connected to the #9 tap of the unit 819 by a line 820. The #10 tap of the unit 821 is connected to the line 816, and due to the inversion provided by the unit 821 it will be understood that the line 816 is high except when on an $E_2$ cycle.

The even home pulses during $E_1$ cycles are applied by the line 817 to the #8 tap of a TR–1 unit 822 (FIG. 11*i*), the #9 tap of which is connected through a line 823 to the #4 tap of a PFC–1 unit 824 (FIG. 11*j*). The even home pulses applied through the line 591 to the #6 tap of the unit 814 are positive in form, and it will be understood, therefore, that the leading edge of each such pulse will plate-pull-over the TR–1 unit 822 (FIG. 11*i*) to an "on" condition. When this happens, the line 823, and thus the #4 tap of the PCF–1 unit 824 (FIG. 11*j*) rises, thereby raising the potential of a line 825 connected to the #3 tap of the unit 824. A pulse referred to as the $E_1$ gate is defined by the condition of the trigger 822

(FIG. 11*i*), and this pulse is taken, therefore, from the line 825.

The line 825 is connected to the #5 tap of a CF–2 unit 826 (FIG. 11*j*), the #10 tap of which is connected through a line 827 to the # 5 tap of the two ID–2 units 828 (FIG. 11*i*) and 829 (FIG. 11*j*). The #3 and #10 taps of the unit 828 (FIG. 11*i*) are connected through a line 830 to the #8 tap of a TR–1 unit 831 (FIG. 11*j*), and when the potential of the line 930 drops, it will be understood that the unit 831 is turned on, thereby raising the potential of a line 832 connected to the #9 tap thereof. The line 830 drops when both the #5 and #8 taps of the ID–2 unit 828 (FIG. 11*i*) are up. As explained above, the #5 tap rises upon the occurrence of the even home pulse during an $E_1$ cycle, and the #8 tap which is connected to a line 833 rises when there is an $a_1b_1$ comparison signal by a comparator to be described next.

The $a_1b_1$ comparator comprises ten CD–1 units 834 through 843 (FIGS. 11*e*, 11*d*, 11*c*, 11*k*, 11*j* and 11*i*). The #3 and #10 taps of the units 834 through 838 are connected by a line 844 to the #9 tap of a DA unit 845 FIG. 11*f*). Similarly, the #3 and #10 taps of the units 839 through 843 are connected by a line 846 to the #10 tap of the DA unit 845, and when both of the lines 844 and 846 are high, the #5 tap of the unit 845 is high. The #5 tap of the unit 845 is connected by a line 847, through an INV–3 unit 848 (FIG. 11–*l*), through a line 849 and through a CF–1 unit 850 to the line 833 connected to the #8 tap of the ID–2 unit 828 (FIG. 11*i*).

The #6 and #8 taps of each of the units 834 through 838 (FIGS. 11*e*, 11*d* and 11*c*) are connected to the corresponding line 518 through 510 and 490 in that order, as indicated in the drawing, the #6 and #8 taps of the units 839 through 843 (FIGS. 11*h*, 11*j* and 11*i*) being connected to the corresponding line 558 through 550 and 540, respectively, in that order. Thus, $C_0$ pulses are applied to the #6 tap of the unit 834 (FIG. 11*e*), $C_1$ pulses being applied to the #8 tap of this unit. Similarly, $C_2$ through $C_9$ pulses are applied to the #6 or the #8 tap of the units 835 through 838. Also, $F_0$ pulses, $F_1$ pulses . . . $F_9$ pulses are applied to the #6 or #8 tap of the corresponding CD–1 unit 839 through 843 in a similar manner.

Figure 11K:
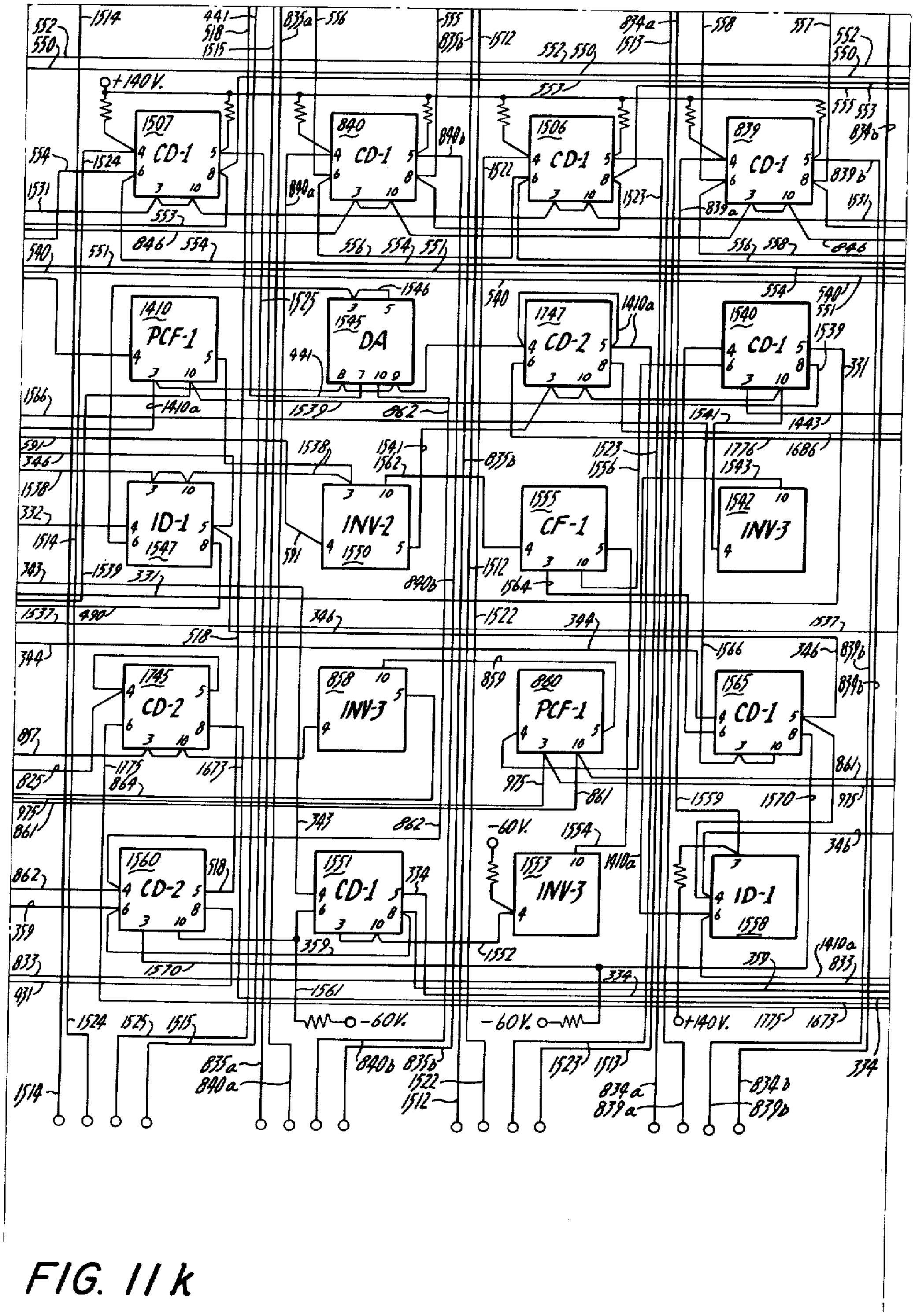
Figure 111:
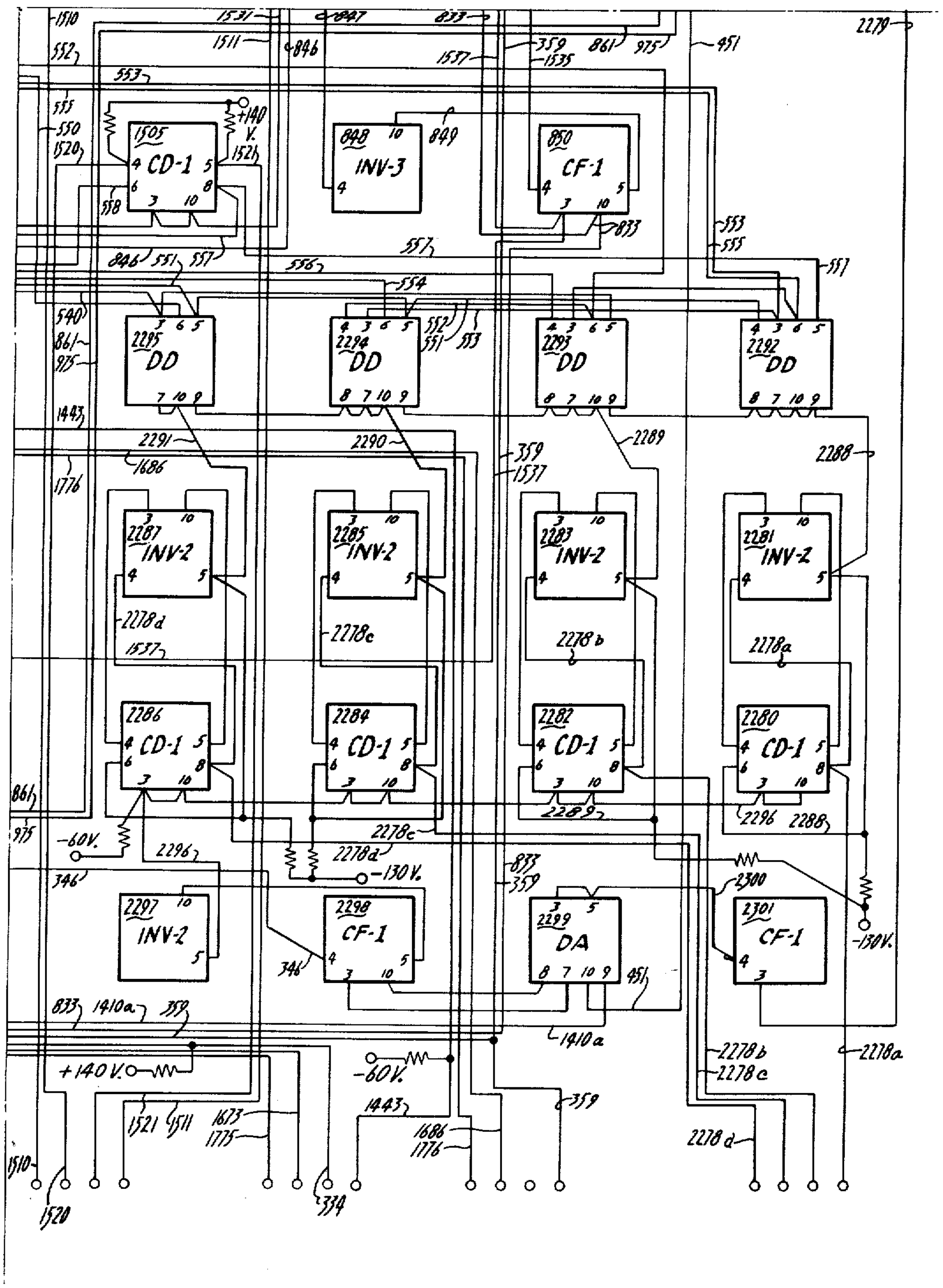

It will be recalled that the $a_1b_1$ portion of an instruction controls the selective energization of the various relays 721 through 728 of the $a_1b_1$ portion of the instruction register. Various contacts of these relays are arranged in a matrix (FIG. 18) which is arranged to connect +140 volts therethrough and through lines 834*b*, *a*, 835*b*, *a*, etc., to the #4 or #5 tap of one of the several CD–1 units 834 through 838 and through lines 839*b*, *a*, 840*b*, *a*, etc., to the #4 or #5 tap of one of the several units 839 through 843 under the control of the $a_1b_1$ portion of the instruction. Thus, for example, if $a_1b_1$ were equal to 26, the relays 722, 726 and 727 of the $a_1b_1$ portion of the instruction register will have been picked, thereby transferring contacts associated therewith and connecting +140 volts to the #4 tap of the CD–1 unit 837 (FIG. 11*d*) and to the #4 tap of the CD–1 unit 840 (FIG. 11*k*). Since $a_1b_1$=26, it will be clear that data transfer from the $T_1$ address should commence during $F_2$ time at the beginning of $C_6$ time. Thus, at the beginning of $C_6$ time during $F_2$, the #4 taps of the units 837 and 840 being high, the #3 and #10 taps of the units 837 and 840 rise, thereby raising the #9 and #10 taps of the DA unit 845 (FIG. 11*f*) and it is at this time that the line 833 goes up. The leading edge of the positive pulse taken from the line 833 is utilized to initiate a pulse referred to as the $E_1$ cycle gate, since at this time the TR–1 unit 831 (FIG. 11*j*), which defines the $E_1$ cycle gate, is turned on thereby.

When the unit 831 is turned on, as it is on an $a_1b_1$ comparison on an $E_1$ gate, the #9 tap thereof rises, thereby raising the potential of the #5 tap of the unit 824 and causing the #10 tap thereof to go up. The #10 tap of the unit 824 is connected by a line 855 to the #6 tap of a CD–1 unit 856, the #3 tap of which is connected by a line 857, through an INV–3 unit 858 (FIG. 11*k*), through a line 859 and through a PCF–1 unit 860 to a line 861 from which $E_1$ cycle gate pulses are taken. The end of the $E_1$ cycle gate, it will be recalled, is determined by *mn*, it being arranged to terminate *mn* characters after an $a_1b_1$ comparison.

The *mn* comparison signal which occurs *mn* characters after an $a_1b_1$ comparison is connected to the #8 tap of the ID–2 unit 829 (FIG. 11*j*) by a line 862. It will be recalled that the #5 tap of the unit 829 is high on an $E_1$ gate, and when the line 862 goes up, a line 863 connected between the #3 and #10 taps of the unit 829 and the #3 tap of the trigger 831 drops, thereby turning off the trigger 831 and lowering the potential of the #9 tap thereof. When this occurs, the line 861 (FIG. 11*k*) drops, thereby defining the end of the $E_1$ cycle gate. The end of the $E_1$ cycle gate causes the #5 tap of the INV–3 unit 858 to drop, and since this tap is connected by a line 864 to the #3 tap of the TR–1 unit 822 (FIG. 11*i*), the units 822 is turned off at this time, thereby lowering the potential of the #9 tap thereof and terminating the $E_1$ gate. Thus, the $E_1$ gate exists from the even home pulse during an $E_1$ cycle until there is an *mn* comparison.

The *mn* comparator disclosed in detail in FIGS. 14*c* and 14*d* comprises ten CD–1 units 900 through 909 and is substantially identical to the $a_1b_1$ comparator discussed previously. The #3 and #10 taps of these units are connected to a corresponding line 910 or 911, and the #4 and #5 taps thereof are connected by a corresponding line 912 through 931 to the appropriate terminals of a matrix (FIG. 18) of points of the relays 737 through 744 of the *mn* portion of the instruction register. The other side of this matrix is connected to +140 *volts*.

The #6 and #8 taps of the units 900 through 909 (FIGS. 14*c* and 14*d*) are connected by corresponding lines 933 through 952 to a source of control signals to be described in connection with the description of the core buffer unit. For the present, however, it will be understood that the line 933 is up while the first character is being entered into the core buffer and drops at the end of this character time, and that the line 934 rises at the beginning of the second character and drops at the end thereof, etc. Similarly, the lines 943 through 952 rise during the first, second, third, etc., fields entered into the core buffer for the duration of that field. Since there are ten fields in one drum revolution, a given line 943 through 952 rises once during the $E_1$ cycle, a given line 933 through 942 being arranged to rise ten times during each drum revolution since there are ten characters in each of the ten fields.

Thus, assuming, for example, that *mn*=26, it will be understood that it is desired to terminate the $E_1$ cycle gate after 26 characters have been transferred into the core buffer. When the $E_1$ cycle gate is initiated, data commences to enter the core buffer, the lines 933 through 942 being adapted to rise sequentially as each character is entered and the lines 943 through 952 being arranged to rise sequentially as each field is entered. In the present example, it is assumed that *mn*=26, and under these conditions the relays 742, 743 and 738 of the *mn* portion of the instruction register have been picked, thereby connecting +140 volts to the #4 taps of the CD–1 units 903 and 906 (FIG. 14*c*). At the end of the sixth character entered into the core buffer during the third field, the #6 taps of the units 903 and 906 rise, thereby causing the #3 and #10 taps of these units to go up. At this time the lines 910 and 911 connected from these taps to the #8 and #7 taps of a DA unit 953 rise, thereby causing the #3 tap of the unit 953 to rise. This occurs at the beginning of the 27th character (at the end of the 26th character entered into the core buffer). The #3 tap of the unit 953 is connected by a line 954, through an INV–3 unit 955, through a line 956 and through a CF–1 unit 957 to the line 862. Thus, the $E_1$ cycle gate is terminated, as described above, *mn* characters after an $a_1b_1$ comparison.

It will be recalled that data taken from a drum track is applied through the line 800 (FIG. 11*a*) to the #9 tap of the DA unit 802 when $T_1{+}S$ or $R$. The #8 tap of the unit 802 is connected to the $E_1$ cycle gate line 861. Thus, during an $E_1$ cycle the #8 tap of the unit 802 is high from an $a_1b_1$ comparison until *mn* characters have been entered into the core buffer. The #7 tap of the unit 802 is subjected to phase B clock pulses associated with the $T_1$ address on an $E_1$ cycle, and, as will become clear, with phase B clock pulses associated with the $T_2$ address on an $E_2$ cycle.

The $T_1{+}S$ or $R$ line 335 (FIG. 17) is connected to the #4 tap of a CF–1 unit 968 (FIG. 11*g*), the #5 tap of this unit being connected to the $T_2{+}P$ or $R$ line 331 (FIG. 17). Similarly, the $T_1{=}R$ line 340 is connected to the #4 tap of a CF–1 unit 973, the $T_2{=}R$ line 336 is connected to the #5 tap of the unit 973, the $T_1{=}S$ line 338 is connected to the #4 tap of a CF–1 unit 974, and and the $T_2{=}P$ line 337 is connected to the #5 tap of the unit 974. The #3 and #10 taps of the units 968, 973 and 974 are connected to the #8 and #9 taps, respectively, of three DA units 967, 971 and 972 corresponding thereto. The #7 tap of each of the DA units is connected to the $E_1$ cycle gate line 861 and the #10 taps of these units are connected to a line 975 from which $E_2$ cycle gate pulses, derived in a manner to be described later, are taken.

The phase A clock pulse line 400 is connected to the #8 tap of a CD–2 unit 361 (FIG. 11*b*), the #5 tap of which is connected to the line 451 which, it will be recalled, is high from $F_9$ through $F_0$. Thus, during $F_9$ through $F_0$ phase A clock pulses associated with the drum 25 are taken from the #10 tap of the unit 361 by a line 961 to the #4 and #5 taps of a CD–2 unit 962 (FIG. 11*g*). Similarly, phase A clock pulses corresponding to the disc unit and to the input-output drum are connected to the #4 and #5 taps of two CD–2 units 965 and 966, respectively, which pulses are derived as explained later herein. Thus, on an $E_1$ cycle gate clock pulses corresponding to the $T_1$ address are entered onto a line 963 connected to the #3 and #10 taps of the units 962, 965 and 966. Similarly, on an $E_2$ cycle gate clock pulses corresponding to the $T_2$ address are entered onto the line 963.

When $T_1$ defines a drum track, therefore, phase A clock pulses derived from the clock track $CT_2$ are entered via the line 963 on the #4 tap of an INV–2 unit 964 (FIG. 11*a*) during the $E_1$ cycle gate. The #3 tap of the unit 964 is connected by a line 976 through a CF–1 unit 977 and through a line 978 to the #7 tap of the DA unit 802, and due to the inversion provided by the INV–2 unit 964 the clock pulses appearing on the #7 tap of the unit 802 are phase B (inverted phase A pulses). Thus, all data appearing on the #9 tap of the DA unit 802 is gated by an $E_1$ cycle gate and is mixed with phase B clock pulses, and in this way phase B data pulses are taken from the #3 and #5 taps of the unit 802 throughout the $E_1$ cycle gate.

As will be described presently, all data to be entered into the core buffer, whether from the disc unit or the input drum, is applied by the line 800 to the #9 tap of the unit 802, and it will be understood that such data is mixed with the appropriate clock pulses in the unit 802 during the $E_1$ cycle gate. The #3 and #5 taps of the unit 802 are connected by a line 979 to the #4 tap of an INV–3 unit 980 (FIG. 11*b*), the #10 tap of which is connected by a line 981 through a PCF–1 unit 982 to a line 983. Thus, phase B data pulses transmitted during an $E_1$ cycle gate are taken from the line 983 and are entered through this line into the core buffer, as will next be described.

As discussed earlier herein, all data transferred is taken from its $T_1$ address through the 100-character core buffer (disclosed in the block form in FIG. 24) to the $T_2$ address, the buffer being under the control of the $T_1$ timing during the $E_1$ cycle and under the control of the $T_2$ timing during the $E_2$ cycle. Thus, clock pulses from the desired one of three sources, i.e., the input-output drum, the process drum, or the discs, are supplied to the buffer during the appropriate period.

The core buffer generally comprises 700 bistable magnetic cores of a type well known in the art, each core being composed of a ferromagnetic material having a substantially rectangular hysteresis loop. The cores are arranged in seven 10 by 10 planes, one of which is shown in FIG. 22, and each core in a given plane is linked by a corresponding winding 1001 referred to herein as the *z* winding. A second winding 1002, denoted the sense winding, also links each core in a given plane, and when a core is switched from one condition to the other, a pulse is induced in the sense winding 1002 associated therewith. Thus, there are seven *z* windings 1001 and seven sense windings 1002 corresponding to each of the seven core planes.

In addition to the *z* and sense windings, each core is linked by one of ten *x* windings 1003 and one of ten *y* windings 1004. Each of the ten *x* windings 1003 links each core in the corresponding horizontal row of each of the seven planes (see FIG. 23). Similarly, each of the *y* windings 1004 links each core in the corresponding vertical row of each of the seven planes. Thus, each *x* winding 1003 and each *y* winding 1004 links 70 cores.

In the present embodiment, the core buffer is arranged to store 100 seven-bit characters, one bit in each of the 700 cores. A bit is entered into a core by switching it from a condition referred to herein as "off" to its "on" condition, and is read therefrom by switching an "on" core off, thereby inducing a pulse in the sense winding. The cores are successively addressed to permit the entry of data serially by character by energizing successive *x* windings each character and by energizing successive *y* windings each ten characters. If it is assumed that a current of $-I$ is necessary to switch an "off" core on, then a current of $-I/2$ through both an *x* and a *y* winding will switch each of the seven cores at the address *x*, *y* on. If a current equal to $I/2$ is induced in a *z* winding, the core at the address *x*, *y* which lies in the plane corresponding to this *z* winding is inhibited or prevented from being switched on since the net current to which the core is subjected is equal to only $-I/2$. Conversely, when a *z* winding is not pulsed, the core at address *x*, *y* in the corresponding plane is not inhibited and is switched on. Thus, the various character addresses in the core buffer are successively energized, by means to be described, the bits of each character being selectively entered into the corresponding core under the control of the *z* windings and the structure which drives them.

It will be recalled that data entered into the core buffer is taken from the #3 tap of the PCF–1 unit 982 (FIG. 11*b*) and that the appropriate phase A clock pulses are present on and are taken from the line 963 (FIG. 11*g*) during both an $E_1$ cycle gate and an $E_2$ cycle gate. The clock pulse line 963 is connected to the #2 tap of a $GA_f$ unit 1011 (FIG. 32), the #6 tap of which is connected to the #2 tap of a K unit 1012. The output of the unit 1012 is taken from the #6 tap thereof through a K unit 1013 and is entered into a ring counter 1014 through a line 1015 connected between the #6 tap of the K unit 1013 and the #2 tap of an I unit 1016. The ring counter or bit ring 1014 is arranged to generate full bit pulses corresponding to $B_g$, $B_0$, $B_x$, etc., to control the flow of data to and from the core buffer.

Figure 31:
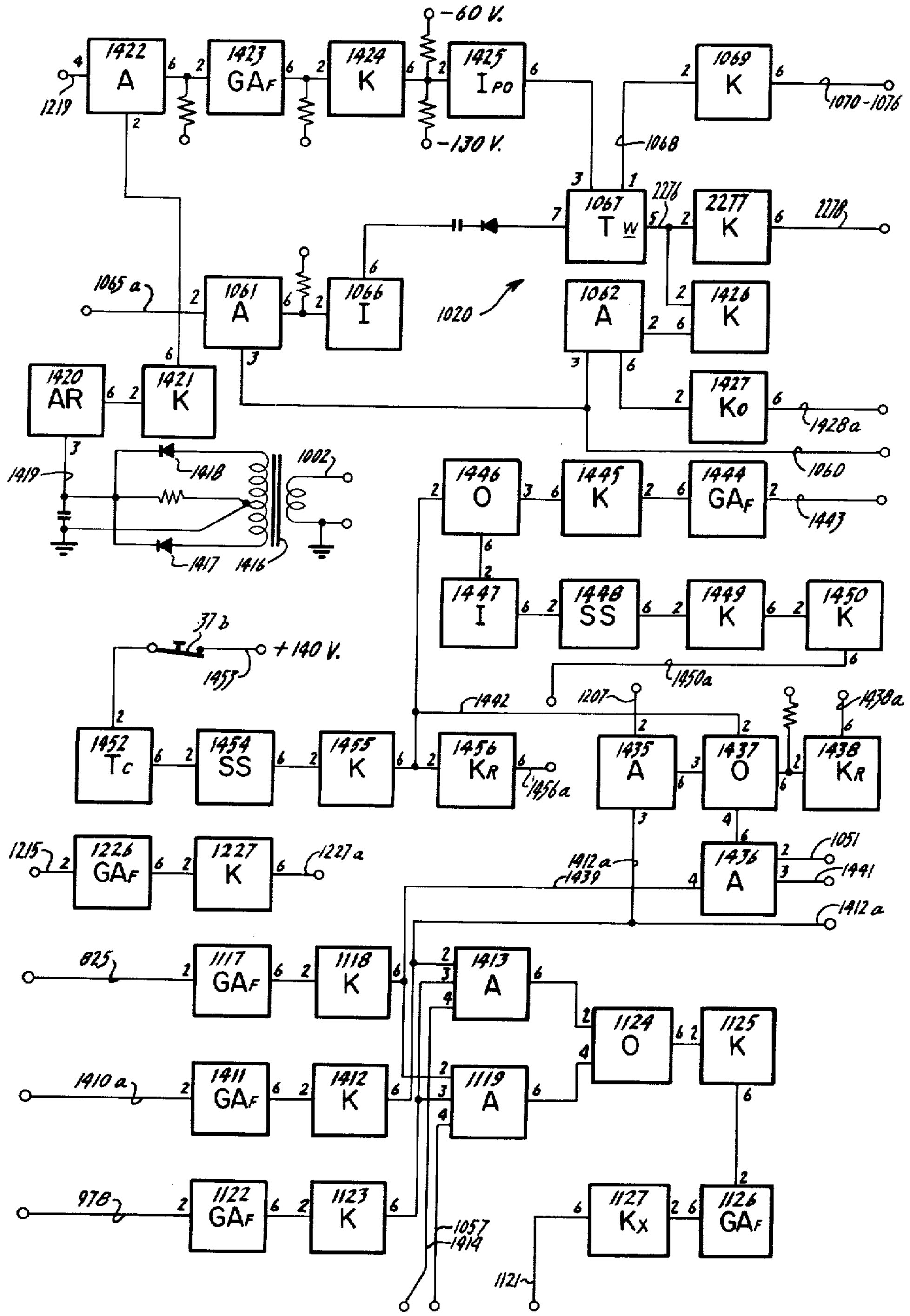
Figure 32:
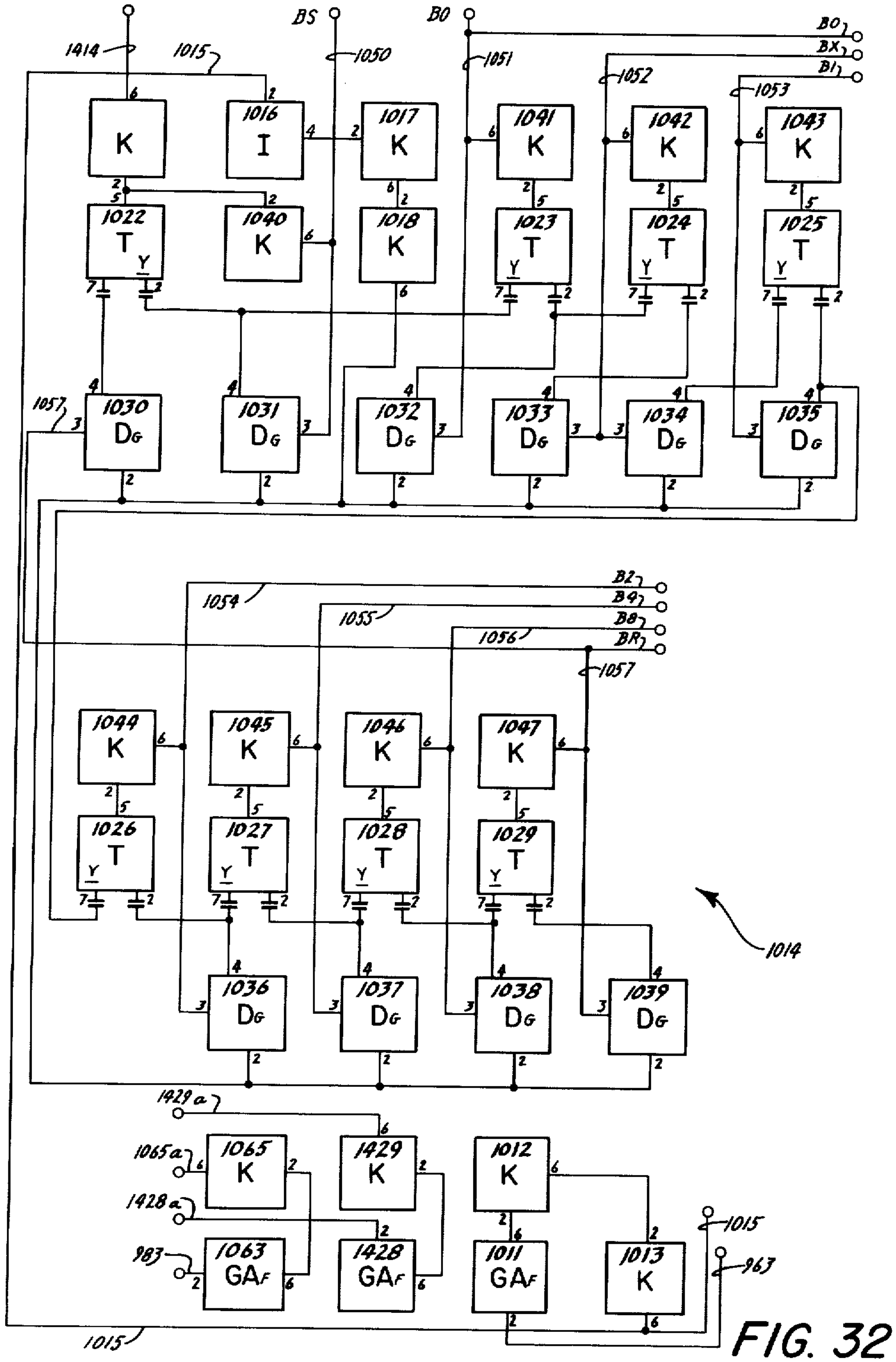
Figure 33A:
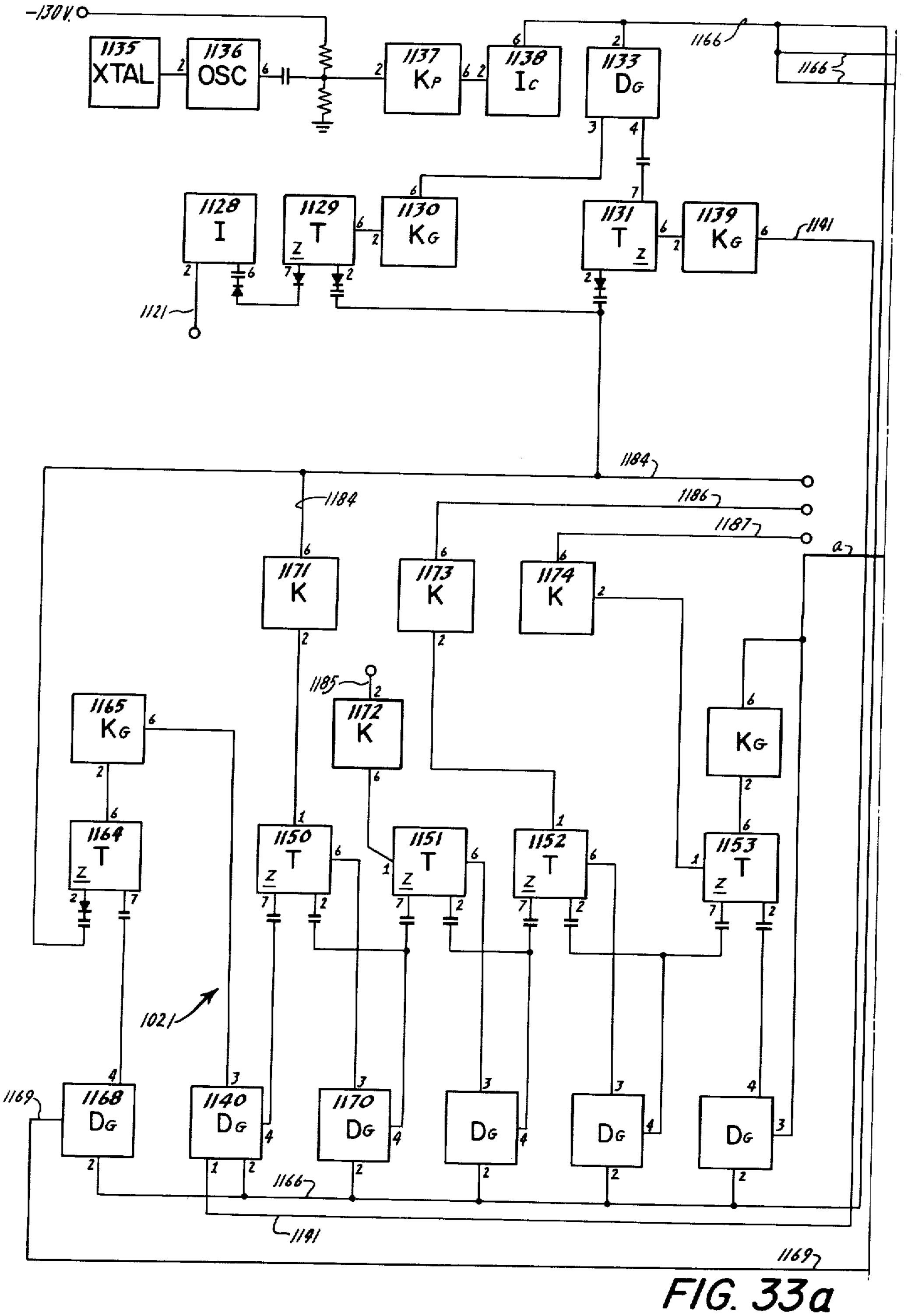
Figure 33B:
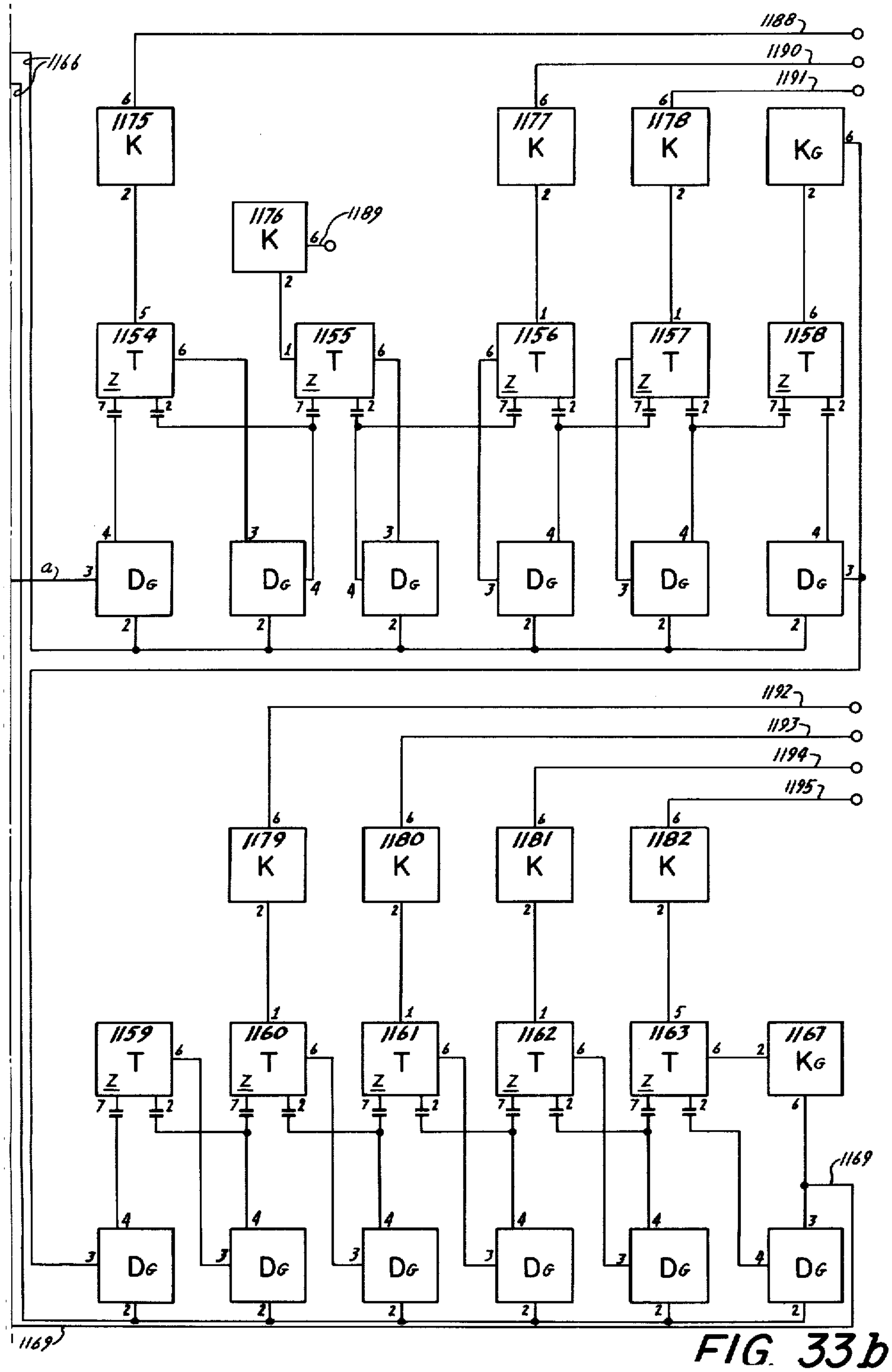

Data transfer is accomplished serially by character and serially by bit in the present machine, and data coming from the information transfer circuits via the line 983 to the core buffer on an $E_1$ cycle is first scanned into a character register 1020 (FIG. 31) serially by character and serially by bit under the control of the bit ring 1014 (FIG. 32). At the end of each character time, i.e., after each character has been entered in the character register, a buffer cycle is taken which enters the characters into the cores serially by character but parallelly by bit. On an $E_1$ cycle, therefore, the buffer cycle is initiated, by means to be described, at $B_r$ phase B time. Conversely, on an $E_2$ cycle data read from the buffer and into the information transfer circuits is read parallelly by bit and serially by character into the character register 1020 during the buffer cycle, the buffer cycle in this case being taken at the beginning of each character time, i.e., at $B_s$ phase B time, and each character is then scanned serially by bit from the character register and into the information transfer circuits under control of the bit counter 1014.

The bit ring 1014 (FIG. 32), in addition to its function of scanning characters into and out of the character register, is arranged to control a buffer clock 1021 (FIGS. 33*a* and 33*b*) which controls the generation of the various pulses utilized during a buffer cycle. The bit ring (FIG. 32) generally comprises a ring counter having eight T units 1022 to 1029, inclusive, corresponding to $B_s$ through $B_r$, respectively, each of which, with the sole exception of the T unit 1022, is reset to an "off" condition, i.e., with the #5 tap thereof low. This is indicated by the letter *y* being positioned on the side of the #5 tap. In the case of the T unit 1022, the letter *y* is positioned adjacent the #2 tap, which indicates it is reset in an "on" condition. The identity of the letter *y* indicates the source of the reset, which source will be described later.

Phase A clock pulses taken from the line 1015 are inverted by the I unit 1016 and are fed through two K units 1017 and 1018 to the #2 tap of each of ten DG units 1030 through 1039 during the $E_1$ and $E_2$ cycle gates only. Thus, inverted phase A clock pulses are applied to the #2 tap of each of the DG units 1030 through 1039 during the $E_1$ and $E_2$ cycle gates. Since each of the T units 1022 through 1029, with the exception of unit 1022, is "off" initially, the #3 tap of each of the DG units 1030 through 1039, with the exception of DG unit 1031, is low since the #5 tap of each of these T units is connected through a corresponding K unit 1040 through 1047 to the #3 tap of the corresponding one or more of the several DG units. The output of each of the K units 1040 through 1047 is additionally connected to lines 1050 through 1057 from which the bit pulses $B_s$ through $B_r$ are taken, as will be explained. After reset, the line 1050 is high, the lines 1051 through 1057 being low; however, on the leading, negative-going edge of the first clock pulse applied to the #2 taps of the various DG units 1030 through 1039, the T unit 1022 is turned off, thereby lowering the potential of the line 1050. Also, at this time the line 1051 rises since the T unit 1023 is turned on, and it stays up until the negative-going edge of the next following clock pulse passing through the DG unit 1032 turns the T unit 1023 off. Successive T units 1024 through 1029 are turned on and then off in a similar manner by successive clock pulses, and it will be seen that in this way bit pulses $B_0$ through $B_r$ are generated and may be taken from the lines 1051 through 1057, respectively. Additionally, $B_s$ is taken from the line 1050. Each of these pulses is a positive-going, full bit pulse, and the bit ring 1014 generates these pulses throughout each of the $E_1$ and $E_2$ cycle gates.

The bit pulses $B_0$ through $B_r$ are utilized to scan the data from the information transfer circuits into the character register 1020 (FIG. 31). The character register includes seven circuits identical to the circuit shown in the drawing, only one being shown to avoid a needless repetition of the drawings. It will be understood, however, that each of the bit lines 1051 through 1057 is connected to a corresponding line 1060 associated with the corresponding one of the seven circuits 1020. The line 1060 of each of these circuits is connected to the #3 tap of a corresponding one of seven A units 1061 as well as to the #3 tap of a corresponding one of seven A units 1062.

Data to be entered in the core buffer comes into the #2 tap of each of the seven A units 1061 serially by bit where it is mixed with the various bit pulses. Therefore, upon coincidence of a bit and data pulse in one of the A units 1061 a positive-going signal is present on the #6 tap of the corresponding A unit. It will be recalled that data pulses are taken from the #3 tap of the PCF-1 unit 982 (FIG. 11*b*) by the line 983. These pulses are fed by the line 983 through a $GA_f$ unit 1063 (FIG. 32) and through a K unit 1065 to the #2 tap of the A unit 1061 (FIG. 31) by a line 1065*a*. The output of each of the seven A units 1061 is connected through a corresponding I unit 1066 to the #7 tap of the corresponding one of seven T units 1067. The T units 1067 are reset in such a way that the #5 taps thereof are initially low and the #1 taps thereof are initially high. This is accomplished by a *w* reset, to be described, and is so indicated on the drawing by the positioning of the *w* adjacent the #5 taps thereof. Thus, a line 1068 connected to the #1 tap of each T unit 1067 is high on reset and remains high until a bit pulse passes through the corresponding A unit 1061 and causes the T unit to reverse its condition.

Figure 30:
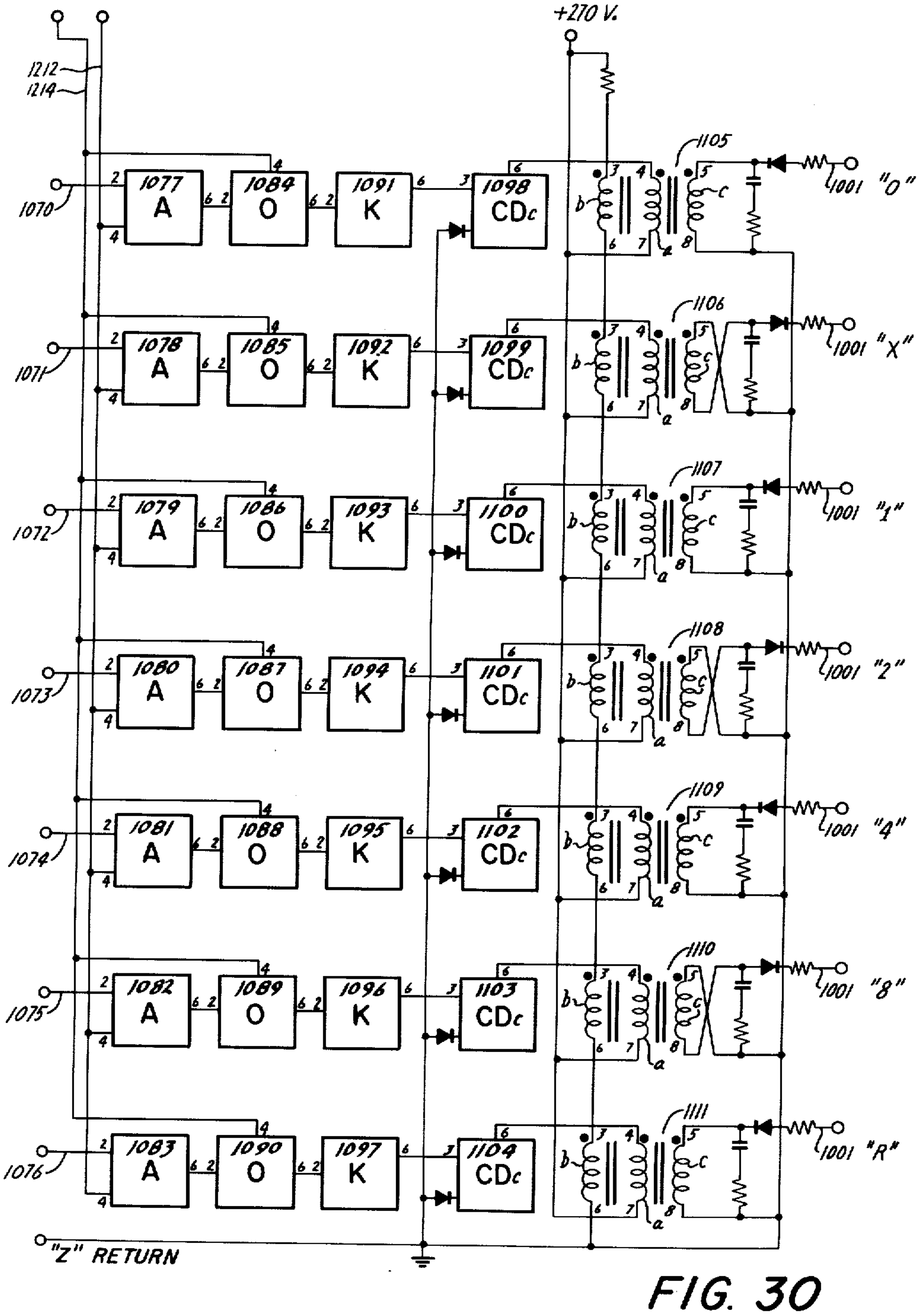

Each of the seven lines 1068 associated with the seven T units 1067 is connected through a corresponding K unit 1069 to a corresponding one of seven lines 1070 through 1076 (FIG. 30). When one of these lines is high, no bit is present in the corresponding T unit 1067. Conversely, when a line 1070 to 1076 inclusive is low, a bit is present in the corresponding T unit 1067. The lines 1070 through 1076 are connected to one input of a corresponding A unit 1077 through 1083, respectively, the other input to each of these A units being a pulse termed the "write gate," the generation of which will be described shortly. Thus, if no bit is stored in a particular character register T unit 1067, the output of the corresponding A unit 1077 through 1083 goes up for the duration of the write gate pulse.

Each output of the A units 1077 to 1083 inclusive is connected through a corresponding O unit 1084 through 1090 and through a corresponding K unit 1091 through 1097 to the #3 tap of a corresponding $CD_c$ unit 1098 through 1104. The $CD_c$ units 1098 through 1104 are utilized to drive corresponding switch cores 1105 through 1111, the #6 or output tap of each of these $CD_c$ units being connected through the primary winding *a* of the corresponding switch core to +270 volts. These switch cores are well known in the art and utilize a core of ferromagnetic material having a substantially rectangular hysteresis loop. Each switch core has two input windings *a* and *b* and an output winding *c*. Current flow through either input winding has no effect unless it is of sufficient magnitude and of the proper polarity to switch the core material to its opposite state of magnetization, in which case a current is induced in the output winding *c*. The various switch cores are utilized herein to furnish an $I/2$ current to the various storage cores of the core matrix which lie in planes thereof corresponding to bits which are to be inhibited. In other words, when no bit is to be stored in a particular storage core, the corresponding switch core 1105 through 1111 is pulsed, thereby inducing a current equal to $I/2$ in the *c* winding thereof.

It should be noted that the *b* windings of these switch cores are connected in series between +270 volts and ground and that the polarity and magnitude of the current flow therethrough is such that the core is controlled thereby to switch to a condition referred to hereinafter as "off." Thus, a switch core 1105 through 1111 is turned on only for the duration of the write gate pulse when the corresponding T unit 1067 is off, i.e., when the #1 tap thereof is high.

The output winding *c* of each of these switch cores 1105 through 1111 is connected to the corresponding winding 1001 (FIG. 22) and is thus connected through each of the storage cores in the corresponding one of the seven planes of the core array to ground, and when one of the switch cores is turned on, as it is when the #3 tap of the corresponding $CD_c$ unit goes up, a pulse is generated in the *c* winding thereof which passes a current equal to 1/2 through each of the storage cores in the corresponding plane. This pulse is utilized to prevent a change in condition of the storage cores in that plane, as described earlier. Thus, when no bit is stored in one of the character register T units 1067, the core plane corresponding thereto is provided, upon occurrence of the write gate pulse, with a pulse to prevent the storage of a bit in that plane.

As mentioned earlier, the buffer cycle takes place at the end of each character on the $E_1$ cycle and at the beginning of each character on the $E_2$ cycle. The derivation of the buffer cycle during an $E_1$ cycle will first be described. It will be recalled that the $E_1$ gate pulse is taken from the #3 tap of the PCF–1 unit 824 (FIG. 11*j*), which tap is connected by the line 825 to the #2 tap of a $GA_f$ unit 1117 (FIG. 31) and is fed through a K unit 1118 to one of three inputs of an A unit 1119. The #3 tap of the A unit 1119 is subjected to phase B clock pulses taken from the #3 tap of the CF–1 unit 977 (FIG. 11*a*) through the line 978, through a $GA_f$ unit 1122 (FIG. 31) and through a K unit 1123 to the #3 tap of the A unit 1119. The third input to the A unit 1119 is $B_r$ pulses taken via line 1057 from the #6 tap of the K unit 1047 (FIG. 32). Thus, the pulses taken from the output of the A unit 1119 (FIG. 31) are $B_r$ phase B pulses during the $E_1$ gate which, as is apparent, occurs during the latter portion of each character time. This output is fed through an O unit 1124, through a K unit 1125, a $GA_f$ unit 1126, and a $K_x$ unit 1127 to the input of an I unit 1128 (FIG. 33*a*) via a line 1121. The I unit 1128 is adapted to invert the pulse taken from line 1121, and the output thereof is coupled to the #7 tap of a T unit 1129 which is utilized to control an open ring counter circuit provided for the development of the various pulses generated during the buffer cycle.

The T unit 1129 and a T unit 1131 are each reset off, i.e., in such a way that the #6 taps thereof are initially low, as noted by the position of the *z* adjacent the #7 taps thereof, and they are reset in this manner by a *z* reset pulse which is developed in a manner to be described later. The leading edge of the pulse presented to the input of the I unit 1128 is, therefore, arranged to turn the T unit 1129 on to thereby raise the potential of the #6 tap thereof. The #6 tap of the T unit 1129 is connected through a $K_g$ unit 1130 to the #3 tap of a DG unit 1133. The #2 tap of the DG unit 1133 is connected to the output of a one-megacycle oscillator, and when the #3 tap of the DG unit 1133 is high, as it is at $B_r$ phase B on an $E_1$ cycle, these one-megacycle pulses are taken from the #4 tap of the DG unit 1133 and are fed to the #7 tap of the T unit 1131. Thus, the negative-going edge of the first one-megacycle pulse turns the T unit 1131 on, thereby raising the #6 tap thereof.

The one-megacycle pulses are generated by a crystal 1135, the output of which is connected to and is arranged to drive an oscillator 1136. The output of the oscillator is fed through a $K_p$ unit 1137 and through an $I_c$ unit 1138 to the #2 tap of the DG unit 1133. Thus, on an $E_1$ cycle the negative-going edge of the first one-megacycle pulse generated after $B_r$ phase B turns on the T unit 1131, thereby raising the potential of the #2 tap of a $K_g$ unit 1139. The #6 tap of the $K_g$ unit 1139 is connected to the #1 tap of a DG unit 1140 by a line 1141 and the pulse taken therefrom is arranged to initiate operation of the buffer clock.

The buffer clock comprises fifteen T units 1150 through 1164 (FIGS. 33*a* and 33*b*), each of which is reset by the z reset pulse in such a way that it is initially off, with the sole exception that the T unit 1164 (FIG. 33*a*) is reset on, the T unit 1164 being the unit that determines the end of the buffer cycle. Since the T unit 1164 is initially on, the #3 tap of the DG unit 1140 is initially high, the #6 tap of the T unit 1164 being connected through a K unit 1165 to the #3 tap of the DG unit 1140. The third input to the DG unit 1140, the #2 tap thereof, is connected to the one-megacycle drive by a line 1166, and when the #1 tap of the DG unit 1140 goes up, as it does on the negative-going edge of the first one-megacycle pulse after $B_r$ phase B, the negative-going edge of the next successive one-megacycle pulse causes the #4 tap of the DG unit 1140 to drop.

The #4 tap of the unit 1140 is connected to the #7 tap of the T unit 1150 and therefore on the negative-going edge of the second one-megacycle pulse after $B_r$ phase B the T unit 1150 is turned on, thereby raising the potential of the #6 tap thereof at this time. The #6 tap of the T unit 1150 is connected to the #3 tap of a DG unit 1170, the #2 tap of which is connected to the line 1166. The #4 tap of the DG unit 1170 is connected to the #2 tap of the T unit 1150 as well as to the #7 tap of the T unit 1151, and on the negative-going edge of the third one-megacycle pulse the T unit 1150 is turned off, the T unit 1151 being turned on at this time.

Successive T units of the buffer clock are similarly turned on and off by successive one-megacycle pulses. However, when the T unit 1150 is turned on, the #1 tap thereof drops, and since this tap is connected through a K unit 1171 and a line 1184 to the #2 tap of each of the T units 1129, 1131 and 1164, these T units are turned off at this time, thereby lowering the #3 tap of the DG unit 1133 and lowering the #1 and #3 taps of the DG unit 1140 to prevent passage of additional one-megacycle pulses therethrough. When the T unit 1163 (FIG. 33*b*) is turned on, the #6 tap thereof goes up for one microsecond, and since the #6 tap of the T unit 1163 is connected through a K unit 1167 to the #3 tap of a DG unit 1168 (FIG. 33*a*) by a line 1169, the T unit 1164 is turned on at this time due to its #7 tap being connected to the #4 tap of the DG unit 1168. Thus, after 14 microseconds the buffer clock has completed its cycle of operation.

Figure 34:
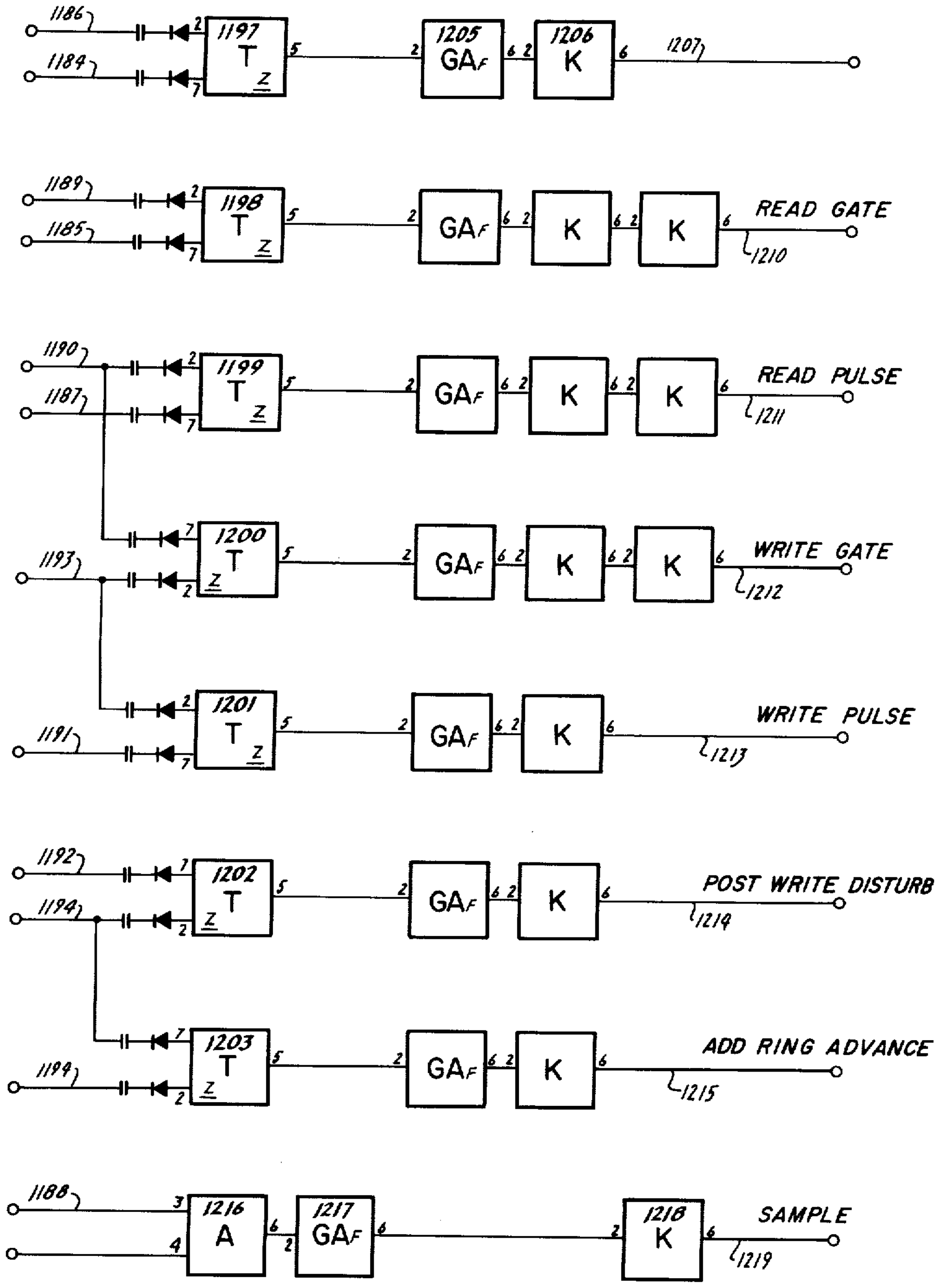

Each of the T units 1150 through 1163, with the exception of the T units 1158 and 1159, drives a corresponding K unit 1171 through 1182. The timing of the buffer clock pulses taken from the #6 taps of the various K units 1171 through 1182 is shown in FIG. 19 and they are taken therefrom by means of a corresponding one of twelve lines 1184 through 1195. These pulses are utilized to control the generation of the various buffer cycle waveforms and are connected through the aforementioned lines 1184 through 1195 to control the condition of several T units 1197 to 1203 inclusive (FIG. 34).

It will be noted that the line 1186 is connected to the #2 tap of the T unit 1197, the line 1184 being connected to the #7 tap of said T unit, and that the #5 tap of the T unit 1197 is connected through a $GA_f$ unit 1205 and through a K unit 1206 to a line 1207. By referring to the positioning of the z on the block which represents the T unit 1197, it will be seen that this T unit is reset in such a way that the #5 tap thereof is initially low. Thus, when the line 1184 drops in potential, the #5 tap rises and remains up until the line 1186 drops, and a pulse of two-microseconds duration may be taken from the line 1207 immediately following each $B_r$ phase B time during an $E_1$ cycle gate. In a similar manner, the T units 1198 through 1203 are utilized to generate the various pulses shown in FIG. 19 under the control of the pulses taken from the lines 1184 through 1195, the output of each of these T units being taken from six lines 1210 through 1215, the output of each of the T units 1198 through 1203 being connected through a $GA_f$ unit and through one or more K units to the corresponding line 1210 through 1215.

The pulse taken from the line 1210 is designated the

"read gate" pulse and is of four-microseconds duration lasting from $c_1$ to $c_5$ time referred to the buffer cycle, as indicated in FIG. 19. The pulse taken from the line 1211 (FIG. 34) is designated the "read" pulse and is of three-microseconds duration lasting from $c_3$ to $c_6$. A five-microsecond pulse is taken from the line 1212, which pulse is initiated at $c_6$ time and terminates at $c_{11}$ time and is designated the "write gate" pulse. The "write" pulse is taken from the line 1213 and is of four-microseconds duration lasting from $c_7$ to $c_{11}$ time. The pulse taken from the line 1214, a two-microsecond pulse existing from $c_{10}$ to $c_{12}$ time, is designated the "post-write disturb" pulse, and the pulse taken from the line 1215, a one-microsecond pulse lasting from $c_{12}$ to $c_{13}$ is designated the "address ring advance" pulse. The $c_4$ pulse taken from the line 1188 is mixed with a signal that indicates operation on an $E_2$ cycle and is utilized as a "sample" pulse, as will be explained later herein, the mixing being accomplished in an A unit 1216, the output of which is fed through a $GA_f$ unit 1217 and a K unit 1218 to a line 1219.

The address ring advance pulse taken from the line 1215 (FIG. 34) is utilized, as its name implies, to drive an address ring 1220 (FIG. 25) which controls the excitation of the various cores in the $x$ planes, the output of the ring 1220 being utilized to drive the ring 1221 which controls the excitation of the various cores in the $y$ planes. The signal on the line 1215 (FIG. 34) is connected through a $GA_f$ unit 1226 (FIG. 31), a K unit 1227 and via a line 1227*a* to the #3 tap of an I unit 1228 (FIG. 25), where the signal is inverted. This signal, i.e., the address ring advance signal, is then fed through a $K_s$ unit 1229 and a K unit 1230 to a line 1231 which is connected to the #2 tap of each of thirteen DG units 1232 through 1244.

The output taken from the #4 tap of each of the DG units 1232 through 1244 is utilized to control the condition of one or more T units 1245 through 1254 associated therewith, the #4 tap of DG unit 1233 being connected to the #2 tap of the T unit 1245 and also to the #7 tap of the T unit 1246. Similarly, the #4 tap of DG unit 1234 is connected both to the #2 tap of the T unit 1246 and to the #7 tap of the T unit 1247, etc. When the line 1231 initially drops, as it does at $c_{12}$ during the buffer cycle, only the T unit 1245 is affected since this T unit, and only this one, is reset in an "on" condition. Each of the remaining T units 1246 through 1254 is reset by the $y$ reset pulse in an "off" condition, thereby initially holding the #3 tap of each of the various DG units 1234 through 1244 low. The #3 tap of the DG unit 1233, however, is initially high, the #5 tap of the T unit 1245 being initially high, as is the line 1255 connected to the #3 tap of the unit 1233. The first address ring advance pulse taken from the line 1231, therefore, turns the T unit 1245 off and also turns the T unit 1246 on, thereby raising the potential of a line 1256 and lowering the potential of the line 1255. The next address ring advance pulse similarly raises the potential of a line 1257 controlled by the T unit 1247 and lowers the potential of the line 1256.

It will be recalled that the buffer cycle is taken at the end of each character, i.e., during $B_r$ phase B, when on an $E_1$ cycle. Thus, at the end of each character near the end of the buffer cycle, i.e., $c_{12}$ to $c_{13}$ time, this ring is advanced one position. Since the ring 1220 (FIG. 25) is a closed ring, the various T units 1245 through 1254 are turned on and off successively as long as address ring advance pulses are entered on the line 1231. Each time the T unit 1254 is turned off, i.e., each time the #5 tap thereof drops in potential, the tens-position ring 1221 (FIG. 26) is advanced one position, the #5 tap of the T unit 1254 (FIG. 25) being connected through a K unit 1260, through a line 1261 and through two more K units 1262 and 1263 (FIG. 26) to a line 1264 which is connected to the #2 tap of each of thirteen DG units 1265 through 1277 which control the operation of the tens-position ring 1221 in a manner similar to that just described in connection with the units-position ring 1220. The output of the units-position ring is utilized to control excitation of the cores in the various $x$ planes as mentioned above, and is taken from the lines 1255, 1256, 1257, 1261, and from six more lines 1278 through 1283, the output of the tens-position ring being taken from ten lines 1285 through 1294 (FIG. 26), which lines control excitation of the cores in the various $y$ planes.

When the various T units of the rings 1220 and 1221 are reset, the lines 1255 and 1285 are high and are arranged to control the excitation of all seven cores at the address $x=0$, $y=0$, as will next be described. Similarly, after the first character has been read into the cores, the address ring advance pulse causes the units-position ring to advance one position, thereby raising the potential of the line 1256 to control excitation of the seven cores at address $x=1$, $y=0$. Successive core sets are energized in a similar manner upon occurrence of successive address ring advance pulses.

Figure 27:
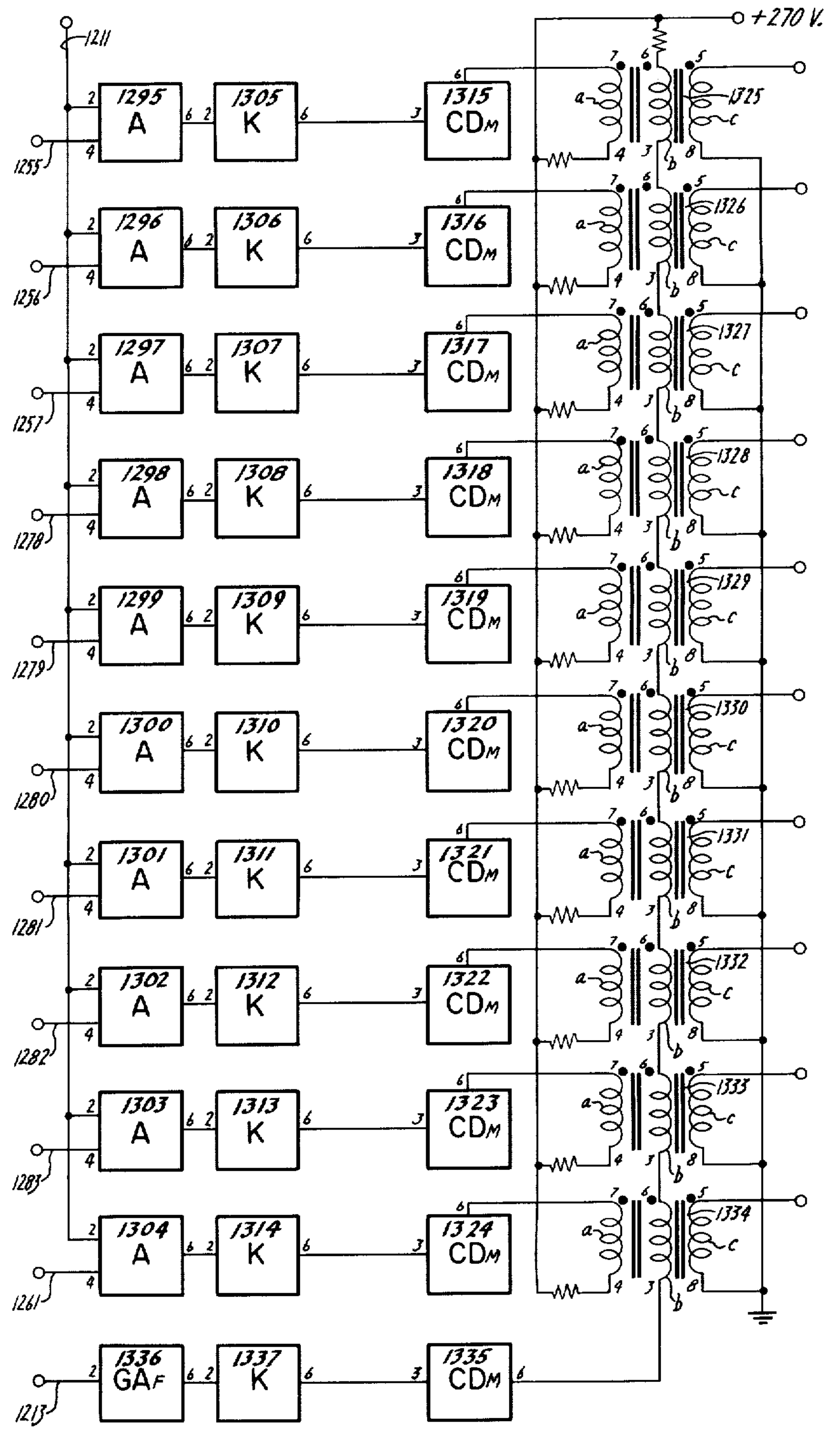

Each of the lines 1255, 1256, 1257, 1261, and 1278 through 1283 taken from the ring 1220 is connected to the #3 tap of a corresponding A unit 1295 through 1304 (FIG. 27), respectively, where it is mixed with a read pulse taken from the line 1211 (FIG. 34) which is connected to the #2 tap of each of the A units 1295 through 1304 (FIG. 27). The outputs of these A units are connected through a corresponding K unit 1305 through 1314, respectively, and through a corresponding $CD_m$ unit 1315 through 1324, respectively, the #6 taps of which are connected through the primary winding *a* of a corresponding switch core 1325 through 1334, respectively, to +270 volts. These switch cores are substantially identical to the switch cores 1105 through 1111, and when the #4 tap of one of the A units 1295 through 1304 is high, the #6 tap thereof rises for the duration of the read pulse, i.e., from $c_3$ to $c_6$ time, and causes current to flow through the primary winding *a* of the corresponding switch core. When a switch core 1325 through 1334 is off, the read pulse through the primary winding turns it on and causes a current equal to $I/2$ to be induced in the output winding *c*.

The secondary winding *b* of each of the switch cores 1325 through 1334 is connected in series between +270 volts and the #6 tap of a $CD_m$ unit 1335, and when current is caused to flow therethrough due to the presence of a positive signal on the #3 tap of the $CD_m$ unit 1335, all of these switch cores are switched off, if they are not already in an "off" condition. The write pulse taken from the line 1213 (FIG. 34) is fed through a $GA_f$ unit 1336 (FIG. 27) and through a K unit 1337 to the #3 tap of the $CD_m$ unit 1335. Thus, upon occurrence of the write pulse the #6 tap of the $CD_m$ unit 1335 drops for the duration thereof, thereby sending a pulse through the secondary winding *b* of each of the switch cores 1325 through 1334. It is in this manner, near the end of each buffer cycle, that the switch cores 1325 through 1334 are reset off. During the initial portion of each buffer cycle, therefore, each of the switch cores 1325 through 1334 is off, and upon the occurrence of the read pulse the switch core associated with the $x$ address, determined by the condition of the ring counter 1220 at that time, is turned on and induces a current in the output winding *c* thereof, which current is equal to $I/2$ as described previously. The following write pulse then switches that switch core off again and induces a current equal to $-I/2$ in the output winding *c* thereof.

Figure 28A:
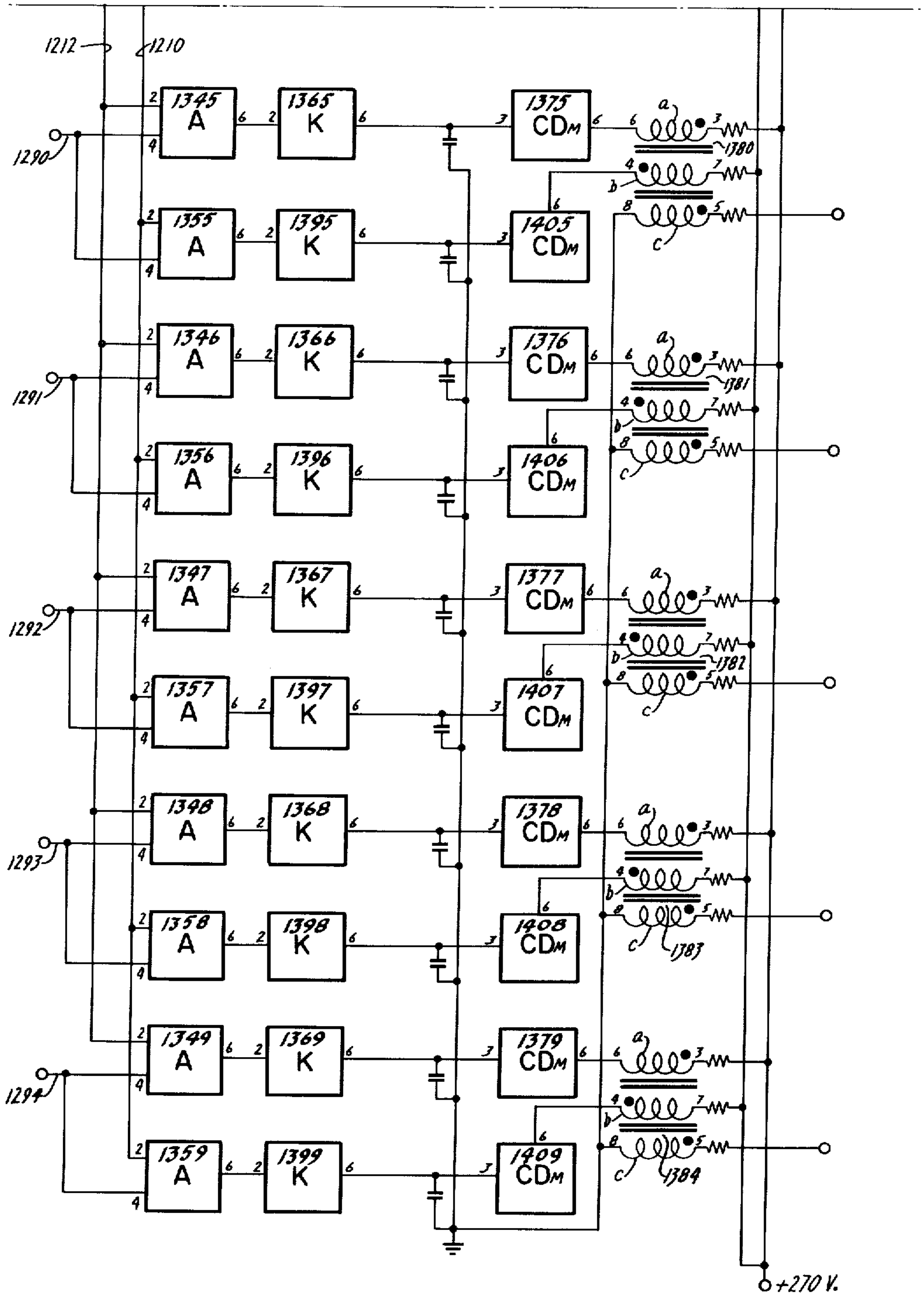
Figure 28B:
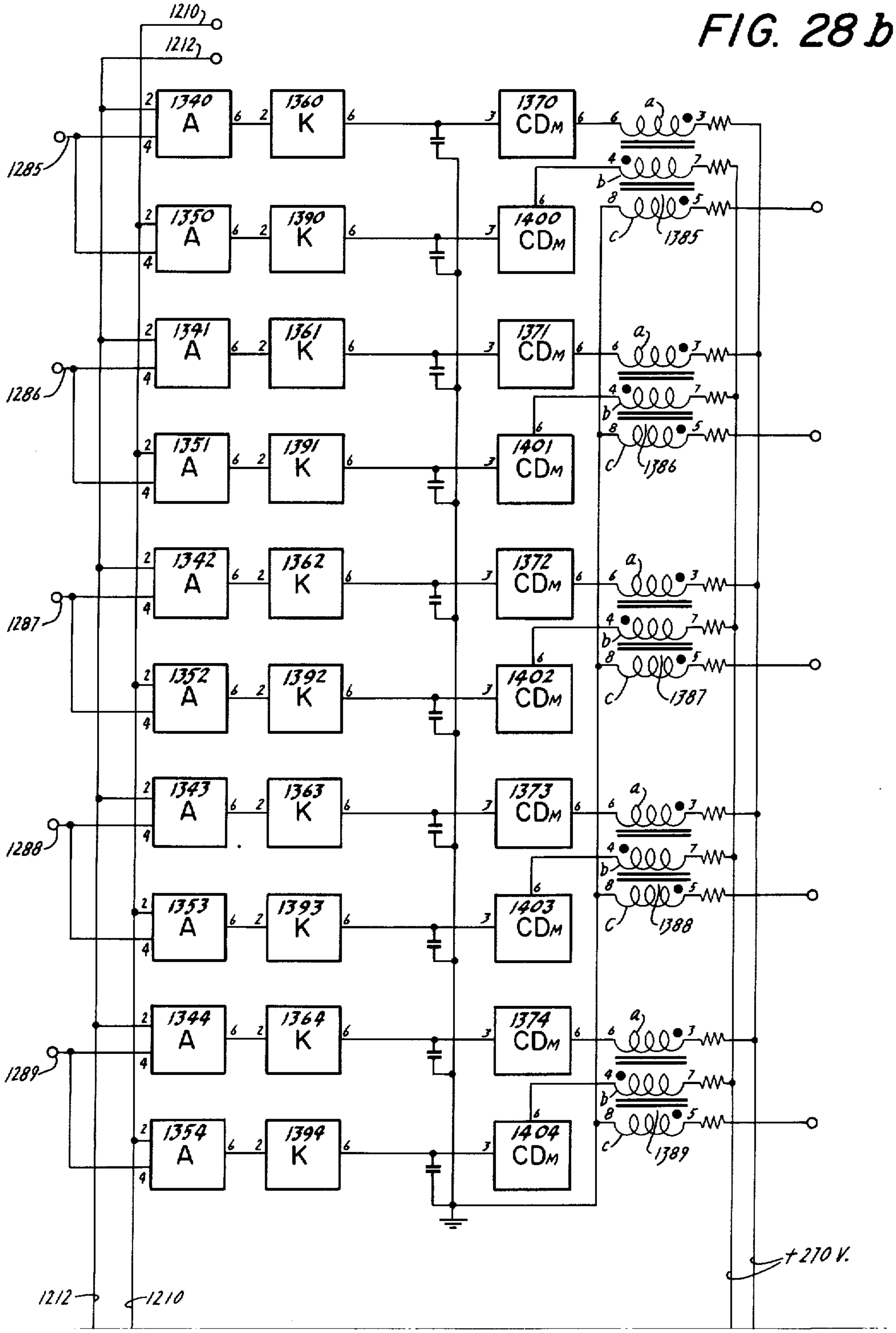

Each of the lines 1285 through 1294 (FIG. 26) of the tens-position ring 1221 is connected to the #4 tap of a corresponding A unit 1340 through 1349 (FIGS. 28*a* and 28*b*), respectively, as well as to the #4 tap of a corresponding A unit 1350 through 1359, respectively. It will be noted that the read gate pulse is connected through the line 1210 (FIG. 34) to the #2 tap of each of the A units 1350 through 1359 (FIGS. 28*a* and 28*b*), and that the write gate pulse is connected through the line 1212 (FIG. 34) to the #2 tap of each of the A units 1340 through 1349 (FIGS. 28*a* and 28*b*). In this way the tens-position address is mixed with the read and write gates in the appropriate A unit 1340 through 1359.

The write gate, it will be recalled, is developed near the end of each buffer cycle and lasts from $c_6$ to $c_{11}$ time. The output of each of the A units 1340 through 1349 is coupled through a corresponding K unit 1360 through 1369 and through a corresponding $CD_m$ unit 1370 through 1379 to the primary winding *a* of a corresponding switch core 1380 through 1389. These switch cores are similar to those described earlier herein. The write gate pulse, therefore, is utilized to reset each of the switch cores 1380 through 1389 to a condition referred to herein as "off."

During the initial portion of the buffer cycle the read gate pulse is developed, and when mixed with the tens address passes through the A unit 1350 through 1359 corresponding to that address, through the associated K unit 1390 through 1399 and through the corresponding $CD_m$ unit 1400 through 1409 to the secondary winding *b* of the corresponding one of the several switch cores 1380 through 1389. Since each of the switch cores is reset off by the write gate pulse during the last preceding time that a buffer cycle is taken at each address, the switch core at a given address is turned on by the read gate pulse during the buffer cycle, and when one of these switch cores is turned on, all of the storage cores at the *y* address are pulsed with a current equal to $I/2$.

It will be recalled that the *x* switch core 1325 through 1334 corresponding to the *x* address is turned on by a read pulse, thereby inducing a current $I/2$ in the winding which passes through all of the storage cores in the *x* plane corresponding to the *x* address from $c_3$ to $c_6$ time. Since a current is also induced in the *y* winding of each of the storage cores corresponding to the *y* address during the read gate pulse pulse time $c_1$ to $c_5$, it will be understood that all seven storage cores at any given address $x$—$y$ are flipped to a condition referred to as "off," if they are not already off, during the period $c_3$ to $c_5$, since at this time aiding currents $I/2+I/2=I$ flow through the *x* and *y* windings defined by the $x$—$y$ address. The write pulse is next applied to the secondary winding *b* of each of the switch cores 1325 through 1334 and the particular switch core turned on during the preceding read pulse is turned off at this time, thereby inducing a current equal to $-I/2$ in the winding which links all of the cores in the *x* plane defined by the *x* address. Additionally, when the write gate pulse occurs, current flows through the secondary winding *b* of the switch core 1380 through 1389 corresponding to the *y* address, which switch core was turned on by the preceding read gate pulse, and that switch core is again turned off, thereby inducing a reverse current pulse equal to $-I/2$ in the *y* winding which links each of the storage cores in the plane defined by the *y* address.

If there is no other action to prohibit this, it will be clear that each of the seven storage cores at the address $x$—$y$ is turned on since the sum of the currents flowing through the *x* and *y* windings corresponding thereto is equal to $-I/2+-I/2=-I$. It is for this purpose, however, that the *z* windings are provided; that is, the *z* windings are arranged in such a way that a positive flux proportional to $I/2$ is generated if no bit is indicated by the corresponding T unit 1067 of the character register. Thus, when one of the switch cores 1105 through 1111 (FIG. 30) is turned on, as it is by the write gate pulse if there is no bit corresponding thereto, a current equal to $I/2$ induced in the output winding *c* inhibits all storage cores in the *z* plane associated therewith from being turned on. Conversely, if no pulse is induced in the various *c* windings of the *z* switch cores 1105 through 1111, the storage cores at the address $x$—$y$ in the planes corresponding to these windings are turned on, thereby entering the character then present in the character register into the storage cores at the proper address.

It should be additionally noted that the pulse termed "post-write disturb" taken from the line 1214 during the period $c_{10}$ to $c_{12}$ (FIG. 34) is arranged to disturb each of the storage cores slightly immediately after they are turned on, this being for a purpose clear to anyone familiar with core storage. The post-write disturb pulse is connected through the various O units 1084 through 1090 (FIG. 30) to the various K units 1091 through 1097, and it will be clear that upon the occurrence thereof the various switch cores 1105 through 1111 are disturbed slightly.

Thus far, the description of the core buffer has been given functionally in connection with the read-in of information to the core buffer during the $E_1$ cycle, it being understood that successive characters are shifted into the character register 1020 and entered into the proper storage cores during successive buffer cycles in a similar manner. On an $E_2$ cycle it is desired to read the data present in the storage cores therefrom and into the character register for entry into the information transfer circuits. To accomplish this, it is first necessary to enter the data serially by character but parallelly by bit from the cores into the character register and then to scan the data serially by bit and serially by character therefrom and into the information transfer circuits. Thus, it is necessary that the buffer cycle (see FIG. 19) take place prior to $B_0$ phase B time of the character corresponding thereto to enable the entry of the character into the character register prior to $B_0$ phase B time. During an $E_2$ cycle, therefore, the buffer cycle is initiated at $B_S$ phase B.

It will be recalled that on an $E_1$ cycle the initiation of the buffer cycle is controlled by an $E_1$ gate. Similarly, on an $E_2$ cycle the buffer cycle is controlled by an $E_2$ gate. An $E_2$ gate pulse, derived in a manner to be described, is taken via a line 1410*a* to the #2 tap of a $GA_f$ unit 1411 (FIG. 31), the #6 tap of which is connected through a K unit 1412 to the #2 tap of an A unit 1413. A second input to the A unit 1413 is the B clock, taken from the output of K unit 1123, and the third input to the A unit 1413 is a pulse taken from a line 1414, which pulse is a $B_S$ pulse derived by the T unit 1022 (FIG. 32), as described previously herein. Thus, on an $E_2$ cycle, $B_S$ phase B pulses are taken from the output of the A unit 1413 (FIG. 31). This pulse is fed through the O unit 1124, through the K unit 1125, through the $GA_f$ unit 1126, through the $K_x$ unit 1127 to the input of the I unit 1128 (FIG. 33*a*) where it starts the buffer clock as described previously. It should now be clear that the buffer clock is turned on each $B_S$ phase B time on an $E_2$ cycle, thereby initiating a buffer cycle at these times.

A further distinction in the operation of the buffer on an $E_2$ cycle is that data present in the storage cores is to be read therefrom and into the character register. This is accomplished by sensing which of the seven storage cores at the address $x$—$y$ are turned off during the period of time common to the read pulse and the read gate pulse, i.e., from $c_3$ to $c_5$ time. A sample is taken during $c_4$ of the flux generated by a storage core being turned off.

Each of the sense windings 1002 (FIG. 22) is arranged to link all of the cores in the corresponding *z* plane and is placed across the corresponding one of seven pulse transformers 1416 (FIG. 31), only one of which is shown in the drawings. It will be noted that the secondary is provided with rectifiers 1417 and 1418 to prevent passage of a pulse to the line 1419 created by turning on one of the storage cores lying in the plane corresponding thereto, and it is only when a corresponding storage core is turned off that a pulse appears on the line 1419. The line 1419 is connected through an AR unit 1420 and through a K unit 1421 to one input of an A unit 1422. The second input to the A unit 1422 is taken via the line 1219 from the K unit 1218 (FIG. 34). A $c_4$ pulse is taken from the line 1219 during the buffer cycle when on an $E_2$ cycle. This is true since the #6 tap of the K unit 1412 (FIG. 31) is connected by a line 1412*a* to the #4 tap of the A unit 1216 (FIG. 34), which line is high on an $E_2$ cycle. Thus, if a pulse is induced in a sense winding during the period from $c_3$ to $c_5$ on an $E_2$ cycle, due to the presence of a bit in the core defined by the *x*—*y*—*z* address corresponding thereto, a $c_4$ pulse is taken from the #6 tap of the corresponding one of the seven A units 1422 (FIG. 31). Such a pulse indicates the presence of a bit in that bit position and is fed through a corresponding $GA_f$ unit 1423 and through a corresponding K unit 1424 where it is coupled to the input of a corresponding $I_{p0}$ unit 1425, the output of which is connected to the #3 tap of the corresponding one of the seven T units 1067.

When the negative-going spike caused by the presence of a bit in the core corresponding thereto is applied to the #3 tap of the appropriate T unit 1067, this unit is turned on, thereby raising the potential of the #5 tap thereof and indicating the presence of a bit in that bit position. The #5 tap of the T unit 1067 is connected through a K unit 1426 to the #2 tap of the A unit 1062 where the pulse is mixed with the corresponding bit pulse, as described earlier. Thus, if, for example, the "0" T unit 1067 is turned on, a pulse is taken from the output of the A unit 1062 during $B_0$ time, which pulse is fed through a $K_0$ unit 1427, through a $GA_f$ unit 1428 (FIG. 32) via a line 1428*a*, and through a K unit 1429 to a line 1429*a* from where it is taken into the information transfer circuits.

It should be further noted that the core buffer utilized herein is regenerative and that each bit read therefrom is re-entered therein, re-entry being accomplished in the same manner that initial read-in during an $E_1$ cycle is accomplished; that is, if there is a bit present in one or more of the T units 1067 during the $E_2$ buffer cycle, the line 1068 connected to the #1 tap thereof is low, whereas if no bit is present the line 1068 corresponding thereto will be high and will inhibit the re-entry of a bit as described previously.

As discussed earlier herein, the various T units associated with the core buffer are reset at the proper time by one of three reset circuits, *w*, *y* and *z*. The *w* reset circuit is utilized to reset the T units 1067 (FIG. 31) of the character register 1020 in an "off" condition, i.e., with the #5 taps thereof low, and comprises two A units 1435 *and* 1436, an O unit 1437 and a $K_r$ unit 1438. It will be recalled that on an $E_1$ cycle the #6 tap of the K unit 1118 is high, the #6 tap of the K unit 1412 being low at this time. The #6 tap of the K unit 1118 is connected by a line 1439 to the #4 tap of the A unit 1436, and the #6 tap of the K unit 1412 is connected to the #3 tap of the A unit 1435 via the line 1412*a*.

The #2 tap of the A unit 1436 is connected by the line 1051 to the output of the K unit associated with the T unit 1023 (FIG. 32), which line, it will be recalled, is the $B_0$ line from which $B_0$ pulses are taken. The #3 tap of the unit 1436 (FIG. 31) is connected by the line 1015 to the #6 tap of the K unit 1013 (FIG. 32), from which line phase A clock pulses are taken, and it will be understood that on an $E_1$ cycle the output tap of the A unit 1436 (FIG. 31) rises during $B_0$ phase A. This signal is connected through the O unit 1437, through the K unit 1438 to a line 1438*a* to the plates of the diodes (not shown) associated with the control grids of the T units 1067 corresponding to the #7 taps thereof. Thus, on an $E_1$ cycle the T units are reset in an "off" condition at $B_0$ phase A.

During an $E_2$ cycle it is desired to reset the character register just prior to the buffer cycle, i.e., at $B_s$ phase B time. It will be recalled that the #6 tap of the K unit 1412 is high during the $E_2$ gate and that this tap is connected to the #3 tap of the A unit 1435 by the line 1412*a*. Additionally, the #2 tap of the A unit 1435 is connected to the line 1207, on which line, it will be recalled, a pulse extending from $c_0$ to $c_2$ time is present during the initial portion of each buffer cycle, the line 1207 being connected to the #6 tap of the K unit 1206 (FIG. 34). Thus, on an $E_2$ cycle the #6 tap of the A unit 1435 (FIG. 31) rises from $c_0$ to $c_2$ time, and since the #6 tap of this A unit is connected through the O unit 1437 to the input of the $K_r$ unit 1438, the T units 1067 of the character register are reset by this pulse during an $E_2$ cycle. It will be noted that there is a third input to the O unit 1437, i.e., via a line 1442 connected to the #2 tap thereof. When a pulse, derived as will be described later, is present on the line 1442, the T units 1067 are reset to an "off" condition.

The T units of the bit ring 1015, the units-position ring 1220 and the tens-position ring 1221 are reset by the *y* reset circuitry shown in FIG. 31. A line 1443 connected from the information transfer circuits to the #2 tap of a $GA_f$ unit 1444 supplies reset control pulses at the appropriate time to the *y* reset circuitry. For the present, it will be assumed that whenever the line 1443 is hit with a positive pulse, reset of the various rings 1015, 1220 and 1221 is accomplished and the source of these pulses will be described hereinafter. For the present it is sufficient to note that the line 1443 rises at the process drum home pulse following the $E_1$ cycle if $T_1 \neq S$ or $R$ and on the process drum home pulse following the $E_2$ cycle if $T_2 \neq P$, $R$ or $X$. The #6 tap of the $GA_f$ unit 1444 is connected through a K unit 1445, through an O unit 1446 and through an I unit 1447 to the #2 tap of an SS unit 1448. Thus, when the line 1443 goes up, the #2 tap of the SS unit 1448 drops, thereby triggering this unit to emit a single, positive-going pulse, the duration of which is controlled by the time constants of the SS unit. In the present machine a ten-microsecond pulse is developed by the unit 1448 and is taken from the #6 tap thereof through a K unit 1449, a K unit 1450 and via a line 1450*a* which is connected through the diode connected to the control grid of each of the various T units of the rings 1015, 1220 and 1221 associated with that half of the T unit indicated by the positioning of the letter *y* on the block thereof. Since the pulse taken from the K unit 1450 is positive, it will be understood that the plate associated with the control grid corresponding to the position of the *y* on each T unit block is reset low by this reset pulse. Each of the rings 1015, 1220 and 1221 is also reset when the line 1442 is pulsed, this line being connected to the #2 tap of the O unit 1446.

The *z* reset circuitry (FIG. 31) is energized when the power is turned on and includes a $T_c$ unit 1452, the #2 tap of which is caused to rise in potential at this time due to the fact that it is connected through the *n/c b* points of the start key 37 to the 140-volt supply by a line 1453. When the key is released, 140 volts is placed on the #2 tap of the $T_c$ unit 1452, thereby triggering an SS unit 1454 connected to the output of the $T_c$ unit 1452 and generating a positive-going, ten-microsecond pulse which is taken from the #6 tap of the unit 1454. This pulse is fed through a K unit 1455 to the #2 tap of a $K_r$ unit 1456 as well as to the line 1442 which is connected to the #2 tap of the O unit 1446 and to the #2 tap of the O unit 1437. When the start key 37 is actuated, therefore, each of the *w* and *y* resets is pulsed, causing the character register 1020, the bit ring 1015, and the address rings 1220 and 1221 to be reset at this time. Also at this time the #6 tap of the $K_r$ unit 1456 rises, which tap is connected by a line 1456*a* through a diode (not shown) to one control grid of each of the T units of the buffer clock as well as through a diode (not shown) to one control grid of each of the T units 1197 through 1203 (FIG. 34), the particular control grid to which it is connected being the one corresponding to that side of the block upon which the letter *z* occurs. Thus, all of the T units associated with the core buffer are reset when operation is initiated, and, in addition, the character register 1020 and the address rings 1220 and 1221 are reset at the appropriate time during the operation of the buffer.

Since the address rings 1220 and 1221 are reset at the end of each $E_1$ and $E_2$ cycle when $T_1 \neq S$ or $R$ and when $T_2 \neq P$, $R$ or $X$, respectively, and since clock pulses and data are not entered into the buffer except during $E_1$ and $E_2$ cycle gates, i.e., from $a_1b_1$ to *mn* and $a_2b_2$ to *mn*, it should be understood that the condition of the address rings 1220 and 1221 will indicate at all times how many characters have been entered into the buffer and also how many characters have been read therefrom. This information is utilized to control the *mn* comparator described previously.

Figure 26:
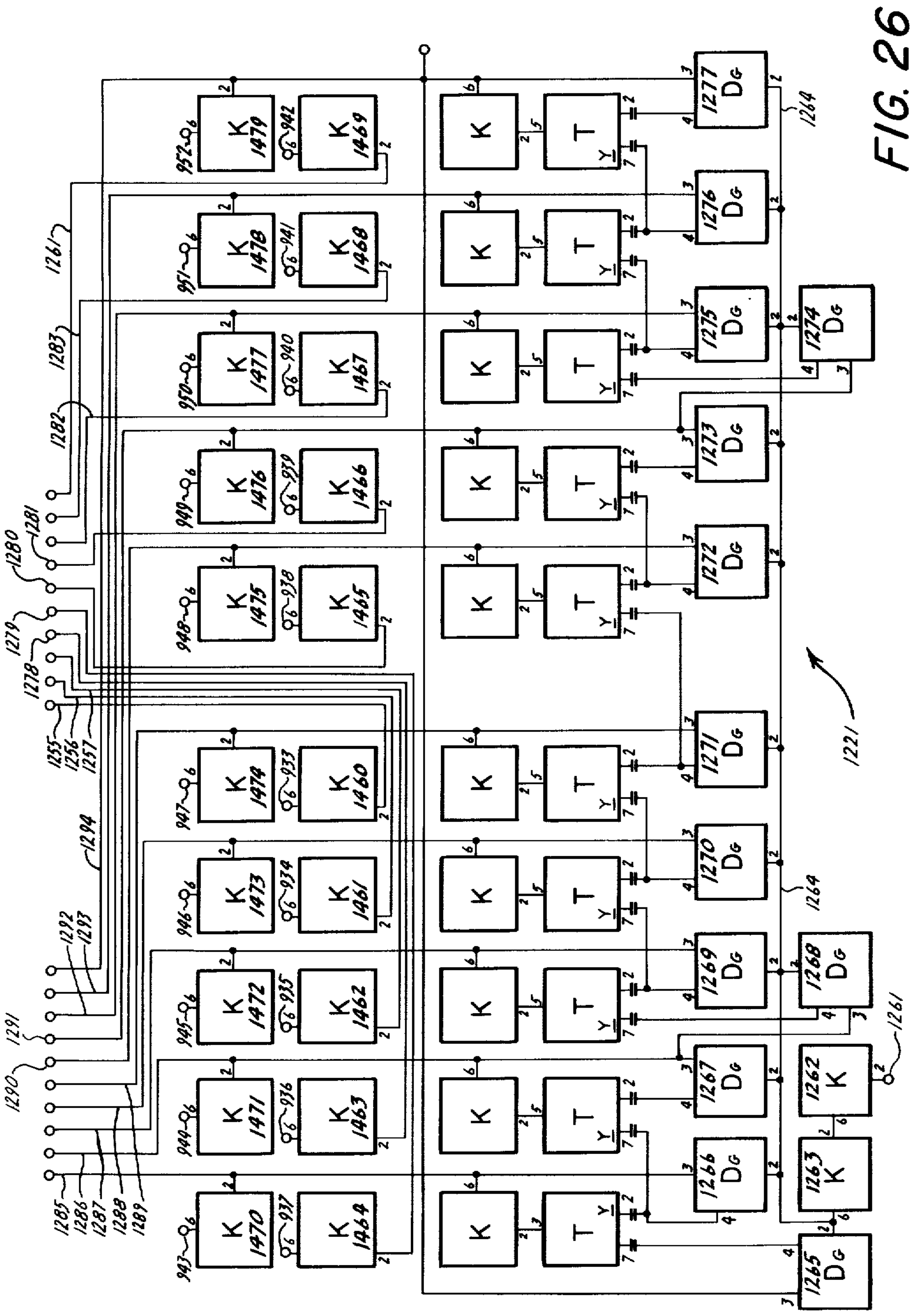

The various lines 1255, 1256, 1257 and 1278 through 1283 (FIG. 25) taken from the outputs of the K units associated with the units-position ring 1220 are connected to the #2 taps of corresponding K units 1460 through 1469, respectively (FIG. 26). Similarly, the lines 1285 through 1294 taken from the outputs of the K units associated with the tens-position ring 1221 (FIG. 26) are connected to the #2 taps of corresponding K units 1470 through 1479, respectively. The #6 taps of the K units 1460 through 1479 are connected by the lines 933 through 952 to the various CD units of the *mn* comparator (FIGS. 11*c* and 11*d*). Thus, when *mn* characters have been entered into or taken from the core buffer, an *mn* comparison is made which terminates the $E_1$ cycle gate, as described previously, or the $E_2$ cycle gate, as will be described.

As mentioned above, the core buffer is under the control of the $E_2$ gate when on an $E_2$ cycle, and data transfer as well as the entry of clock pulses into the core buffer is under the control of the $E_2$ cycle gate on an $E_2$ cycle. The $E_2$ gate and the $E_2$ cycle gate are derived similarly to the $E_1$ and $E_1$ cycle gates described earlier. Referring to FIG. 3, it will be recalled that when the *c* contacts of the $E_2$ relay 66 are transferred, as they are on an $E_2$ cycle, the #3 tap of the KS unit 819 (FIG. 11*i*) rises, thereby raising the potential of the line 820 connected to the #9 tap thereof. This line is connected to the #4 tap of an ID–1 unit 813 (FIG. 11*j*), the #3 tap of which is connected by a line 1491 to the #8 tap of a TR–1 unit 1492, the $E_2$ gate trigger. The #6 tap of the unit 813 is connected by a line 1493 to the #3 tap of a CD–1 unit 1494 (FIG. 11*i*), and when the #6 and #4 taps of the unit 813 (FIG. 11*j*) rise, it will be clear that the trigger 1492 is switched to a condition wherein the #9 tap thereof is high, since at this time the line 1491 drops, thereby pulling the #8 tap of the unit 1492 down.

The potential of the line 1493, and thus of the #6 tap of the unit 813, is controlled by the signals present on the #4 and #6 taps of the unit 1494 (FIG. 11*i*). The #6 tap of the unit 1494 is connected to the odd home pulse line 592, and the condition of the #4 tap of the unit 1494 indicates the presence or absence of an error during the preceding $E_1$ cycle, as will be described, it being connected to a line 2436 which is high when there was no $E_1$ error, thereby preventing the initiation of $E_2$ gates when there was an $E_1$ error since this line is low at this time. For the present it is sufficient to understand that the #4 tap is high when there has been no error during an $E_1$ cycle. Thus, assuming no $E_1$ error, the #3 tap of the unit 1494 rises with the odd home pulse, and if on an $E_2$ cycle it will be understood that this odd home pulse will plate-pull-over the TR–1 unit 1492 (FIG. 11*j*), as mentioned above. This last mentioned unit defines the $E_2$ gate, the #9 tap thereof being connected to the #4 tap of the PCF unit 1410 (FIG. 11*k*), and the $E_2$ gate pulse is taken from the line 1410*a* connected to the #3 tap of the unit 1410, as mentioned in connection with the description of the core buffer.

In addition to being connected to the circuitry associated with the core buffer, the line 1410*a* is connected to the #5 tap of an ID–2 unit 1495 (FIG. 11*j*), the #8 tap of which is connected to the #3 and #10 taps of a CD–1 unit 1496 by a line 1497. The #4 tap of the unit 1496 is connected to the line 344 which is high when $T_2 \neq X$ or $N$, and the #6 tap of this unit is connected to the output of the $a_2b_2$ comparator to be described. Thus, when $T_2 \neq X$ or $N$, the line 1497 rises with an $a_2b_2$ comparison, and if on an $E_2$ gate it will be clear that the #10 tap of the unit 1495 drops at this time, thereby lowering the potential of a line 1498 and of the #7 tap of a TR–1 unit 1499 at this time. The unit 1499 defines the $E_2$ cycle gate in a manner to be described following a brief description of the $a_2b_2$ comparator.

The $a_2b_2$ comparator (FIGS. 11*f*, 11*e*, 11*d*, 11*l*, 11*k* and 11*j*) is substantially identical to the $a_1b_1$ comparator previously described and includes ten CD–1 units 1500 through 1509. The #4 and #5 taps of these CD–1 units are connected by lines 1510 through 1529 to the various contacts associated with the relays 733 and 729 (FIG. 18) of the $a_2b_2$ portion of the instruction register, as indicated in the drawings. The #6 and #8 taps of the units 1500 through 1509 are connected to the lines 490, 510 through 518, 540, and 550 through 558 from which $C_9$, $C_8$ . . . $C_0$ and $F_9$, $F_8$ . . . $F_0$ pulses are taken. The #3 and #10 taps of each of the units 1500 through 1504 are connected to a common line 1530, the #3 and #10 taps of the units 1505 through 1509 being connected to a common line 1531. Thus, the line 1530 rises whenever the #4 and #6 taps or the #5 and #8 taps of one of the CD–1 units 1500 through 1504 rise, thereby indicating a $b_2$ comparison ten times each drum revolution since each $C_9$ through $C_0$ pulse occurs ten times per drum revolution. The line 1531, however, rises only once per drum revolution when the #4 and #6 or #5 and #8 taps of one of the CD–1 units 1505 through 1509 rise. When the line 1531 rises, there has been an $a_2$ comparison.

The line 1530 is connected to the #8 tap of the DA unit 845 (FIG. 11*f*), the line 1531 being connected to #7 tap of the unit 845. The #3 tap of the unit 845, therefore is up only when both of the lines 1530 and 1531 are up, and it will be understood that at this time there has been an $a_2b_2$ comparison. The #3 tap of the unit 845 is connected by a line 1533, through an INV–3 unit 1534, through a line 1535 and through the CF–1 unit 850 (FIG. 11–*l*) to a line 1537 which is connected to the #6 tap of the CD–1 unit 1496 (FIG. 11*j*).

As mentioned above, the #7 tap of the TR–1 unit 1499 drops on an $a_2b_2$ comparison while on an $E_2$ gate as long as $T_2 \neq X$ or $N$. When this occurs, the #9 tap of the unit 1499 goes up. This tap is connected by a line 1538 to the #5 tap of the PCF–1 unit 1410 (FIG. 11*k*), the #10 tap of which is connected by a line 1539 to the #8 tap of a CD–1 unit 1540. The #5 tap of the unit 1540 is connected to the line 331 which is high when $T_2 \neq R$ or $P$. Thus, when the #9 tap of the unit 1499 (FIG. 11*j*) goes up, the #10 tap of the unit 1540 (FIG. 11*h*) rises as long as $T_2 \neq R$ or $P$, thereby raising the potential of a line 1541 which is connected between the #10 tap of the unit 1540 and the #4 tap of an INV–3 unit 1542. The #10 tap of the unit 1542 is connected by a line 1543 through a PCF–1 unit 860 to the line 975 from which the $E_2$ cycle gate pulse is taken.

The TR–1 unit 1499 (FIG. 11*j*) is turned off, thereby defining the end of the $E_2$ cycle gate, *mn* characters after the $a_2b_2$ comparison. The line 1410*a* is connected to the #8 and #9 taps of a DA unit 1545 (FIG. 11*k*), the #7 tap of which is connected to the $B_s$ phase A line 441 and the #10 tap of which is connected to the line 862 from which the *mn* comparison signal is taken. As explained above, the *mn* comparator causes the line 862 to rise both when *mn* characters have been entered into the core buffer and when *mn* characters have been taken from the core buffer, the *mn* comparator being under the control of the units and tens position rings 1220 and 1221 of the core buffer. Thus, after an *mn* comparison during an $E_2$ cycle $B_s$ phase A pulses are taken from the #3 and #5 taps of the unit 1545 via a line 1546 to the #6 tap of an ID–1 unit 1547. The #4 tap of the unit 1547 is connected to the line 332 which raises the #4 tap when $T_2 \neq X$, and, assuming that this is the condition, it will be understood that the #3 tap of the unit 1547 drops at $B_8$ phase A. The #3 tap is connected via a line 1538 to the #9 tap of the TR–1 unit 1499 (FIG. 11*j*), and upon an *mn* comparison this TR unit is turned off by the leading edge of the first $B_8$ phase A pulse thereafter. Thus, at this time the line 975 from which $E_2$ cycle gate pulses are taken drops. (It should also be noted that the $E_2$ cycle gate may be terminated when $T_2=X$ by $C_9$ pulses since the $C_9$ line 490 is connected to the #8 tap of the ID–1 unit 1547 (FIG. 11*k*) and since the #5 tap of this unit is connected to the line 346 which is high when $T_2=X$. Thus, when $T_2=X$, the TR–1 unit 1499 (FIG. 11*j*) is turned off by the next following $C_9$ pulse since the #10 tap of the unit 1547 (FIG. 11*h*) drops at this time.)

One further method by which the unit 1499 (FIG. 11*j*) is turned off, thereby terminating the $E_2$ cycle gate, is with the even home pulse taken from the line 591. This pulse occurs at the end of the $E_2$ cycle and is connected via the line 591 to the #4 tap of an INV–2 unit 1550 (FIG. 11*k*), the #3 tap of which is connected through the line 1538 to the #9 tap of the unit 1499 (FIG. 11*j*), and it should be clear, therefore, that the leading edge of the even home pulse turns the unit 1499 off and therefore terminates the $E_2$ cycle gate.

The $E_2$ gate is arranged to terminate with the $E_2$ cycle gate. The line 1541 is connected to the #5 tap of the INV–2 unit 1550 (FIG. 11*k*) and through a line 1562 to the #4 tap of a CF–1 unit 1555, the #3 tap of which is connected through a line 1564 to the #6 tap of a CD–1 unit 1565. The #4 tap of the unit 1565 is connected to the line 344 which is high when $T_2 \neq X$ or $N$, and if $T_2 \neq X$ or $N$, it will be clear that the #3 tap of the unit 1565 rises at the end of the $E_2$ cycle gate, thereby raising the potential of a line 1566 connected thereto. This line is connected to the #5 tap of an INV–2 unit 1567 (FIG. 11*j*) the #9 tap of which is connected to the #3 tap of the TR–1 unit 1492 by a line 1568, thus turning this unit off at the end of the $E_2$ cycle gate and thereby terminating the $E_2$ gate. It should be noted additionally that the line 1566 is connected to the #10 tap of the CD–1 unit 1565 (FIG. 11*k*) and to the #10 tap of a CD–1 unit 1494 (FIG. 11*i*), and when either of these taps rises the $E_2$ gate is terminated in the manner just described.

The #10 tap of the unit 1565 (FIG. 11*k*) rises when the #5 and #8 taps thereof are each high. The #8 tap of the unit 1565 is connected to the #3 tap of a CD–2 unit 1560 by a line 1570 and it goes up when the #4 and #6 taps of the unit 1560 are both up. The #4 tap is connected to the *mn* comparison line 862 and the #6 tap is connected to the process drum home line 359, and upon the concurrence of an *mn* comparison and a process drum home pulse the line 1570 rises. The #5 tap of the unit 1565 is connected to the line 346 and is high when $T_2=X$, and the line 1566, therefore, goes up if $T_2=X$ when there is a process drum home pulse occurring during an *mn* comparison, thereby terminating the $E_2$ gate at this time. Even home pulses taken from the line 591 are connected to the #8 tap of the unit 1494 (FIG. 11*i*), the #5 tap of which is connected to the line 343 which is high when $T_2=N$. Thus, when $T_2=N$, the $E_2$ gate is terminated by the process drum even home pulse.

As mentioned above, the core buffer address rings are reset at the end of each $E_1$ and $E_2$ cycle as long as $T_1 \neq S$ or $R$ and $T_2 \neq P$ or $R$. The line 359 from which process drum home pulses are taken is connected to the #8 tap of a CD–1 unit 1551 (FIG. 11*k*), the #5 tap of which is connected to the line 334 which is high as long as $T_1 \neq S$ or $R$ and $T_2 \neq P$ or $R$. Thus, each home pulse causes a line 1552 connected to the #10 tap of the unit 1551 to go up. This line is connected through an INV–3 unit 1553, through the CF–1 unit 1555 and through a line 1556 to the #6 tap of the CD–1 unit 1540, and it will be clear, therefore, that the line 1443 rises on each home pulse as long as the #4 tap of the unit 1540 is high and as long as $T_1 \neq S$ or $R$ and $T_2 \neq P$ or $R$. The #4 tap of the unit 1540 is utilized to provide one additional condition for raising the potential of the line 1443, this condition being when $T_2=X$ on an $E_2$ gate, since it is not desired to reset the buffer counters under this condition. The $E_2$ gate is connected by the line 1410*a* to the #6 tap of an ID–1 unit 1558, the #4 tap of which is connected to the line 346 which is high when $T_2=X$. Thus, except when $T_2=X$, the #3 tap of the unit 1558 is high, and since this tap is connected to the #4 tap of the unit 1540 by a line 1559, it will be clear that the desired condition exists.

The line 1443 from which the pulse utilized to reset the counters 1015, 1220 and 1221 of the core buffer is taken also rises at $C_0B_4$ when $T_2=N$. The $B_4$ line 431 is connected to the #8 tap of a CD–2 unit 1560 (FIG. 11*k*), and the $C_0$ line 518 is connected to the #5 tap of the unit 1560. The #10 tap of the unit 1560 is connected through a line 1561 to the #6 tap of the CD–1 unit 1551, the #4 tap of which is connected to the line 343 which is high when $T_2=N$. Thus, when $T_2=N$, the line 1552 connected to the #3 tap of the unit 1551 rises each $C_0B_4$ time, thereby causing the line 1443 to rise at these times since when $T_2=N$ it cannot be equal to X.

To resume with the description of data transfer within the processing unit, it will be recalled that data is taken from the core buffer on an $E_2$ cycle from the line 1429*a* (FIG. 32), this data being in the form of full bit pulses. The line 1429*a* is connected to the #8 tap of a CD–2 unit 1575 (FIG. 11*h*), the #5 tap of which is connected to the $E_2$ cycle gate line 975. Thus, during an $E_2$ cycle gate the data taken from the core buffer passes through the unit 1575 and through a line 1576 to the #8 tap of a CD–1 unit 1577 (FIG. 11*g*). The #5 tap of the unit 1577 is connected to the line 342 which is high when $q \neq c$, and under this condition, therefore, $E_2$ data is taken from the #10 tap of the unit 1577 via a line 1578 to the #4 tap of an INV–3 unit 1579 (FIG. 11*g*), the #10 tap of which is connected to the #4 tap of a PCF–3 unit 1580 via a line 1581. Data to be recorded on the process drum at the location defined by the $T_2$ address is taken from the #3 tap of the unit 1580 via a line 1582 to the #4 tap of an INV–2 unit 1583 (FIG. 20*f*) and to the #8 tap of a DD unit 1584 from where it is taken through the erase and write amplifiers to the transducer of the process drum defined by the $T_2$ address.

The data applied through the line 1582 to the units 1583 and 1584 is positive and in the form of full bit pulses. The #3 tap of the INV–2 unit 1583 is connected through a line 1585, through a CF–1 unit 1586 and through a line 1587 to the #10 tap of a DA unit 1588, the #9 tap of which is high on an $E_2$ gate when $q \neq c$. This is true since the $E_2$ gate line 1410*a* is mixed with the signal "$q \neq c$" in a CD–1 unit 1589, the #3 tap of which is connected via a line 1590 to the #9 tap of the unit 1588. Thus, when $q \neq c$, inverted $E_2$ data, i.e., the erase pulses, are taken from the #5 tap of the unit 1588 and through a CF–2 unit 1591 to a line 1592.

The line 1592 is connected to the #4 tap of an EA–1 unit 1593 (FIG. 10), the #10 tap of which is connected through an EA–2 unit 1594 to the line 790 which is the input to the erase matrix (FIG. 15) described previously. The various points utilized to make up this matrix are associated with the various relays of the $T_2$ portion of the instruction register, and it will be understood that the erase portion of the proper transducer is connected therethrough to the line 790.

$E_2$ data, as mentioned earlier, is also connected to the #8 tap of the DD unit 1584 (FIG. 20*f*), the #7 tap of which is connected to the line 1590. The #9 and #10 taps of the unit 1584 are connected to the phase B clock pulse line 402, and it will be understood, therefore, that on an $E_2$ gate when $q \neq c$, phase B data pulses are taken from a line 1597 which is connected to the #3, #4 and #6 taps of the unit 1584. The line 1597 is connected to the #4 tap of the unit 1591, and data present thereon is taken from a line 1598 connected from the #3 tap of this unit. The line 1598 is connected to the #4 tap of a WA–1 unit 1599 (FIG. 10), the #10 tap of which is connected to the #4 tap of a WA–2 unit 1600 via a line 1601. The #10 tap of the unit 1600 is connected to the line 787 which is the input to the write matrix (FIG. 15) arranged to connect the line 787 to the write amplifier associated with the transducer determined by the condition of the various relays of the $T_2$ portion of the address register. It should be noted here that phase B data is recorded on the selected track of the process drum while full bit spaces are erased in the absence of data by the erase structure described above.

When on a copy operation the $C_1$ relay 79 is picked, as described earlier, thereby transferring its *e* contacts (FIG. 3*b*) and applying a CB–2 pulse therethrough and through a line 2485 to the #3 tap of a KS unit 2486 (FIG. 11*i*), the #9 tap of which is connected through a CF–1 unit 2487 to the #4 tap of the ID–2 unit 828 as well as to the #5 tap of the ID–1 unit 1490 (FIG. 11*j*) by a line 2488. Thus, when on a $C_1$ cycle the $E_1$ gate is initiated by the even home pulse, as described earlier, and additionally the $E_1$ cycle gate is initiated at this time. Both the $E_1$ gate and the $E_1$ cycle gate are terminated by the next following odd home pulse applied through the line 592 to the #4 tap of the ID–2 unit 829, and it will now be clear that both the $E_1$ gate and the $E_1$ cycle gate are up for one drum revolution when $T_1 \neq R$ or $S$, thereby permitting the transfer of 100 characters into the core buffer. When $T_1 = R$ or $S$, the $E_1$ gate and $E_1$ cycle gate are terminated at the end of the $E_1$ disc gate or $E_1$ drum gate, respectively, as described later. On a $C_2$ cycle the relay 80 (FIG. 6*b*) is picked and its *g* contacts (FIG. 3*a*) are transferred, thereby connecting the odd CB pulse taken from the line 54 through these contacts and through a line 2489 to the #3 tap of a KS unit 2490 (FIG. 11*i*). The #9 tap of the unit 2490 is connected through the CF–1 unit 2487 and through a line 2491 to the #4 tap of the ID–2 unit 1495 (FIG. 11*j*) as well as to the #4 tap of the ID–2 unit 1490. Thus, the $E_2$ gate is initiated by the odd home pulse. Similarly, the $E_2$ cycle gate is initiated by this pulse, and each of these gates is terminated by the next following even home pulse when $T_2 \neq P$ or $R$. As above described in connection with the termination of the $E_1$ gates, the $E_2$ gate and $E_2$ cycle gate are terminated at the end of the $E_2$ disc gate and $E_2$ drum gate in the case where $T_2 = R$ or $P$. Thus, the $E_2$ gate and $E_2$ cycle gate permit the transfer to the $T_2$ address of the 100-character record defined by the address.

Means are provided herein for indicating whether or not data is actually transferred by an instruction; i.e., whether or not the field or fields defined by an instruction are blank. It will be recalled that data taken from the core buffer is present on the line 1582 which is connected to the #3 tap of the PCF–3 unit 1580 (FIG. 11*g*) as long as $q \neq c$. The line 1582 is connected to the #6 and #8 taps of each of two CD–2 units 2492 (FIG. 11*h*) and 2493 (FIG. 11*i*) as well as to the #6 tap of the CD–2 unit 1575 (FIG. 11*h*). The $B_1$ and $B_2$ lines 429 and 430 are connected to the #4 and #5 taps, respectively, of the unit 2492 (FIG. 11*h*), the $B_4$ and $B_8$ lines 431 and 432 being connected to the #4 and #5 taps, respectively, of the unit 2493 (FIG. 11*i*). The $B_x$ line 428 is connected to the #4 tap of the unit 1575 (FIG. 11*h*). The #3 and #10 taps of the units 2492 and 2493 (FIGS. 11*h* and 11*i*) are connected via a line 2494 to the #3 tap of the unit 1575 (FIG. 11*h*) as well as to the #8 tap of a THY–1 unit 2495 (FIG. 14*h*). The line 2494, therefore, rises if at least one bit is present on the line 1582, thereby raising the potential of the #8 tap of the unit 2495 at this time. The #4 tap of the unit 2495 is grounded, the #5 tap being connected through the pick coil of a relay 2496 to ground. The #6 tap of the unit 2495 is connected via a line 2497 through the n/o *e* contacts of the $E_2$ relay 66 (FIG. 3*b*), through the n/c *f* contacts of the error relay 46 (FIG. 3*a*), through the n/c *b* contacts of the error relay 45 and through CB–19 to +70 volts. Thus, throughout the $E_2$ cycle the #6 tap of the unit 2495 (FIG. 14h) is connected to +70 volts and if a bit is present in the $E_2$ data this unit fires, thereby picking the relay 2496.

The latch winding of the relay 2496 is connected between ground and through its own n/o *a* contacts and through a line 2498 to one side of the n/o *e* contacts of the $I_1$ relay 60 (FIG. 3*a*) as well as to one side of the n/o *a'* contacts of the $I_2$ relay 62. The other side of the *e* points of the $I_1$ relay 60 is connected through the n/c *d* contacts of the error relay 64 and through CB–18 to +70 volts, the other side of the *a'* contacts of the $I_2$ relay 62 being connected through the n/c *d* contacts of the error relay 46, through the n/c *e* contacts of the error relay 45 and through CB–17 to +70 volts. Thus, during the $I_1$ and $I_2$ cycles the line 2498 is high, thereby unlatching the relay associated with the blank field detector. It will be understood now that if the relay 2496 (FIG. 14*h*) is picked, this is an indication that the field or fields transferred during the $E_2$ cycle were not blank and, conversely, that if the contacts of the relay 2496 are in their normal condition, the field was blank. The points of the relay 2496 are available at appropriate hubs on the control panel for use as may be desired, i.e., to determine whether or not any data was transferred during the $E_2$ cycle.

Thus far, data transfer solely within the processing unit has been described, the data being read from one track of the process drum 25 into the core buffer during an $E_1$ cycle and read out of the core buffer onto another track of the process drum during an $E_2$ cycle. All data transfer within the processing unit is accomplished in this manner. When transfers are taken from or to the disc unit or the input-output drum, the operation as described above is modified somewhat due to the fact that these units are not in synchronism with the process drum as well as the fact that only full records are taken from or transmitted to these units.

The address buffer 20 (FIG. 2), which controls the operation of the access mechanism 19 of the disc unit 11, includes four relays 1610 through 1613 (FIG. 23) into which the units order of the disc address is entered via lines **1610*a* when $T_2 = Y$, i.e., when the address of the desired record within the disc unit is entered into the address buffer. The other four digits of the disc address are similarly entered into other mechanisms (not shown) for controlling the positioning of the transducers of the disc unit. The units order of an address, it will be recalled, determines the side and sector of the disc track to be utilized, and the relays 1610 through 1612 control selection of one of the five sectors, the relay 1613** defining the side on which the selected sector lies. Any convenient structure (not shown) may be provided to enter the units order of the address into these relays.

The sectors of the various discs are defined, as is disclosed in the copending application Serial No. 555,007, filed December 23, 1955, by a single magnetic spot recorded on one of the discs and by the signals derived therefrom in each of five magnetic transducers disposed equidistant around this disc, the time lapse between successive signals taken from adjacent transducers defining each sector, as will become clear. Each of the five sector transducers (not shown) is connected across a corresponding resistance 1614 through 1618 (FIG. 21) which is connected between the control grid of a corresponding vacuum tube 1619 through 1623 and ground. These tubes are utilized to amplify the signals generated in the sector transducers to a sufficient level to permit them to be passed through various points of the relays 1610, 1611 and 1612 to each of two lines 1627 and 1628 which are returned to −60 volts. The plate of each of the tubes 1619 through 1623 is connected to +270 volts, and the cathode of the tube 1619 is connected to the n/o *a'* contacts of the relays 1610 and 1611 by a line 1625. The cathode of the tube 1620 is connected by a line 1620*a* to the n/c *a'* contacts of the relay 1611 as well as to the n/o *b'* contacts of the relay 1612. The cathode of the tube 1621 is connected by a line 1626 to the n/o *a'* contacts of the relay 1612 as well as to the n/o *b'* contacts of the relay 1611. Similarly, the cathode of the tube 1622 is connected by a line 1622*a* to the n/c *b'* contacts of the relay 1610 as well as to the n/c *b'* contacts of the relay 1612, and the cathode of the tube 1623 is connected by a line 1633*a* to the n/o *b'* contacts of the relay 1610 as well as to the n/c *a'* contacts of this relay.

The various contacts of the relays 1610 through 1612 are arranged in a matrix having two outputs, i.e., the lines 1627 and 1628 which are connected to the transfer points of the *c'* contacts of the relays 1611 and 1612, respectively, and depending upon the condition of these relays it will be clear that selected cathodes of the tubes 1619 through 1623 are connected to the lines 1627 and 1628. When all of the relays are in their normal condition, the "0" sector is defined thereby, and when in this condition, it will be seen that the cathode of the tube 1622 is connected through the n/c *b'* points of the relay 1610, through the n/c *b'* points of the relay 1611, through the n/c *c'* points of the relay 1612 to the line 1628. Also, the cathode of the tube 1623 is connected through the line 1623*a*, through the n/c *a'* points of the relay 1610, through the n/c *a'* points of the relay 1612 and through the n/c *c'* points of the relay 1611 to the line 1627. Thus, the lines 1627 and 1628 are arranged to rise with the signals on the control grids of certain of the tubes 1619 through 1623 determined by the condition of the sector relays.

The line 1627 rises at the beginning of the desired sector, the line 1628 being arranged to rise at the end thereof, and in the case where the sector defined by the sector address is "0," the line 1627 rises when the sector transducer associated with the tube 1623 senses the magnetized spot mentioned above. This rise defines the beginning of the "0" sector. The line 1628 rises when the transducer associated with the tube 1622 senses the magnetized spot. This occurs at the beginning of the "1" sector (at the end of the "0" sector) and thereby defines the end of the "0" sector. Other sectors are similarly defined by the circuitry shown herein, it being understood that the condition of the various relays 1610 through 1612 determines which sector pulses are applied to the control grids of two tubes 1624 and 1629 which are coupled to the lines 1627 and 1628, respectively.

Sector signals applied to the control grids of the tubes 1624 and 1629 are amplified and inverted thereby, and the output of these tubes is connected through a corresponding tube 1630 and 1631 to the control grid of a corresponding cathode follower 1632 and 1633. The sector start and sector end pulses, therefore, are taken from two lines 1634 and 1635 connected to the cathodes of the tubes 1632 and 1633, respectively, which pulses are positive in form. Thus, at the beginning of the sector defined by the condition of the relays 1610 through 1612 the line 1634 rises, and at the end of the desired sector the line 1635 rises. It should be noted at this time that the relay 1613 of the units portion of the address is utilized to connect the desired one of the two transducers associated with the access mechanism of the disc unit to the read amplifier, it being understood that when this relay is in its normal condition one of the two transducers is operative and when it is transferred the second of the two transducers is operative. Thus, the side of the disc to be read from or written on is determined by the condition of the relay 1613.

It will be recalled that when successive records are to be recorded upon or read from the same disc track it is not necessary to provide an additional program step to enter the new address into the address buffer since placing a "3" in the *p* column of an instruction causes sector advance after that instruction has been carried out. The next instruction, therefore, may be arranged to transfer the data on the new sector directly at this time. The relays 1610 through 1612 (FIG. 23) are advanced under the control of five relays 1602 through 1606 by a pulse taken from a line 1607 derived in a manner to be described later herein. For the present it is sufficient to understand that this pulse is an odd pick pulse (odd) occurring during a $p_2$ cycle.

The line 1607 is connected through the n/o *c* contacts of the relays 1610 through 1613 to one side of the pick coil of the relays 1602 through 1605, respectively, as well as directly to one side of the pick coil of the relay 1606. The other sides of the pick coils of the relays 1602 through 1606 are grounded and the hold coils of these relays are connected between ground and through their own *a* contacts to the odd hold line 58. Thus, these relays are picked by odd pick pulses and are held by the following odd hold pulse.

It was mentioned above that the relays 1610 through 1612 of the address buffer are picked in any convenient manner by means not shown herein when $T_2=Y$. When picked, these relays are held through their own *a* contacts as long as a line 1608 is connected to 48 volts, since the hold coils thereof are connected between ground and through these contacts to the line 1608. The line 1608 is connected through a parallelly arranged group of points (FIG. 3*b*) of the relays 715, 718, 719, 720 and 66, which points provide a closed circuit except when $T_2=Y$ as well as when not on an $E_2$ cycle, and through the points of CB–5 to +48 volts. The line 1608 is additionally connected through the n/c *c* points of the relay 1606, through a parallelly arranged group of points of the relays 715, 718, 719, 720 and 65, which points provide a closed circuit except when $T_2=Y$ as well as when not on an $E_1$ cycle, and through the points of CB–6 to +48 volts. When $T_2=Y$, therefore, on both $E_1$ and $E_2$ cycles, the line 1608 is disconnected from +48 volts, thereby permitting the hold coils of the relays 1610 through 1613 (FIG. 23) to become deenergized. Thus, when $T_2=Y$, the sector portion of the disc address is entered into the relays 1610 through 1613 during the $E_2$ cycle, the hold coils of these relays being deenergized during the $E_1$ and $E_2$ cycles to thereby erase a preceding sector address, and these relays are picked according to the desired sector and are held following the $E_2$ cycle since at this time the $E_1$ and $E_2$ relays 65 and 66 are deenergized. Additionally when $T_2 \neq Y$, the sector relays 1610 through 1613 are held in a given condition until the relay 1606 is picked.

Assume now that an instruction having a "3" in the *p* column thereof is programmed, and assume further that the record address entered into the address register of the disc unit during a previous operation defined a record in sector 1. In this case, the points of the relay 1610 (FIG. 23) are transferred and are held as described above. During the $p_2$ cycle following data transfer, the line 1607 is pulsed with an odd pick pulse which picks relays 1602 and 1606. These relays are held by the following even CB pulse, i.e., by the odd hold pulse, and the even pick pulse taken from the line 55 is connected through the transferred *b* contacts of the relay 1606 to a line 1609. (It should be noted that when the relay 1606 picks, its *d* contacts (FIG. 3*b*) are opened, thereby opening the line 1608 from the 48-volt supply and permitting all sector relays 1610 through 1613 to drop out at this time.) The line 1609 is connected, under the above conditions, through the n/c *b* contacts of the relay 1605, through the n/o c contacts of the relay 1602, through the n/c b contacts of the relay 1603 and through the pick coil of the "2" relay 1611. Since the line 1608 is reconnected to +48 volts on the following odd CB pulse, the relay 1611 is held, thereby setting the sector relays to gate sector 2 when the instruction calls for reading from or to the discs. Successive sector advance pulses on the line 1607 cause the relays 1610 through 1613 to be picked in a similar manner to thereby set up successive sectors.

Figure 14E:
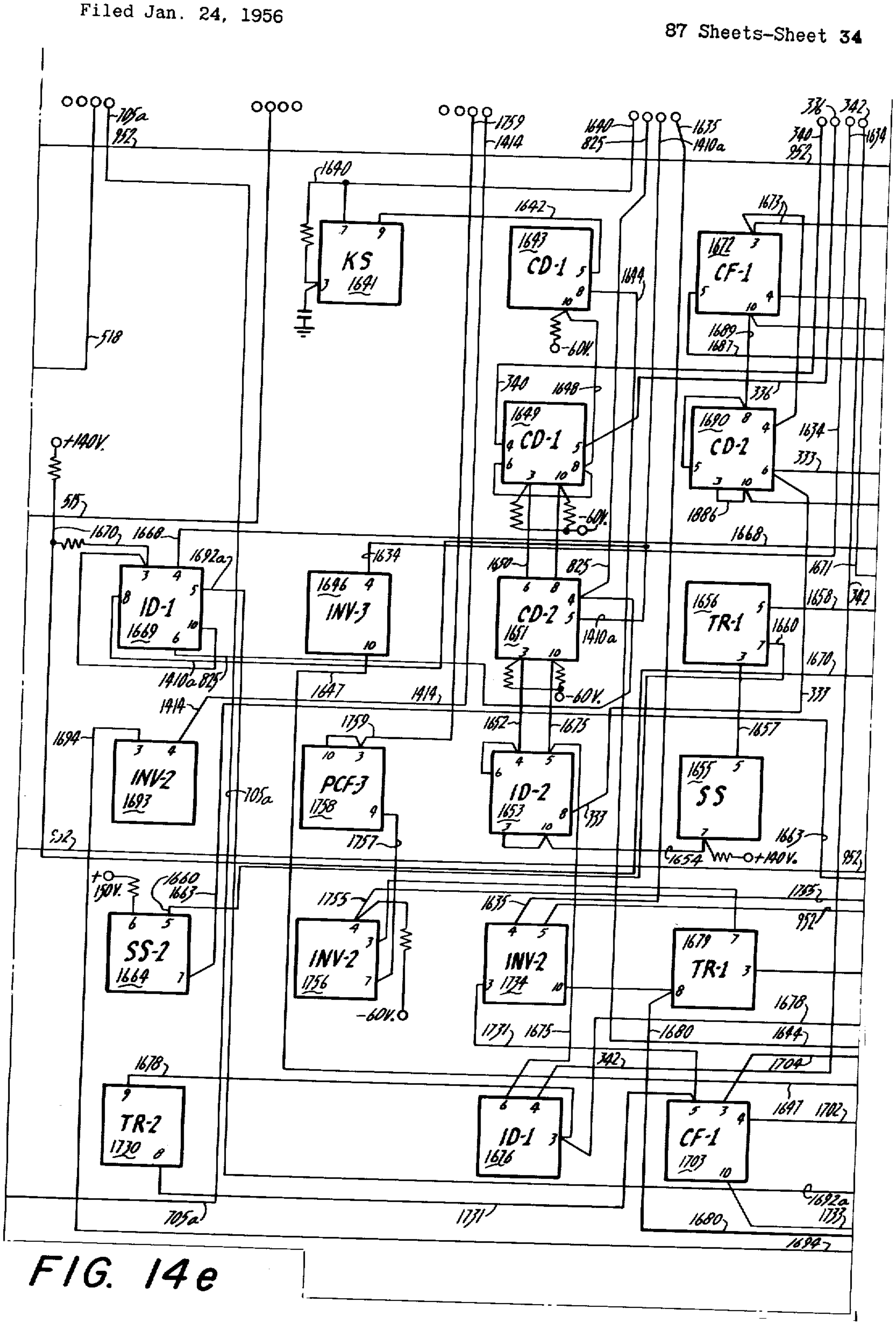
Figure 14F:
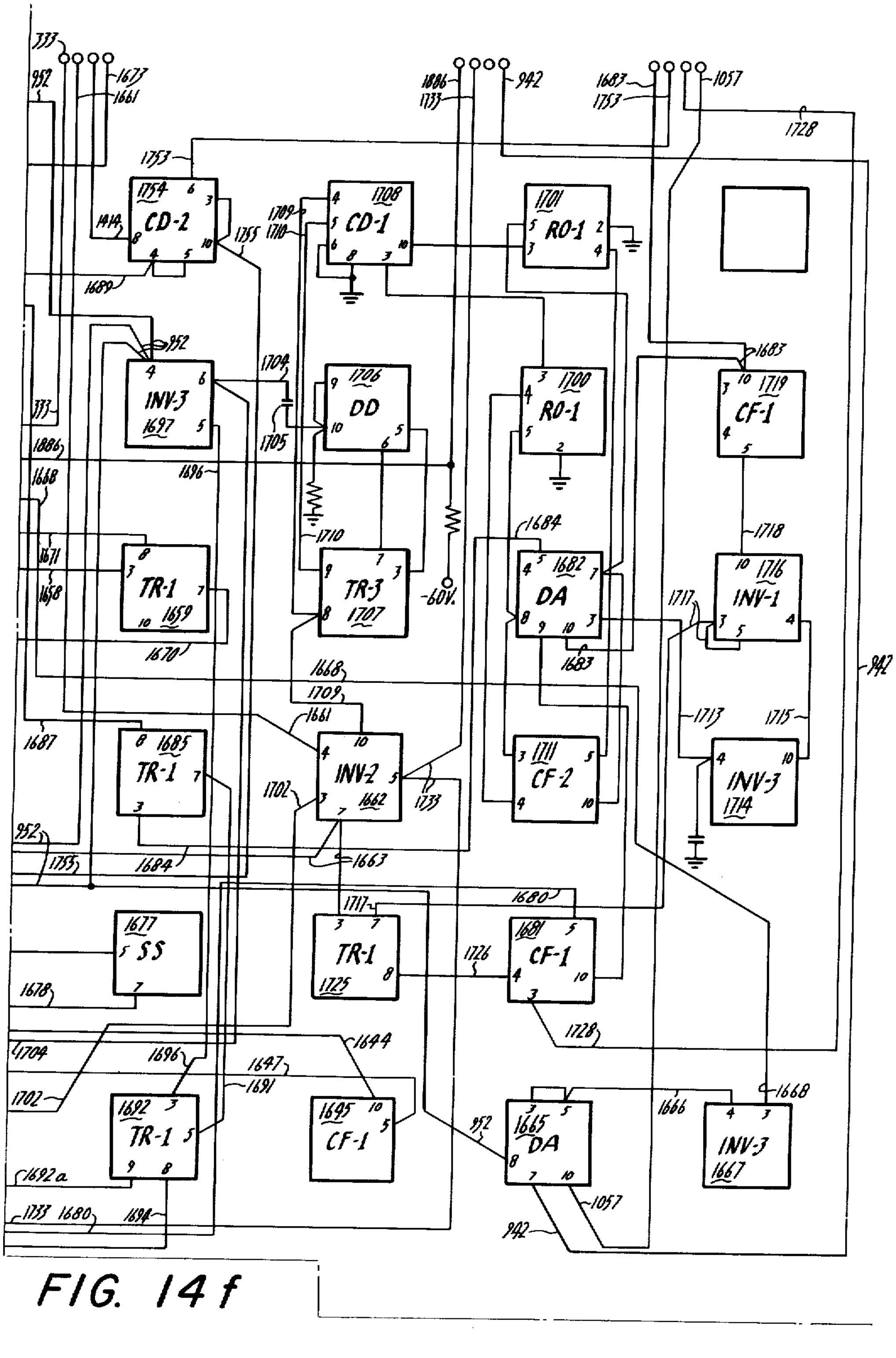

Referring now to FIG. 14e, a line 1640 is arranged to rise when the access mechanism of the disc unit has positioned the transducers adjacent the track of the disc defined by the address in the address buffer. This signal is referred to herein as the "track located" signal and the description of its source will not be given herein. It is sufficient to note that the line 1640 is high only if the transducer associated with the disc unit is ready to read or write. The line 1640 is connected to the #3 tap of a KS unit 1641, and as long as the track located signal is present on the line 1640 the #9 tap of the unit 1641 is high. The #9 tap of the unit 1641 is connected through a line 1642 to the #5 tap of a CD–1 unit 1643, the #8 tap of which is connected by a line 1644 to the #10 tap of a CF–1 unit 1645 (FIG. 14f). The line 1644 is arranged to go up each time the sector start pulse appears on the line 1634, since the sector start pulse taken from the line 1634 is connected through an INV–3 unit 1646 (FIG. 14e) and through a line 1647 to the #5 tap of the unit 1645 (FIG. 14f). Thus, for the duration of the track located signal, sector start pulses pass through the unit 1643 (FIG. 14e) to a line 1648 connected between the #10 tap of the unit 1643 and the #6 and #8 taps of a CD–1 unit 1649. The #4 and #5 taps of the unit 1649 are connected to the lines 340 and 336 (FIG. 17), respectively, which are high when $T_1=R$ or $T_2=R$, respectively, as described earlier.

Assuming, for the present, that $T_1=R$, the #4 tap of the unit 1649 (FIG. 14e) is high and the sector start pulse passes through this unit to a line 1650 connected between the #3 tap thereof and the #6 tap of a CD–2 unit 1651. The $E_1$ gate line 825 is connected to the #4 tap of the unit 1651. On an $E_1$ gate, the line 825 is high, thereby permitting the sector start pulse to be taken from the #3 tap of the unit 1651 via a line 1652 to the #4 and #6 taps of an ID–2 unit 1653 which is utilized to invert this signal. The #3 and #10 taps of the unit 1653 are connected via a line 1654 to the #7 tap of an SS unit 1655 which provides a 100-microsecond delay. The #5 tap of the unit 1655, therefore, rises for 100 microseconds upon occurrence of the start pulse on an $E_1$ gate when $T_1=R$, at the end of which time a TR–1 unit 1656 is turned off by the trailing, negative-going edge of this pulse, since the #5 tap of the unit 1655 is connected to the #3 tap of the unit 1656 by a line 1657. Thus, 100 microseconds after the leading edge of the sector start pulse, the #5 tap of the unit 1656 rises, thereby raising the potential of a line 1658 connected from this tap to the #3 tap of a TR–1 unit 1659 (FIG. 14f).

The unit 1659 defines a pulse referred to as the "$E_1$ disc gate" which is initiated when the #3 tap thereof drops. This occurs when the unit 1656 (FIG. 14e) is turned on by lowering the potential of a line 1660 connected to the #7 tap of the unit 1656, which line drops when the first data pulse is taken from the disc read amplifier. Bits are recorded in each space bit position of disc records, as will become clear, and the first bit in each such record is, therefore, a space bit. The output of the read amplifier associated with the disc unit is taken from a line 1661 through an INV–2 unit 1662 (FIG. 14f) to a line 1663 which is connected between the #7 tap of the unit 1662 and the #7 tap of an SS–2 unit 1664 (FIG. 14e). When the line 1661 rises in response to the leading edge of the first data bit sensed after the 100-microsecond delay, i.e., a space bit, the line 1663 drops, thereby triggering the unit 1664 to emit a short positive pulse which is taken from the #5 tap thereof through the line 1660 to the #7 tap of the TR–1 unit 1656. The trailing, negative-going edge of this pulse turns the unit 1656 on, thereby causing the line 1658 to drop, which results in turning off the unit 1659 (FIG. 14f) and thereby initiating the $E_1$ disc gate which is taken from the #8 tap thereof.

The $E_1$ disc gate is terminated when the unit 1659 is turned on again, i.e., when the #7 tap thereof drops. This occurs after 100 characters have been entered into the core buffer. The line 952 (FIG. 26), which, it will be recalled, rises after 90 characters have been entered into the core buffer and drops after 100 characters, is connected to the #8 tap of a DA unit 1665 (FIG. 14f), the #7 tap of this unit being connected to the line 942 (FIG. 26) which rises during each tenth character entered into the core buffer, as described earlier. The #10 tap of the unit 1665 (FIG. 14f) is connected to the line 1057 (FIG. 32) from which $b_r$ pulses generated by the bit ring 1015 of the core buffer are taken. Thus, at $b_r$ time during the 100th character entered into the buffer, the #3 and #5 taps of the unit 1665 (FIG. 14f) go up. These taps are connected by a line 1666, through an INV–3 unit 1667 and through a line 1668 to the #4 tap of an ID–1 unit 1669 (FIG. 14e). The #6 tap of this unit is subjected to the $E_1$ gate via the line 825. Thus, during an $E_1$ gate the $b_r$ pulse taken from the output of the DA unit 1665 (FIG. 14f) passes through the unit 1669 (FIG. 14e) where it is inverted, and is applied through a line 1670 to the #7 tap of the TR–1 unit 1659 (FIG. 14f), thereby turning this unit on and lowering the potential of the #8 tap thereof. Thus, after 100 characters have been entered into the core buffer, the $E_1$ disc gate terminates. The #8 tap of the unit 1659 is connected by a line 1671, through a CF–1 unit 1672 (FIG. 14e) to a line 1673 from where the $E_1$ disc gate pulse is taken for use as will be described later.

On an $E_2$ gate, the line 1410a taken from the #3 tap of the unit 1410 (FIG. 11k) and connected to the #5 tap of the CD–2 unit 1651 (FIG. 14e) is high, and in the case when $T_2=R$, sector start pulses are applied to the #8 tap of the unit 1651 since when $T_2=R$ the #5 tap of the CD–1 unit 1649 is high. This is true, of course, only if the track located signal is present on the line 1640, as described above. Thus, on an $E_2$ gate when $T_2=R$, sector start pulses are taken from the #10 tap of the unit 1651 and through a line 1675 to the #6 tap of an ID–1 unit 1676, the #4 tap of which is high when $q\neq c$, since it is connected to the line 342 (FIG. 17). The #3 tap of the unit 1676 (FIG. 14e), therefore, drops with the sector start pulse as long as $q\neq c$, which drop triggers an SS unit 1677 (FIG. 14f), the #7 tap of which is connected by a line 1678 to the #3 tap of the unit 1676 (FIG. 14e). The unit 1677 (FIG. 14f) provides a 200-microsecond delay, at the end of which time the #5 tap drops and turns off a TR–1 unit 1679 (FIG. 14e), thereby raising the potential of the #8 tap of this unit. The #8 tap of the unit 1679 is connected by a line 1680, through a CF–1 unit 1681 (FIG. 14f) to the #9 tap of a DA unit 1682, the #10 tap of which is connected by a line 1683 to the source of phase A clock pulses associated with the disc unit, as will be described. Since the #9 tap of the unit 1682 goes up 200 microseconds after the sector start pulse on an $E_2$ cycle when $q\neq c$ and $T_2=R$, phase A clock pulses apper on the #5 tap of this unit at this time. These pulses are taken via a line 1684 to the #3 tap of a TR–1 unit 1685 and when the line 1684 drops, as it does at the beginning of phase B time, the unit 1685 is turned off. This unit defines the $E_2$ disc gate which is initiated when it is turned off and terminates when it is again turned on. When turned off, the #8 tap thereof rises, thereby raising the potential of a line 1686 from which $E_2$ disc gate pulses are taken, since the #8 tap is connected through a line 1687, through the CF–1 unit 1672 (FIG. 14*e*), through a line 1689 and through a CD–1 unit 1690 to the line 1686.

The $E_2$ disc gate, like the $E_1$ disc gate, terminates after 100 characters have been read from the core buffer, at which time the #7 tap of the unit 1685 (FIG. 14*f*) is arranged to drop. The #7 tap of the unit 1685 is connected through a line 1691 to the #5 tap of a TR–1 unit 1692, the #8 tap of which is connected to the #3 tap of an INV–2 unit 1693 (FIG. 14*e*) by a line 1694. $b_8$ pulses taken from the line 1414 (FIG. 32) connected to the #4 tap of the unit 1693 (FIG. 14*e*) pass through this unit where they are inverted and maintain the #5 and #8 taps of the TR–1 unit 1692 (FIG. 14*f*) low since they are connected to plate-pull-over it to an "on" condition. The unit 1692 remains on until the #3 tap thereof drops, which tap is connected by a line 1696 to the #5 tap of an INV–3 unit 1697. The #4 tap of the unit 1697 is connected to the line 952 (FIG. 26) which drops, it will be recalled, after 100 characters have been entered into the buffer. Thus, at this time the #5 tap of the unit 1697 (FIG. 14*f*) drops, thereby turning off the TR–1 unit 1692 and raising the #8 tap thereof. Upon occurrence of the next following $b_8$ pulse taken from the line 1414, therefore, the #8 tap of the unit 1692 drops, thereby turning this unit on and causing the #5 tap to drop. When the unit 1692 is turned on, the unit 1685 is turned on and the $E_2$ disc gate is terminated. Thus, the $E_2$ disc gate is initiated by the negative-going edge of the first phase A clock pulse after the 200-microsecond delay and terminates on the leading edge of $b_8$ after 100 characters are read from the core buffer.

The timing of the data pulses taken from or entered into the disc unit is under the control of a circuit similar to that described in the copending application Serial No. 537,260, filed September 28, 1955, wherein clock pulses are developed by one of two RO–1 units 1700 and 1701 (FIG. 14*f*). On an $E_1$ cycle, clock pulses are generated by alternate units 1700 and 1701 ecah time a data pulse appears on the line 1661. The line 1661, it will be recalled, comes from the disc read amplifier and signals taken therefrom are applied to the #4 tap of the unit 1662, as described above. Since the data pulses taken from the disc read amplifier are positive in form, negative data pulses are taken from the #3 tap of the unit 1662 by a line 1702 to the #4 tap of a CF–1 unit 1703 (FIG. 14*e*), the #3 tap of which is coupled by a line 1704, through a condenser 1705 (FIG. 14*f*) to the #9 and #10 taps of a DD unit 1706. Thus, data pulses are differentiated by the condenser 1705 and are taken from the #5 and #6 taps of the unit 1706 to the #3 and #7 taps, respectively, of a TR–3 unit 1707. In this way each data pulse reverses the condition of the unit 1707, on the leading edge thereof, thereby alternately raising the potential of the #8 and #9 taps upon the occurrence of successive data pulses.

The #8 tap of the unit 1707 is connected to the #4 tap of a CD–1 unit 1708 by a line 1709, the #9 tap of the unit 1707 being connected to the #5 tap of the unit 1708 by a line 1710. The #6 and #8 taps of the unit 1708 are grounded, and the #3 and #10 taps thereof are high when the corresponding line 1709 or 1710 is high. When the #3 tap of the unit 1708 is high, the RO–1 unit 1700 is operative, the unit 1701 being operative when the #10 tap of the unit 1708 is high. The #4 and #5 taps of the unit 1700 are connected to the #4 tap of a CF–2 unit 1711 and to the #8 tap of the DA unit 1682, respectively, the #3 tap of the unit 1711 also being connected to the #8 tap of the unit 1682. The #4 tap of the unit 1701 is connected to the #5 tap of the unit 1711, the #10 tap of which is connected to the #7 tap of the unit 1682 as well as the #5 tap of the unit 1701. Thus, for example, when the #3 tap of the CD–1 unit 1708 is high, the RO–1 unit 1700 is operative and clock pulses generated thereby are taken from the #4 and #5 taps thereof and are applied to the #8 tap of the unit 1682.

These pulses are taken from the #3 tap of the unit 1682. When the opposite condition exists, i.e., when the #10 tap of the unit 1708 is high, the unit 1701 is operative and the resulting clock pulses are connected to the #7 tap of the unit 1682 and are similarly taken from the #3 tap thereof.

This circuitry, as explained in the aforementioned copending application Serial No. 537,260, is provided to phase the clock pulses according to the data being read, and it will be understood, therefore, that phased clock pulses are taken from the #3 tap of the unit 1682. This tap is connected via a line 1713 to the #4 tap of an INV–3 unit 1714, the #10 tap of which is connected via a line 1715 to the #4 tap of an INV–1 unit 1716. The #3 tap of the unit 1716 is connected by a line 1717 to the #5 tap thereof and the #10 tap of this unit is connected through a line 1718 and through a CF–1 unit 1719 to the line 1683 from which phased, phase A disc clock pulses are taken, as mentioned earlier.

Data pulses entered on the #4 tap of the unit 1662 via the line 1661 are applied through the line 1663 to the #3 tap of a TR–1 unit 1725 as well as to the #7 tap of the SS–2 unit 1664 (FIG. 14*e*). Since the positive data pulses are inverted by the unit 1662 (FIG. 14*f*), the unit 1725 is turned off by the leading edge of each data pulse taken from the line 1661. The #7 tap of the unit 1725 is connected to the line 1717 from which phase B clock pulses are taken, and it should be clear that the unit 1725 is turned on by the negative-going edge of each such clock pulse taken from this line. Thus, this unit is turned on by the leading edge of each bit pulse and is turned off one bit time later. The unit 1725 is provided to shape the data bits taken from the disc read amplifier, which bits are taken from the #8 tap of the unit 1725 through a line 1726 and through the CF–1 unit 1681 to a line 1728.

When entering data into the disc unit, the #8 tap of the TR–3 unit 1707 is maintained low, thereby preventing data pulses taken from the disc unit from affecting the condition of the unit 1707 and rendering the RO–1 unit 1701 only operative. Thus, when writing on the discs the clock pulses are developed by the unit 1701. It will be recalled that on an $E_2$ gate when $T_2=R$ and $q\neq c$, the #3 tap of the ID–1 unit 1676 (FIG. 14*e*) drops with the sector start pulse. This tap is connected by the line 1678 to the #9 tap of a TR–2 unit 1730, and under the outlined conditions the sector start pulse will plate-pull-over the unit 1730 to an "off" condition, thereby raising the potential of the #8 tap thereof. This tap is connected via a line 1731 through the CF–1 unit 1703 (FIG. 14*e*) to a line 1733, and since the line 1733 is connected through the INV–2 unit 1662 (FIG. 14*f*) to the line 1709 which is connected to the #8 tap of the unit 1707, it should be clear that the sector start pulse lowers the potential of the #8 tap and maintains it in this condition until the TR–2 unit 1730 (FIG. 14*e*) is turned on. The sector end pulse taken from the line 1635 is connected through an INV–2 unit 1734 to the #8 tap of the unit 1730 and is arranged to plate-pull-over the unit 1730 to an "on" condition, thereby lowering the line 1731 and raising the #8 tap of the unit 1707 (FIG. 14*f*). Thus, when writing on a disc it will be clear that the data is entered under the control of the clock pulses generated by the RO–1 unit 1701.

As explained above, the data from the disc read amplifier is present on the line 1728 whenever the transducers associated with the disc unit are adjacent a track thereof. Thus, as long as these transducers are in position, data is taken from the line 1728 and is connected to the #6 tap of a CD–1 unit 1740 (FIG. 11*g*). $b_8$ pulses taken from the line 1414 (FIG. 32) of the buffer bit ring are connected to the #4 tap of an INV–2 unit 1741 (FIG. 11*g*) where they are inverted and fed by a line 1742 to the #4 tap of the unit 1740. As explained above, space bits are recorded in each of the bit spaces provided therefor on the discs. Since this bit is not utilized for the parity checks which occur in various places throughout the machine, it is desired that data entered into the information transfer circuits, which is taken from the disc unit, be corrected to omit the space bit. Since $b_s$ is inverted by the unit 1741, it will be understood that the #4 tap of the unit 1740 is low only during $b_s$ time. In this way the data taken from the line 1728 appears on the #3 tap of the unit 1740 without a space bit.

This data is taken from the #3 tap of the unit 1740 by a line 1743 to the #6 tap of a CD–1 unit 1744 (FIG. 11*h*), the #3 and #10 taps of which are connected to the line 800. The #4 tap of the unit 1744 is up when $T_1=R$, since it is connected to the line 340 (FIG. 17), and in this condition it will be clear that the data from the discs is entered on the line 800 (FIG. 11*h*) which, it will be recalled, is connected to the #9 tap of the DA unit 802 (FIG. 11*a*). This data is mixed with phase B clock pulses taken from the line 978 and with the $E_1$ cycle gate, which are applied to the #7 and #8 taps, respectively, of the unit 802, as described earlier. Thus, when $T_1=R$, the disc data passes through the unit 802 to the core buffer, as described above in connection with data flow within the processing unit, for the duration of the $E_1$ cycle gate. Since the discs and process drum are not operated in synchronism, however, the gate necessary to gate data from the disc unit into the cores is different from the gate formed as described earlier.

It will be recalled that the $E_1$ cycle gate line 861 connected to the #10 tap of the PCF–1 unit 860 (FIG. 11*k*) is high during an $E_1$ cycle gate. The line 1673 (FIG. 14*e*) from which the $E_1$ disc gate pulse is taken is connected to the #8 tap of a CD–2 unit 1745 (FIG. 11*k*), the #4 and #5 taps of which are connected to the $E_1$ gate line 825. Thus, on an $E_1$ gate the #10 tap of the unit 1745 rises for the duration of the $E_1$ disc gate which occurs, as will be recalled, only when $T_1=R$. When $T_1=R$, therefore, the $E_1$ cycle gate described previously is replaced by the $E_1$ disc gate and is taken from the same line 861. Referring back to FIG. 11*a*, the $E_1$ disc gate is applied, therefore, to the #8 tap of the DA unit 802. Thus, the data read from the discs passes through the unit 802 to the line 979 from where it is taken and entered into the core buffer, and since the $E_1$ disc gate is terminated after 100 characters have been entered into the buffer, only one complete 100-character record passes through the unit 802 to the core buffer.

On the next following $E_2$ cycle, data from the single character register of the core buffer is taken by the line 1429*a* to the #8 tap of the CD–2 unit 1575 (FIG. 11*h*), as described earlier, where it is mixed with an $E_2$ cycle gate. As on an $E_1$ cycle, the $E_2$ cycle gate is replaced by the $E_2$ disc gate when $T_2=R$. (It should be noted that if $T_2$ is equal to one of the tracks of the process drum, the ordinary $E_2$ cycle gate described previously gates this data into the information transfer circuits in the manner described earlier.) The line 1686 (FIG. 14*e*) from which the $E_2$ disc gate pulse is taken is connected to the #8 tap of a CD–2 unit 1747 (FIG. 11*k*), the #5 and #4 taps of which are connected to the $E_2$ gate line 1410*a*. Thus, on an $E_2$ gate when $T_2=R$, the $E_2$ disc gate is connected to the line 975 (FIG. 11*b*). This line is connected to the #5 tap of the CD–2 unit 1575 (FIG. 11*h*), and data from the single character register is gated by the $E_2$ disc gate to the line 1576.

It will be recalled that if $q\neq c$ data taken from the line 1576 (FIG. 11*h*) passes through the unit 1577 (FIG. 11*g*), through the line 1578, through the INV–3 unit 1579 and through the line 1581 to the #4 tap of the PCF–3 unit 1580. The #3 tap of the unit 1580 is connected by the line 1582 to the #7 tap of a DA unit 1748 (FIG. 11*h*) where it is mixed with phase B clock pulses taken from the line 978 connected to the #8 tap of this unit. Thus, phase B data pulses taken from the #3 tap of the unit 1748 are connected by a line 1749 through an INV–3 unit 1750, through a line 1751 and through the PCF–1 unit 982 (FIG. 11*b*) to a line 1753 which is connected to the #6 tap of a CD–2 unit 1754 (FIG. 14*f*), where it is mixed with the $E_2$ disc gate. Also, since the #8 tap of the unit 1754 is connected to the line 1414, $b_s$ phase B pulses are mixed with the $E_2$ data going to the discs, and data together with the inserted space bits is taken via a line 1755, through an INV–2 unit 1756, a line 1757, a PCF–3 unit 1758 to a line 1759 which is connected to the disc write amplifier (not shown). This data is gated, by means not shown, by the pulse taken from the line 1733 (FIG. 14*e*) which, it will be recalled, is up during the appropriate sector time. Thus, on an $E_2$ gate when $T_2=R$, data taken from the line 1759 is recorded in the appropriate sector of the disc and track determined by the address in the address buffer.

It was mentioned earlier that when $q=c$, the machine is controlled to compare the data recorded on the $T_2$ track with the data recorded on the $T_1$ track. When $q=c$, the machine is arranged to take $E_1$ and $E_2$ cycles; and during the $E_1$ cycle the data is read from the $T_1$ address and is entered into the cores in the normal fashion. During the $E_2$ cycle, however, the data taken from the cores is compared with the data being read at this time from the $T_2$ track. If there is any difference existing between these two data sets, an indication thereof is given, as will become clear.

On an $E_2$ cycle data from the cores is taken from the line 1576 (FIG. 11*h*), as described above, which is connected to the #5 tap of an INV–2 unit 1760 (FIG. 11*i*) as well as to the #8 tap of a CD–1 unit 1761, the latter of which is arranged to make the aforementioned comparison. The data read from the $T_2$ address during the $E_2$ cycle appears on a line 1762 which is connected to the #4 tap of the unit 1760 and to the #6 tap of the unit 1761. It will be recalled that disc data which has had the space bit removed therefrom is taken from the #3 tap of the unit 1740 (FIG. 11*g*). This data is entered on the #4 tap of a CD–2 unit 1763 since this tap is connected to the #3 tap of the unit 1740 by the line 1743. The #6 tap of the unit 1763 is high when $T_2=R$ (it being connected to the line 336), and under these conditions $T_2$ data from the discs passes through the unit 1763 to the line 1762. Similarly, data from the P track of the input-output drum is entered on the #5 tap of the unit 1763 where it is mixed with a $T_2=P$ signal, and when $T_2=P$ this data appears on the line 1762.

It should also be noted here that data from the $T_2$ read amplifier is applied to the #5 and #8 taps of a CD–2 unit 1764 (FIG. 11*g*) via a line 1765. When $T_2$ is equal to something other than P, R, L or M, the data from the $T_2$ read amplifier passes through the unit 1764 to the line 1762. Thus, $T_2$ data, positive in form, is connected to the #6 tap of the unit 1761 (FIG. 11*i*), and $T_2$ data, negative in form, is applied to the #5 tap of this unit since this data is inverted by the INV–2 unit 1760. Similarly, the $T_1$ data taken from the cores and connected to the #8 tap of the unit 1761 is positive in form, the $T_1$ data taken from the #10 tap of the unit 1760 and applied to the #4 tap of the unit 1761 being negative in form. Thus, positive $T_1$ data is mixed with negative $T_2$ data on the #8 and #5 taps, respectively, of the unit 1761, and negative $T_1$ data is mixed with positive $T_2$ data on the #4 and #6 taps, respectively, of this unit, and whenever the #5 and #8 taps or the #4 and #6 taps are both up, the #3 and #10 taps of the unit 1761 rise and thereby indicate that the comparison between the $T_1$ and $T_2$ data has failed.

These taps are connected by a line 1766 to the #10 tap of a DA unit 1767. The #8 tap of the unit 1767 is connected to the line 978 from which phase B clock pulses corresponding to the $T_2$ address are taken, and the #7 tap is connected to the $E_2$ cycle gate line 975.

The #9 tap of the unit 1767 is connected by a line 1768 to the #10 tap of a CF–1 unit 1769 (FIG. 11*h*), which tap is high whenever the #5 tap thereof is high, i.e., when $q=c$, since it is connected to the line 333 (FIG. 17). Thus, on a compare operation, i.e., when $q=c$, the #9 tap of the DA unit 1767 (FIG. 11*i*) is high, and during the $E_2$ cycle gate (or the $E_2$ disc gate in the case where $T_2=R$) phase B clock pulses pass through the DA unit 1767 to a line 1770 only if there is a failure in the comparison being made, as explained. The line 1770 is connected to the #8 tap of a THY–1 unit 1771 (FIG. 14*h*), the #4 tap of which is grounded. The #6 tap of the unit 1771 is connected by a line 2222 through the parallelly arranged n/o *g* contacts (FIG. 3*a*) of the $p_1$ relay 63 and the n/o *j* contacts of the $I_1$ relay 60 to one side of the n/c *d* contacts of the error relay 64. The other side of the last mentioned contacts is connected through CB–24 to +70 volts. The #5 tap of the unit 1771 is connected through the pick coil of a relay 1772 to ground and it will be clear that this relay is picked during the $I_1$ or $p_1$ cycle following a comparison when the comparison fails.

When $T_2=R$, means are provided for forcing a comparison, i.e., for forcing $q=c$ following the entry of data into the disc unit. It will be recalled that the disc unit is utilized to store semi-permanent records, and it will be understood, therefore, that it is desired that any information entered therein be well checked to thereby preserve an accurate reference file. It is for this reason that the comparison is forced whenever data is recorded in the disc unit. When $T_2=R$, the machine is arranged, as before, to take the normal $E_1$ and $E_2$ cycles to record the data on the discs. Thereafter, a second pair of $E_1$ and $E_2$ cycles are forced to permit the comparison. Means to be described cause the #5 tap of the CF–1 unit 1769 (FIG. 11*h*) to rise at the beginning of the second $E_2$ cycle as well as to cause the #8 and #6 taps of the units 1653 and 1690 (FIG. 14*e*), respectively, to rise at this time, thereby forcing $q=c$.

Figure 14G:
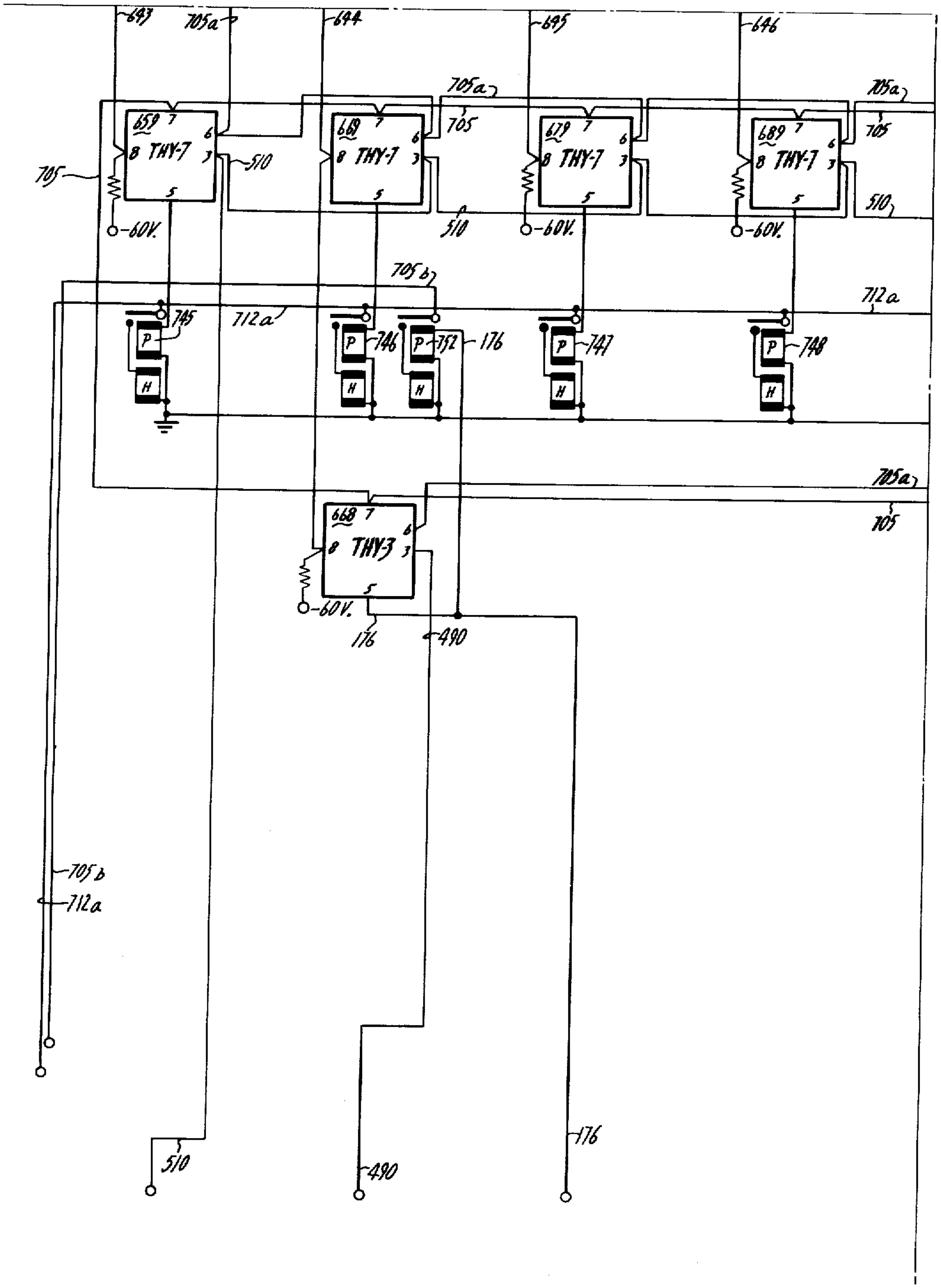
Figure 14H:
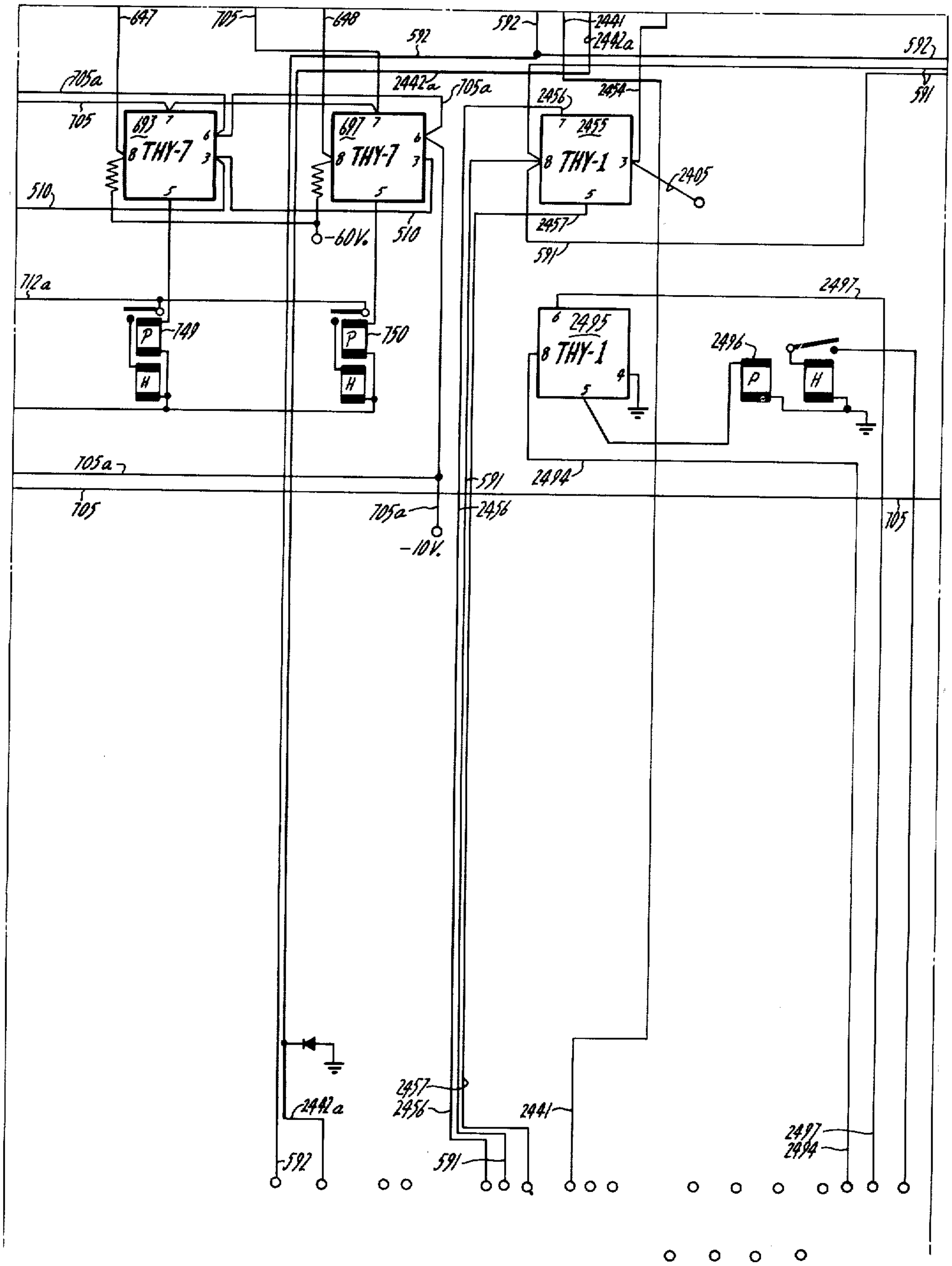
Figure 14I:
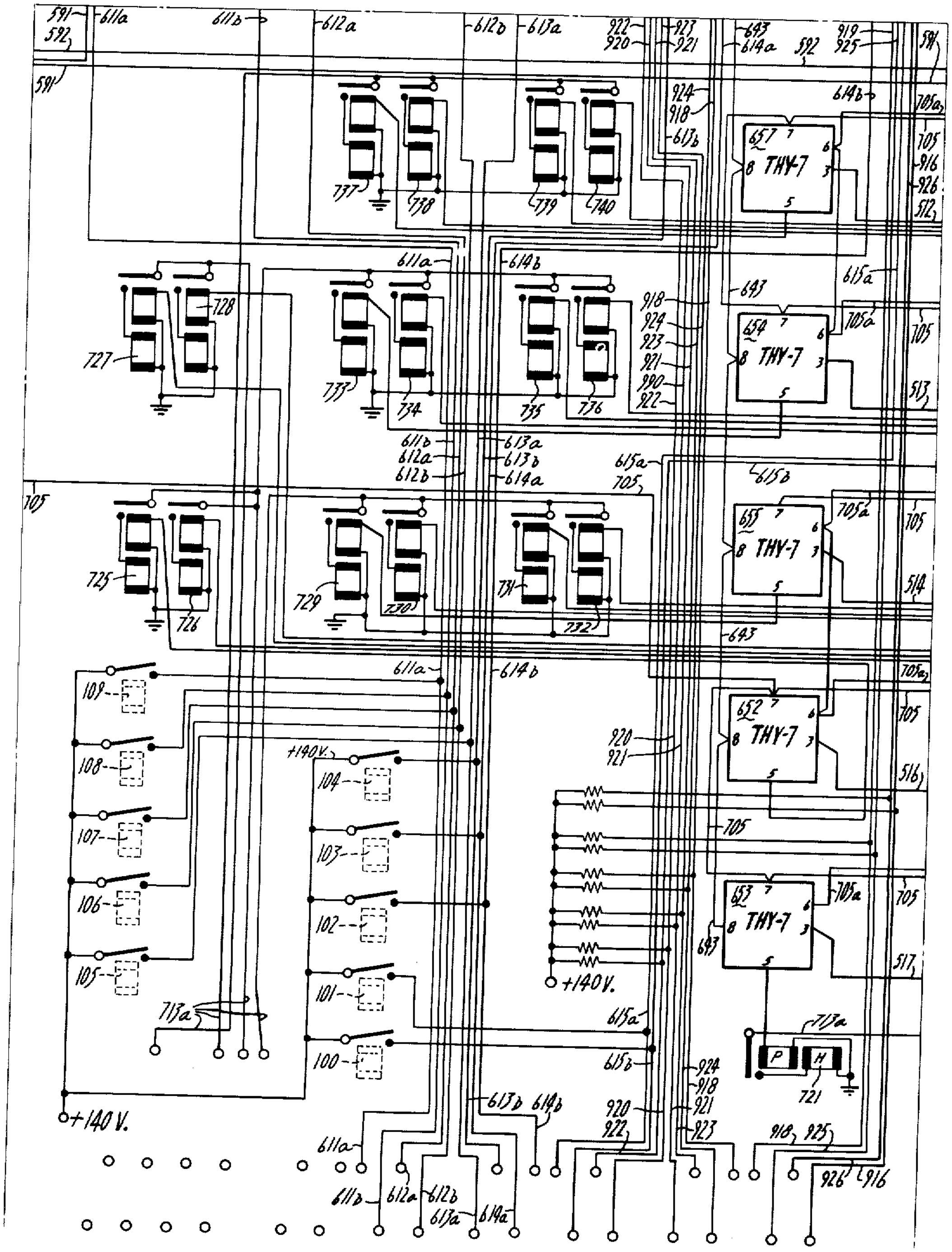
Figure 14J:
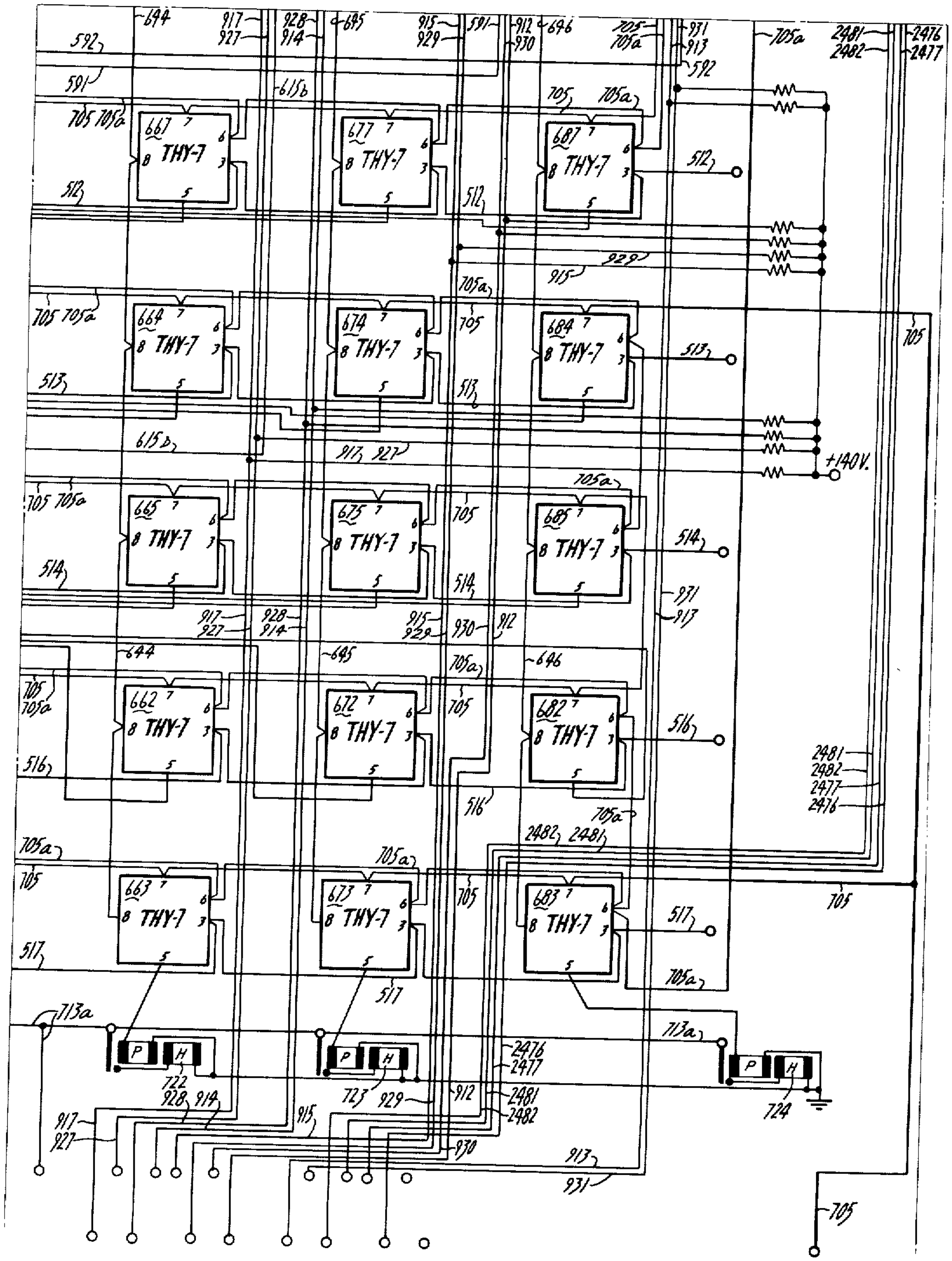

Referring to FIG. 6*a*, it will be seen that when $T_2=R$, the odd pick pulse during the $E_2$ cycle is taken from the line 54 through the n/c *b* contacts of the error relay 46, through the n/c *d* contacts of the error relay 45, through the n/o *b* contacts of the $E_2$ relay 66, through the line 69, through the n/o *e* contacts of the relay 715, through the n/o *d* contacts of the relay 718, through the n/c *e* contacts of the relay 719, through the n/o *e* points of the relay 720, through the n/c *b* points of the relay 752 and through the pick coil of a relay 175 (FIG. 6*b*) to ground, since when $T_2=R$ the *x*, 1 and 8 relays of the $T_2$ portion of the instruction register, i.e., the relays 715, 718 and 720, are picked. The relay 175 is held during the following odd hold pulse since the odd hold line 58 is connected through the n/o *a* points of the relay 175 and through the hold coil of this relay to ground. When the relay 175 picks, its *b* contacts are transferred and the even pick pulse taken from the line 55 is connected therethrough and through the n/o *f* points of the relay 720 to a line 176 which is connected to one side of the pick coil of the relay 752 (FIG. 14*g*). Since the relay 720 is energized when $T_2=R$, it will be clear that the relay 752 is picked by the even pick pulse when $T_2=R$, thereby forcing $q=c$.

When the #8 tap of the ID–2 unit 1653 (FIG. 14*e*) goes up, as it does when $q=c$ since it is connected to the line 333, the sector start pulse passes therethrough to the line 1654 as on an $E_2$ gate, since during this period the sector start pulse taken from the #10 tap of the unit 1649 passes through the unit 1651 to the line 1675. It should also be noted that the #4 tap of the unit 1676 is low when $q=c$, it being connected to the line 342, and therefore that the sector start pulse is not passed therethrough to initiate the $E_2$ disc gate as described previously. The sector start pulse taken from the line 1654 fires the SS unit 1655 which after 100 microseconds turns off the TR–1 unit 1656. The unit 1656 is turned on, as described previously, by the trailing edge of a pulse taken from the SS–2 unit 1664, which pulse is initiated on the leading edge of the first data pulse taken from the disc read amplifier. When the unit 1656 is turned on, the unit 1659 (FIG. 14*f*) is turned off, thereby initiating an $E_1$ disc gate during the second $E_2$ cycle, which gate is terminated as before when the line 1670 connected to the #7 tap of the unit 1659 drops.

The #9 tap of the TR–1 unit 1692 is connected by a line 1692*a* to the #5 tap of the ID–1 unit 1669 (FIG. 14*e*), the #8 tap of the last mentioned unit being connected to the $E_2$ gate line 1410*a*. Since the #9 tap of the unit 1692 (FIG. 14*f*) is normally high, as explained earlier herein, and since it drops momentarily after the 100th character has been read from the core buffer until the following $b_s$ phase B time, at the end of $b_s$ phase B time following the record the #5 tap of the unit 1669 (FIG. 14*e*) rises, and since the #8 tap of the unit 1669 is high at this time, the #3 and #10 taps of the unit 1669 drop, thereby turning on the unit 1659 and terminating the second $E_1$ disc gate.

Data is taken from the input-output drum 10*a* into the machine of the invention When $T_1=S$, and also data is read onto the output track of the drum 10*a* from the information transfer circuits when $T_2=P$. Data flow to or from the drum 10*a* is under the control of the clock tract $CT_1$ which is arranged to provide 800 clock pulses corresponding to the 800 bit positions arranged around the various tracks of this drum per revolution, in addition to a single pulse per revolution which is referred to as the reference mark and which defines the beginning of the data recorded on the various tracks. When $T_1=S$, data from the input track S or S′ is gated by a pulse referred to as the $E_1$ drum gate which rises with the reference mark and which terminates after 100 characters have been entered into the core buffer. Similarly, data is gated onto the output track P when $T_2=P$ under the control of a pulse referred to as the $E_2$ drum gate which is initiated by the reference mark and is terminated after 100 characters have been read from the core buffer. The circuitry for the creation of these gates may be of conventional design and is not included in the detailed description of the present machine, it being deemed sufficient to understand only that these gates are initiated by the reference mark during an $E_1$ or $E_2$ gate when $T_1=S$ or $T_2=P$, respectively, and that they terminate 100 characters later, i.e., when the line 952 taken from the tenth stage of the tens portion 1221 of the address counter of the core buffer drops.

As was the case when $T_1=R$ or when $T_2=R$, the $E_1$ and $E_2$ cycle gates are replaced by the $E_1$ drum gate and the $E_2$ drum gate, respectively, due to the fact that the input-output drum is not operated in synchronism with the other magnetic recording apparatus. Thus, when $T_1=S$, a line 1775 from which the $E_1$ drum gate is taken and which is connected to the #6 tap of the CD–2 unit 1745 (FIG. 11*k*) rises for the duration of this gate. Since the #4 tap of the unit 1745 is high on an $E_1$ gate, the #3 tap thereof rises for the duration of the $E_1$ drum gate, thereby controlling the line 861 to rise for this period. Similarly, when $T_2=P$, a line 1776 from which the $E_2$ drum gate is taken rises. This line is connected to the #6 tap of the CD–2 unit 1747, the #4 tap of which is connected to the $E_2$ gate. Thus, on an $E_2$ gate the $E_2$ drum gate is taken from the #3 tap of the unit 1747 and thus appears on and is taken from the line 975 connected to the #3 tap of the PCF–1 unit 860. It is in this manner, therefore, that the $E_1$ and $E_2$ cycle gates are replaced by the appropriate input-output drum gates, and data flow to and from the core buffer, as well as the flow of $CT_1$ clock pulses to the core buffer, is under the control of these gates when $T_1=S$ or $T_2=P$.

It should also be noted at this time that data from either input track of the input-output drum is entered into the information transfer circuits by the line 16 connected to the #5 tap of the CD–2 unit 1763 (FIG. 11*g*), as well as to the #8 tap of the CD–1 unit 1744 (FIG. 11*h*). Thus, when $T_1=S$, input data is connected to the line 800 for entry into the core buffer in the manner explained earlier.

As mentioned earlier, when $T_1=S$ or $R$ or when $T_2=P$ or $R$, the $E_1$ or $E_2$ cycle, respectively, is extended since the various magnetic units utilized herein are not in synchronism. Assuming first that $T_1=S$ or $R$, the normal $I_1$ and $I_2$ cycles are taken and on the $E_1$ cycle, when the n/o *c* contacts of the $E_1$ relay 65 (FIG. 3*b*) are transferred, the #3 tap of the KS unit 810 (FIG. 11*i*) rises, thereby raising the potential of the #5 tap of the ID–1 unit 813 (FIG. 11*j*), and when the process drum even home pulse is applied to the #8 tap of the unit 813, the trigger 822 (FIG. 11*i*), which defines the $E_1$ gate, is turned on, thereby initiating the $E_1$ gate. Since the trigger 822 is not turned off until the end of the $E_1$ disc gate when $T_1=R$ or until the end of the $E_1$ drum gate when $T_1=S$, it will be clear that the $E_1$ gate is not terminated until data transfer from the drum 10*a* or from the discs R has been completed. The $E_2$ gate is initiated in the normal manner, i.e., by the process drum odd home pulse occurring during the $E_2$ cycle, and at this time the trigger 1492 (FIG. 11*j*) is turned on (this is true even though the $E_1$ gate still exists) and, like the $E_1$ gate, the $E_2$ gate is not terminated until the end of the $E_2$ disc gate when $T_2=R$ or until the end of the $E_2$ drum gate when $T_2=P$. It should also be clear that when $T\neq R$ or $P$ the $E_2$ gate is terminated at the end of the $E_2$ cycle gate in the normal fashion described earlier.

It will be recalled that the relay 50 (FIG. 4*b*) normally is picked by an even CB pulse following the energization of the relay 38 and that it is held until $T_1=R$ or $S$. When $T_1=R$ or $S$, the relay 50 drops out during the $I_2$ cycle since the circuit from the line 36 to the pick coil thereof is opened as explained hereinbefore. It will also be recalled that the relay 40 drops out when the relay 38 picks. The pick coil of the relay 51 is connected between ground and through the n/c *e* contacts of the relay 40, through the n/c *e* contacts of the relay 50 to the line 41, and when the relays 40 and 50 are both deenergized, it will be clear that the relay 51 is picked by the next odd CB pulse following their deenergization. The relay 51 is then held until either the relay 40 or the relay 50 is energized and when the relay 51 picks, the even hold line 57 (FIG. 3*a*) is connected through both CB–3 and CB–4 to +48 volts, thereby putting both odd and even CB pulses on the line 57 until the relay 51 drops out.

Referring now to FIG. 6*b*, it will be seen that when the $E_2$ relay 66 picks it is held by both odd and even CB pulses as long as the relay 51 is picked, since the even hold line 57 is connected through the n/o *a* contacts of the relay 66 and through the hold coil of this relay to ground. Thus, when $T_1=R$ or $S$, the $I_1$, $I_2$, $E_1$ and $E_2$ relays are picked in their normal sequence; however, the $E_2$ relay is held until the end of the odd CB pulse after the relay 51 drops out since after this time only odd CB pulses appear on the line 57. As will become clear, this occurs at the end of the $E_1$ gate since at this time the relay 50 (FIG. 4*b*) is picked.

Figure 4B:
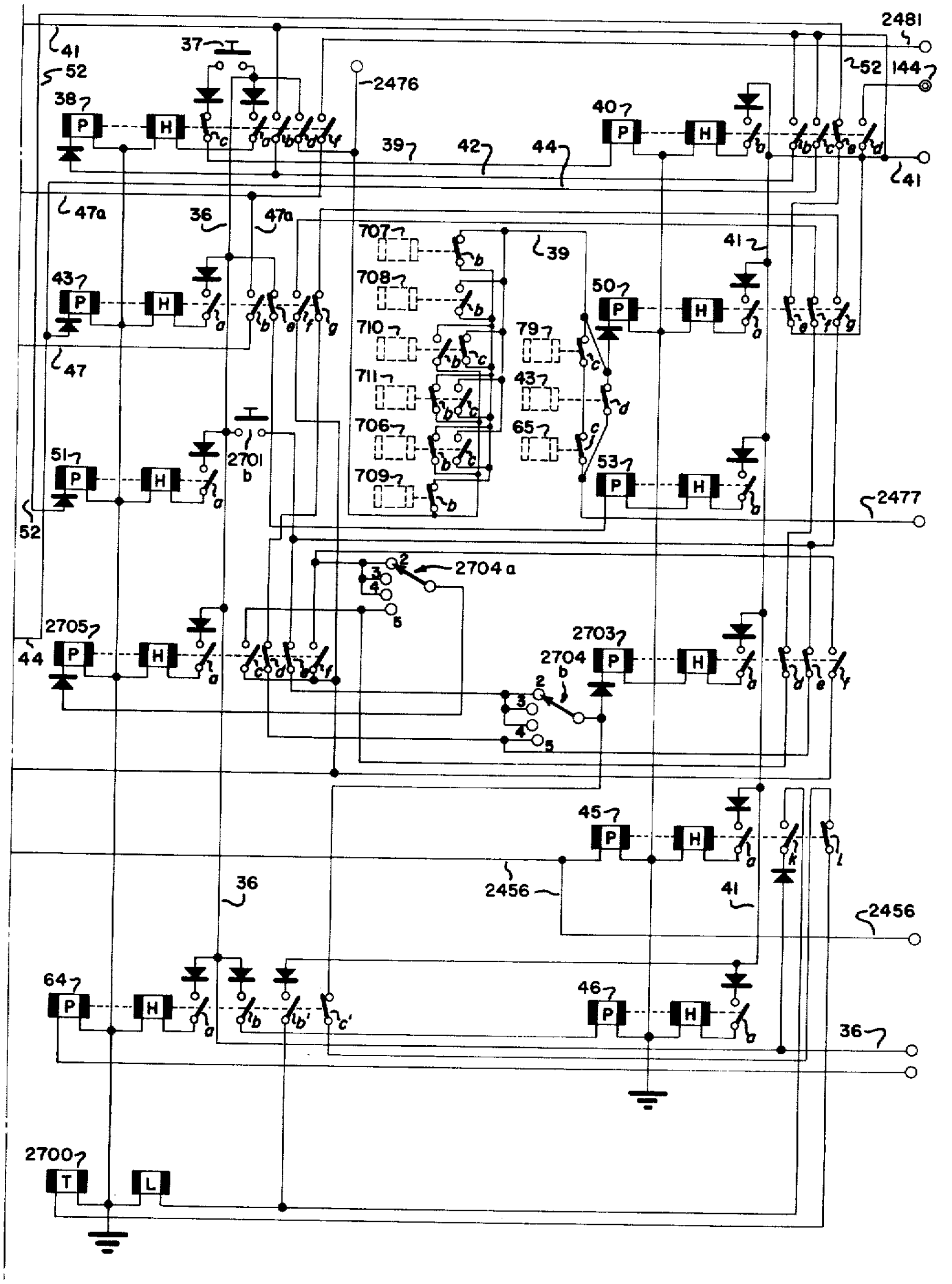
Figure 5:
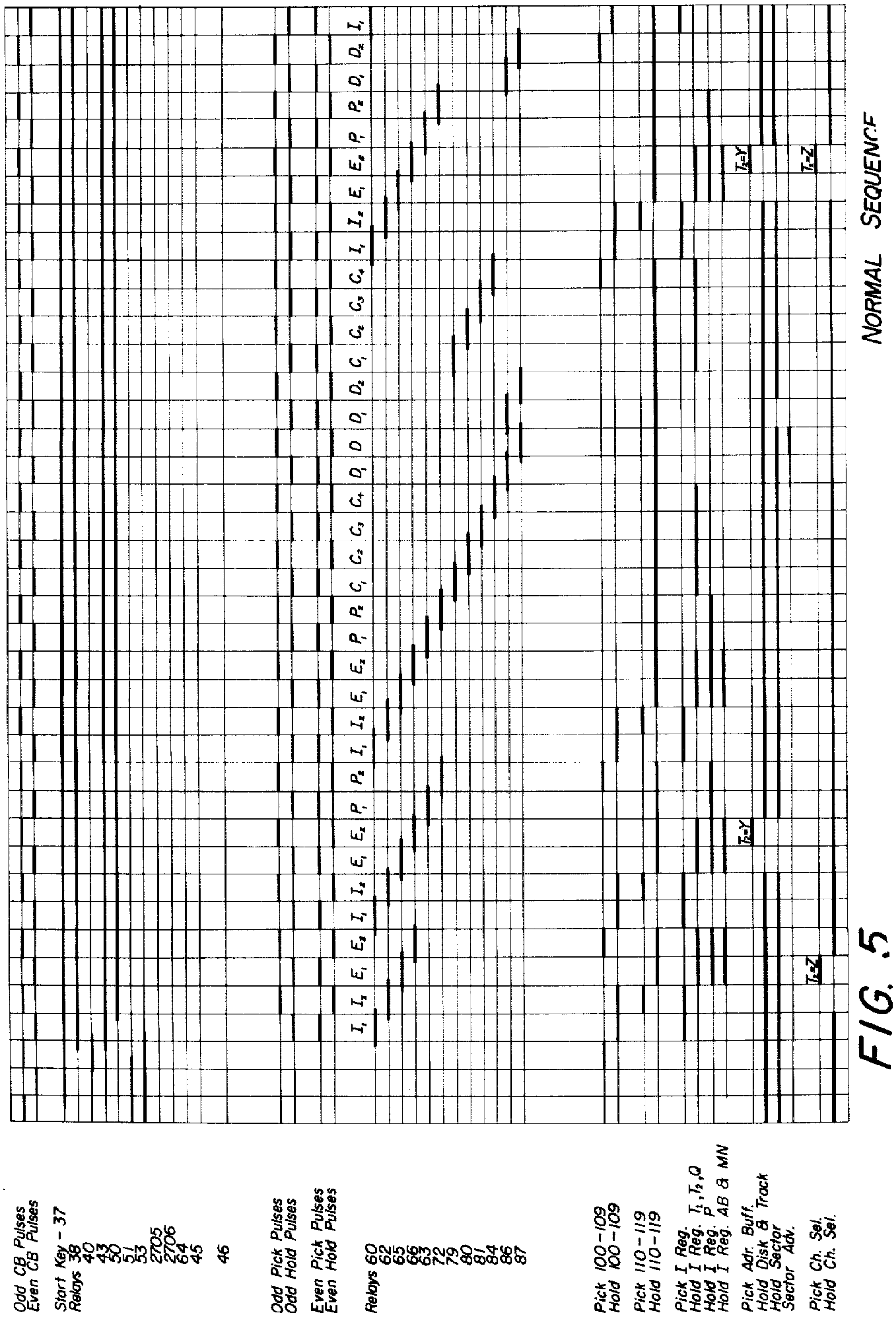

The $E_1$ gate line 825 is connected to the #4 tap of a CF–2 unit 2470 (FIG. 11*i*), the #3 tap of which is connected by a line 2471 to the #4 tap of an INV–2 unit 2472 (FIG. 14*d*). The #3 tap of the unit 2472 is connected through a CF–2 unit 2473 and through a line 2474 to the #8 tap of a THY–1 unit 2475. The #4 tap of the unit 2475 is grounded and the #6 tap thereof is connected by a line 2476 to one side of the n/o *d* contacts of the relay 38 (FIG. 4*b*). Since the line 2471 (FIG. 14*d*) is high throughout the $E_1$ gate, it will be clear that the line 2474 is low during this period; however, at the end of the $E_1$ gate the line 2474 rises, thereby raising the potential of the #8 tap of the THY–1 unit 2475. Since the #5 tap of the unit 2475 is connected by a line 2477 through the n/c *c* contacts of the $E_1$ relay 65 (FIG. 4*b*) and through the n/c *c* contacts of the $C_1$ relay 79 to one side of the pick coil of the relay 50, it will be seen that the relay 50 is picked by the even CB pulse occurring after termination of the $E_1$ gate and, as explained above, the relay 51 drops out at this time since the *e* contacts of the relay 50 are opened. Thus, at the end of the $E_1$ gate the even hold line 57 is no longer connected to even CB pulses, thereby permitting the $E_2$ relay 66 (FIG. 6*b*) to drop out. When $T_1=S$ or $R$, therefore, the $E_2$ relay 66 is held by even CB pulses until the relay 51 picks, i.e., until the end of the $E_1$ gate, and the odd CB pulse following the end of the $E_1$ gate holds the $E_2$ relay 66 which defines the $E_2$ cycle at this time. The timing diagram for the above defined sequence is shown in FIG. 37.

When $T_2=P$, $X$ or $R$, the relay 43 (FIG. 4*b*) drops out at the end of the even CB pulse following the $I_2$ cycle since at this time the circuit between the pick coil of the relay 43 and the line 41 is opened, as explained earlier. When the relay 43 drops, a CB–2 pulse is connected through the n/c *e* contacts thereof via the line 36 to one side of the pick coil of the relay 53, thereby picking this relay. The relay 53, therefore, remains energized until the relay 43 is again picked, since as long as the relay 43 is deenergized the relay 53 is held by odd and even CB pulses. When and as long as the relay 53 is picked, the odd hold line 58 (FIG. 3*a*) is connected through both CB–3 and CB–4 to +48 volts, thereby subjecting the line 58 to both odd and even CB pulses for this period.

Referring now to FIG. 6*b*, when the $E_2$ relay 66 picks, its *b* contacts (FIG. 6*a*) are transferred and the odd pick pulse taken from the line 54 through the *b* contacts of the error relay 46 and through the *d* contacts of the error relay 45 to the line 67 is connected therethrough and through the points of the various $T_2$ relays to the line 68 as long as $T_2\neq R$. Assuming that the *p* column of the instruction is blank, this pulse is connected through the various *p* relays and through the pick coil of the $I_1$ relay 60 to ground, thereby energizing the $I_1$ relay. Thus, when $T_2=P$ or $X$, the $I_1$ relay 60 is picked and held by both odd and even CB pulses taken from the line 58 until the relay 53 drops out. When $T_2=R$, however, the odd pick pulse is connected, as described above, through the n/o *b* contacts of the $E_2$ relay 66, through the line 69, through the n/o *e* contacts of the relay 715, through the n/o *d* contacts of the relay 718, through the n/c *e* contacts of the relay 719, through the n/o *e* contacts of the relay 720, through the n/c *b* contacts of the relay 752 and through the pick coil of the $E_1$ relay 65 (FIG. 6*b*) to ground, thereby energizing this relay. Since the odd hold line 58 is connected through the n/o *a* contacts of the relay 65 and through the hold coil of this relay to ground, it will be clear that when $T_2=R$ the $E_1$ relay 65 is again picked and it is held until the relay 53 drops out.

Assuming now that $T_2=P$ or $X$, the $I_1$ relay 60 is picked the second time in the normal fashion; however, the $I_2$ relay 62 is not picked when the contacts of the $I_1$ relay 60 transfer since the even pick line 55 connected through the n/o *h* contacts of the relay 43 (FIG. 3*a*) to one side of CB–2 is disconnected from the CB–2 pulses until the relay 43 (FIG. 4*b*) is picked again. As will be pointed out, this occurs at the end of the $E_2$ gate. When $T_2=R$, the $E_1$ relay is picked again after the $E_2$ relay is picked, as described above, and the $E_2$ relay 66 is not energized again until the relay 43 picks, which occurs, as mentioned above, at the end of the $E_2$ gate. Thus, when $T_2=R$, the normal sequence of picking the $I_1$, $I_2$, $E_1$ and $E_2$ relays is taken and, in addition, the $E_1$ relay is picked again during $E_2$ and is held until the expiration of the $E_2$ gate, at which time the $E_2$ relay is again picked. Since $q=c$ is forced when $T_2=R$, a second interlock is necessary, and at this time the $I_1$ relay 60 is picked instead of the $E_1$ relay since the *b* contacts of the relay 752 are now opened and since the *c* contacts of this relay are closed. The $I_1$ relay is held in the same manner described above for the $E_1$ relay, i.e., until the relay 53 drops out, at which time the normal sequence is resumed.

It was mentioned above that the relay 43 picks at the end of the $E_2$ gate. The $E_2$ gate line 1410*a* (FIG. 11*i*) is connected to the #5 tap of the CF–2 unit 2470, the #10 tap of which is connected by a line 2478 to the #5 tap of the INV–2 unit 2472 (FIG. 14*d*). The #10 tap of the unit 2472 is connected through the unit 2473 and through a line 2479 to the #8 tap of a THY–1 unit 2480, the #4 tap of which is connected to ground. The #6 tap of the unit 2480 is connected via a line 2481, through the n/o *f* contacts of the relay 38 (FIG. 4*b*) and through the armature and #2 contact of the switch 48 (FIG. 4*a*) to the odd CB line 41, and since the #5 tap of the unit 2480 (FIG. 14*d*) is connected by a line 2482, through the n/c *d* contacts of the $E_2$ relay 66 (FIG. 4*a*), through the n/c *d* contacts of the $C_2$ relay 80, through the n/c *c* contacts of the error relay 46, through the n/c *c* contacts of the error relay 45 and through the pick coil of the relay 43 to ground, it will be clear that the odd CB pulse, which occurs after the line 2474 connected to the #8 tap of the unit 2475 (FIG. 14*d*) rises, picks the relay 43 (FIG. 4*b*). Since the line 2478 connected to the #5 tap of the unit 2472 (FIG. 14*d*) rises for the duration of the $E_2$ gate, it will be clear that the line 2479 rises at the end of the $E_2$ gate, thereby controlling the relay 43 (FIG. 4*b*) to be picked at this time and controlling the $I_1$ cycle to terminate at the expiration of the even CB pulse following the energization of the relay 43 when $T_2=X$ or $P$ or controlling the $E_1$ cycle to terminate at the expiration of the even CB pulse following the energization of the relay 43 when $T_2=R$. Thus, the machine is thrown in an interlocked condition when $T_1=S$ or $R$ or when $T_2=P$, $X$ or $R$, thereby interrupting the normal sequence until the expiration of the $E_1$ or $E_2$ gate, whichever is appropriate, at which time the normal operating sequence is resumed.

Arithmetic operations in the present machine are accomplished under the control of suitable instructions. These operations include addition, subtraction and multiplication. It will be recalled that a track of the process drum 25 is utilized to provide 10 ten-digit accumulators. These accumulators are defined by character positions 00 through 09, 10 through 19, etc., and are identified as accumulators 0 through 9, respectively. All data transferred under the control of an instruction to a given accumulator is first transferred through an adder together with the data presently recorded in that accumulator, and the algebraic sum is entered into the accumulator. Thus, assuming that accumulator 6 is empty and, further, that it is desired to add the number stored in positions $C_4$ through $C_0$ of $F_2$ on storage track B to the number stored in positions $C_8$ through $C_3$ of $F_7$ on storage track C in accumulator 6, the first of the two instructions necessary to accomplish this addition would be B24 L69 05. This instruction causes the augend to be added to the number stored in the first five positions of the accumulator (in this case it is added to zero since accumulator 6 is empty) and enters the sum into accumulator 6. The next instruction, C78 L69 06, causes the addend to be added to the augend taken from the accumulator track and enters the sum into accumulator 6 from where it may be taken by an instruction such as L69 A49 10. It should be noted that when $T_1=L$, the accumulator defined by $a_1b_1$ and $mn$ is read from and that the data recorded thereon is left intact for future use. When it is desired to read out and reset an accumulator to zero, an instruction where $T_1=M$ is utilized. Subtraction is accomplished by letting $T_2$ equal M, and since the machine is arranged to perform algebraic addition, the instruction $T_2=M$ merely causes the sign of the addend to be changed.

Multiplication is accomplished by successive addition and requires two instructions. The multiplicand is first written ten times on a track provided therefor on the process drum, which track is referred to as the multiplicand track. This is accomplished by an instruction such as C25 N99 06, which, in this example, enters the six-digit number taken from positions $C_{25}$ through $C_{20}$ of track C into the positions $C_9$ through $C_4$ of each of the ten fields $F_9$ through $F_0$ of the multiplicand track. Another instruction is then arranged to enter the multiplier into the core buffer from where it is taken one character at a time to control the successive addition of the multiplicand in the adder. Such an instruction might be A36 X – – 03. The multiplicand is summed in accumulators 0 and 1, i.e., $F_0$ and $F_1$ of the accumulator track, a number of times specified by each multiplier digit, the sum corresponding to each of the multiplier digits being shifted one place to the right to provide for successive addition of the higher orders.

The adder utilized herein is a single position, full binary adder having three inputs, i.e., A, B and carry, and two outputs, i.e., sum and carry. Numbers are carried in binary coded decimal form, and for this reason means are provided to insert a carry in the next higher order digit whenever the sum is greater than 9. However, since a carry of this sort has the effect of carry 16 and since it is desired to carry only 10, a 6 must be added to the sum in the form of a correction. Thus, one rule built into the operation of the arithmetic circuitry requires that whenever there is a carry during the addition of "8" bits or whenever the sum contains an "8" bit and a "4" bit and/or a "2" bit, a carry is inserted during $B_1$ time of the next higher order character. Additionally, the sum of the present order is corrected by adding 6.

Subtraction is accomplished by complement addition. Negative numbers are carried in the accumulator in tens complement form and the subtrahend is converted to tens complement form, if negative. The conversion to tens complement form is accomplished by first converting the actual data to fifteens complement form. This is accomplished merely by inverting the true data signals. The data is then converted to its nines complement either by subtracting 6 therefrom or, as in the present embodiment, by adding 10 thereto. The tens complement of the digit is then obtained by adding a "1" bit in the low order position of the number.

When, after summation, there is a carry, it is, as before, necessary to add 6 (or subtract 10) to put the number in decimal form. Under these circumstances no correction other than the +1 correction is necessary since the $(+6)+(-6)$ or $(-10)+(+10)$ equals no correction. It may now be said that on a complement add, i.e., where the subtrahend is negative as is the case where a positive subtrahend is to be subtracted or a negative subtrahend is to be added, a +1 correction is always inserted in one input of the adder at $B_1$ time of the low order digit of the subtrahend and a +10 correction is necessary only if the sum does not exceed 9.

As will become clear, means are provided for indicating the conditions of the various accumulators, i.e., whether they are empty or whether the number stored therein is positive or negative, and the condition of an accumulator after an operation wherein it is involved is determined by the following rules. If the operation performed is true add and the prior accumulator sign is "+," the new accumulator sign is "+." If the prior accumulator sign had been "–," however, and there was no decimal carry from the high order addition, the new accumulator sign is "–." If there is a decimal carry out of the high order position, the new accumulator sign is "+." If on true add and the prior accumulator sign is "+," a decimal carry out of the high order position indicates an overflow of that accumulator (it should be noted that where the prior accumulator sign is "–," it is impossible to overflow). On complement add where the prior accumulator sign is "+," no decimal carry out of the high order position indicates that the new accumulator sign is "—." Additionally, a decimal carry out of the high order position indicates that the new accumulator sign is "+." (It should be noted that where the prior accumulator sign is "+," it is impossible to overflow on a complement add operation.) Also on a complement add operation, where the prior accumulator sign is "—," the new accumulator sign is "—."

The arithmetic circuitry utilized herein is disclosed in block form in FIG. 29, and it will be noted that the accumulator track 1788 of the process drum 25 is arranged with its read and write heads 1789 and 1790 located one character early and one character late, respectively. The reason for this arrangement will become apparent as the description proceeds. When $T_2=L$ or $M$, $E_2$ data from the core buffer, taken from the line 1582 (FIG. 11*g*), is entered on a line 1791 (FIG. 29) through a gating means 1792, the line 1791 being connected through the complementer 2005 to the A input of the adder 1794. The data on the accumulator track 1788 is read therefrom one character early and is fed by a line 1795 to a one-character delay 1796 from where it is taken by a line 1797 through a gating means 1798 to the B input of the adder. Thus, the addend and augend are entered in timed relation into the adder and the sum is taken therefrom by a line 1799 through a gating means 1800 to the accumulator write head 1790.

There is a one-character delay in the adder and it is therefore necessary to locate the write head of the accumulator one character late to permit recordation of the sum taken from the adder at the proper time. On readout from the accumulator the data taken from the line 1795 is connected through a gating means 1801 to the A input of the adder and the data from the accumulator is thus entered on the line 1802, which line, like the line 1799, is connected to the output of the adder. Thus, also due to the delay within the adder, the read head 1789 of the accumulator is located one character early to permit the data taken from the adder on read-out to be on time. (It should be noted that the data from the accumulator does not pass through the accumulator delay unit 1796 on accumulator read-out.)

When $T_2=X$, the multiplicand is taken from the multiplicand track 1803 by a transducer 1804 through a line 1805 and a gating means 1806 to the line 1791 where it is entered into the A input of the adder. The gating means 1806 is successively under the control of successive multiplier digits each revolution of the process drum and permits the multiplicand to pass therethrough a number of times equal to each multiplier digit each drum revolution. Each field of the multiplicand track to pass through the adder 1794 is taken by the line 1799 to the write head 1807 of a partial product track 1808 provided on the drum 25. Due to the one-character delay in the adder, the read head 1809 associated with the partial product track is located nine characters beyond the write head so that data read therefrom is one field late. (It should be noted that a permanent magnet erase head 1810 is provided to erase all data from the partial product track after it has passed the read head 1809.) Thus, data taken from the multiplicand track through the adder and onto the partial product track is read therefrom by the transducer 1809 and through a line 1811 and a gating means 1812 to the B input of the adder one field time later. In this way, successive fields of the multiplicand track are added together a number of times equal to the multiplier digit.

During $F_8$ time only, a gating means 1813 is operative to gate partial products corresponding to prior multiplier digits previously recorded in accumulators 0 and 1 onto the accumulator track for re-recordation. Since this data is read one character time early, the data recorded in $F_1C_8$ through $F_0C_9$ is entered into the delay unit 1796 during $F_1$ time. Further, due to the one-character delay provided by the unit 1796 and due also to the fact that the head 1790 is displaced one character late, the data taken therefrom through the line 1797 and through the gating means 1813 to the write head 1790 of the accumulator is on time and is therefore written wholly within accumulator 8. In this way, the partial product corresponding to each multiplier digit is shifted one place prior to the addition thereto of the partial product corresponding to the next successive multiplier digit, thereby accomplishing column shift.

During $F_0$ time the partial product relating to a given multiplier digit is taken from the partial product read head 1809 and is entered into the B input of the adder. Also at this time the final partial product associated with prior multiplier digits is taken from the accumulator track through the line 1795 and the gating means 1801 to the A input of the adder. The two final partial products are thus added, the column shift having been accomplished as above described, and the sum thereof is entered into accumulators 0 and 1. Read-out of the product from accumulators 0 and 1 is accomplished in the same manner as in the case of addition.

Figure 20B:
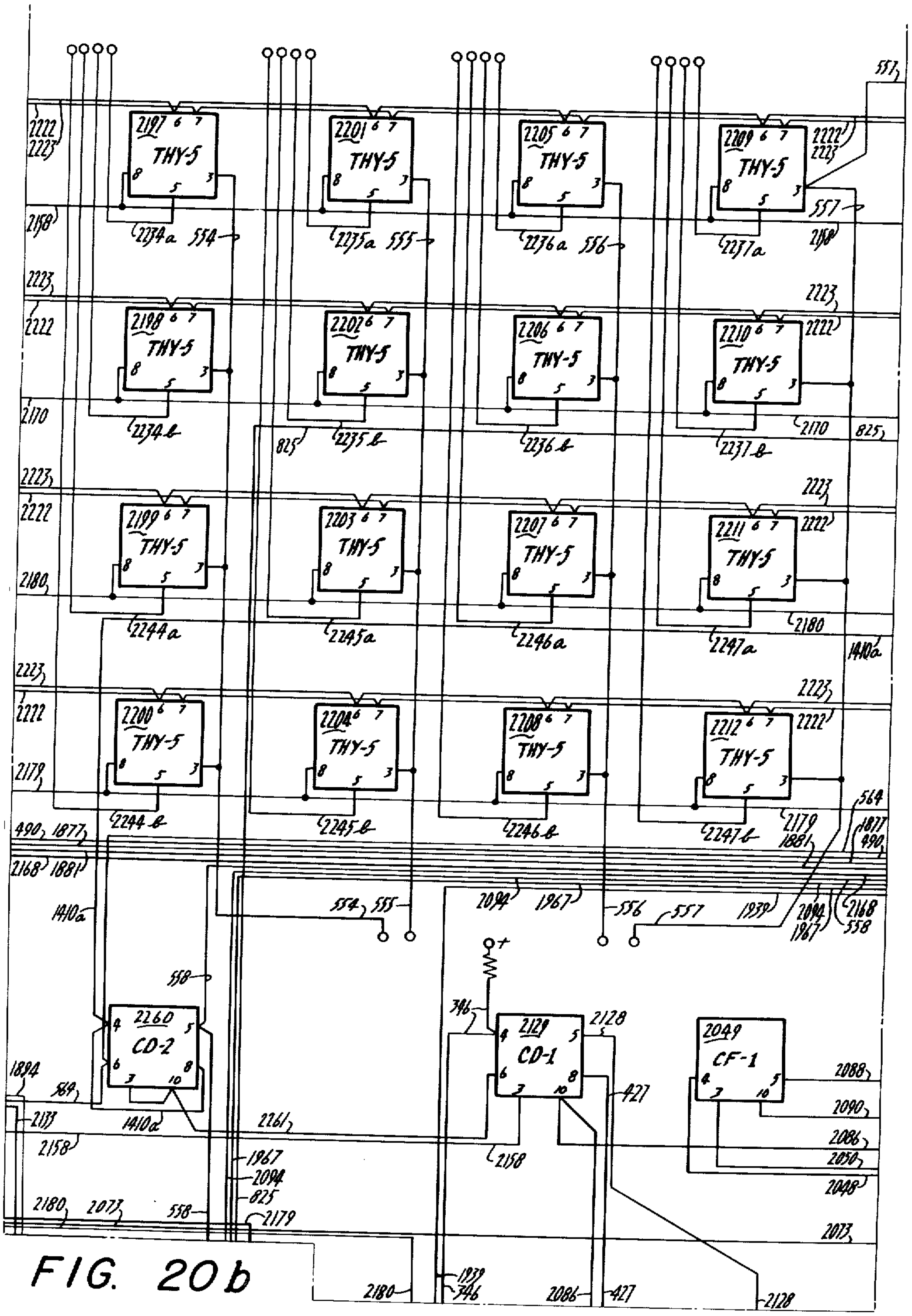
Figure 20C:
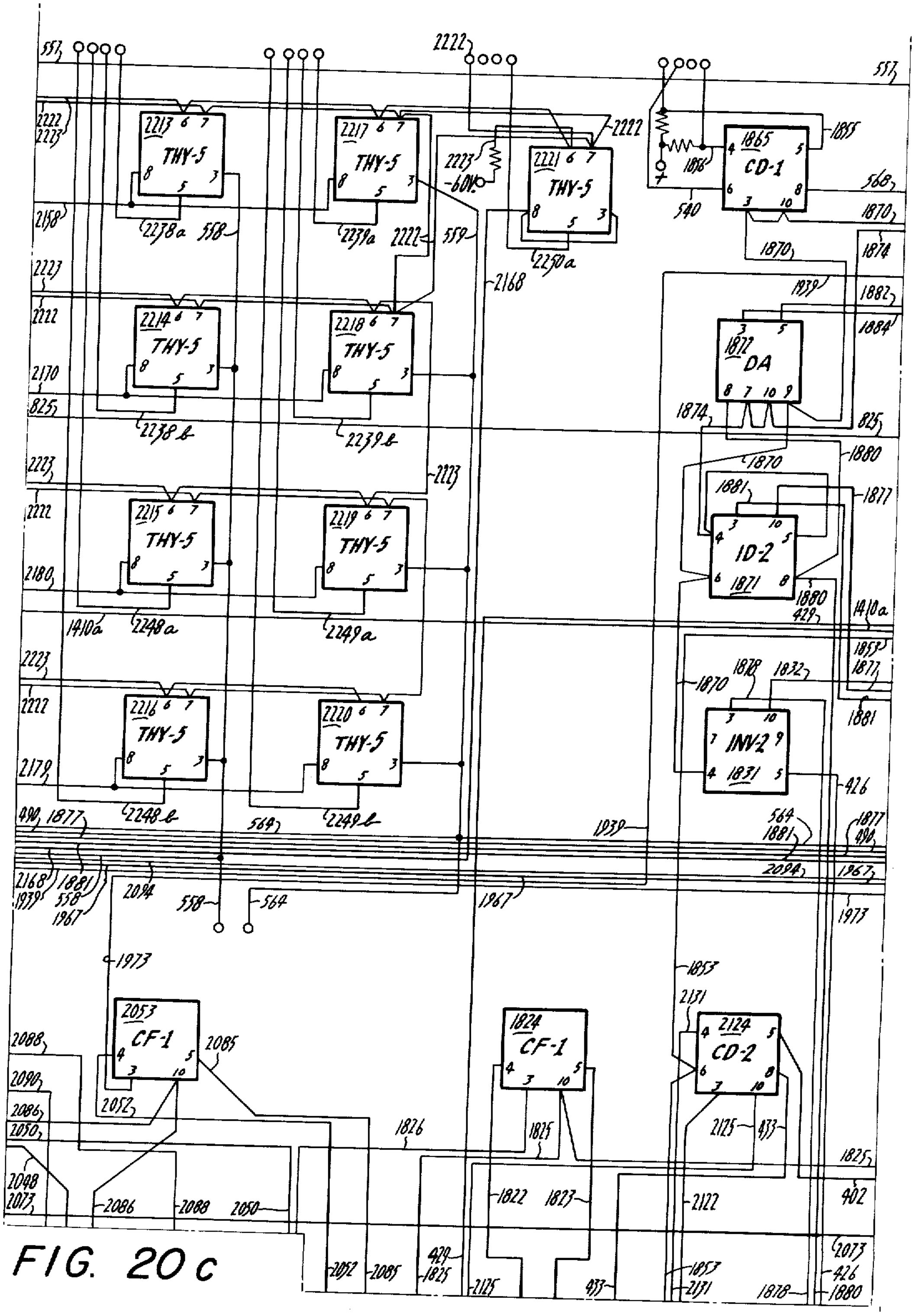
Figure 20D:
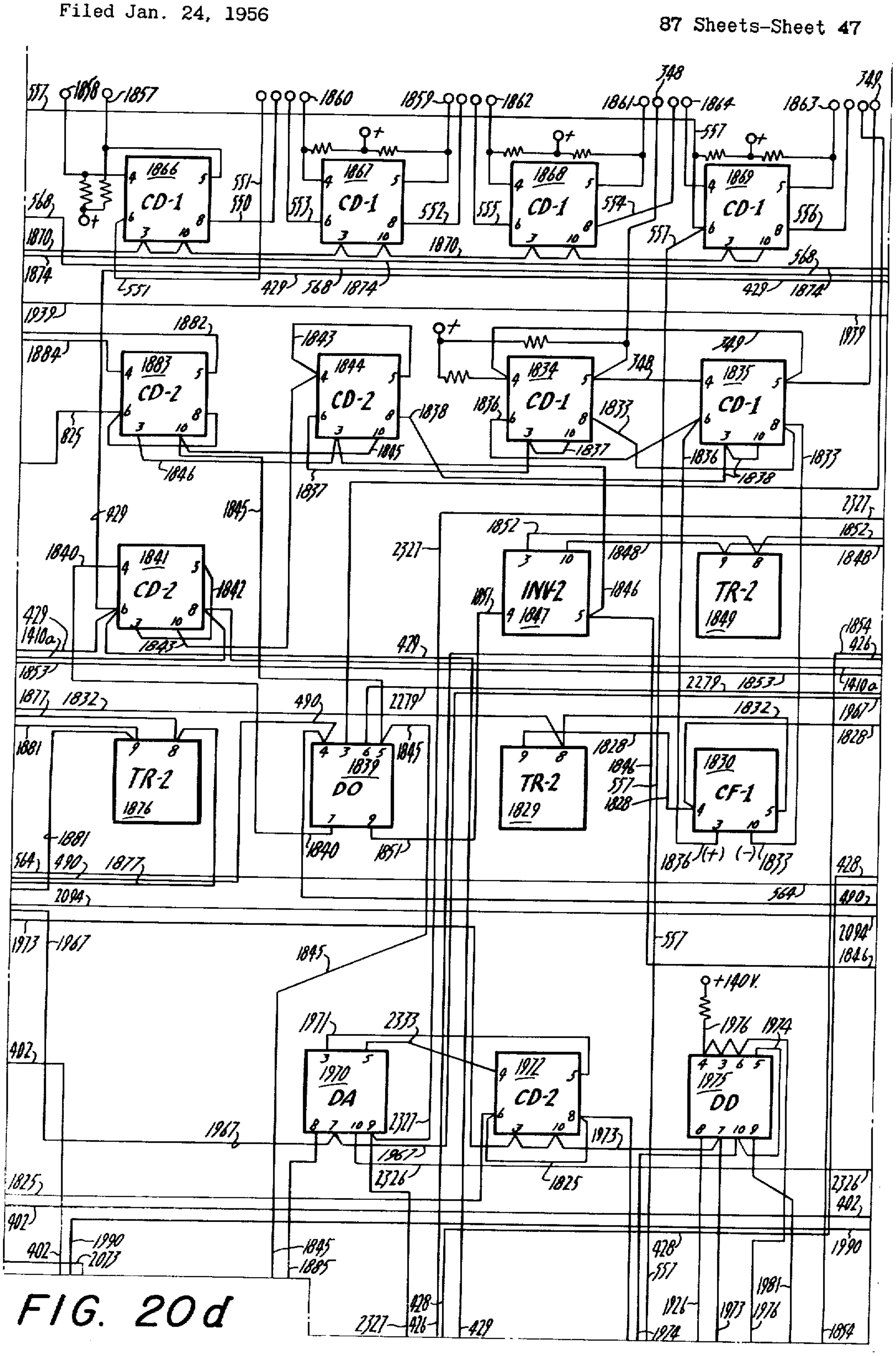
Figure 20E:
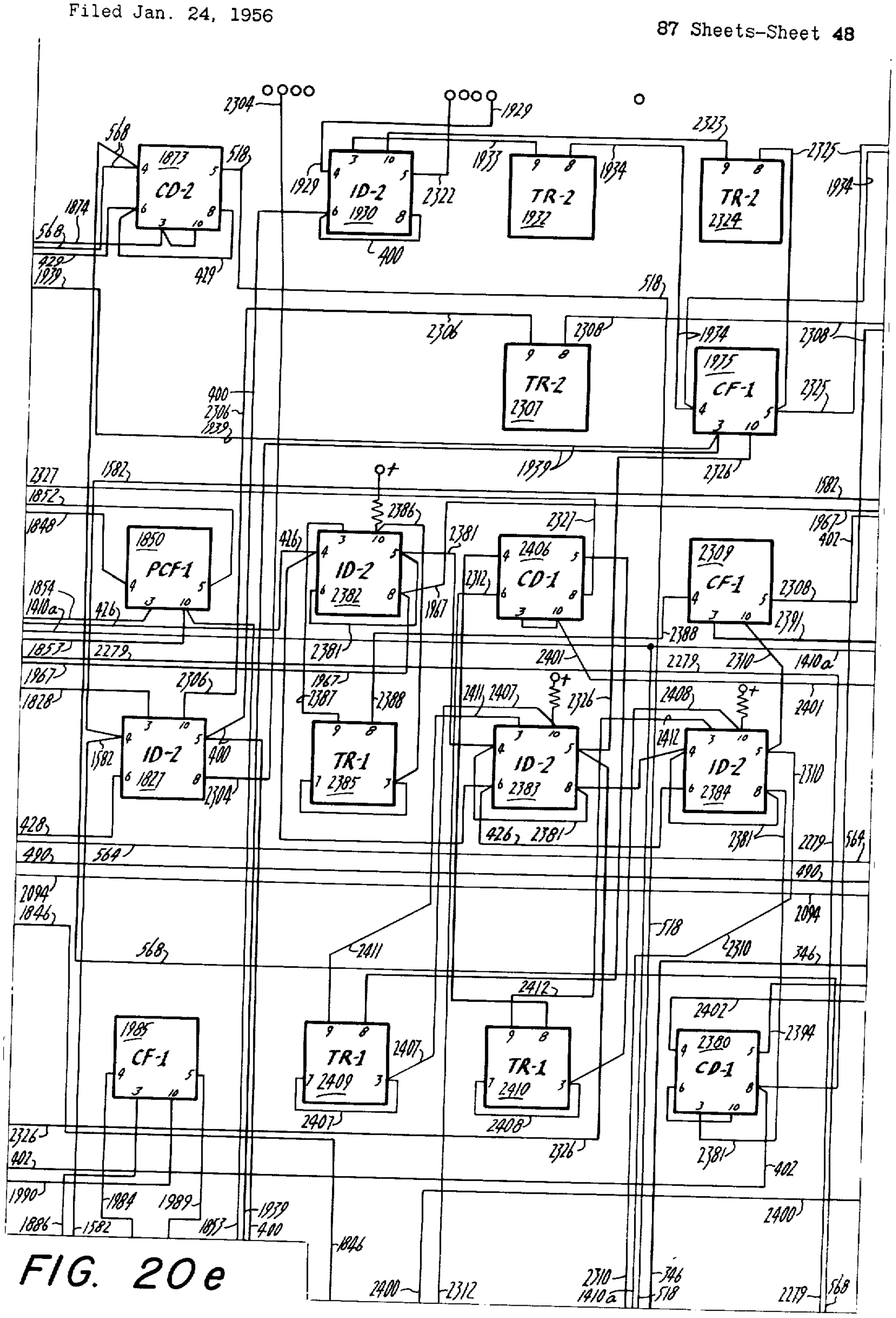
Figure 20F:
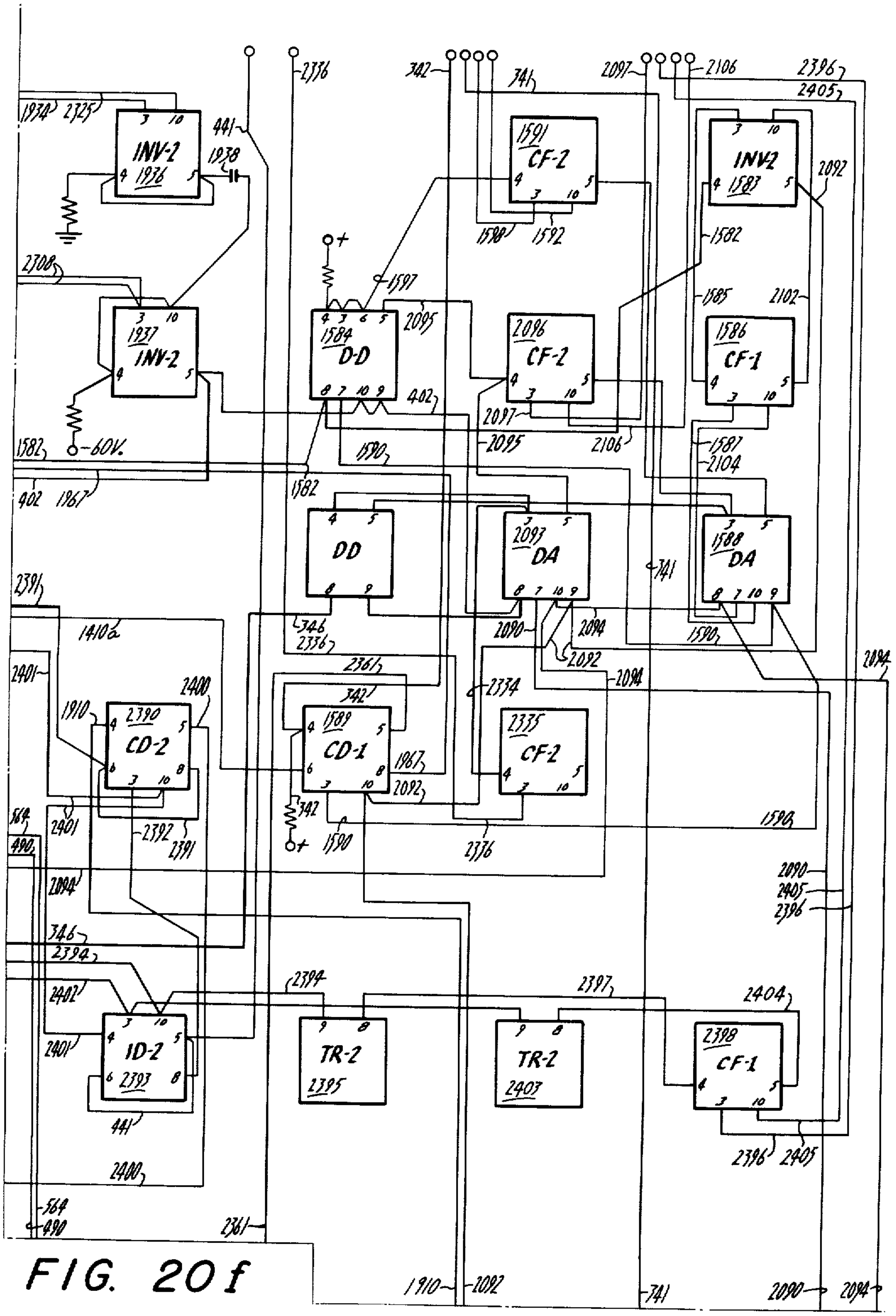
Figure 20G:
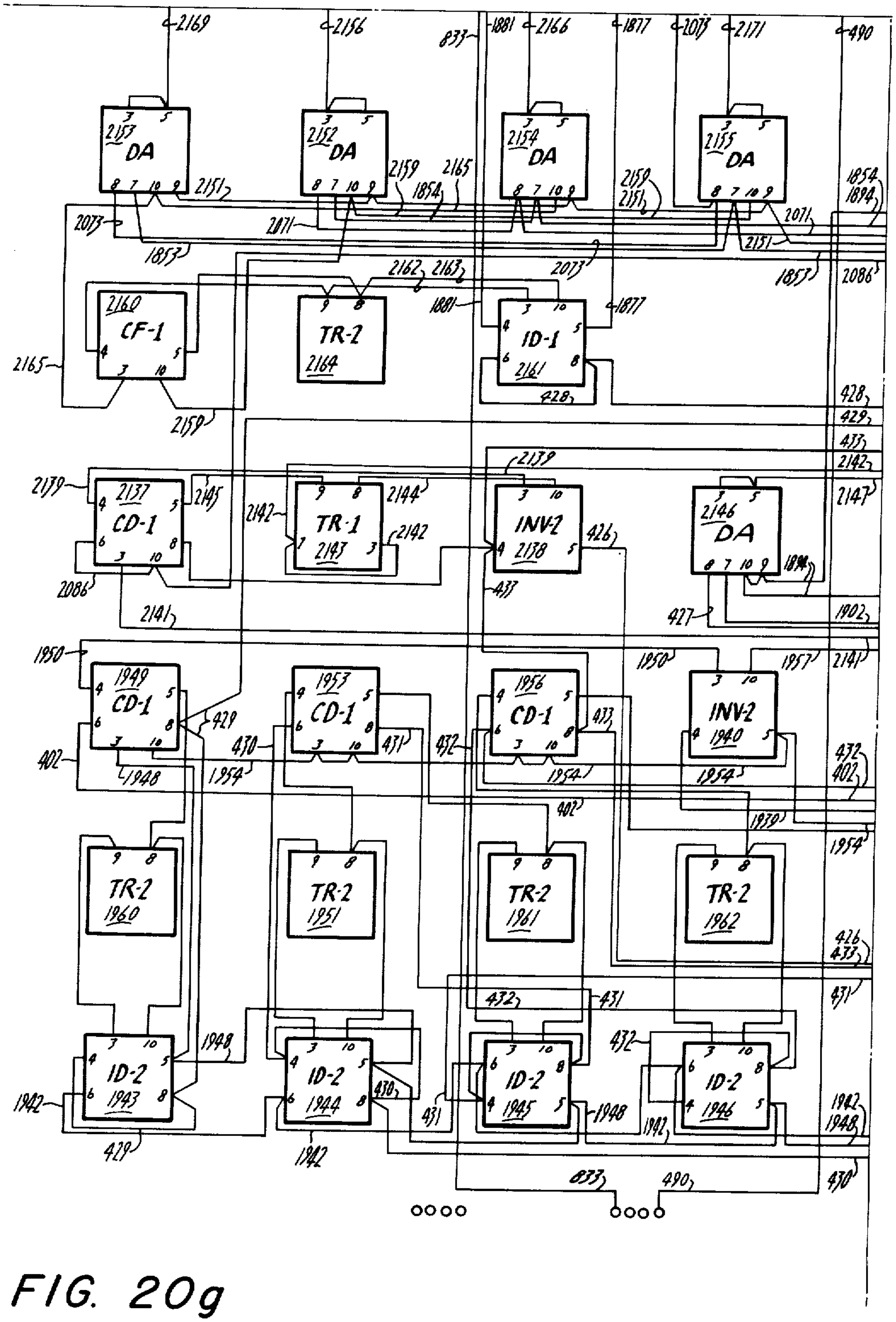
Figure 20H:
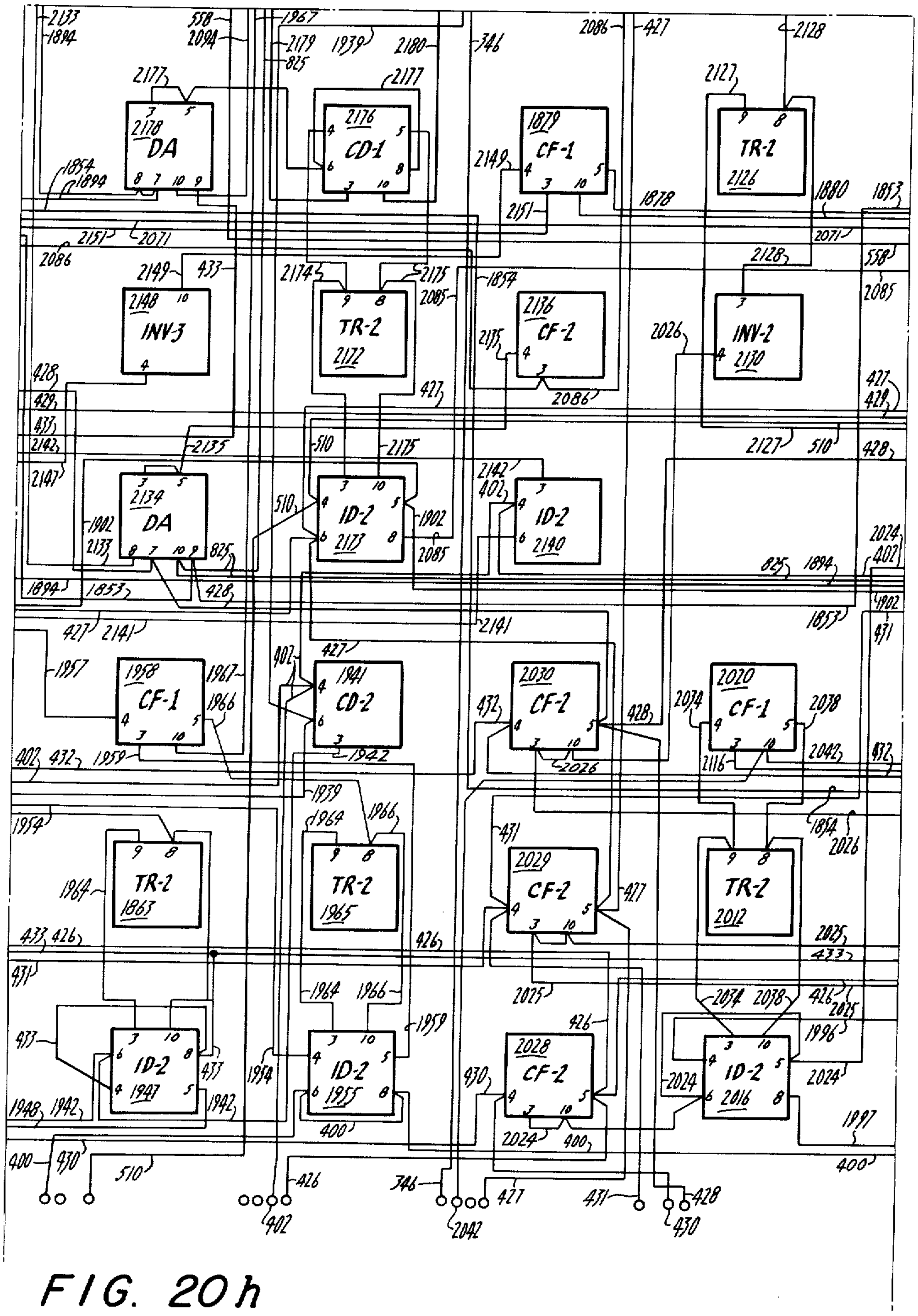
Figure 20I:
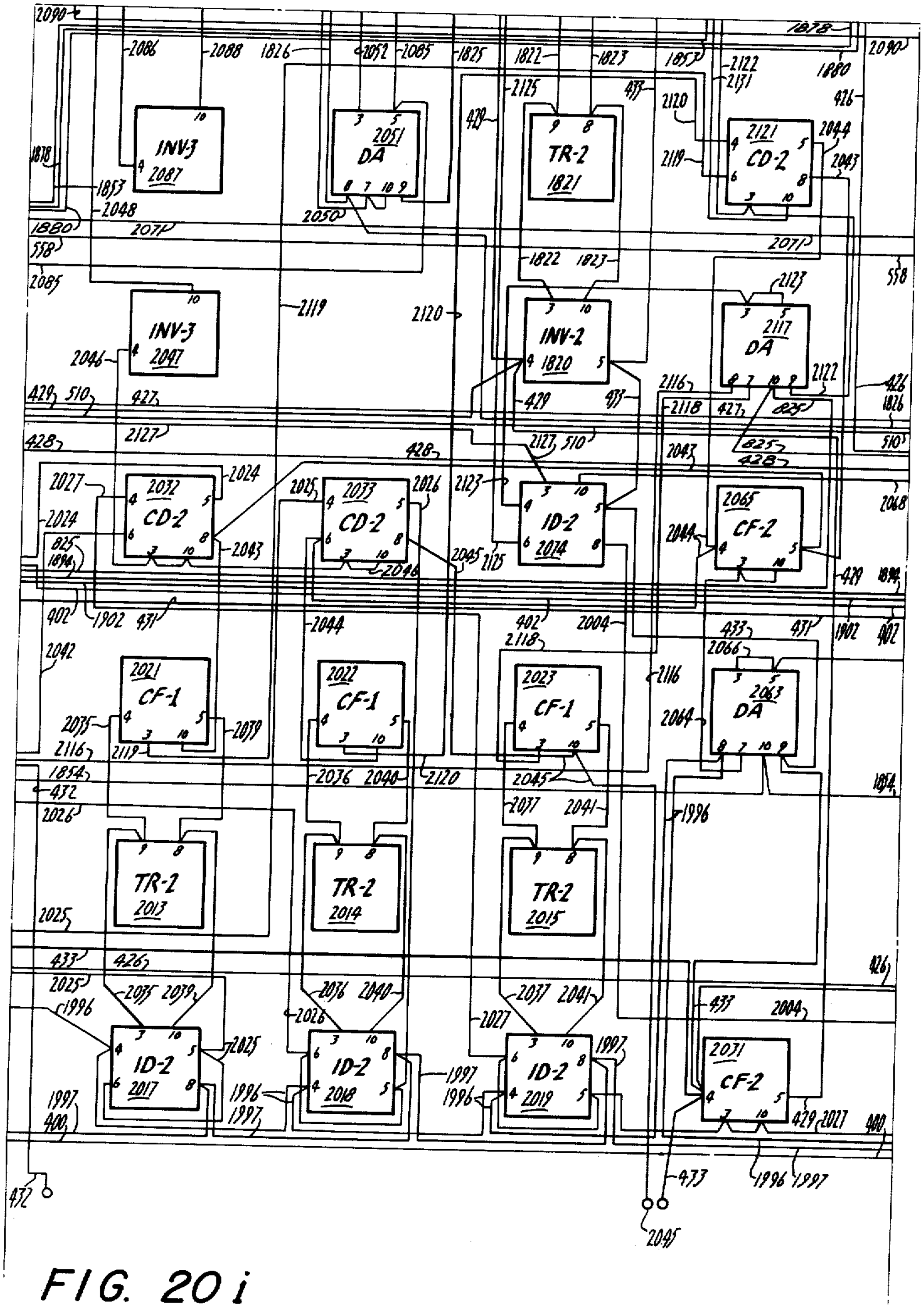

Before proceeding with the detailed description of the arithmetic circuits, the circuitry which is utilized to derive certain of the gates necessary for the operation of the arithmetic circuits will be described. Referring now to FIG. 20*i*, the line 429 from which $B_1$ pulses are taken is connected to the #4 tap of an INV–2 unit 1820, the #5 tap of which is connected to the $B_r$ line 433. The #3 and #10 taps of the INV–2 unit 1820 are connected to the #9 and #8 taps, respectively, of a TR–2 unit 1821 by lines 1822 and 1823, respectively, as well as to the #4 and #5 taps, respectively, of a CF–1 unit 1824 (FIG. 20*c*) by these same lines. The TR–2 unit 1821 (FIG. 20*i*) defines two cycles known as the add cycle and the correction cycle. At $B_1$ time the #3 tap of the unit 1820 drops, thereby turning the unit 1821 on by pulling the #9 tap thereof down. Similarly, the unit 1821 is turned off at $B_r$ time since at this time the #8 tap thereof is pulled down. The add cycle exists from $B_1$ time through $B_8$ time, the correction cycle being defined by the period $B_r$ through $B_x$ time. Thus, the unit 1821 is on from the end of $B_x$ time, i.e., the beginning of $B_1$ time, through $B_8$ time, thereby rendering the line 1823 high for this period, and is off from the beginning of $B_r$ time, i.e., the end of $B_8$ time, through $B_x$ time, thereby rendering the line 1822 high during this period. It should now be clear that the add cycle is taken from the #10 tap of the CF–1 unit 1824 (FIG. 20*c*) by a line 1825 and that the correction cycle is taken from a line 1826 connected to the #3 tap of the unit 1824.

It was mentioned earlier that the condition of the various accumulators 0 through 9 is indicated by means to be described and, further, the rules for changing accumulator signs were set forth. Referring to FIG. 20*e*, the line 1582 from which $E_2$ data from the core buffer is taken, as described earlier, is connected to the #4 tap of an ID–2 unit 1827, the #6 tap of which is connected to the $B_x$ line 428. Thus, the $E_2$ data going to the arithmetic circuits is mixed with $B_x$ pulses. This is done to determine whether or not there is an "*x*" bit present in this data to thereby determine whether or not the data is positive, since negative numbers are identified by the presence of an "*x*" bit in the low order thereof. Thus, the #3 tap of the unit 1827 is normally high and drops only if the $E_2$ data contains an "*x*" bit. This tap is connected by a line 1828 to the #9 tap of a TR–2 unit 1829 (FIG. 20*d*) as well as to the #4 tap of a CF–1 unit 1830.

The $B_s$ line 426 is connected to the #5 tap of an INV–2 unit 1331 (FIG. 20*c*), the #10 tap of which is connected by a line 1832 to the #8 tap of the unit 1829 (FIG. 20*d*) as well as to the #5 tap of the unit 1830. Each $B_s$ pulse, therefore, causes the TR–2 unit 1829 to be turned on since the #8 tap thereof is pulled down thereby. Upon occurrence of an "$x$" bit in the $E_2$ data, however, the unit 1829 is turned off, thereby indicating that the $E_2$ data is negative. Since the unit 1829 is turned on by each $B_8$ pulse, it will be clear that the normal condition of the unit 1829 indicates that the $E_2$ data is positive, and under these conditions the #10 tap of the CF–1 unit 1830 is low, it being high when the $E_2$ data is negative. When the $E_2$ data is negative, as indicated by the presence of an "$x$" bit, the #3 tap of the unit 1830 is low, it being high when the $E_2$ data is positive.

The #10 tap of the unit 1830 (FIG. 20*d*) is connected by a line 1833 to the #8 tap of a CD–1 unit 1834 as well as to the #8 tap of a CD–1 unit 1835, the #3 tap of the unit 1830 being connected to the #6 taps of the units 1834 and 1835 by a line 1836. The line 348 which, it will be recalled, is high when $T_2=L$ (see FIG. 17) is connected to the #5 and #4 taps of the units 1834 and 1835 (FIG. 20*d*), respectively, the line 349 (FIG. 17) which is high when $T_2=M$ being connected to the #4 and #5 taps of the units 1834 and 1835, respectively (FIG. 20*d*). Thus, when $T_2=L$, for example, and the $E_2$ data is negative, the #5 and #8 taps of the unit 1834 are high, thereby raising the potential of a line 1837 connected to the #3 and #10 taps of this unit and indicating that the next operation is complement addition. The line 1837 also rises when the #4 and #6 taps of the unit 1834 are both high. This occurs when the $E_2$ data is positive and when $T_2=M$, which is also complement addition. On true add a line 1838 connected to the #3 and #10 taps of the unit 1835 are arranged to rise and this condition exists whenever the $E_2$ data is positive and $T_2=L$ or whenever the $E_2$ data is negative and $T_2=M$. Thus, the line 1837 is up on complement add, the line 1838 being up on true add.

The $C_9$ line 490 is connected through a DO unit 1839 (FIG. 20*d*) and through a line 1840 to the #4 tap of a CD–2 unit 1841, the #6 tap of which is connected to the $B_1$ line 429. Thus, each $C_9B_1$ time the #3 tap of the unit 1841 rises, thereby raising the #5 tap of this unit since it is connected by a line 1842 thereto. The #8 tap of the unit 1841 is connected to the $E_2$ gate line 1410*a*, and it will be understood that on an $E_2$ gate $C_9B_1$ pulses are taken from the #10 tap thereof by a line 1843 which is connected to the #4 and #5 taps of a CD–2 unit 1844. The true add line 1838 is connected to the #8 tap of the unit 1844, and when this line is high, $C_9B_1$ pulses pass through the unit 1844 to a line 1845. Similarly, if the complement add line 1837 is high, $C_9B_1$ pulses pass through the unit 1844 to a line 1846 since the complement add line 1837 is connected to the #6 tap of the unit 1844.

The line 1846 is connected through an INV–2 unit 1847 to a line 1848 which is connected to the #9 tap of a TR–2 unit 1849 as well as to the #4 tap of a PCF–1 unit 1850 (FIG. 20*e*), and it will be understood that on complement add the $C_9B_1$ pulse taken from the line 1846 causes the unit 1849 (FIG. 20*d*) to be turned off since the #9 tap thereof is pulled down at this time. The line 1845 is connected through the DO unit 1839 to a line 1851 which is connected to the #4 tap of the INV–2 unit 1847. The #3 tap of the unit 1847 is connected by a line 1852 to the #8 tap of the unit 1849 as well as to the #5 tap of the unit 1850 (FIG. 20*e*). On a true add operation, therefore, the $C_9B_1$ pulse taken from the line 1845 passes through the unit 1839 (FIG. 20*d*) and the unit 1847 to the #8 tap of the TR–2 unit 1849, thereby turning it on and raising the potential of the #9 tap. Thus, on complement add a line 1853 connected to the #10 tap of the unit 1850 (FIG. 20*e*) is high, a line 1854 being high on true add as defined by the TR–2 unit 1849 (FIG. 20*d*).

The condition of each accumulator is examined prior to the field time in which it lies. As will be more fully explained later herein, ten lines 1855 through 1864 (FIGS. 20*c* and 20*d*) are high if the accumulators 9 through 0, respectively, corresponding thereto are positive, these lines being low if the corresponding accumulators are negative. The lines 1855 and 1856 are connected to the #5 and #4 taps, respectively, of a CD–1 unit 1865, the lines 1857 through 1864 being similarly connected to the #5 and #4 taps of four CD–1 units 1866 through 1869. The #6 tap of the unit 1865 is connected to the $F_9$ line 540, the #8 tap of this unit being connected to the $C_E$ line 568. Similarly, the lines 550 through 557 from which the pulses $F_8$ through $F_1$, respectively, are taken are connected to the corresponding #6 or #8 tap of the units 1866 through 1869 as indicated in the drawing. Since the operation of each of the CD–1 units 1865 through 1869 is identical, only the operation of the unit 1865 (FIG. 20*c*) will be described. Assuming accumulator 1 is positive, the #4 tap of the unit 1865 is high and the $F_9$ pulses connected to the #6 tap thereof pass therethrough to a line 1870 connected to the #3 and #10 taps thereof. (Similarly, pulses occurring during the field preceding each accumulator pass through the corresponding unit 1866 through 1869 (FIG. 20*d*) to the line 1870 when that accumulator is positive.)

The line 1870 is connected to the #6 tap of an ID–2 unit 1871 (FIG. 20*c*) as well as to the #9 tap of a DA unit 1872. The $C_E$ line 568 is connected to the #4 tap of a CD–2 unit 1873 (FIG. 20*e*), the #6 tap of which is connected to the $B_1$ line 429. Additionally, the #5 and #8 taps of this unit are connected to the $C_0$ and $B_1$ lines 518 and 429, respectively. Thus, a line 1874 connected between the #3 and #10 taps of the unit 1873 (FIG. 20*e*) and the #4 tap of the unit 1871 (FIG. 20*c*) rises during $C_EB_1$ as well as during $C_0B_1$. Since the #6 tap of the unit 1871 is high during $C_E$ or during $F_9$ through $F_1$ when the next accumulator is positive, the $C_EB_1$ pulse or the $C_0B_1$ pulse passes through the unit 1871 to a line 1881 connected to the #3 tap of this unit. Since the line 1881 drops at $C_EB_1$ when accumulator 0 is positive or at $C_0B_1$ of the field preceding a given accumulator when that accumulator is positive, a TR–2 unit 1876 (FIG. 20*d*) is turned off at this time since the #9 tap thereof is connected to the line 1881, thereby raising the potential of the #8 tap which indicates that the next accumulator is positive. This signal is taken from the #8 tap by a line 1877 connected thereto.

When the next accumulator is negative, the line 1870 is low. This line is connected to the #4 tap of the INV–2 unit 1831 (FIG. 20*c*), thereby raising the potential of a line 1878 when the next accumulator is negative. This line is connected through a CF–1 unit 1879 (FIG. 20*h*) to a line 1880 which is connected to the #8 tap of the unit 1871 (FIG. 20*c*). The line 1874 is connected to the #5 tap of the unit 1871 as well as to the #4 tap thereof, and it will be clear that when the next accumulator is negative, either a $C_EB_1$ or a $C_0B_1$ pulse causes the #10 tap of the unit 1871 to drop. Since this tap is connected to the #8 tap of the TR–2 unit 1876 (FIG. 20*d*), such a pulse turns this unit on and causes the line 1881 connected to the #9 tap thereof to rise. When the line 1881 is up, therefore, the next accumulator is negative.

It was mentioned above that the line 1870 is connected to the #9 tap of the DA unit 1872 (FIG. 20*c*), the line 1880 being connected to the #8 tap of this unit. Additionally, the line 1874 is connected to the #7 and #10 taps of the unit 1872. Thus, when the next accumulator sign is "+," i.e., when the #9 tap of the DA unit 1872 is up, the $C_EB_1$ or $C_0B_1$ pulse applied to the #10 tap of this unit passes therethrough and through a line 1882 connected between the #5 tap thereof and the #5 tap of a CD–2 unit 1883 (FIG. 20*d*). Similarly, when the #8 tap of the unit 1872 (FIG. 20*c*) is up, i.e., when the next accumulator is negative, the $C_EB_1$ or $C_0B_1$ pulse passes through the unit 1872 to a line 1884 which is connected between the #3 tap of the unit 1872 and the #4 tap of the unit 1883 (FIG. 20*d*). The #6 and #8 taps of the unit 1883 are connected to the $E_1$ gate line 825, and when on an $E_1$ gate, therefore, $C_EB_1$ or $C_0B_1$ pulses are taken from the #10 or #3 tap of the unit 1883 when the next accumulator is positive or negative, respectively. If the next accumulator is positive, the line 1845 rises just prior to the corresponding accumulator field and turns on the trigger 1849 as described above. If the #3 tap of the unit 1883 goes up during $C_EB_1$ or $C_0B_1$, as it does when the next accumulator sign is "—" on an $E_1$ gate, the trigger 1849 is turned off just prior to the next accumulator time. Thus, on an $E_1$ gate the line 1853 (FIG. 20*e*) is high when the next accumulator is negative, the line 1854 being high when the next accumulator is positive. (It should be remembered that on an $E_2$ gate the line 1853 is high on complement add, the line 1854 being high on true add.)

The gating means 1792 and 1798 (FIG. 29) are controlled by a pulse referred to herein as the add-subtract gate taken from a line 1885 (FIG. 20–*l*), as will be described. This gate is defined by the condition of a TR–2 unit 1886. The line 1531 (FIG. 11–*l*) which, it will be recalled, goes up on an $a_2$ comparison is connected to the #8 tap of a DA unit 1887 (FIG. 20–*l*), the #7 tap of this unit being connected to the $E_2$ gate line 1410*a*. Thus, the #3 tap of the unit 1887 rises with the $a_2$ comparison when on an $E_2$ gate, thereby raising the potential of a line 1888 connected between this tap and the #6 tap of an ID–1 unit 1889. The #4 tap of the unit 1889 is connected to the line 347 (FIG. 17), which line is high when $T_2=L$ or $M$, and under this condition, therefore, it will be clear that the #3 tap of the unit 1889 (FIG. 20–*l*) drops with the $a_2$ comparison on an $E_2$ gate when $T_2=L$. This tap is connected to the #9 tap of the unit 1886 by a line 1890, and when it drops the unit 1886 is turned off, thereby raising the potential of the #8 tap thereof. The #8 tap is connected by a line 1891 through a CF–1 unit 1892 to the line 1885, and it will be clear that the add-subtract gate pulse is initiated by an $a_2$ comparison on an $E_2$ gate when $T_2=L$ or $M$.

The $C_9$ and $C_L$ lines 490 and 564, respectively, are connected to the #5 and #4 taps, respectively, of a CF–2 unit 1893 (FIG. 20*a*), the #3 and #10 taps of which are connected to a line 1894. Thus, the $C_9$ and $C_L$ pulses are both present on the line 1894. This line is connected to the #8 tap of the unit 1889 (FIG. 20–*l*). The $E_2$ gate line 1410*a*, in addition to being connected to the #7 tap of the unit 1887, is connected to the #5 tap of an INV–2 unit 1895, the #10 tap of which is connected to the #5 tap of the unit 1889 by a line 1896. The line 1410*a* is high during an $E_2$ gate, and it will be understood, therefore, that the line 1896 is high when not on an $E_2$ gate. Thus, if not on an $E_2$ gate, $C_9$ and $C_L$ pulses are taken from the #10 tap of the unit 1889, and since these pulses are inverted by this unit, the trigger 1886 is turned on by the leading edges thereof, the #10 tap of the unit 1889 being connected to the #8 tap of the unit 1886 by the line 1891. When the #8 tap of the unit 1886 drops, the #3 tap of the unit 1892 also drops, thereby defining the end of the add-subtract gate. Thus, on an $E_2$ gate the line 1885 is high on the $a_2$ comparison if $T_2=L$ or $M$ and drops at the first $C_9$ or $C_L$ pulse after the $E_2$ gate has expired. It will now be clear that when $T_2=L$ or $M$, the line 1885 is up during the full field or fields defined by the $a_2$ and *mn* portions of the address.

The gating means 1800 (FIG. 29) is under the control of a pulse referred to herein as the add-subtract write gate. This pulse is controlled by the condition of a TR–2 unit 1897 (FIG. 20–*l*) and exists for a full field or fields, as will become clear. Additionally, due to the one-character delay present in the adder, this pulse is initiated at $C_8$ time and terminates at $C_8$ time. The line 1885 from which the add-subtract gate is taken is connected to the #6 tap of an ID–2 unit 1898, the #4 tap of which is connected to the $C_8$ line 510. Thus, when the line 1885 is up, i.e., during the add-subtract gate, $C_8$ pulses pass through the unit 1898 to a line 1899 connected between the #3 tap thereof and the #9 tap of the trigger 1897. Since these pulses are inverted by the unit 1898, the unit 1897 is turned off by the leading edge of each $C_8$ pulse. When this occurs, the #8 tap of the unit 1897 goes up. This tap is conneceted by a line 1900 to the #3 tap of an ID–1 unit 1901 as well as to the #5 tap of the CF–1 unit 1892, and when the unit 1897 is turned off, a line 1902 connected to the #10 tap of the unit 1892 rises. It is from this line that the add-subtract write gate is taken. The $C_8$ line 510 is also connected to the #6 tap of the unit 1901 and the #4 tap of this unit is connected by the line 1890 to the #9 tap of the TR–2 unit 1886. Thus, when the unit 1886 is on, the #4 tap of the unit 1901 rises and the first $C_8$ pulse thereafter causes the #3 tap thereof to drop, and since this tap is connected by the line 1900 to the #8 tap of the trigger 1897, this trigger is turned on at this time, thereby lowering the potential of the line 1902 and terminating the add-subtract write gate. Thus, the add-subtract write gate is initiated at $C_8$ time following an $a_2$ comparison on an $E_2$ gate when $T_2=L$ or $M$ and it terminates at $C_8$ time after the $E_2$ gate terminates.

The gating means 1801 (FIG. 29) which controls read-out from the accumulators is controlled by a pulse referred to herein as the read-out gate. This pulse is defined by the condition of a TR–2 unit 1905 (FIG. 20–*l*). It will be recalled that when it is desired to read out from the accumulators, $T_1=L$ or $M$, and under these conditions the line 345 (FIG. 17) is high. This line is connected to the #4 tap of an ID–1 unit 1906 (FIG. 20–*l*). The $a_1$ comparison line 846 is connected to the #8 tap of a DA unit 1907, the #7 tap of which is connected to the $E_1$ gate line 825. On an $E_1$ gate, therefore, a line 1908 connected to the #3 tap of the unit 1907 rises with the $a_1$ comparison, and if $T_1=L$ or $M$ the #3 tap of the unit 1906 drops at this time, since the #6 tap thereof is connected to the line 1908. The #3 tap of the unit 1906 is connected via a line 1909 to the #9 tap of the trigger 1905, and this unit, therefore, is turned off by the $a_1$ comparison signal when on an $E_1$ gate if $T_1=L$ or $M$, since the #9 tap thereof is pulled down at this time. When this occurs, the #8 tap of the unit 1905 rises, thereby raising the potential of a line 1910 from which the read-out gate pulse it taken since the #8 tap of the unit 1905 is connected by a line 1911 through a CF–1 unit 1912 to the line 1910.

The $C_9$ or $C_L$ line 1894 is connected to the #8 tap of the unit 1906, the $E_1$ gate line 825 being connected through the INV–2 unit 1895 to a line 1913 connected between the #3 tap of the unit 1895 and the #5 tap of the unit 1906. Thus, the first $C_9$ or $C_L$ pulse to occur upon termination of the $E_1$ gate causes the #10 tap of the unit 1906 to drop, and since this tap is connected by the line 1911 to the #8 tap of the TR–2 unit 1905, this unit is turned on at this time, thereby lowering the potential of the line 1910 and terminating the read-out gate. Thus, the read-out gate is initiated on an $a_1$ comparison on an $E_1$ gate when $T_1=L$ or $M$ and is terminated by the first $C_9$ or $C_L$ pulse to occur after the expiration of the $E_1$ gate. Thus, this pulse defines the full field or fields set out by the $a_1$ and *mn* portions of the instruction, and in this way the whole of each accumulator is read out.

$E_2$ data taken from the cores is applied via the line 1582 to the #5 tap of the gating means 1792 (FIG. 20*k*), a CD–2 unit, as well as to the #4 tap of the ID–2 unit 1827 (FIG. 20*e*). The add-subtract gate is connected via the line 1885 (FIG. 20–*l*) to the #8 tap of the unit 1792 (FIG. 20*k*), and when this line is high, it will be clear that the $E_2$ data passes through the unit 1792 to the line 1791 connected to the #10 tap thereof. The line 1791 is connected to the #4 tap of a CD–2 unit 1917 as well as to the #4 tap of the complementer 2005, an INV–2 unit, which is provided to complement the data when on a complement operation. The add cycle pulse is applied through the line 1825 (FIG. 20*c*) to the #10 tap of a DA unit 1919 (FIG. 20*j*), the #9 tap of this unit being connected to the true add line 1854 (FIG. 20*e*), and it will be understood, therefore, that the #5 tap of the unit 1919 (FIG. 20*j*) is high for the duration of the add cycle, i.e., from $B_1$ through $B_8$ time, on true add. The #5 tap of this unit is connected by a line 1920 to the #6 tap of the unit 1917 (FIG. 20*k*), thereby permitting data present on the line 1791 to pass through the unit 1917 to a line 1921 for the duration of each add cycle on true add.

Figure 20J:
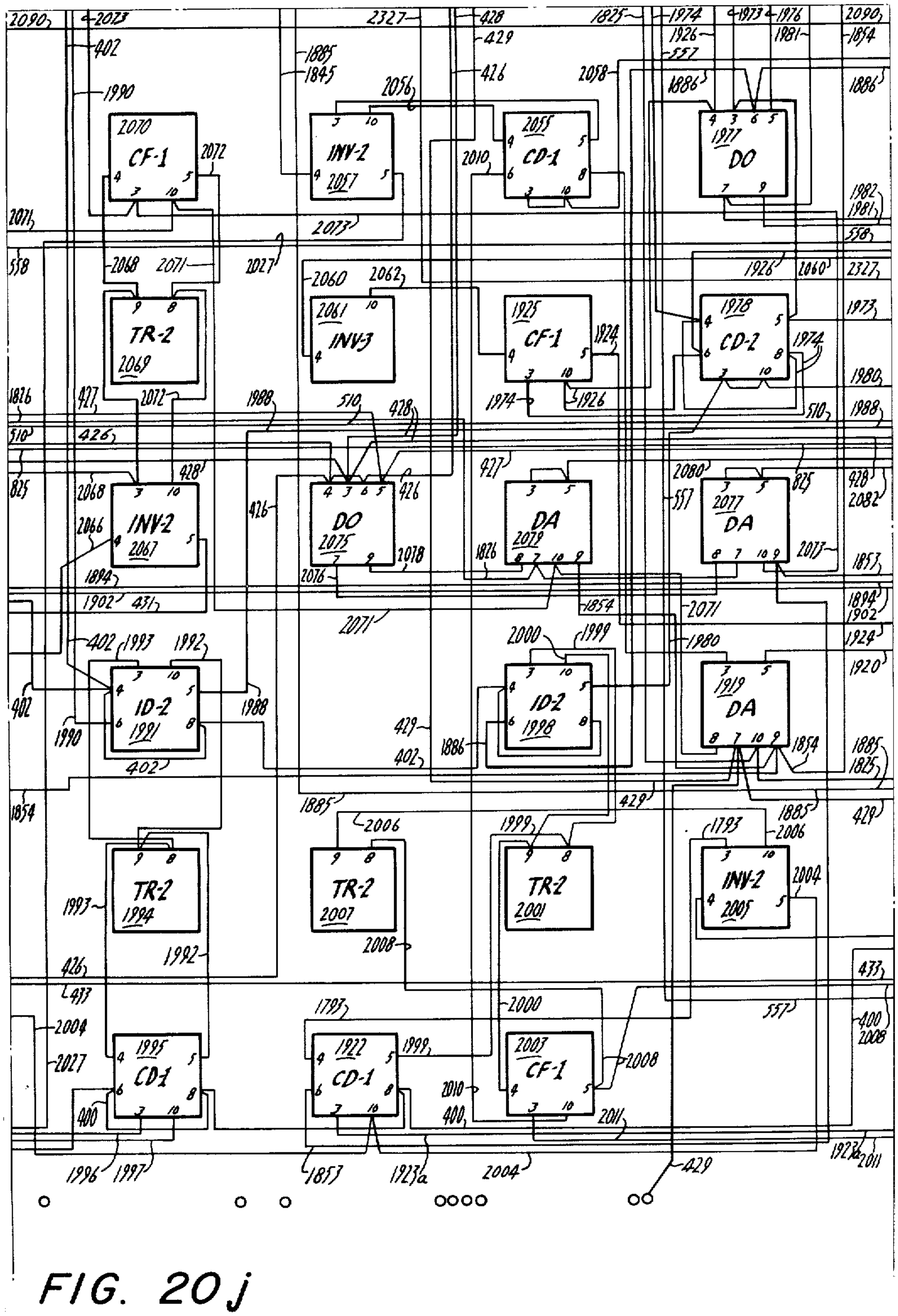
Figure 20K:
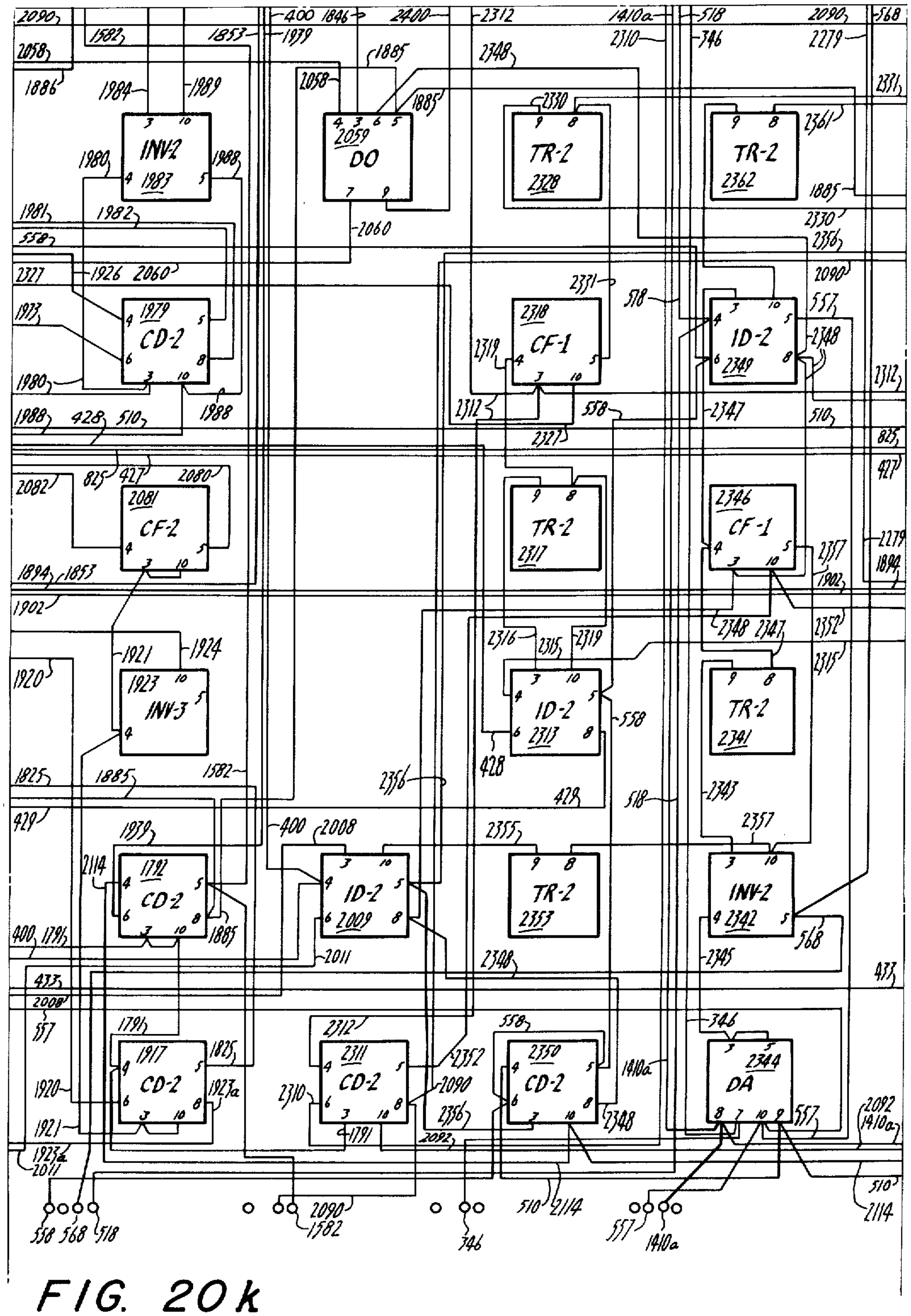
Figure 201:
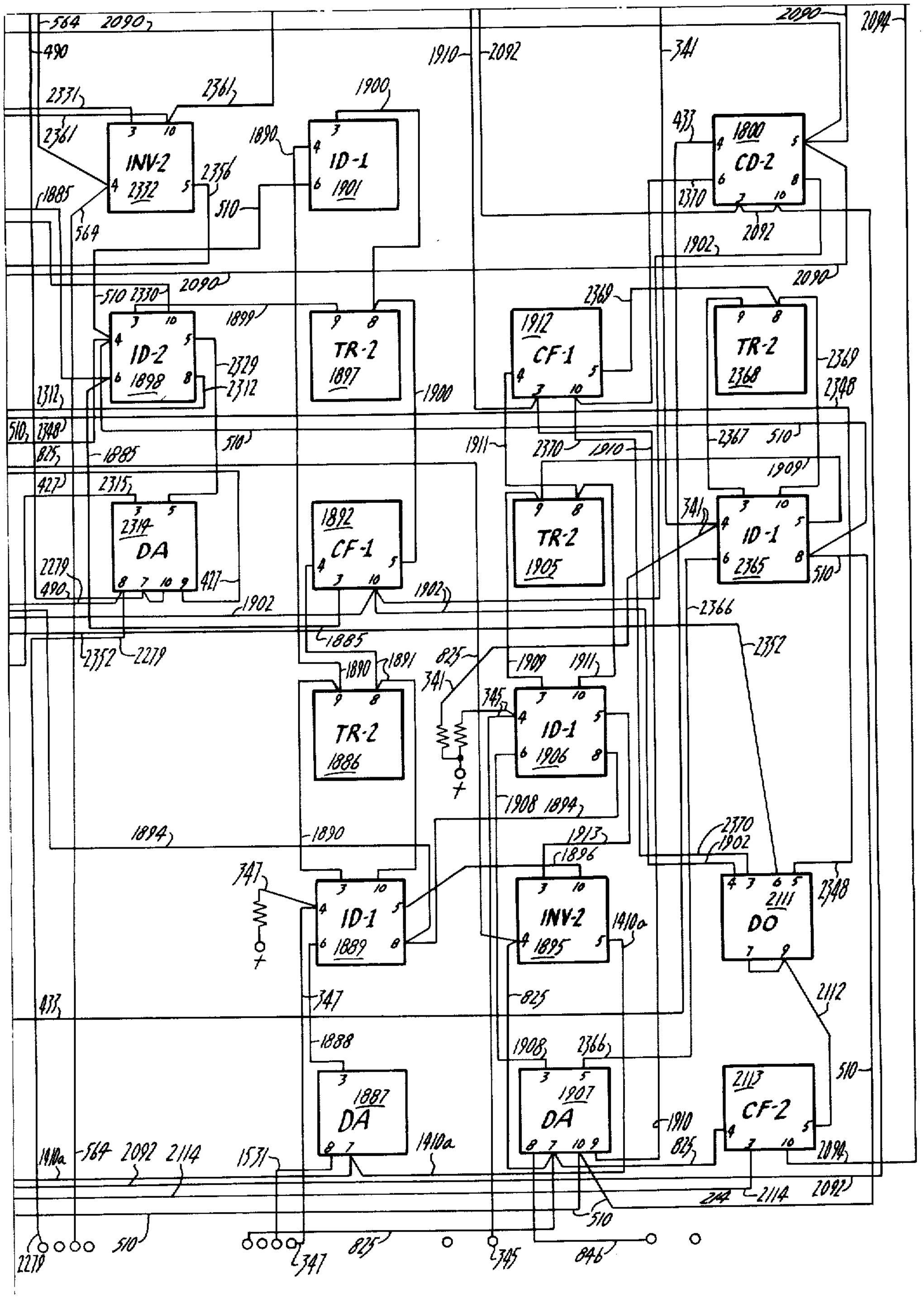

The #3 tap of the complementer 2005 (FIG. 20*j*) is connected to the #4 tap of a CD–1 unit 1922, the #6 tap of which is connected to the complement add line 1853 (FIG. 20*e*). Thus, on a complement add operation data taken from the line 1791 (FIG. 20*j*) is inverted by the unit 2005 and is taken through the CD–1 unit 1922 and through a line 1923*a* to the #8 tap of the unit 1917 (FIG. 20*k*). The add cycle line 1825 is connected to the #5 tap of the unit 1917, and on a complement add operation the $B_1$ through $B_8$ portions of the data entered on the #8 tap of the unit 1917 pass therethrough to the line 1921. Since on a complement add operation the line 1854 is low, it will be clear that the data connected to the #4 tap of the unit 1917 will not pass therethrough on a complement add operation. Thus, whether on complement add or true add, that portion of the data defined by $B_1$ through $B_8$ is applied to the line 1921 which is connected between the #3 and #10 taps of the unit 1917 and the #4 tap of an INV–3 unit 1923. The #10 tap of the unit 1923 is connected by a line 1924 through a CF–1 unit 1925 to a line 1926 which comprises the A input to the adder 1794.

Referring now to FIG. 10, the output of the accumulator read head is connected via a line 1927 to the #4 tap of an RA–1 unit 1928, the #10 tap of which is connected through a line 1929 to the #4 tap of an ID–2 unit 1930 (FIG. 20*e*). The #6 tap of the unit 1930 is connected to the phase A clock pulse line 400, and it will be understood that when a bit is present on the line 1929, the #3 tap of the unit 1930 drops at the beginning of phase A. This #3 tap is connected to the #9 tap of a TR–2 unit 1932 by a line 1933, and each bit read from the accumulator track, therefore, causes the trigger 1932 to be turned off at the beginning of phase A time, thereby raising the #8 tap of the unit 1932. The #8 tap is connected by a line 1934 to the #4 tap of a CF–1 unit 1935 as well as to the #3 tap of an INV–2 unit 1936 (FIG. 20*f*). The phase B clock pulse line 402 is connected to the #5 tap of an INV–2 unit 1937, the #10 tap of which is coupled through a condenser 1938 to the #4 and #5 taps of the INV–2 unit 1936. The trailing edge of each phase B pulse, therefore, causes the #10 tap of the unit 1937 to rise, and it will be understood, therefore, that the #4 and #5 taps of the INV–2 unit 1936 rise at this time. Thus, at the end of each phase B time the TR–2 unit 1932 is turned on, if not already on, since the #3 tap of the unit 1936 is connected to the #8 tap of the unit 1932 (FIG. 20*e*). It should now be clear that data from the accumulator track will appear on a line 1939 connected to the #3 tap of the unit 1935 in the form of positive-going, full bit pulses.

The line 1939 (FIG. 20*e*) on which accumulator data is always present is connected to the #4 tap of an INV–2 unit 1940 (FIG. 20*g*) as well as to the #6 tap of a CD–2 unit 1941 (FIG. 20*h*), which taps form the input to the accumulator delay unit. The #4 tap of the unit 1941 is connected to the phase B clock pulse line 402, and accumulator data is therefore mixed with phase B clock pulses in this unit. Thus, phase B accumulator data is taken from the #3 tap of the unit 1941 via a line 1942 to the # 6 tap of each of five ID–2 units 1943 through 1947 (FIGS. 20*g* and 20*h*), the #4 and #8 taps of each of which are connected to the $B_1$ through $B_r$ lines 429 through 433, respectively. The #5 taps of the units 1943 through 1947 are connected in common via a line 1948 to the #3 tap of a CD–1 unit 1949. The #3 tap of the unit 1940 (FIG. 20*g*) is connected via a line 1950 to the #4 tap of the CD–1 unit 1949 and the #6 tap of the unit 1949 is connected to the phase B clock pulse line 402. When a bit is present on the line 1939, the #3 tap of the unit 1940 is low, it being high in the absence of a bit. In the last mentioned case, therefore, i.e., when the line 1939 is low, phase B clock pulses pass through the unit 1949 to the line 1948. Thus, the line 1948 is high during phase B if there is no bit, just as the line 1942 is high on phase B if there is a bit.

The ID–2 units 1943 through 1947 are provided to determine the identity of the bits read from the accumulator track. This is accomplished by mixing the data present on the line 1942 with each of the bits $B_1$, $B_2$, $B_4$, $B_8$ and $B_r$ in the corresponding units 1943 through 1947. Each of the units 1943 through 1947 is associated with a corresponding TR–2 unit 1960, 1951, and 1961 through 1963, respectively, the #3 and #10 taps thereof being connected to the #9 and #8 taps, respectively, of the corresponding triggers. The #8 tap of the unit 1960 is connected to the #5 tap of the CD–1 unit 1949, the #8 taps of the triggers 1951 and 1961 being connected to the #4 and #5 taps, respectively, of a CD–1 unit 1953. Similarly, the #8 taps of the triggers 1962 and 1963 are connected to the #4 and #5 taps, respectively, of a CD–1 unit 1956. The $B_1$ line 429 is connected to the #8 tap of the unit 1949 and the $B_2$ through $B_r$ lines 430 through 433 are connected to the #6 or #8 taps of the units 1953 and 1956, as indicated in the drawing. The #3 and #10 taps of the units 1953 and 1956 are connected to the #10 tap of the unit 1949 as well as to the #5 tap of the unit 1940 and the #4 tap of an ID–2 1955 (FIG. 20*h*) by a line 1954. Thus, when a bit is present on the line 1939, the corresponding trigger 1960, 1951 or 1961 through 1963 is turned off at phase B time thereof, it being turned on at this time if no bit corresponding thereto is present on the line 1939. If turned off, the #8 tap goes up, thereby raising the #5 tap of the unit 1949 or the #4 or #5 tap of the units 1953 and 1956 corresponding thereto and permitting the passage therethrough of the phase B portion of the bit pulse corresponding thereto.

The line 1954 is connected to the #4 tap of the ID–2 unit 1955 where the signal taken therefrom is mixed with phase A clock pulses connected by the line 400 to the #6 and #8 taps thereof. Since the line 1954 does not rise until phase B time when a bit is entered into one of the triggers 1960, 1951, or 1961 through 1963, there can be no coincidence of pulses on the #4 and #6 taps of the unit 1955 until one character time later, at which time a line 1964 connected between the #3 tap of the unit 1955 and the #9 tap of a TR–2 unit 1965 drops, thereby turning off the trigger 1965 and raising the potential of a line 1966 connected to the #8 tap of this trigger. The line 1966 is additionally connected through a CF–1 unit 1958 to a line 1967, which line therefore rises one character time after a bit is entered on the line 1939.

If there is no bit present on the line 1939, the #3 tap of the unit 1940 (FIG. 20*g*) is high. This tap is connected by a line 1950 to the #4 tap of the unit 1949, and when there is no bit, a line 1948 connected to the #3 tap of this unit goes up during phase B time and turns on the corresponding trigger 1960, 1951, or 1961 through 1963. When one of these triggers is on, the corresponding bit pulse cannot pass through the associated CD–1 unit to the line 1954. The line 1954 is connected through the INV–1 unit 1940, through a line 1957 and through the CF–1 unit 1958 (FIG. 20*h*) to a line 1959 which is connected to the #5 tap of the ID–2 unit 1955, and as long as the line 1954 is low, phase A clock pulses pass through the unit 1955 to the line 1966 and thereby turn the trigger 1965 on. Thus, the trigger 1965 is turned on at the beginning of a bit time when no bit was present on the line 1939 one character time earlier and is turned off at the beginning of a bit time when a bit was present on the line 1939 one character time earlier. It should now be clear that the accumulator data is read into the triggers 1951 and 1960 through 1963 of the accumulator delay unit during the phase B portion of the corresponding bit time and is read therefrom and onto the line 1967 one character time later at phase A of the corresponding bit time.

The data read from the accumulator and through the accumulator delay to the line 1967 is on time with the $E_2$ data coming from the core buffer since the accumulator data is read one character early. The line 1967 is connected to the #7 tap of a DA unit 1970 (FIG. 20*d*), the #8 tap of which is connected to the add-subtract gate line 1885. Thus, the accumulator data is mixed with the add-subtract gate, and during this gate accumulator data is taken from the #3 tap of the unit 1970 (FIG. 20*d*) through a line 1971 to the #5 tap of a CD–2 unit 1972. The #8 tap of the unit 1972 is connected to the add cycle line 1825, and it will be understood, therefore, that the "1," "2," "4" and "8" bits of each character taken from the accumulator during the add-subtract gate are taken from the #10 tap of the unit 1972 and are connected by a line 1973 to the B input to the adder. Thus, the $E_2$ data is entered into the A input of the adder in timed relation with the accumulator data which is entered into the B input of the adder. The C or carry input to the adder is made through a line 1974, as will become clear later.

As mentioned earlier herein, the adder utilized is a full binary adder of a conventional variety having three inputs A, B and carry. Each of the input lines to the adder, 1926, 1973 and 1974, is connected to the #8, #7 and #10 taps, respectively, of a DD unit 1975, the #3, #4 and #6 taps of which are connected via a line 1976 to the #5 tap of a DO unit 1977 (FIG. 20*j*). The lines 1926 and 1973 are additionally connected to the #4 and #3 taps of the unit 1977, the lines 1926 and 1974 are connected to the #6 and #4 taps of a CD–2 unit 1978; the lines 1973 and 1974 are connected to the #5 and #8 taps of the unit 1978; and the lines 1926 and 1973 are connected to the #4 and #6 taps of a CD–2 unit 1979 (FIG. 20*k*). The #3 and #10 taps of the unit 1978 (FIG. 20*j*) are connected by a line 1980 to the #3 tap of the unit 1979 (FIG. 20*k*), and it will be understood that the line 1980 is up whenever there is a coincidence between pulses entered on the A and C, B and C, or A and B inputs to the adder. Since such a coincidence indicates that a carry is forthcoming, it will be clear that the line 1980 is up if there is a carry.

The line 1974 is connected to the #5 tap of the unit 1975 (FIG. 20*d*) as well as to the #10 tap of this unit, and the #9 tap thereof is connected to a line 1981 which is connected between the #7 tap of the unit 1977 (FIG. 20*j*) and the #8 tap of the unit 1979 (FIG. 20*k*). Thus, the line 1981 goes up if there is a bit on the A, B or C input to the adder. If bits are present on all three inputs to the adder simultaneously, in which case there is a carry, the line 1976 connected to the #4, #3 and #6 taps of the DD unit 1975 (FIG. 20*d*) is high, thereby raising the #5 tap of the unit 1977 (FIG. 20*j*). When this occurs, a line 1982 connected to the #9 tap of the unit 1977 goes up. The line 1982 additionally rises if the #6 tap of the unit 1977 goes up. This occurs when there is no carry since the carry line 1980 is connected through an INV–2 unit 1983 (FIG. 20*k*), through a line 1984, through a CF–1 unit 1985 (FIG. 20*e*) and through a line 1986 to the #6 tap of the unit 1977 (FIG. 20*j*). Thus, the line 1982 is high when there is no carry or when there are bits on the A, B and C inputs to the adder simultaneously.

The #7 tap of the unit 1977 rises if there is a bit present on either the A, B or C input to the adder, thereby causing the line 1981 to rise under these circumstances. Since the line 1981 is connected to the #8 tap of the CD–2 unit 1979 (FIG. 20*k*) and since the #5 tap of the unit 1979 is connected to the line 1982, it should be clear that the #10 tap of the unit 1979 rises if there is a bit present on any one of the three inputs to the adder and either there is no carry or there is a bit present on each of the three inputs to the adder. A line 1988 is connected to the #10 tap of the unit 1979 and when it goes up, there is a sum. This line is connected through the INV–2 unit 1983, through a line 1989 and through the CF–1 unit 1985 (FIG. 20*e*) to a line 1990, and the line 1990 is therefore high if there is no sum. Thus, the line 1988 is high when there is a sum, the line 1990 being high when there is no sum, and the line 1980 is high if there is a carry, the line 1986 being high if there is no carry.

The line 1988 is connected to the #5 tap of an ID–2 unit 1991 (FIG. 20*j*), the #4 and #8 taps of which are connected to the phase B clock pulse line 402. The line 1990 is connected to the #6 tap of the unit 1991, and if there is a sum, a line 1992 connected to the #10 tap of the unit 1991 drops at the beginning of phase B time. It should be noted also that if there is no sum, a line 1993 connected to the #3 tap of the unit 1991 drops at the beginning of phase B time. The lines 1992 and 1993 are connected to the #9 and #8 taps, respectively, of a TR–2 unit 1994 as well as to the #5 and #4 taps, respectively, of a CD–1 unit 1995. If there is a sum, the unit 1994 is turned off, it being turned on if there is no sum. The #6 and #8 taps of the unit 1995 are connected to the phase A clock pulse line 400, and in the case where the trigger 1994 is off, i.e., where there is a sum, the #4 tap of the unit 1995 is high at the beginning of phase B time of the corresponding bit. The #6 tap of the unit 1995 goes up with the following phase A clock pulse, thereby raising a line 1996 connected to the #3 tap of this unit at this time. When the line 1996 goes up, therefore, it is an indication that there is a sum from the addition of the bits occurring during the preceding bit time. Similarly, a line 1997 connected to the #10 tap of the unit 1995 rises at the beginning of the following phase A time and indicates no sum, if such is the case.

The carry line 1980 is connected to the #5 tap of an ID–2 unit 1998 (FIG. 20*j*), the no-carry line 1986 being connected to the #6 tap of this unit. The #4 and #8 taps of the unit 1998 are connected to the phase B clock pulse line 402. The #3 and #10 taps of the unit 1998 are connected via lines 1999 and 2000, respectively, to the #8 and #9 taps of a TR–2 unit 2001 as well as to the #5 and #4 taps, respectively, of a CD–1 unit 1922 and a CF–1 unit 2003, respectively. Thus, if there is a carry, the unit 2001 is turned off at phase B time, it being turned on at phase A time if there is no carry, and in the case where it is turned off, the line 1999 goes up, thereby raising the #5 tap of the unit 1922. The #8 tap of this unit is connected to the phase A clock pulse line 400, and if there is a carry, it will be clear that a line 2004 rises at the beginning of the following phase A time, thereby indicating a bit carry. This line is connected through an INV–2 unit 2005 and through a line 2006 to the #9 tap of a TR–2 unit 2007, the #8 tap of which is connected by a line 2008 to the #3 tap of an ID–2 unit 2009 (FIG. 20*k*) and to the #5 tap of the CF–1 unit 2003 (FIG. 20*j*). Since the line 2004 rises at phase A time if there is a carry, the trigger 2007 is turned off at this time if there is a carry, since the line 2006 connected to the #9 tap thereof drops. This condition causes the line 2008 to rise, thereby raising a line 2010 connected to the #10 tap of the CF–1 unit 2003. In the case where there is no carry, the trigger 2001 is on and the line 2000 as well as the #4 tap of the CF–1 unit 2003 is high. This results in raising a line 2011 connected between the #3 tap of the unit 2003 and the #6 tap of the unit 2009 (FIG. 20*k*). Since phase A clock pulses are connected to the #4 tap of the unit 2009 by the line 400, the #3 tap of the unit 2009 drops at the beginning of the following phase A time, thereby turning the trigger 2007 on and lowering the potential of the #5 tap of the unit 2003. It should also be noted that when there is no carry the line 2004 is down.

The initial addition of bits is made during an add cycle, all corrections being entered in the adder together with the result of the previous add cycle during the correction cycle. The sum taken from the adder during the add cycle is delayed one bit, as explained above, and this sum is entered into four TR–2 units 2012 through 2015 (FIGS. 20*h* and 20*i*) which comprise the adder register. The sum line 1996 is connected to the #4 tap of each of four ID–2 units 2016 through 2019, the no-sum line 1997 being connected to the #8 tap of each of these units. It should also be noted that the #3 and #10 taps of each of the units 2016 through 2019 are connected to the #9 and #8 taps, respectively, of the corresponding adder register trigger 2012 through 2015 as well as to the #4 and #5 taps, respectively, of a corresponding CF–1 unit 2020 through 2023. The #6 and #5 taps of each of the units 2016 through 2019 are connected through lines 2024 through 2027 to the #3 and #10 taps of a corresponding CF–2 unit 2028 through 2031 as well as to the #5 tap of a CD–2 unit 2032, to the #4 tap of a CD–2 unit 2033, to the #5 tap of the CD–2 unit 2033 and to the #4 tap of the CD–2 unit 2032, respectively. The #4 tap of each of the CF–2 units 2028 through 2031 is connected to the $B_2$ line 430, $B_4$ line 431, $B_8$ line 432 and $B_r$ line 433, respectively, the #5 taps of these units being connected to the $B_s$ line 426, $B_0$ line 427, $B_x$ line 428 and $B_1$ line 429, respectively. Thus, for example, if there is a sum during the addition of "1" bits, the line 1996 goes up at the beginning of the following bit time, i.e., $B_2$ time. Since the $B_2$ line 430 is connected through the CF–2 unit 2028 and through the line 2024 to the #6 tap of the unit 2016, it will be clear that a line 2034 connected to the #3 tap of the unit 2016 drops at this time, thereby turning the trigger 2012 off and raising the potential of the #8 tap thereof. Similarly, a sum during $B_2$, $B_4$ and $B_8$ times is indicated by turning the corresponding trigger 2013, 2014 or 2015 off at the beginning of $B_4$, $B_8$ or $B_r$ time, respectively. In like manner the triggers 2012 through 2015 are turned on by $B_s$, $B_0$, $B_x$ and $B_1$ pulses, respectively, if there is no sum.

The #9 taps of the trigger 2012 through 2015 are connected to the #3 taps of the units 2016 through 2019 as well as to the #4 taps of the units 2020 through 2023 by the line 2034 and lines 2035 through 2037, respectively, the #8 taps of the units 2012 through 2015 being connected by lines 2038 through 2041 to the #10 taps of the units 2016 through 2019 and to the #5 taps of the units 2020 through 2023. Thus, when one of the triggers 2012 through 2015 is turned off, as it is at the beginning of the bit time following a sum, the #8 tap thereof goes up, thereby raising the potential of the #5 tap of the corresponding CF–1 unit 2020 through 2023. The #10 taps of the units 2020 through 2023 are connected via lines 2042 through 2045 to the #6 or #8 taps of the units 2032 and 2033, the #3 and #10 taps of each of which are connected to a line 2046. Since the input to the #4 and #5 taps of the units 2032 and 2033 occurs one bit time prior to the signal on the #6 and #8 taps thereof, it will be understood that the result stored in the adder register triggers 2012 through 2015 is not taken therefrom until three bits later. For example, if a sum is indicated during the addition of "1" bits, the trigger 2012 is turned off at the beginning of $B_2$ time. This causes the #10 tap of the unit 2020 to go up, thereby raising the #6 tap of the unit 2032. Since the #4 tap of the unit 2032, however is connected to the line 2027, which line rises during either $B_r$ or $B_1$ time, it will be clear that the signal applied to the #6 tap of the unit 2032 does not pass therethrough to the line 2046 until the next following $B_1$ or $B_r$ time. Thus, the sum is stored in the adder register for three bits and, if in the above example the sum entered in the trigger 2012 was determined during the add cycle, it should be clear that the line 2046 rises during the next $B_r$ time, i.e., at the beginning of the correction cycle.

The line 2046 is connected through an INV–3 unit 2047 (FIG. 20*i*), through a line 2048 and through a CF–1 unit 2049 (FIG. 20*b*) to a line 2050 which is connected to the #7 and #10 taps of a DA unit 2051 (FIG. 20*i*). The #8 tap of the unit 2051 is connected to the correction cycle line 1826 and the #9 tap of the unit 2051 is connected to the add cycle line 1825. Thus, assuming that the result of an add cycle is stored in the adder register triggers 2012 through 2015 (FIGS. 20*h* and 20*i*), the result is read therefrom onto a line 2052 connected to the #3 tap of the unit 2051 during the next following correction cycle. The line 2052 is connected through a CF–2 unit 2053 (FIG. 20*c*) to the line 1973 which is the B input to the adder. The corrections are entered into the A input to the adder during the correction cycle in a manner to be described shortly; however, before proceeding with the description of correction entry, a brief discussion of the bit carry operation is deemed appropriate.

It will be recalled that when there is a carry the line 2010 connected to the #10 tap of the CF–1 unit 2003 (FIG. 20*j*) rises. This occurs at the beginning of phase A time during the next following bit time. The line 2010 is connected to the #6 tap of a CD–1 unit 2055, the #4 tap of which is connected by a line 2056 to the #10 tap of an INV–2 unit 2057. The #5 tap of the unit 2057 is connected to the line 2027 upon which $B_1$ and $B_r$ pulses appear, as described earlier. Thus, the #4 tap of the unit 2055 is low during both $B_r$ and $B_1$ time, thereby preventing any bit carry signal taken from the line 2010 from passing through the unit 2055 during $B_1$ or $B_r$ time. Since the carry signal is one bit delayed, it will be clear that no carry from the addition of "8" bits can pass through the unit 2055 to a line 2058 connected to the #3 tap of the unit 2055. The line 2058 is connected between the #4 tap of a DO unit 2059 (FIG. 20*k*) and the #3 and #10 taps of the unit 2055 (FIG. 20*j*), and carry signals taken therefrom pass through the unit 2059 (FIG. 20*k*), through a line 2060, through an INV–3 unit 2061 (FIG. 20*j*), through a line 2062, and through the CF–1 unit 1925 to the line 1974 which, it will be recalled, is the C input to the adder. In this way, therefore, carry pulses are entered into the C input to the adder during the next following bit time, where appropriate.

It will be recalled that when there is a decimal carry, a "1" is inserted in the "1" position of the next character and a +6 correction is added to the sum. These are indicated by a carry during $B_8$ time or by a character the sum of the bits of which is greater than 9, the character having an "8" bit and a "4" bit and/or a "2" bit. Referring now to FIG. 20*i*, the sum line 1996 is connected to the #8 tap of a DA unit 2063, the #10 tap of which is connected to the true add line 1854 and the #9 tap of which is connected to the $B_r$ line 433. The #7 tap of the unit 2063 is connected by a line 2064 to the #3 and #10 taps of a CF–2 unit 2065, the #4 tap of which is connected to the line 2044 and the #5 tap of which is connected to the line 2043. It will be recalled that the lines 2043 and 2044 are high when a "2" or a "4," respectively, is stored in the adder register, and whenever a "2" or a "4" is present in the adder register, the line 2064 connected to the #3 and #10 taps of the unit 2065 is up. Since the sum line 1996 is high during $B_r$ only if the sum includes an "8" bit ($B_8$ time of the add cycle corresponds to $B_r$ time of the correction cycle), it will be clear that a line 2066 connected to the #3 and #5 taps of the unit 2063 goes up during $B_r$ time if on true add when a sum is indicated and a "4" or a "2" bit is present in the adder register. Thus, when there is an "8" and a "4" or a "2" bit present in the sum of two binary coded numbers on true add, the line 2066 rises during $B_r$ time.

The line 2066 is connected through an INV–2 unit 2067 (FIG. 20*j*) and a line 2068 to the #9 tap of a TR–2 unit 2069 and to the #4 tap of a CF–1 unit 2070. When the line 2066 rises, there is a decimal carry, and at this time the trigger 2069 is turned off, thereby raising the potential of the #8 tap thereof. Since the #8 tap of the unit 2069 is connected to the #5 tap of the unit 2070, a line 2071 connected to the #10 tap of the unit 2070 rises at $B_r$ time if there is a decimal carry. The $B_4$ line 431 is connected to the #5 tap of the INV–2 unit 2067, the #10 tap of which is connected by a line 2072 to the #8 tap of the unit 2069. Thus, the trigger 2069 is reset at the beginning of each $B_4$ time, thereby raising the potential of the #9 tap thereof and of a line 2073 connected to the #3 tap of the unit 2070. Additionally, if there is a bit carry during $B_r$ time, i.e., a carry during the addition of "8" bits, the line 2068 drops and turns the trigger 2069 off at this time, since the bit carry line 2004 is connected to the #8 tap of an ID–2 unit 2074 (FIG. 20*i*). The $B_r$ line 433 is connected to the #5 tap of the unit 2074 and the #10 tap of this unit is connected to the line 2068. Thus, the occurrence of a carry during $B_r$ time or the presence of an "8" bit and a "4" or a "2" bit in the adder register causes the trigger 2069 to be turned off and thereby indicates a decimal carry by raising the potential of the line 2071.

The $B_8$ line 426 and the $B_x$ line 428 are connected to the #4 and #3 taps, respectively, of a DO unit 2075 (FIG. 20*j*), the #7 tap of which is connected via line 2076 to the #8 tap of a DA unit 2077, and when either of the lines 426 or 428 rises, the line 2076 goes up. The $B_8$ line 426 is additionally connected to the #6 tap of the unit 2075, the $B_0$ line 427 being connected to the #5 tap of this unit. Thus, a line 2078 connected between the #9 tap of the unit 2075 and the #8 tap of a DA unit 2079 rises during both $B_8$ and $B_0$. During a correction cycle, it will be recalled that $B_8$ time corresponds to $B_2$ time, $B_0$ time corresponds to $B_4$ time and $B_x$ time corresponds to $B_8$ time. Thus, during the correction cycle the line 2076 rises at the time that corrections are being added to the "2" bits as well as at the time that corrections are being added to the "8" bits. Similarly, the line 2078 rises both when corrections are being made to the "2" bits and to the "4" bits. The #7 taps of the units 2077 and 2079 are connected to the correction cycle line 1826, the #10 tap of the unit 2079 being connected to the decimal carry line 2071, which line is additionally connected to the #8 tap of the DA unit 1919. The #9 tap of the unit 2079 is connected to the true add line 1854, the #10 tap of the unit 2077 being connected to the no-decimal-carry line 2073 and the #9 tap of this unit being connected to the complement add line 1853.

On true add it is necessary to insert a +6 correction when there is a decimal carry, and $B_0$ and $B_8$ pulses applied to the #8 tap of the unit 2079 pass therethrough to a line 2080 connected to the #3 and #5 taps of the unit 2079 when on true add if the decimal carry line 2071 is up. The line 2080 is connected through a CF–2 unit 2081 (FIG. 20*k*) to the line 1921 which is connected eventually to the A input to the adder, as described earlier. Thus, a "4" and a "2" are entered into the A input to the adder during the correction cycle under these conditions. Additionally, a +10 correction is necessary during the correction cycle when on complement add if there is no decimal carry. These conditions are mixed in the DA unit 2077 (FIG. 20*j*) and, if met, a $B_8$ and a $B_x$ pulse pass therethrough, during the correction, through a line 2082 and through the CF–2 unit 2081 (FIG. 20*k*) to the line 1921 from where it is entered into the A input to the adder.

When on complement add it is necessary to add a "1" bit in the low order number to thereby convert the number from the nines complement to the tens complement, as discussed earlier. It will also be recalled that the line 1846 connected to the #3 taps on the CD–2 units 1883 and 1844 (FIG. 20*d*) rises at $C_9B_1$ time during an $E_2$ gate if on a complement add operation. This line is connected to the #3 tap of the DO unit 2059 (FIG. 20*k*), the #7 tap of which is connected through the INV–3 unit 2061 (FIG. 20*j*) and through the CF–1 unit 1925 to the carry input 1974 to the adder, and on a complement add operation, therefore, a carry is always entered into the low order number.

The sum arrived at during the add cycle is added to the corrections in the adder in the same manner initially described in connection with the initial entry of two characters into the adder. This is accomplished during the correction cycle, at the end of which time the final sum of the two characters is entered into the adder register triggers 2012 through 2015 (FIGS. 20*h* and 20*i*). During the next following add cycle the final sum is scanned from these triggers onto the line 2050 as described earlier, and this data is exactly one character late. This data is mixed with an add cycle pulse in the DA unit 2051 (FIG. 20*i*), the #5 tap of which is connected through a line 2085 and through the CF–2 unit 2053 (FIG. 20*c*) to a line 2086 which is connected through an INV–3 unit 2087 (FIG. 20*i*), through a line 2088 and through a CF–1 unit 2049 (FIG. 20*b*) to a line 2090. It will be understood, therefore, that the data taken from the line 2090 is the corrected sum of the addition which took place during the preceding character time. Thus, there is a one character delay in the adder circuitry.

The line 2090 is connected to the #5 tap of the gating means 1800 (FIG. 20–*l*), a CD–2 unit, the #8 tap of which is connected to the add-subtract gate line 1902. Thus, during the add-subtract gate the data from the adder is taken from the #3 and #10 taps of the unit 1800 through a line 2092 to the #9 tap of a DA unit 2093 (FIG. 20*f*) as well as to the #5 tap of the INV–2 unit 1583. (This data is to be written on the accumulator track, and due to the delay within the adder it is one character late.) The #10 tap of the DA unit 2093 is connected to a line 2094 from which a pulse referred to as the accumulator write gate is taken and which is high when it is desired to write on the accumulator track, as will be described. When this line is up, the data taken from the line 2092 passes through the unit 2093 to a line 2095 connected to the #5 tap of the unit 2093. The line 2095 is connected through a CF–2 unit 2096 and through a line 2097 to the #4 tap of a WA–1 unit 2098 (FIG. 10), the #10 tap of which is connected by a line 2099 through a WA–2 unit 2100 to a line 2101 which is connected to the write winding of the transducer associated with the accumulator track.

It was mentioned earlier that the line 2092 was also connected to the #5 tap of the unit 1583 (FIG. 20*f*). The data taken from the line 2092 is, therefore, inverted by the unit 1583 and taken by a line 2102 through the CF–1 unit 1586 to a line 2104 which is connected between the #10 tap of the unit 1586 and the #7 tap of the DA unit 1588. The #8 tap of the unit 1588 is connected to the line 2094 which, as will be described, is high when it is desired to write on the accumulator track. The #3 tap of the unit 1588 is connected through the CF–2 unit 2096, through a line 2106, through an EA–1 unit 2107 (FIG. 10), through a line 2108 and through an EA–2 unit 2109 to a line 2110 which is connected to the erase winding of the transducer associated with the accumulator track. It will be recalled that the accumulator transducer is disposed one character late, and it will be understood, therefore, that the data taken from the adder is recorded on the accumulator track on time since this data is also one character late.

The line 2094 (FIG. 20*f*) from which the write accumulator control pulse is taken is controlled to go up at various times, one of which is during the add-subtract write gate taken from the line 1902 (FIG. 20–*l*) which, it will be recalled, is up during the $a_2$ field or fields when $T_2=L$ or $M$ during an $E_2$ gate. Since the line 1902 is connected through a DO unit 2111, through a line 2112 and through a CF–2 unit 2113 to the line 2094, the line 2094 goes up for the duration of the add-subtract write gate. Thus, when $T_2=L$ or $M$, data taken from the core buffer, together with data from the accumulator, is entered into the adder and the sum thereof is recorded upon the accumulator track for future reference. Additional data may be added to the sum by one or more similar instructions where $T_2=L$ or $M$ and the sum may be read from the accumulator by making $T_1=L$ or $M$.

When $T_1=L$ or $M$, the data taken from the transducer associated with the accumulator track is read one character early. This data, it will be recalled, is taken from the line 1939 (FIG. 20*e*) connected to the #3 tap of the CF–1 unit 1935. In addition to being connected to the input of the accumulator delay unit, the line 1939 is connected to the #6 tap of the CD–2 unit 1792 (FIG. 20*k*). The $E_1$ gate line 825 is connected through the CF–2 unit 2113 (FIG. 20–*l*) to a line 2114 which is connected to the #4 tap of the unit 1792 (FIG. 20*k*), and if on an $E_1$ gate, therefore, it will be clear that all data from the accumulator track passes through the unit 1792 to the line 1791 from where it is entered into the adder either directly or through the complementer depending upon the sign of the accumulator data. The pulse taken from the line 2114 is referred to as the accumulator-to-adder gate and when $T_1=L$ or $M$ it exists for the duration of the $E_1$ gate.

While in the the adder the data from the accumulator is provided with suitable corrections, as described earlier in the case where the data is negative, and the corrected data is taken from the line 2090 (FIG. 20*h*) to the #8 tap of a CD–1 unit 2115 (FIG. 11*g*). Since the #10 tap of this unit is connected to the line 800 from which data is taken and entered into the core buffer during the $E_1$ cycle, as described earlier, and since the #8 tap is connected to the $T_1=L$ or $M$ line 345, it will be clear that data from the accumulator is entered on time into the core buffer during the $E_1$ cycle gate, as described earlier, for transfer therefrom to a location determined by the $T_2$ portion of the address.

The data taken from the accumulator via the line 2090 connected to the #10 tap of the CF–1 unit 2049 (FIG. 20*b*) is provided, where necessary, with an "*x*" bit in the lower order digit thereof when the sign of the accumulator data is negative. Additionally, redundancy bits are inserted where necessary to provide an odd bit count, and zeros are inserted where no "1," "2," "4" or "8" bits are present in a given character. The zero insert structure is disclosed in FIGS. 20*b*, 20*c*, 20*h* and 20*i*. As mentioned above, it is desired to insert a "0" bit in each character having no numerical bits. For this reason, the #3 tap of the CF–1 unit 2020 (FIG. 20*h*) is connected via a line 2116 to the #8 tap of a DA unit 2117 (FIG. 20*i*), which line is high when the adder register contains no "1" bit, i.e., when the TR–2 unit 2012 (FIG. 20*h*) is on. Similarly, the #3 tap of the CF–1 unit 2023 (FIG. 20*i*) is connected to the #7 tap of the unit 2117 by a line 2118, which line is high when no "8" bit is present in the adder register. Two lines 2119 and 2120 connected between the #3 taps of the CF–1 units 2021 and 2022 (FIG. 20*i*), respectively, and the #6 and #4 taps, respectively, of a CD–2 unit 2121 are up when no "2" or "4" bit, respectively, is present in the adder register.

The #3 tap of the unit 2121, therefore, is high when there is neither a "2" nor a "4" bit in the adder register and a line 2122 connected between this tap and the #9 tap of the DA unit 2117 is therefore high at this time. The #10 tap of the DA unit 2117 is connected to the $E_1$ gate line 825, and it should now be clear that on an $E_1$ gate if there are no numerical bits stored in the adder register triggers 2012 through 2015, a line 2123 connected to the #3 and #5 taps of the unit 2117 is high. This line is connected to the #4 tap of the ID–2 unit 2074 where it is mixed with a $B_r$ phase B pulse taken from the #10 tap of a CD–2 unit 2124 (FIG. 20*c*) by a line 2125 to the #6 tap of the unit 2074 (FIG. 20*i*). This is true since the $B_r$ line 433 and phase B clock pulse line 402 are connected to the #8 and #5 taps, respectively, of the unit 2124 (FIG. 20 ). Thus, if no numerical bits are present in the adder register triggers during an $E_1$ gate at $B_r$ phase B time, the #3 tap of the unit 2074 (FIG. 20*i*) drops at $B_r$ phase B. This tap is connected to the #9 tap of a TR–2 unit 2126 (FIG. 20*h*) by a line 2127, and under the conditions outlined this trigger is turned off at $B_r$ phase B, thereby raising the potential of the #8 tap thereof which is connected via a line 2128 to the #5 tap of a CD–1 unit 2129 (FIG. 20*b*) and to the #3 tap of an INV–2 unit 2130 (FIG. 20*h*). The $B_0$ line 427 is connected to the #8 tap of the unit 2129 (FIG. 20*b*), and it will be clear, therefore, that when the trigger 2126 (FIG. 20*h*) is off, $B_0$ pulses pass through the unit 2129 (FIG. 20*b*) to the line 2086 which is connected to the #10 tap thereof, thereby inserting "0" bits in the data entered through the INV–3 unit 2087 (FIG. 20*i*) and CF–1 unit 2049 to the line 2090.

The line 2026 (FIG. 20*h*) from which $B_8$ and $B_x$ pulses are taken is connected to the #4 tap of the INV–2 unit 2130, and it will be clear, therefore, that the line 2128 connected to the #3 tap of this unit drops during $B_8$ and $B_x$, thereby turning on the trigger 2126 at these times to reset it. It should further be noted that if a "6" is present in the adder register triggers 2013 and 2014 (FIGS. 20*i* and 20*h*) at $B_r$ phase B time when on complement add, it is desired to insert a "0" on the line 2090 since after the necessary correction is made, i.e., a −6 or +10 as described earlier, the result is zero. For this reason, the lines 2043 and 2044 are connected to the #8 and #5 taps, respectively, of the CD–2 unit 2121 (FIG. 20*i*), the #10 tap of which is connected by a line 2131 to the #4 tap of the unit 2124 (FIG. 20*c*). The #6 tap of this last mentioned unit is connected to the complement add line 1853. Thus, when on complement add and a "4" and a "2" bit are present in the adder register, the line 2122 which is connected to the #3 tap of the unit 2124 is up, thereby causing the zero insertion as described previously.

The sign of the data read from the accumulator is indicated, as mentioned above, by placing an "*x*" bit in the digit defined either by the $a_1b_1$ comparison or $C_9$ of that field or both, if negative. The $C_9$ line 490 is connected to the #5 tap of a CF–2 unit 2132 (FIG. 20*a*), the #4 tap of which is connected to the $a_1b_1$ comparison line 833, and upon either an $a_1b_1$ comparison or a $C_9$ pulse, a line 2133 connected to the #3 and #10 taps of the unit 2132 goes up. This line is connected to the #8 tap of a DA unit 2134 (FIG. 20*h*), the #7 tap of which is connected to the $B_x$ line 428, the #10 tap of which is connected to the $E_1$ gate line 825 and the #9 tap of which is connected to the complement add line 1853. Thus, on complement add, i.e., when the accumulator data is negative, and on an $E_1$ gate, a line 2135 connected to the #3 and #5 taps of the unit 2134 goes up during $B_x$ of the character time initiated by the $a_1b_1$ comparison as well as during $B_x$ of $C_9$ time. The line 2135 is connected through a CF–2 unit 2136 to the line 2086, thereby inserting an "*x*" bit in the first digit to be read from the accumulator track into the core buffer as well as in each $C_9$ character during the $E_1$ gate when the corresponding accumulators are negative.

All data going to the core buffer on an $E_1$ cycle, including "*x*" and "0" bits where necessary, is therefore present on the line 2086. Each character of data appearing on this line is checked by means to be described to determine the bit count, i.e., whether the bit count is odd or even, to thereby detect whether or not a parity bit should be inserted. The line 2086 is connected to the #6 tap of a CD–1 unit 2137 (FIG. 20*g*), and all data taken from the line 2086 is thereby present on this tap. The $B_r$ line 433 is connected to the #4 tap of an INV–2 unit 2138 as well as to the #8 tap of the CD–1 unit 2137, and since the #3 tap of the unit 2138 is connected to the #4 tap of the unit 2137 by a line 2139, the #4 tap of the unit 2137 is high except during $B_r$ time, thereby permitting the data taken from the line 2086 to be taken from the #3 tap of the unit 2137 to the #6 tap of an ID–2 unit 2140 (FIG. 20*h*) by a line 2141 except during $B_r$ time. The #4 tap of the unit 2140 is connected to the phase B clock pulse line 402 and phase B data pulses, therefore, appear on a line 2142 connected between the #3 tap of the unit 2140 and the #7 and #3 taps of a TR–1 unit 2143 (FIG. 20*g*). This trigger determines the necessity of a parity insertion.

The trigger 2143 is reset in an "on" condition at the beginning of each $B_s$ time since the $B_s$ line 426 is connected through the INV–2 unit 2138 and a line 2144 to the #8 tap thereof. Thus, on reset of the #9 tap of the unit 2143 is high, thereby raising the potential of a line 2145 connected between this tap and the #5 tap of the CD–1 unit 2137. When this line is high, it will be clear that $B_r$ pulses applied to the #8 tap of the unit 2137 pass therethrough to the line 2086 connected to the #10 tap of this unit, thereby inserting parity bits. Each bit taken from the line 2086 through the unit 2137 and through the unit 2140 to the #7 and #3 taps of the parity trigger 2143 causes the condition of this trigger to be reversed, and it should be clear, therefore, that if an odd number of bits are applied to the #7 and #3 taps of the unit 2143, the #9 tap thereof will be low thereafter, thereby preventing the insertion of a parity bit. Conversely, if an even number of bits are present, the line 2145 will be high and a parity bit is inserted.

After each operation involving an accumulator, it is necessary to determine the new accumulator sign and to enter the sign into the various relays to be described. It is also necessary to determine whether or not the accumulator is empty and whether or not it has overflowed. The rules utilized to determine these conditions were set forth earlier. Referring now to FIGS. 20*a*, 20*b*, 20*g* and 20*h*, the structure which operates under these rules is shown. It will be recalled that when on true add and the next accumulator sign is "—," that accumulator is positive if there is a decimal carry. The presence of these conditions is examined during $B_0$ of each $C_9$ or $C_L$ time during the add-subtract gate. The line 1894 upon which $C_9$ and $C_L$ pulses appear is connected to the #9 and #10 taps of a DA unit 2146 (FIG. 20*g*), the #7 tap of which is connected to the add-subtract gate line 1902 and the #8 tap of which is connected to the $B_0$ line 427. Thus, during the add-subtract gate $C_9B_0$ and $C_LB_0$ pulses are taken from the #3 and #5 taps thereof by a line 2147 through a INV–3 unit 2148 (FIG. 20*h*), through a line 2149, through a CF–1 unit 1879 (FIG. 20*h*) and through a line 2151 to the #9 tap of a DA unit 2152 (FIG. 20*g*) as well as to the #9 taps of three more DA units 2153 through 2155. The true add line 1854 is connected to the #7 tap of the DA unit 2152, and the decimal carry line 2071, which, it will be recalled, is high from $B_r$ through $B_x$ when there is a decimal carry, is connected to the #8 tap of the unit 2152. The #10 tap of the unit 2152 is high, as will be described, when the accumulator is negative. Thus, when the accumulator is negative on true add and when there is a decimal carry, a $C_9B_0$ pulse and a $C_LB_0$ pulse are taken from the #3 and #5 taps of the unit 2152 by a line 2156 and through a CF–2 unit 2157 (FIG. 20*a*) to a line 2158 which controls the accumulator sign relays to be set to indicate that the accumulator is positive.

The #10 tap of the unit 2152 (FIG. 20*g*) is high when the accumulator concerned is negative and is connected through a line 2159 to the #10 tap of a CF–1 unit 2160. It will be recalled that the line 1877 rises during the field preceding a given accumulator if that accumulator is positive. This line is connected to the #5 tap of an ID–1 unit 2161, the #8 tap of which is connected to the $B_x$ line 428, as is the #6 tap thereof. The #4 tap of the unit 2161 is high during the field preceding a given accumulator when that accumulator is negative, since this tap is connected to the line 1881. Thus, when the next accumulator is positive, the #10 tap of the unit 2161 drops during $B_x$ time, the #3 tap of this unit being arranged to drop at this time when the next accumulator is negative. The #3 and #10 taps are connected by lines 2162 and 2163 to the #9 and #8 taps, respectively, of a TR–2 unit 2164, the condition of which indicates the accumulator sign. Thus, when the next accumulator is positive, the trigger 2164 is turned on, it being turned off when the next accumulator sign is "—." When on, the #9 tap thereof is high, which tap is connected by the line 2162 to the #4 tap of the unit 2160, thereby raising a line 2165 connected to the #3 tap of the unit 2160 and lowering the potential of the line 2159 connected to the #10 tap of the unit 2160.. Conversely, when off, the accumulator sign is "—" and the line 2159 is high, the line 2165 being low at this time.

If on true add and there is a decimal carry during the high order of an accumulator, i.e., into $C_9$ of the next following accumulator or into $C_L$, and the accumulator concerned is positive, it will be recalled that the accumulator has overflowed. This condition is determined by the DA unit 2154 (FIG. 20*g*), the #8 tap of which is connected to the decimal carry line 2071, the #7 tap of which is connected to the true add line 1854, the #10 tap of which is connected to the accumulator + line 2165, and the #9 tap of which is connected to the line 2151 which is high during $B_0$ of $C_9$ and $C_L$ on an add-subtract gate. Thus, if there is a decimal carry from the high order digit on true add when the accumulator is positive, a line 2166 connected between the #3 and #5 taps of the unit 2165 and the #4 tap of a CF–2 unit 2167 (FIG. 20*a*) goes up, thereby raising the potential of a line 2168 connected to the #3 and #10 taps of the unit 2167. Thus, when the line 2168 rises, it is an indication that there has been an overflow in the accumulator concerned and it controls the entry of an indication thereof in the accumulator relays, as will be described.

When on complement add and there is no decimal carry out of the high order of the accumulator when the accumulator is positive, the new accumulator sign is "—," as described earlier. The no-decimal carry line 2073 is connected to the #8 tap of the DA unit 2153 (FIG. 20*g*), the #7 tap of which is connected to the complement add line 1853. Additionally, the #10 tap of the unit 2153 is connected to the accumulator + line 2165, the #9 tap being connected to the line 2151 which is high during $B_0$ of $C_9$ or $C_L$. Thus, if the conditions outlined above are met, a line 2169 connected between the #3 and #5 taps of the DA unit 2153 and the #5 tap of the CF–2 unit 2157 (FIG. 20*a*) goes up, thereby controlling a line 2170 connected to the #10 tap of the unit 2157 to rise at this time. When the line 2170 goes up, therefore, the new accumulator sign is "—" and this signal controls the entry of this condition into the accumulator relays.

When the accumulator is positive, it will be clear that on true add this condition is unchanged. Similarly, when an accumulator is negative, the condition is unchanged if a complement addition operation is taken, and under these conditions the accumulator relays are maintained in their status guo.

It will be recalled that an overflow is additionally indicated if there is no decimal carry from the high order digit on complement add if the accumulator is negative. This condition is determined by the DA unit 2155 (FIG. 20*g*), the #8 tap of which is connected to the no-demicalcarry line 2073, the #7 tap of which is connected to the complement add line 1853, the #10 tap of which is connected to the accumulator — line 2159, and the #9 tap of which is connected to the line 2151. Thus, when these conditions are met, a line 2171 connected between the #3 and #5 taps of the unit 2155 and the #5 tap of the unit 2167 (FIG. 20*a*) rises either at $C_9B_0$ or $C_LB_0$, whichever is appropriate, thereby controlling the overflow line 2168 to rise at this time.

Whether or not an accumulator field is blank is determined by the condition of a TR–2 unit 2172 (FIG. 20*h*) which, when off, indicates that the accumulator concerned is empty. This trigger is reset at $C_8B_0$ time in an "off" condition. The $B_0$ line 427 is connected to the #6 tap of an ID–2 unit 2173, the $C_8$ line 510 being connected to the #4 tap of this unit and the #3 tap thereof being connected by a line 2174 to the #9 tap of the trigger 2172. Thus, at $C_8B_0$ the #9 tap of the trigger 2172 is pulled down, thereby resetting this trigger in an "off" condition. This trigger is turned on whenever a line 2175 connected between the #8 tap thereof and the #10 tap of the ID–2 unit 2173 drops, which occurs when the #5 and #8 taps of the unit 2173 are high simultaneously. The #5 tap is connected to the add-subtract gate line 1902, the #8 tap being connected to the line 2085 from which data from the adder register is taken. It will be recalled that since the data taken from the adder register is gated by an add cycle pulse, only "1," "2," "4" and "8" bits of each character appear on the line 2085, and if a numerical bit does appear on the line 2085 during an add-subtract gate, it will be clear that the line 2175 drops, thereby turning on the trigger 2172 and indicating that the accumulator is not empty. Unless this occurs, therefore, the trigger 2172 remains off and indicates that the accumulator is empty.

The lines 2174 and 2175 are connected to the #4 and #5 taps, respectively, of a CD–1 unit 2176, the #6 and #8 taps of which are connected by a line 2177 to the #3 and #5 taps of a DA unit 2178. The write accumulator control pulse taken from the line 2094, which pulse is the add-subtract gate when $T_2=L$ or $M$, is connected to the #10 tap of the unit 2178. The #9 tap of this unit is connected to the $B_r$ line 433 and the #7 and #8 taps are connected to the $C_9$ or $C_L$ line 1894. Thus, when $T_2=L$ or $M$, the line 2177 rises during each $C_9B_r$ and $C_LB_r$ time for the duration of the add-subtract gate, thereby controlling one or the other of two lines 2179 and 2180 to rise, depending upon the condition of the trigger 2172. Thus, if the trigger 2172 is off, the line 2180 goes up at this time and indicates that the accumulator is empty. Similarly, if the trigger 2172 is on, the line 2179 rises and indicates that the accumulator is not empty. The lines 2179 and 2180 control the entry of these conditions into the accumulator relays, as will be described shortly.

The relays for indicating the condition of the various accumulators are operated by the corresponding one of 41 THY–5 units 2181 through 2221 (FIGS. 20*a*, 20*b* and 20*c*), the #5 taps of which are connected through the pick or hold coil of an associated relay 2230 through 2250 (FIG. 23) by lines 2181*a* through 2221*a*, as indicated in the drawing. The #3 taps of the units 2181 through 2184 are connected to the $F_8$ line 550, the #3 taps of the units 2185 through 2188 being connected to the $F_7$ line 551. Similarly, the #3 taps of the units 2189 through 2220 are connected to the corresponding one of the several lines $F_6$ through $F_0$ and $C_L$, 552 through 558 and 564, respectively. The #7 tap of each of the units 2181 through 2221 is connected to a line 2222 which in turn is connected through the contacts (FIG. 3*a*) of the $E_2$ relay 66 and through CB–23 to +70 volts as well as through the contacts of either the $I_1$ or $p_1$ relays 60 or 63 and through the points of CB–24 to +70 volts. Thus, the line 2222 is connected to +70 volts during $I_1$, $p_1$ and $E_2$ cycles, as long as there is no error, thereby supplying voltage to these thyratrons (FIGS. 20*a*, 20*b* and 20*c*) at these times. The #6 tap of each of these units is connected by a line 2223 to −60 volts which supplies bias thereto.

The units 2181, 2185, 2189, etc., through 2217 are utilized to energize the latch winding of the corresponding one of the ten relays 2230 through 2239, one side of the latch winding of each of which is connected to the #5 tap of the corresponding unit 2181, etc. The #8 tap of each of these last mentioned units 2181 through 2217 is connected to the line 2158 which, it will be recalled, rises, when the new sign of the accumulator under consideration is "+" at $C_9B_0$ or $C_LB_0$. Thus, when an accumulator is positive, the #3 and #8 taps of the THY–5 unit 2181 through 2217 corresponding thereto are both up during the following field time and cause that unit to fire, thereby energizing the latch coil of the associated relay and releasing its contacts to their normal condition. Thus, for example, assuming accumulator 7 to be positive, the line 2158 connected to the #8 tap of the limit 2189 rises during $C_9B_0$ time and when the $F_6$ line 552 goes up, as it does immediately following accumulator 7, the latch coil of the relay 2132 is energized and its contacts are released, thereby indicating that accumulator 7 is positive.

The THY–5 units 2182, 2186, 2190, etc., through 2218 are utilized to energize the pick winding of the corresponding one of the ten relays 2230 through 2239, one side of each of which is connected to the #5 tap of the corresponding unit 2182 through 2218. The #8 tap of each of these units is connected to the line 2170 which rises during $C_9B_0$ and $C_LB_0$ during the add-subtract gate when the next accumulator is negative. Thus, as described above in connection with the latch coil of the relays 2230 through 2239, the pick coils of these relays are energized immediately following the field time corresponding to each accumulator if that accumulator is negative.

When the accumulator condition is indicated as zero, it will be recalled that the line 2180 rises. This line is connected to the #8 tap of each of the units 2183, 2187 through 2219 and the pick winding of each of the ten relays 2240 through 2249 is connected to the #5 tap of the corresponding THY–5 unit and is energized, therefore, immediately following each accumulator field if that accumulator is empty. Similarly, the latch winding of the corresponding one of the ten relays 2240 through 2249 is energized under the control of the THY–5 units 2184, 2188, etc. through 2220 when there is a coincidence of pulses from the no-zero line 2179 and the corresponding field line connected to the #8 and #3 taps, respectively, thereof. Thus, for example, if accumulator 7 is empty, the contacts of the relay 2242 are latched in their transferred condition, these contacts being in their normal condition when accumulator 7 is not empty.

Overflow is indicated by the condition of the relay 2250, the pick winding of which is connected between the #5 tap of the unit 2221 (FIG. 20*c*) and ground. The overflow line 2168 is connected to the #3 and #8 taps of the unit 2221, and it will be understood that when the overflow line goes up, the relay 2250 is picked. This relay is reset manually, as will be described, and when its contacts are in their transferred condition, it will be clear that this indicates that an overflow in one of the ten accumulators has taken place.

The points of the various relays 2230 through 2250 are arranged as shown in FIG. 35 to provide an indication on the control panel of the condition of the various relays. For example, assuming that accumulator 7 is positive and not empty, the contacts of the relays 2232 and 2242 will be in their normal condition, thereby connecting a hub 2251, designated as the accumulator 7 hub, through the n/c *a* contacts of the relay 2242 and through the n/c *b* contacts of the relay 2232 to a terminal 2252 marked positive, thereby indicating that this accumulator is positive. If the accumulator were empty, the hub 2253 would be connected to the accumulator 7 hub 2251. The condition of the other accumulators 0 through 9 is similarly indicated by the corresponding 0, + and — hubs. Also, if there is an overflow in any one of the accumulators, the relay 2250 is energized and its contacts are latched in their transferred condition. Referring to FIG. 35, it will be seen that when there is an overflow, an "in" hub 2254 is connected through the n/o *a* points of the relay 2250 to a "yes" hub 2255, it being connected through the n/c *a* points of this relay to the "no" hub 2256 when there has been no overflow. Thus, when it is desired to determine whether a particular accumulator has overflowed, the condition of the contacts of the relay 2250 is determined by sending an appropriate pulse to the "in" hub, it being arranged to exit from the "yes" or "no" hubs 2255 or 2256 depending upon whether or not there was an overflow. One further note of interest is that +140 volts is connected through the n/c *a* contacts (FIG. 23) of each of the relays 2230 through 2239 to the corresponding line 1855 through 1864 which are connected to the CD–1 units 1865 through 1869 (FIGS. 20*c* and 20*d*), and when an accumulator is positive, the corresponding line 1855 through 1864 is high, as described earlier.

It should be noted, before proceeding with the description of the arithmetic circuitry, that when $T_2=X$, i.e., when a multiplication is to be performed, accumulators 0 and 1, into which the product is entered, are set positive. This is accomplished in the following manner. The $C_L$ line 564 is connected to the #6 tap of a CD–2 unit 2260 FIG. 20*b*), the #4 and #8 taps of which are connected to the $E_2$ gate line 1410*a*. The #5 tap of the unit 2260 is connected to the $F_0$ line 558. Thus, on an $E_2$ gate during $F_0$ as well as during $C_L$, a line 2261 connected to the #3 and #10 taps of the unit 2260 rises, this line being also connected to the #6 tap of the CD–1 unit 2129. Since the $T_2=X$ line 346 is connected to the #4 tap of the unit 2129, the line 2158 connected to the #3 tap of the unit 2129 rises at this time, thereby causing the relays 2238 and 2239 to be tripped. Thus, when $T_2=X$, the accumulators 0 and 1 are set positive during an $E_2$ gate.

To perform multiplication, two instructions are necessary. First, the multiplicand is taken from its $T_1$ address through the core buffer and is written on the multiplicand track 1803 ten times, once in each of the ten fields thereof. This is accomplished by an instruction such as C23 N99 06 wherein a six-digit multiplicand is taken from character positions 18 through 23 of track C and is written into the first six positions of each field of the multiplicand track.

The $E_1$ cycle of this operation is completely normal and is accomplished in the manner described earlier herein. The $E_2$ cycle, however, is altered when $T_2=N$. The $E_2$ gate is initiated by the odd home pulse, as described above; however, it does not terminate with the $E_2$ cycle gate since when $T_2=N$ the #4 tap of the CD–1 unit 1565 (FIG. 11*k*) is low, it being connected to the line 344 which is high only when $T_2\neq X$ or $N$. The $E_2$ gate is terminated by the even home pulse connected through the unit 1494 (FIG. 11*i*) when $T_2=N$, to the line 1566 as described earlier. The $E_2$ cycle is further distinguished in that the $E_2$ cycle gate occurs ten times during the $E_2$ gate, it being initiated each $C_9$ time and closed at every *mn* comparison thereafter. The line 343 which is high when $T_2=N$ is connected to the #5 tap of the CD–1 unit 1496 (FIG. 11*j*), the #8 tap of which is connected to the $C_9$ line 490. Thus, when $T_2=N$, the line 1497 rises each $C_9$ time, thereby raising the potential of the #8 tap of the ID–2 unit 1495 at these times. Since the $E_2$ gate line 1410*a* is connected to the #5 tap of this unit, the line 1498 drops each $C_9$ time when $T_2=N$ on an $E_2$ gate, thereby turning on the $E_2$ cycle gate trigger 1499 which, as described earlier, initiates the $E_2$ cycle gate. The trigger 1499 is turned off by the *mn* comparison signal as described previously, thereby terminating each $E_2$ cycle gate.

In order to obtain an *mn* comparison during each field of the multiplicand track, it is necessary to reset the buffer address ring. This is accomplished by resetting the buffer address circuits each $C_0B_4$ time when $T_2=N$. The $B_4$ line 431 is connected to the #8 tap of the CD–2 unit 1560 (FIG. 11*k*), the $C_0$ line 518 being connected to the #5 tap of this unit. Thus, the line 1561 goes up each $C_0B_4$ time. Since the #4 tap of the unit 1551 is connected to the $T_2=N$ line 343, this pulse passes through the unit 1551, through the INV–3 unit 1553, through the CF–1 unit 1555 to the #6 tap of the CD–1 unit 1540. Further, since the line 1559 connected to the #4 tap of the unit 1540 is high unless $T_2=X$, it will be seen that the $C_0B_4$ pulse will appear on the line 1443, which causes the buffer address rings to be reset as described earlier and thereby permits an *mn* comparison to be made during each field of the multiplicand track. Thus, when $T_2=N$, the $E_2$ cycle gate is initiated at $C_9$ of each field of the multiplicand track and each is terminated at the *mn* comparison. It will be recalled that the data entered into the core buffer is regenerated on read-out and it should be clear, therefore, that during each $E_2$ cycle gate the multiplicand is read from the core buffer into the appropriate field of the multiplicand track.

Means are provided to insert zeros in those character positions of the multiplicand track not occupied by the multiplicand. For example, if a six-digit multiplicand is utilized, zeros are inserted in character positions $C_3$, $C_2$, $C_1$ and $C_0$. This is accomplished by inserting "0" bits onto the multiplicand track on an $E_2$ gate when $T_2=N$ as long as the $E_2$ cycle gate does not exist (it will be recalled that the $E_2$ cycle gate terminates at each *mn* comparison and is not initiated until the following $C_9$ time). The $B_0$ line 427 is connected to the #7 tap of a DA unit 2265 (FIG. 11*g*), the #8 tap of which is connected to the $E_2$ gate line 1410*a* and the #9 tap of which is connected to the #3 tap of a CF–1 unit 2266 (FIG. 11*h*). Since the #4 tap of the unit 2266 is connected to the $T_2=N$ line 343, the #9 tap of the unit 2265 (FIG. 11*g*) is high when $T_2=N$, and if on an $E_2$ gate, therefore, $B_0$ pulses pass through the unit 2265, through a line 2267 to the #6 tap of the CD–1 unit 1577. The $E_2$ cycle gate line 975 is connected through an INV–2 unit 964 (FIG. 11*a*) where it is inverted and fed through a line 2269 to the #4 tap of the unit 1577 (FIG. 11*g*), and it will be clear, therefore, that in the absence of an $E_2$ cycle gate the aforementioned $B_0$ pulses occurring during the $E_2$ gate pass through the CD–1 unit 1577 to the line 1576 connected to the #3 tap thereof. These pulses are mixed in the unit 1577 with a $q\neq c$ signal applied through the line 342 to the #5 tap thereof, and if $q\neq c$ the #5 tap is high and the aforementioned $B_0$ pulses pass through the unit 1577 to the line 1578 from where they are taken, as described previously, to the write relay matrix (FIG. 15) which is controlled by the condition of the instruction register relays to connect this signal together with the signals taken from the core buffer to the transducer associated with the multiplicand track for recordation thereon. Thus far, it has been shown how the multiplicand is loaded onto the multiplicand track and how "0" bits are recorded in empty character positions left on the multiplicand track.

The second instruction necessary to accomplish a multiplication operation is to send the multiplier into the core buffer from where it is taken one character at a time to control the successive addition of the multiplicand. To accomplish this, the $T_2$ address is made equal to X. For example, an instruction such as B25 X99 03 might be used, which would accomplish removing a three-digit multiplier from character positions 25, 24 and 23 of track B into the core buffer from where it is taken one character at a time in a manner to be described. Thus, the normal $E_1$ cycle is taken, thereby entering the multiplier into the core buffer.

When $T_2=X$, the $E_2$ gate is initiated as disclosed previously; however, it is not terminated until the reference mark following the number of drum revolutions corresponding to *mn* since it is desired to enter one multiplier digit at a time into the character register of the core buffer during each drum revolution. Each multiplier digit remains in the single character register for one full drum revolution, and, therefore, after a number of drum revolutions corresponding to *mn*, the high order multiplier digit has been in the single character register for a full revolution. At the end of the $E_2$ gate multiplication has been completed, as will become clear later. Referring now to FIG. 11*k*, the $T_2=X$ line 346 is connected to the #5 tap of the CD–1 unit 1565, the #8 tap of which is connected by the line 1570 to the #3 tap of the CD–2 unit 1560, which tap, it will be recalled, rises when the *mn* comparison line 862 and the process drum home line 359 are both up. Since the $E_2$ gate terminates when the line 1566 connected to the #10 tap of the unit 1565 drops, it will be clear that when $T_2=X$ the process drum home pulse next following the *mn* comparison signal terminates the $E_2$ gate.

The $E_2$ cycle gate, when $T_2=X$, is initiated by the process drum home pulse and is terminated at $C_9$ time, i.e., at the beginning of each field. The $E_2$ cycle gate occurs once for each multiplier digit and each such gate lasts from the process drum home pulse until the beginning of $F_9$. The $T_2=X$ line 346 is connected to the #5 tap of the CD–1 unit 814 (FIG. 11*j*), the #8 tap of which is connected to the process drum home pulse line 359. Since the $E_2$ cycle gate pulse is initiated when the line 1497 goes up, as described earlier, it will be clear that when $T_2=X$ the process drum home pulse causes the $E_2$ cycle gate to be initiated. The $E_2$ cycle gate is terminated, as explained earlier, when the line 1538 connected to the #9 tap of the trigger 1499 drops. The $T_2=X$ line 346 is additionally connected to the #5 tap of the ID–1 unit 1547 (FIG. 11*k*), the $C_9$ line 490 being connected to the #8 tap of the unit 1547, and when $T_2=X$, therefore, the $E_2$ cycle gate is terminated at the beginning of the first $C_9$ pulse, i.e., at $F_9C_9$. Successive $E_2$ cycle gates are created in a similar manner for the duration of the $E_2$ gate.

The buffer counters are not reset until the occurrence of the reference mark following *mn* drum revolutions when $T_2=X$. This is true since the reset line 1443 (FIG. 11*k*) is low as long as the line 1559 connected to the #4 tap of the CD–1 unit 1540 is low. The line 1559 is high unless the #4 and #6 taps of the unit 1558 are both high. The #4 tap of the unit 1558 is connected to the $T_2=X$ line 346, the #6 tap of this unit being connected to the $E_2$ gate line 1410*a*, and during the $E_2$ gate, therefore, when $T_2=X$ the line 1559 is low. At the expiration of the $E_2$ gate, however, the line 1410*a* drops, at which time the line 1559 rises and permits the process drum home pulse to pass through the unit 1540 to reset the buffer counters, as described earlier. Thus, the buffer counters are not reset until the last multiplier digit has been read from the single character register.

Each $E_2$ cycle gate is utilized to control the entry of successive characters of the multiplier into the single character register. The clock pulses gated to the core buffer during the $E_2$ cycle gate initiate the operation of the buffer clock which controls the read-out of the low order digit of the multiplier into the single character register in a normal fashion. This digit, however, is maintained in the single character register for a full drum revolution until the next $E_2$ cycle gate. Referring now to FIG. 31, the #5 taps of the various T units 1067 of the core buffer corresponding to the "1," "2," "4" and "8" bits are connected by a corresponding line 2276 to the #2 tap of a corresponding K unit 2277. The #6 tap of each of the last mentioned K units is connected by corresponding lines 2278 to the multiplier comparator (FIG. 11–*l*). Thus, each $E_2$ cycle gate enters a multiplier digit into the T units 1067 of the character register from where it is taken by the lines 2278 parallelly by bit to the multiplier comparator.

The function of the multiplier comparator (FIG. 11–*l*) is to raise the potential of a line 2279 at the beginning of the field time corresponding to the particular multiplier digit then present in the single character register. The "1" bit line 2278*a* is connected to the #8 tap of a CD–1 unit 2280 as well as to the #4 tap of an INV–2 unit 2281, the lines 2278*b* through 2278*d* being similarly connected to the #8 and #4 taps of a corresponding set of CD–1 units and INV–2 units 2282—2283, 2284—2285, 2286—2287. The #3 and #10 taps of each of the INV–2 units 2281, 2283, 2285 and 2287 are connected to the #4 and #5 taps, respectively, of the corresponding CD–1 unit 2280, 2282, 2284 and 2286. The #6 tap of each of these CD–1 units is connected by a corresponding line 2288 through 2291 to the #5 tap of the corresponding INV–2 units. The line 2288 is additionally connected to the #7, #8, #9 and #10 taps of a DD unit 2292 as well as to the #9 tap of a DD unit 2293. The line 2289 is connected to the #7, #8 and #10 taps of the unit 2293 as well as to the #9 tap of a DD unit 2294. The line 2290 is connected to the #7, #8 and #10 taps of the DD unit 2294 as well as to the #9 tap of a DD unit 2295, the #7 and #10 taps of this last mentioned unit being connected to the line 2291. The #5, #6, #3 and #4 taps of the unit 2292 are connected to the $F_1$, $F_3$, $F_5$ and $F_7$ lines, 557, 555, 553 and 551, respectively, the #5 tap of the unit 2293 being connected to the $F_9$ line 540. Thus, the line 2288 rises during $F_1$, $F_3$, $F_5$, $F_7$ and $F_9$. In a similar manner the line 2289 rises during $F_2$, $F_3$, $F_6$ and $F_7$ since the #4, #3 and #6 taps of the unit 2293 are connected to the $F_2$, $F_3$ and $F_6$ lines 556, 555 and 552, the #5 tap of the unit 2294 being connected to the $F_7$ line 551. Similarly, the line 2290 is controlled to rise during $F_4$, $F_5$, $F_6$ and $F_7$, the line 2291 being arranged to rise during $F_8$ and $F_9$.

When the multiplier digit in the single character register corresponds to the field time, a line 2296 connected between the #3 and #10 taps of each of the units 2280, 2282, 2284 and 2286 and the #5 tap of an INV–2 unit 2297 is low. For example, assuming that a "4" is present in the single character register, the line 2278*c* is high, the lines 2278*a*, 2278*b* and 2278*d* being low. Under these conditions the #4 and #8 taps of the units 2280, 2282 and 2286 are high and low, respectively, the #4 and #8 taps of the unit 2284 being low and high, respectively. During $F_1$ time the line 2288 is high, thereby rendering the #6 and #5 taps of the CD–1 unit 2280 high and low, respectively. Under these conditions, the line 2296 is high since both the #4 and #6 taps of the unit 2280 are high. Similarly, during $F_2$ and $F_3$ the line 2296 is high since during $F_2$ the #6 and #4 taps of the unit 2282 are high and during $F_3$ these taps as well as the #6 and #4 taps of the unit 2280 are high. During $F_4$, however, the line 2290 is high, the lines 2291, 2289 and 2288 being low, thereby rendering the #5 and #6 taps of the unit 2284 low and high, respectively. It will also be noted that at this time the #5 and #6 taps of the units 2280, 2282 and 2286 are high and low, respectively. Also, since the #6 and #4 taps or the #8 and #5 taps of the various CD–1 units 2280, 2282, 2284 and 2286 are not high together, the line 2296 is low for the duration of $F_4$.

The #10 tap of the INV–2 unit 2297 is connected to the #5 tap of a CF–1 unit 2298, the #4 tap of which is connected to the $T_2=X$ line 346. Thus, the #5 and #10 taps of the unit 2298 are high during the field defined by the multiplier digit then present in the single character register. The #3 tap of the unit 2298 is connected to the #7 tap of a DA unit 2299, the #10 tap of the unit 2298 being connected to the #8 tap of the unit 2299. The #9 tap of the unit 2299 is connected to the $E_2$ gate line 1410*a*, the #10 tap thereof being connected to the line 451 which, it will be recalled, is high from the beginning of $F_9$ to the end of $F_0$ time. Thus, when $T_2=X$ on an $E_2$ gate, a line 2300 connected to the #3 and #5 taps of the unit 2299 rises for the duration of the field defined by the multiplier digit. The line 2300 is connected through a CF–1 unit 2301 to the line 2279 and the pulse taken from the line 2279 is utilized to control the creation of the necessary gates for gating the multiplicand from the multiplicand from the multiplicand track through the adder, etc., as will be described next.

The magnetic transducer associated with the multiplicand track is connected through a suitable preamplifier such as is shown in FIG. 12, the output of which is taken by a line 2302 (FIG. 10) through an RA–1 unit 2303 and through a line 2304 to the #8 tap of the ID–2 unit 1827 (FIG. 20*e*), the #5 tap of which is connected to the phase A clock pulse line 400. Thus, inverted phase A data from the multiplicand track is taken from the #10 tap of the unit 1827 by a line 2306. The line 2306 is connected to the #9 tap of a TR–2 unit 2307, and at the beginning of each data pulse the trigger 2307 is turned off, thereby raising the potential of a line 2308 connected to the #8 tap thereof. The trigger 2307 is turned on when the #3 tap of the INV–2 unit 1937 (FIG. 20*f*) drops. It will be recalled that phase B clock pulses are applied through the line 402 to the #5 tap of the unit 1937 and that these pulses, inverted in form, are differentiated by the condenser 1938. Since these differentiated pulses are applied to the #4 tap of the unit 1937, the #3 tap thereof drops at the end of phase B, thereby turning on the trigger 2307 (FIG. 20*e*) at this time. Thus, the #8 tap of the trigger 2307 is high for full bits corresponding to the data taken from the multiplicand track. The line 2308 is additionally connected to the #5 tap of a CF–1 unit 2309, the #10 tap of which is connected by a line 2310 to the #6 tap of a CD–2 unit 2311 (FIG. 20*k*). The data from the multiplicand track is mixed here with a pulse referred to as the multiplicand-to-added gate which is applied to the #4 tap of the unit 2311 by a line 2312, and this data passes through the unit 2311 into the A input to the adder in the manner discussed previously for the duration of the multiplicand-to-adder gate.

Referring now to FIG. 20*k*, the $B_x$ line 428 is connected to the #6 tap of an ID–2 unit 2313. The line 2279 which, it will be recalled, is high during the field corresponding to the multiplier digit when $T_2=X$ is connected to the #8 tap of a DA unit 2314 (FIG. 20–*l*), the #7 and #10 taps of which are connected to the $C_9$ line 490. Thus, a line 2315 connected to the #3 tap of the unit 2314 rises at $C_9$ during the multiplier comparison signal, i.e., at the beginning of the field corresponding to the multiplier digit then in the character register. The line 2315 is connected to the #4 tap of the ID–2 unit 2313 (FIG. 20*k*), and a line 2316 connected between the #3 tap of the unit 2313 and the #9 tap of a TR–2 unit 2317 drops at $C_9B_x$ during the multiplier comparison signal, i.e., at $B_x$ time of the first character occurring during the field defined by the multiplier digit. This causes the unit 2317 to be turned off, thereby raising the potential of the #8 tap thereof which is connected to the #4 tap of a CF–1 unit 2318 by a line 2319. This initiates the multiplicand-to-adder gate which is taken from the #3 tap of the unit 2318 by the line 2312. The multiplicand-to-adder gate is terminated when the #10 tap of the unit 2313 drops since this tap is connected to the #8 tap of the trigger 2317 by the line 2319. The #8 tap of the unit 2313 is connected to the $B_1$ line 429, the #5 tap being connected to the $F_0$ line 558. Thus, at $F_0B_1$ time the trigger 2317 is turned on, thereby terminating the multiplicand-to-adder gate. It has been shown, therefore, that the multiplicand-to-adder gate is initiated at $C_9B_x$ time during the field corresponding to the multiplier digit and terminates at $F_0B_1$ time. The multiplicand-to-adder gate, therefore, permits the data from the multiplicand track to pass through the unit 2311 to the line 1791 from where it is entered into the A input to the adder.

The signal taken from the read transducer associated with the partial product track is taken through a suitable preamplifier such as is shown in FIG. 12, through a line 2320 (FIG. 10) and through an RA–1 unit 2321 to a line 2322 which is connected to the #5 tap of the ID–2 unit 1930 (FIG. 20*e*). As mentioned above, the #8 tap of the unit 1930 is connected to the phase A clock pulse line 400, and inverted phase A partial product data pulses are taken from a line 2323 connected to the #10 tap of the unit 1930. Since this line is also connected to the #9 tap of a TR–2 unit 2324, it will be clear that each data pulse taken from the partial product track causes the trigger 2324 to be turned off. This trigger, like the trigger 2307, is turned on at the end of the following phase B time since the #8 tap thereof is connected by a line 2325 to the #10 tap of the INV–2 unit 1936 (FIG. 20*f*), which tap drops at the end of phase B time as described earlier. Thus, the partial product data is taken from the line 2325 as positive, full bit pulses, and since this line is connected through the CF–1 unit 1935 (FIG. 20*e*) to a line 2326, positive-going, full bit data pulses from the partial product track appear on the line 2326. This line is connected to the #10 tap of the DA unit 1970 (FIG. 20*d*), the #9 tap of which is connected to a line 2327 upon which a pulse referred to as the partial-product-to-adder gate is entered.

The partial-product-to-adder gate is defined by the condition of a TR–2 unit 2328 (FIG. 20*k*), this trigger being off for the duration of this gate. The multiplicand-to-adder gate is connected by the line 2312 to the #8 tap of the ID–2 unit 1898 (FIG. 20–*l*), the #5 tap of which is connected by a line 2329 to the #5 tap of the DA unit 2314. The #9 tap of the unit 2314 is connected to the $B_0$ line 427 and the #10 tap of the unit 2314 is connected to the $C_9$ line 490. Thus, the line 2329 goes up during $C_9B_0$, and if the multiplicand-to-adder gate is present on the #8 tap of the ID–2 unit 1898, $C_9B_0$ pulses will pass therethrough to a line 2330 connected between the #10 tap of the unit 1898 and the #9 tap of the trigger 2328 (FIG. 20*k*). Thus, during the multiplicand-to-adder gate the trigger 2328 is turned off at $C_9B_0$, thereby raising the potential of a line 2331 connected to the #8 tap of this trigger. The line 2331 is connected through the CF–1 unit 2318 to the line 2327 and when the unit 2328 is turned off, therefore, the partial-product-to-adder gate is initiated since at this time the line 2327 rises. This gate is terminated when the #3 tap of an INV–2 unit 2332 (FIG. 20–*l*) drops since this tap is connected to the line 2331. This occurs when the $C_L$ line 564 goes up. Thus, the partial-product-to-adder gate is initiated at $C_9B_0$ during the second field after the initiation of the multiplicand-to-adder gate and lasts through $F_0$, the multiplicand-to-adder gate terminating at $F_0B_1$ time. This is true since the multiplicand-to-adder gate is not initiated until $B_x$ time. Each of these gates, therefore, exists for the number of fields corresponding to the multiplier digit; however, the partial-product-to-adder gate is delayed one field.

The permanent magnet erase head, disposed adjacent the partial product track, is arranged to erase all data recorded thereon by the write head after it has passed the read head. Assuming, therefore, that the multiplication operation is just being initiated, it will be clear that the partial product track contains no data, it all having been erased by the head. It should also be noted that prior to a multiplication operation it may be desirable to erase data previously entered into accumulators 0 and 1 by an instruction wherein $T_1=M$ which causes erasure as will be described later.

The partial product data taken from the line 2326 (FIG. 20*d*) is gated onto a line 2333 connected to the #5 tap of the DA unit 1970 by the partial-product-to-adder gate. The line 2333 is connected to the #4 tap of the CD–2 unit 1972 where it is mixed with an add cycle pulse taken from the line 1825 connected to the #6 tap of the unit 1972 Thus, the numerical portion from the partial product track is taken from the #3 tap of the unit 1972 via the line 1973 to the B input to the adder for the duration of the partial-product-to-adder gate, i.e., from the multiplier comparison signal plus one field through $F_0$.

During the first drum revolution the multiplicand is entered into the adder a number of times corresponding to the low order digit of the multiplier. The first time the multiplicand is read from the track during this drum revolution, it is added to nothing since the partial-product-to-adder gate is closed at this time. The multiplicand, therefore, passes through the adder, etc., to the line 2090 which is connected to the #10 tap of the CF–1 unit 2049 (FIG. 20*b*). This data is one character late due to tne one-character delay present in the adder. The line 2090 is connected to the #7 tap of the DA unit 2093 (FIG. 20*f*) where it is mixed with phase B clock pulses taken from the line 402 connected to the #8 tap of the unit 2093. Thus, phase B data pulses are taken from the #3 tap of the unit 2093, through a line 2334 and through a CF–2 unit 2335 to a line 2336 which is connected to the #4 tap of a WA–1 unit 2337 (FIG. 10). The #10 tap of the unit 2337 is connected through a line 2338, a WA–2 unit 2339 and a line 2340 to the winding of the write transducer associated with the partial product track. Thus, the data taken from the adder is recorded on the partial product track one character late.

To permit this data to be read therefrom exactly one field time later, the read head associated with the partial product track is displaced only nine characters beyond the write head. Thus, data is read from the partial product track exactly one field after it is entered from the multiplicand track into the adder. This data, as described above, is connected to the B input of the adder through the DA unit 1970 (FIG. 20*d*) where it is added to the multiplicand taken from the second field of the multiplicand track. This action continues, with the successive partial products being taken from the adder onto the partial product track and back into the adder, through $F_0$ time. After $F_1$ time, however, data from the multiplicand track is no longer entered into the A input to the adder due to the termination of the multiplicand-to-adder gate, and data taken from the accumulator which corresponds to prior partial products, as will be explained, is entered into the A input to the adder at this time. Assuming that accumulator 0 has been reset to an empty condition, the final partial pproduct corresponding to the low order digit of the multiplier is added to zero during $F_0$ time and the sum thereof taken from the adder one character time late is recorded on the accumulator track, as will now be described.

As mentioned above, the final partial product of each multiplier digit is entered, on time, into the B input of the adder during $F_0$ time. It will also be recalled that data from the accumulator direct is connected via the line 1939 to the #6 tap of the CD–2 unit 1792 (FIG. 20*k*) where it is mixed with a signal taken from the line 2114 connected to the #4 tap of the unit 1915. When $T_1=L$ or $M$, the line 2114 is up for the duration of the $E_1$ gate, as explained earlier; however, as will be shown, when $T_2=X$ the line 2114 is up from $F_0C_9$ to $F_0C_0$ during the $E_2$ gate. A TR–2 unit 2341 is turned off when the #9 tap thereof drops, which tap is connected to the #3 tap of an INV–2 unit 2342 by a line 2343. This occurs at $F_1C_8$ on an $E_2$ gate when $T_2=X$ since the $T_2=X$ line 346 is connected to the #7 tap of a DA unit 2344, the $F_1$ line 557 is connected to the #10 tap of this unit, the $C_8$ line 510 is connected to the #9 tap of this unit, and the $E_2$ gate line **1410*a* is connected to the #8 tap of this unit, the #3 and #5 taps of the unit 2344 being connected to the #4 tap of the INV–2 unit 2342 by a line 2345. Thus, when $T_2=X$ on an $E_2$ gate, the trigger 2341 is turned off at $F_1C_8$ time, thereby raising the potential of the #8 tap thereof. Since this tap is connected to the #4 tap of a CF–1 unit 2346 by a line 2347, it will be clear that a line 2348 connected to the #3 tap of the unit 2346 goes up at this time. The #8 tap of the unit 2341 is additionally connected by the line 2347 to the #3 tap of an ID–2 unit 2349, the #6 tap of which is connected to the $F_0$ line 558 and the #4 tap of which is connected to the $C_0$ line 518. Thus, at $F_0C_0$ the #3 tap of the unit 2349 drops, thereby turning the unit 2341 on at this time and lowering the potential of the line 2348. The pulse taken from the line 2348** is referred to as the check accumulator $E_2$ gate and exists from $F_1C_8$ to $F_0C_0$.

The line 2348 is connected to the #8 tap of a CD–2 unit 2350, the #5 and #6 taps of which are connected to the $F_0$ line 558. Additionally, the #4 tap of the unit 2350 is connected to the $C_8$ line 510. Since the #5 tap of the unit 2350 is up for the duration of $F_0$, it will be clear that the line 2114 connected to the #8 tap of this unit is up until $F_0C_0$ since the signal applied to the #8 tap thereof by the line 2348 is high from $F_1C_8$ to $F_0C_0$, as described above. Thus, on an $E_2$ gate when $T_2=X$, the accumulator-to-adder gate lasts from $F_0C_9$ to $F_0C_0$, i.e., $F_0C_9$ through $F_0C_1$, and data taken from accumulator 0 passes through the CD–2 unit 1792 and through the line 1791 to the A input to the adder during this time. It should be noted, however, that since data taken from the accumulator track is read one character early, the data entered into the A input to the adder from the accumulator track is that data located in character positions $C_8$ through $C_0$ of accumulator 0 since it is this data that is defined by the pulse applied to the #4 tap of the unit 1792. It is in this way that column shift is accomplished.

The result taken from the adder, which result is one character late due to the delay in the adder, is then rewritten on the accumulator track, and since the write transducer associated with the accumulator track is disposed one character late, it will be clear that this data is written on time within accumulator 0, i.e., in character positions $C_9$ through $C_1$ of $F_0$. As described earlier, data from the adder is taken from the line 2090 connected to the #10 tap of the CF–1 unit 2049 (FIG. 20*b*) and this line is connected to the #8 tap of a CD–2 unit 2311 (FIG. 20*k*), the #5 tap of which is connected to a line 2352 which is high from $F_0C_8$ until $C_E$ on an $E_2$ gate when $T_2=X$. This condition is determined by the condition of a TR–2 unit 2353, which unit is turned off when the #9 tap thereof drops. This occurs when the #5 and #8 taps of an ID–2 unit 2009 go up since the #10 tap of the unit 2009 is connected by a line 2355 to the #9 tap of the unit 2353.

It was mentioned earlier that the #4 and #6 taps of the CD–2 unit 2350 are connected to the $C_8$ and $F_0$ lines, respectively, and it will be clear, therefore, that the #5 tap of the unit 2009 rises at $F_0C_8$ since the #3 tap of the unit 2350 is connected to the #5 tap of the unit 2009 by a line 2356. The #8 tap of the unit 2009 is connected to the line 2348, and since this line is high from $F_1C_8$ until $F_0C_0$, it will be understood that the trigger 2353 is turned off at $F_0C_8$. The $C_E$ line 568 is connected through the INV–2 unit 2342 and through a line 2357 to the #8 tap of the unit 2353 as well as to the #5 tap of the unit 2346. Thus, the trigger 2353 is turned on by the $C_E$ pulse. The #5 tap of the unit 2346, therefore, rises at $F_0C_8$ time during the check accumulator $E_2$ gate and drops at $C_E$ time, thereby permitting data from the adder to pass through the unit 2311 to the line 2092 connected to the #10 tap thereof. It will be recalled that the data to be written on the accumulator track is taken from the line 2092 through the DA unit 2093 (FIG. 20*f*), etc., to the accumulator write transducer, this data being gated at the #10 tap of the unit 2093 by the accumulator write gate. When $T_2=X$, the accumulator write gate lasts for the duration of the pulse taken from the line 2352, i.e., from $F_0C_9$ to $C_E$, since the line 2352 is connected through the DO unit 2111 (FIG. 20–*l*), through the line 2112 and through the CF–2 unit 2113 to the line 2094 which is connected to the #10 tap of the unit 2093 (FIG. 20*f*). Thus, data taken from the adder during $F_0$ is recorded in accumulator 0 on time.

During the next following drum revolution the multiplicand is entered onto the partial product track via the adder a number of times corresponding to the new multiplier digit, as described earlier, and assuming this to be the operation associated with the second multiplier digit, it will be understood that the partial product associated with the first multiplier digit is now stored in accumulator 0, the low order thereof being present in $C_9$ of accumulator 0. During $F_1$ time the data stored in the positions $C_8$ through $C_0$ of accumulator 1, as well as the data stored in position $C_9$ of accumulator 0, is taken from the accumulator delay output and is rewritten on the accumulator track. Since the data from the accumulator delay is on time, and, further, since the accumulator write head is one character late, it will be understood that this data is re-recorded wholly within accumulator 1. This, together with the operation previously described wherein the data read from the accumulator track one character early was added to the final partial product taken from the partial product track, accomplishes the column shift operation, and during $F_0$, therefore, the new final partial product corresponding to the second multiplier digit is added to the previous final partial product taken from the accumulator track.

During $F_1$ time, therefore, it is desired to read the data from the output of the accumulator delay unit, i.e., data recorded in positions $F_1C_8$ through $F_0C_9$, and to re-record it wholly within accumulator 1, thereby accomplishing the shift mentioned above. The output of the accumulator delay unit is taken via the line 1967 to the #8 tap of the CD–1 unit 1589 (FIG. 20*f*), the #5 tap of which is connected via a line 2361 to the #8 tap of a TR–2 unit 2362 (FIG. 20k). As long as the #8 tap of the unit 1589 (FIG. 20*f*) is high, data from the accumulator delay will pass therethrough to the line 2092 from where it is taken to the #9 tap of the unit 2093 and mixed with the accumulator write gate. The #8 tap of the trigger 2362 (FIG. 20*k*) goes up when the #5 and #8 taps of the ID–2 unit 2349 rise. The #8 tap of the unit 2349 is connected to the line 2348 which is high, it will be recalled, from $F_1C_8$ to $F_0C_0$. The #5 tap of this unit is high for the duration of $F_1$ since it is connected to the $F_1$ line 557. Thus, the trigger 2362 is turned off at $F_1C_8$ and is turned on when the #10 tap of the INV–2 unit 2332 (FIG. 20–*l*) drops. This occurs when the #5 tap of this unit goes up, which tap is connected to the line 2356. The line 2356, it will be recalled, rises at $F_0C_8$ time, thereby turning the trigger 2362 (FIG. 20*k*) on at this time and prohibiting the passage of further data taken from the line 1967 through the unit 1589 (FIG. 20*f*). Thus, data recorded in positions $C_8$ through $C_0$ of accumulator 1, as well as the data recorded in character position $C_9$ of accumulator 0, passes through the line 2092 at this time. The check accumulator $E_2$ gate is connected from the line 2348 through the unit 2111 (FIG. 20–*l*), etc., to the accumulator write gate line 2094, and it will be clear, therefore, that from $F_1C_8$ through $F_0C_8$ accumulator data passes through the unit 2093. (FIG. 20*f*) to the accumulator write head. Further, since the accumulator write head is disposed one character late, this data is recorded wholly within accumulator 1.

During $F_0$ the final partial product corresponding to the multiplier digit now present in the single character register is added to the prior final partial product stored in accumulator 0, the low order digit of the new final partial product being added to the second order digit of the prior final partial product taken from accumulator 0. This result is taken from the adder and is recorded in accumulator 0 as described earlier. The above described operations are repeated for each multiplier digit and at the end of a number of drum revolutions corresponding to the number of multiplier digits, it will be clear that the product is stored in accumulators 1 and 0 from where it may be taken in the same manner as data is taken from any accumulator.

It will be recalled that when $T_1=M$ the accumulator or accumulators defined by the $a_1$ and $mn$ portions of the instruction are reset to zero. This is accomplished by writing redundancy bits on the defined accumulator track and erasing the remainder of the track. Since the transducers utilized herein are arranged to erase when they are not writing, it will be seen that merely by inserting redundancy bits only is this action accomplished. When $T_1=M$, the line 341 connected to the #4 tap of an ID–1 2365 (FIG. 20–*l*) is high. The #6 tap of this unit goes up during $C_8$ during the read-out gate since the read-out gate line 1910 is connected to the #9 tap of the DA unit 1907, since the $C_8$ line 510 is connected to the #10 tap of this unit, and since the #5 tap of the unit 1907 is connected by a line 2366 to the #6 tap of the unit 2365. Thus, at $C_8$ during the read-out gate the #3 tap of the unit 2365 drops, and since this tap is connected by a line 2367 to the #9 tap of a TR–2 unit 2368, this trigger is turned off at the beginning of $C_8$ time. The trigger 2368 is turned on when the #8 tap thereof drops, which occurs when the #10 tap of the ID–1 unit 2365 drops since these taps are connected by a line 2369. The #8 tap of the unit 2365 is connected to the $C_8$ line 510, the #5 tap of this unit being connected to the line 1909 which is low during the read-out gate. Thus, the first $C_8$ pulse after the expiration of the read-out gate causes the #10 tap of the unit 2365 to drop, thereby turning the trigger 2368 on. The line 2369 is additionally connected through the CF–1 unit 1912 to a line 2370 which is connected to the #6 tap of the CD–2 unit 1800 as well as to the #3 tap of the DO unit 2111.

The line 2370 is high, therefore, at the first $C_8$ pulse following the initiation of the read-out gate and drops with the first $C_8$ pulse after the expiration of the read-out gate and thereby raises the #6 tap of the unit 1800 during this period. The $B_r$ line 433 is connected to the #4 tap of the unit 1800 and while the #6 tap is high, therefore, $B_r$ pulses pass therethrough to the line 2092 from where they are taken to the #9 tap of the DA unit 2093. Here they are gated by the accumulator write gate and are entered into the accumulator write and erase amplifiers. It should be noted that the accumulator write gate in this instance is the same pulse that is applied to the #6 tap of the unit 1800 since this pulse is connected by the line 2320 through the unit 2111, etc., to the accumulator write gate line 2094. Thus, when $T_1=M$ redundancy bits are recorded on the full field or fields defined by the $a_1$ and $mn$ portions of the instruction of the accumulator track.

One further note of interest is that a true add operation is forced when $T_2=X$. This is true since the multiplier comparison signal taken from the line 2279 is connected through the DO unit 1839 (FIG. 20*d*), through the line 1851 and through the INV–2 unit 1847 to the #8 tap of the TR–2 unit 1849, thereby turning this trigger on and raising the potential of the true add line 1854, thereby forcing a true add operation when $T_2=X$.

As will become clear shortly, means are provided throughout the machine of the invention to check both $E_1$ and $E_2$ data for parity errors whereby the operation of the machine is halted if an odd bit parity count is not present for each character checked. The arithmetic circuits, as well as the information transfer circuits, are provided with parity checkers, and referring to FIGS. 20*e* and 20*f*, the circuits for checking the output of the accumulator delay unit (i.e., all data taken from any one of the accumulators provided on the accumulator track), data from the multiplicand track and data from the partial product track are shown. The phase B clock pulse line 402 is connected to the #8 tap of a CD–1 unit 2380 (FIG. 20*e*), the #5 tap of which is high if there was no parity error during the $E_1$ cycle, as will become clear. The #4 tap of the unit 2380 is high, as will be explained, if there is no parity error during the $E_2$ cycle. Thus, if there is no $E_1$ nor $E_2$ parity error, phase B clock pulses are taken from the #3 tap of the unit 2380 via a line 2381 to the #6 and #5 taps of an ID–2 unit 2382 as well as to the #4 and #8 taps of two ID–2 units 2383 and 2384.

The output of the accumulator delay unit taken from the line 1967 is connected to the #8 tap of the unit 2382, and it will be clear, therefore, that when there has been no $E_1$ nor $E_2$ parity error, inverted phase B data from the accumulator delay, taken from the #10 tap of the unit 2382, is applied to the #3 and #7 taps of a TR–1 unit 2385 since these taps are connected to the #10 tap of the unit 2382 by a line 2386. The unit 2385 is provided to determine whether the number of bits in a given character is odd or even, and is reset each character time when a line 2387 connected to the #9 tap thereof drops. The line 2387 additionally is connected to the #3 tap of the ID–2 unit 2382, and since the #4 tap of this unit is connected to the $B_s$ line 426, it will be clear that the line 2387 drops each $B_s$ phase B time, thereby turning the trigger 2385 off. Thus, each bit taken from the accumulator delay unit is arranged to reverse the condition of stability of the trigger 2385, and if there is an odd number of bits in a given character the #8 tap thereof will be low at the end of that character time, thereby indicating no parity error. However, if there is an even number of bits, the #8 tap, and thus a line 2388 connected thereto, is high.

The line 2388 is connected to the #4 tap of a CF–1 unit 2389, the #3 tap of which is connected to the #6 and #8 taps of a CD–2 unit 2390 (FIG. 20*f*) by a line 2391. The #4 tap of the unit 2390 is connected to the read-out gate line 1910. Thus, when $T_1=L$ or $M$, the condition of the parity trigger 2385 (FIG. 20*e*) is indicated on a line 2392 (FIG. 20*f*) connected to the #3 tap of the unit 2390, for the duration of the read-out gate. This line is connected to the #8 tap of an ID–2 unit 2393 where it is mixed with a $B_s$ phase A pulse taken from the line 441 connected to the #5 and #6 taps of the unit 2393. Thus, if the trigger 2385 (FIG. 20*e*) is off at $B_s$ phase A time, thereby indicating an error, the #10 tap of the unit 2393 (FIG. 20*f*) drops at the end of the character concerned. A line 2394 connected to the #10 tap of the unit 2393 is also connected to the #9 tap of a TR–2 unit 2395, and this trigger is therefore turned off at $B_s$ phase A when there is an error during the preceding character on accumulator read-out. This causes the #8 tap of the trigger 2395 to rise, thereby raising the potential of a line 2396 since the #8 tap of the unit 2395 is connected through a line 2397 and through a CF–1 unit 2398 to the line 2396. Thus, the line 2396 goes up if there is a parity error during accumulator read-out, it being low at all other times, and in this way signifies an $E_1$ error.

It was mentioned earlier that the #5 tap of the CD–1 unit 2380 (FIG. 20*e*) is low if there was an $E_1$ error. It will be seen that this is true since this tap is connected to the line 2394 which is low under these conditions. Thus, if there is an $E_1$ error, phase B clock pulses cannot pass through the CD–1 unit 2380 to the line 2381 thereafter.

When $T_2=L$ or $M$ or when $T_2=X$, the data taken from the accumulator delay controls the condition of the parity trigger 2385 (FIG. 20*e*) in the manner described above, and the condition of this trigger, as mentioned earlier, is indicated on the #8 tap of the CD–2 unit 2390 (FIG. 20*f*) where it is mixed with either the add-subtract gate or the check accumulator $E_2$ gate. The add-subtract gate taken from the line 1885 and the check accumulator $E_2$ gate taken from the line 2348 are connected through a DO unit 2059 (FIG. 20*k*) and through a line 2400 to the #5 tap of the unit 2390 (FIG. 20*f*). Thus, when $T_2=L$ or $M$ or when $T_2=X$, the condition of the parity trigger 2385 is indicated by the potential of a line 2401 connected to the #10 tap of the unit 2390. This line is connected to the #4 tap of the ID–2 unit 2393, the #6 tap of which, as mentioned above, is connected to the $B_s$ phase A line 441, and if the parity trigger 2385 is off at $B_s$ phase A, an error has been made and this causes the #3 tap of the unit 2383, and thus a line 2402 connected thereto, to drop. Since the line 2402 is connected to the #9 tap of a TR–2 unit 2403, this trigger is turned off if there is an error at this time, thereby raising the potential of a line 2404 connected to the #8 tap thereof and indicating an $E_2$ accumulator error. The line 2404 is connected through the CF–1 unit 2398 to a line 2405, the potential of which, as will be explained later, controls the operation of the machine under the condition where there has been an $E_2$ error.

The line 2402 is connected also to the #4 tap of the CD–1 unit 2380 (FIG. 20*e*) and if low, i.e., if there has been an $E_2$ error, phase B clock pulses are prevented from passing through the unit 2380 to the line 2381, it being clear that such pulses will pass from the line 402 to the line 2381 when there is no $E_1$ nor $E_2$ parity error.

The line 2312 from which the multiplicand-to-adder gate is taken is connected to the #6 tap of a CD–1 unit 2406 (FIG. 20*e*), the #8 tap of which is connected to the line 2327 from which the partial-product-to-adder gate is taken. Data taken from the multiplicand track is present on the line 2310, which line is connected between the #10 tap of the CF–1 unit 2309 and the #5 tap of the ID–2 unit 2384. Similarly, data taken from the partial product track is present on the line 2326 which is connected between the #10 tap of the CF–1 unit 1935 and the #5 tap of the ID–2 unit 2383. The #10 taps of the units 2383 and 2384 are connected via lines 2407 and 2408, respectively, to the #7 and #3 taps of each of two TR–1 units 2409 and 2410, respectively, the #9 taps of which are connected via lines 2411 and 2412, respectively, to the #3 taps of the units 2383 and 2384, respectively. Since $B_s$ pulses are applied to the #6 taps of the units 2383 and 2384 and since phase B clock pulses are applied to the #4 taps of these units when there is no error, the triggers 2409 and 2410 are turned off at each $B_s$ phase B time, thereby resetting them immediately prior to each character. Further, since inverted phase B data pulses from the partial product track and multiplicand track, respectively, are applied to the #7 and #3 taps of each of the triggers 2409 and 2410, it will be clear that when there is an even number of bits in any character, thereby indicating an error, the #8 taps of these triggers are high during the following $B_s$ time, they being low when there is an odd bit count.

The #8 taps of the triggers 2409 and 2410 are connected to the #5 and #4 taps of the CD–1 unit 2406, and when checking data from the partial product track, therefore, the condition of the trigger 2409 will be indicated by the potential of the line 2401 connected between the #3 and #10 taps of the unit 2406 and the #4 tap of the unit 2393 (FIG. 20*f*). Similarly, the condition of the trigger 2410 (FIG. 20*e*) is indicated by the potential of the line 2401 when the data from the multiplicand track is being checked. Thus, when there is a parity error in a character when checking either the partial product or multiplicand track, the line 2401 rises at $B_s$ phase A following that character, thereby causing the trigger 2403 (FIG. 20*f*) to be turned off and indicating an $E_2$ accumulator error. Each of the triggers 2385, 2409, 2410, 2395 and 2403 is reset in an "off" condition manually by opening the bias line supplied to the #6 taps thereof, as will be explained.

During an $E_1$ or a $C_1$ cycle all data going to the core buffer is checked for parity errors. It will be recalled that data to be entered into the core buffer passes through the INV–3 unit 980 (FIG. 11*b*). This data is taken from the tapped output thereof, i.e., the #5 tap, via a line 2413 to the #3 and #7 taps of a TR–1 unit 2414 (FIG. 11h). This trigger is reset in an "off" condition when a line 2415 connected between the #9 tap thereof and the #10 tap of an INV–2 unit 2416 drops. The $b_s$ pulses taken from the line 1414 (FIG. 32) are applied to the #8 and #9 taps of a DA unit 2417 (FIG. 11*h*). The line 963 from which the clock pulses entered into the core buffer are taken is connected to the #7 tap of the unit 2417 and inverted clock pulses are taken from the line 978 and are applied to the #10 tap of the unit 2417. Thus, the pulses developed by the buffer clock are mixed in one half of the DA unit 2417 with the clock pulses utilized to control the operation of the buffer clock and are mixed in the other half of this DA unit with the inverted form of these same clock pulses. The #3 tap of the unit 2417 is connected to the #5 tap of a CF–2 unit 2418 (FIG. 11*i*) by a line 2419, the #5 tap of the unit 2417 (FIG. 11*h*) being connected by a line 2420 to the #4 tap of the unit 2418 (FIG. 11*i*). Thus, it should now be clear that $b_s$ phase A pulses are taken from the #10 tap of the unit 2418 by a line 2421 and that $b_s$ phase B pulses are taken from the #3 tap of the unit 2418 by a line 2422.

$b_s$ phase B pulses are connected to the #5 tap of the INV–2 unit 2416 (FIG. 11*h*) by the line 2422, and it will be clear, therefore, that the trigger 2414 is reset in an "off" condition by each $b_s$ phase B pulse, thereby raising the potential of the #8 tap thereof. The #8 tap is connected via a line 2423 to the #5 tap of the CF–1 unit 977 (FIG. 11*a*), the #10 tap of which is connected via a line 2424 to the #7 tap of a DA unit 2425 (FIG. 11*h*). The $b_s$ phase A line 2421 is connected to the #10 tap of the unit 2425 and the $E_1$ cycle gate line 861 is connected to the #8 tap of this unit. The #9 tap of the unit 2425 is connected to the line 451 which is high, it will be recalled, from $F_9$ through $F_0$. Thus, if the trigger 2414 is off at $b_s$ phase A time during an $E_1$ cycle, a line 2426 connected to the #3 and #5 taps of the unit 2425 rises at $b_s$ phase A.

The line 2426 is connected through the INV–2 unit 2416 and through a line 2427 to the #8 tap of a TR–2 unit 2428, thereby turning this trigger on under the above conditions and causing a line 2429 connected to the #9 tap thereof to rise. Since data entered into the core buffer is applied to the #3 and #7 taps of the trigger 2414 and since this trigger is reset in an "off" condition each $b_s$ phase B time, it will be clear that if a given character contains an even number of bits, the #8 tap thereof is high at $b_s$ phase A time following, it being low at this time when an odd number of bits are present in each character. Thus, when there has been a parity error during an $E_1$ cycle (or $C_1$ cycle), the trigger 2428 is turned on and since the line 2429 is connected to the #5 tap of a CF–1 unit 2430, a line 2431 connected to the #10 tap of the unit 2430 rises at this time. (It should be noted that the #6 tap of the trigger 2428 is connected to the manual reset line 380 which is opened by the manual reset control. In this way, therefore, the trigger 2428 is reset in an "off" condition.)

The line 2431 is connected from the #10 tap of the unit 2430 (FIG. 11*h*) to the #5 tap of an INV–2 unit 2433, to the #5 tap of a CF–2 unit 2434, and to the #4 tap of an INV–2 unit 2435 (FIG. 11*b*). The line 2431 is high when there has been an $E_1$ or $C_1$ parity error and it will be clear, therefore, that when there has been no $E_1$ error, a line 2436 connected to the #3 tap of the unit 2435 is high. Additionally, when the line 2431 (FIG. 11*h*) is high, a line 2437 connected to the #3 and #10 taps of the unit 2433 is low, and since a neon bulb 2438 is connected between the line 2437 and ground, it will be clear that this bulb is ignited when there is an $E_1$ or $C_1$ parity error.

It was mentioned above that the line 2431 is also connected to the #5 tap of the CF–2 unit 2434. The #10 tap of this unit is connected to the #3 tap of a THY–1 unit 2439 (FIG. 14*b*) by a line 2440. The #6 tap of the unit 2439 is connected by a line 2441 to an odd CB pulse, the #8 tap thereof being connected to the odd home pulse line 592. Since the #5 tap of the unit 2439 is connected through the pick winding of the error relay 64 (FIG. 4*d*), it will be clear that when there is an $E_1$ or $C_1$ parity error, this relay is picked by the odd home pulse during the following odd cycle, i.e., during $E_2$ or $C_2$. When this relay is picked, the machine is put in an interlocked condition to be described shortly. It should also be noted that the $E_1$ arithmetic error trigger 2395 (FIG. 20*f*) controls the firing of the thyratron 2439 (FIG. 14*b*) since the line 2436 (FIG. 20*f*) is also connected to the #3 tap of this thyratron (FIG. 14*b*). Thus, on an $E_1$ or $C_1$ parity error the line 2436 (FIG. 11*b*) is low, the neon 2438 is ignited and the $E_1$ or $C_1$ error relay 64 is picked. (It should also be noted that this relay is picked on an $I_1$ error since the line 625 (FIG. 14*c*) is connected to the #4 tap of the unit 2434 (FIG. 11*h*.)

Data taken from the core buffer during an $E_2$ cycle or a $C_2$ cycle is present, it will be recalled, on the line 1751 connected to the #10 tap of the INV–3 unit 1750 (FIG. 11*h*). This data is also present on the #5 tap of the unit 1750 which is connected via a line 2443 to the #3 and #7 taps of an $E_2$ or $C_2$ parity check trigger 2444, which trigger is a TR–1 unit. Since the $b_s$ phase B line 2422 is connected through an INV–2 unit 2445 and through a line 2446 to the #9 tap of the trigger 2444, it will be clear that this trigger is reset in an "off" condition each $b_s$ phase B time. Like the $E_1$ or $C_1$ parity check trigger 2414, the trigger 2444 is left in an "on" condition if a given character contains an odd number of bits. Thus, when there is an even number of bits, the #8 tap of the unit 2444 is high and indicates a parity error. This tap is connected through a line 2447, through the CF–1 unit 2266 and through a line 2448 to the #8 tap of a DA unit 2449, the #7 tap of which is connected to the $E_2$ cycle gate line 975. The #9 tap of the unit 2449 is connected to the $b_s$ phase A line 2421 and the #10 tap of this unit is connected to the line 451. Thus, if there has been a parity error during an $E_2$ cycle, a line 2450 connected to the #3 and #5 taps of the unit 2449 rises at $b_s$ phase A, and since this line is connected through the INV–2 unit 2445 and through a line 2451 to the #8 tap of a TR–2 unit 2452, it will be clear that this last mentioned trigger is turned on at $b_s$ phase A when there has been an $E_2$ or $C_2$ parity error.

Since the #9 tap of the unit 2452 rises under these conditions and since the #9 tap is connected to the #4 tap of the unit 2430 by a line 2453, it will be clear that a line 2454 connected to the #3 tap of the unit 2430 also rises under these conditions. The line 2454 is also connected to the #4 tap of the INV–2 unit 2433, thereby causing the neon 2438 to ignite if there has been an $E_2$ parity error. The line 2454 is additionally connected to the #3 tap of a THY–1 unit 2455 (FIG. 14*h*), the #8 tap of which is connected to the even home pulse line 591 and the #7 tap of which is connected by a line 2456 to an even CB pulse. Additionally, the line 2405 (FIG. 20*f*) which is high on an $E_2$ arithmetic error, is connected to the #3 tap of the unit 2455 (FIG. 14*h*). Since the #5 tap of the unit 2455 is connected to the pick winding of the error relay 45 (FIG. 4*d*), it will be clear that this relay is picked on an $E_2$ or a $C_2$ parity error by the even home pulse occurring during an even cycle. The line 2454 is also connected through the INV–2 unit 2435 (FIG. 11*b*) to a line 2458, and on an $E_2$ or $C_2$ parity error, therefore, the line 2458 is low, it being high when there has been no $E_2$ or $C_2$ parity error. Thus, on an $E_2$ or $C_2$ parity error, the error relay 45 is picked, the neon 2438 is ignited, and the line 2458 is low.

It was mentioned above that on the odd cycle following either an $I_1$, $E_1$ or $C_1$ error the relay 64 (FIG. 4*b*) is picked. Since the hold coil of the relay 64 is connected between ground and through its n/o *a* contacts to the line 36, this relay remains energized until the parity trigger (the trigger 623 (FIG. 14*c*), the trigger 2428 (FIG. 11*h*) or the trigger 2395 (FIG. 20*f*)) which caused it to be picked is reset. On an $I_1$ error (refer to the timing diagram in FIG. 38 wherein the $I_1$ and $E_1$ error timing is set forth) the normal $I_1$ cycle is completed and the $I_2$ and $E_1$ cycles are initiated in the normal manner. However, since the *c* points of the relay 64 (FIG. 6*b*)

are transferred during the $I_2$ cycle, i.e., the odd cycle following the $I_1$ error, the even pick pulse taken from the line 55 is connected therethrough, through the n/c *a'* points of the $C_2$ relay 80, through the n/c *b* points of the $I_1$ relay 60 and through the n/c *h* points of the $p_1$ relay 63 to the pick coil of the $I_2$ relay 62, thereby energizing this winding at this time and maintaining the $I_2$ relay in an energized condition. The $E_2$ relay 66 is not picked at this time since the *b* points of the $E_1$ relay 65 are transferred. The $I_2$ relay 62 drops out when the $I_1$ relay 60 picks.

It will be noted that the line 143 (FIG. 6*a*) is connected through the n/o *b* points of the $I_2$ relay 62 and through the n/o *b* points of the error relay 46 to the odd pick line 54. The error relay 46 (FIG. 4*b*) is connected between ground and through the n/o *b* points of the error relay 64 to the line 36, and on the even cycle following the energization of the relay 64 the relay 46 is energized. Thus, the pulse taken from the odd pick line 54 is transferred through the *b* points (FIG. 6*a*) of the relay 46, through the *b* points of the relay 62 and through the pick winding of the $I_1$ relay 60 (FIG. 6*b*) to ground, thereby picking this relay. When the relay 46 picks, its *c* points (FIG. 4*a*) are opened and the relay 43 (FIG. 4*b*) drops out. As explained previously, this causes the relay 53 to be energized and places the machine in an interlocked condition until the relay 43 is again picked, since, when the relay 43 drops and the relay 53 picks, the odd hold line 58 (FIG. 3*a*) is connected through the points thereof to both CB–3 and CB–4 pulses, thereby maintaining the $I_1$ relay 60 (FIG. 6*b*) energized until the relay 43 (FIG. 4*b*) picks. It will be noted that the pick coil of a latch type relay 2700 is connected between ground and through the n/o *b'* contacts of the relay 64 to the line 41, and when the relay 64 is energized, therefore, the contacts of the relay 2700 are latched in their transferred condition, thereby opening the *a* contacts (FIG. 4*a*) thereof and preventing the interlock resulting from an error from being terminated in the manner described previously in connection with the termination of an interlock wherein $T_2=P$, $Q$ or $R$.

An error interlock is terminated by actuating a switch 2701, referred to as the program advance switch, after an error reset button 2702 has been actuated to reset the error indicating triggers 623, 2428 and 2395 by opening the bias line to the appropriate side thereof. Thus, when the error indicating triggers have been reset, a circuit from the line 41 to the pick coil of the relay 43 (FIG. 4*b*) is completed through one side of the n/o *c* contacts (FIG. 4*a*) of a relay 2703. The relay 2703 (FIG. 4*b*) is connected between ground and through the armature and #2 contact of a switch 2704, through the n/c *e* contacts of a relay 2705 and through the n/o program advance switch 2701 to the line 36, and when the switch 2701 is closed, the relay 2703 picks, thereby connecting the relay 43 through the n/o *c* points of the relay 2703 and through the armature and #2 contact of the switch 48 to the line 41, thereby picking the relay 43 and terminating the interlock. It should also be noted that a line 2706 connected to the armature of the switch 2704 is connected through the n/c *c'* points of the relay 64, through the n/c *l* points of the relay 45 and through the trip winding of the relay 2700 to ground, and when the switch 2701 is actuated, therefore, the relay 2700 is unlatched, thereby releasing its contacts to assume their normal condition. Thus, on an $I_1$ error the machine stops operation, maintaining the $I_1$ relay 60 energized until the error triggers are reset and the program advance switch 2701 is actuated. At this time the previous operation is repeated.

On an $E_1$ error the relays 64, 46 and 53 (FIG. 4*b*) are picked in a similar manner, the relay 43 being arranged to drop out as described above. Since the relay 64 is not picked until the odd cycle following the $E_1$ cycle, i.e., the $E_2$ cycle, on an $E_1$ error, the $E_2$ relay 66 (FIG. 6*b*) is picked normally. If $p$ is blank, the $I_1$ relay 60 is picked normally, the $p_1$ relay 63 being picked in the normal fashion if $p$ is not blank. Since the relay 64 picks near the end of the $E_2$ cycle, its *c* contacts are transferred, thereby again energizing the pick coil of the $E_2$ relay 66, the even pick line 55 being connected through the n/o *c* contacts of the relay 64, through the n/c *a'* contacts of the $C_2$ relay 80, through the n/c *b* contacts of the $E_1$ relay 65 and through the pick coil of the $E_2$ relay 66 to ground. (This is true whether or not $p$ is blank.) The $E_2$ relay 66 is held in the normal fashion through the following odd cycle, and during the latter part of this cycle the $E_1$ relay 65 is repicked, since the *c* points (FIG. 6*a*) of the $E_2$ relay 66 are transferred, thereby connecting the odd pick line 54 through the now transferred *b* contacts of the error relay 46, through the transferred *c* contacts of the relay 66, through the line **66*a* and through the pick coil of the $E_1$ relay 65** (FIG. 6*b*) to ground. It will be recalled that when the relay 43 (FIG. 4*b*) drops out, as it does on an $E_1$ error, the relay 53 picks and throws the machine into an interlocked condition which places both odd and even CB pulses on the odd hold line 58 (FIG. 6*b*), thereby maintaining the $E_1$ relay 65 energized until the relay 43 is again picked. As in the case of an $I_1$ error, the error interlock is terminated by first resetting the error indicating triggers and then actuating the program advance switch 2701, at which time the $E_1$ and $E_2$ cycles are repeated.

On a $C_1$ error (see FIG. 43), the machine is similarly thrown into an interlocked condition wherein the $C_1$ relay 79 is picked and held until the error reset is energized and the key 2701 is actuated, thereby terminating the interlock and permitting the machine to repeat $C_1$, $C_2$, $C_3$ and $C_4$ cycles at this time.

On an $E_2$ or a $C_2$ error (see FIGS. 42 and 43), the relay 45 (FIG. 4*b*) is picked. This relay is also picked if a comparison fails when $T_2=R$, since the #5 tap of the THY–1 unit 1771 (FIG. 14*b*) is connected by a line **2456*a*** through a series of relay points (FIG. 4*b*), which provide a closed circuit when $T_2=R$, and through the pick coil of the error relay 45 to ground. Thus, the relay 45 is picked on an $E_2$ error, a $C_2$ error, or on an error occurring during the forced comparison when $T_2=R$. The relay 45, it will be recalled, is energized on the even cycle following the cycle in which the error occurs, and on an $E_2$ error, therefore, the relay 45 is energized during the even cycle immediately following the $E_2$ cycle. When the points of the relay 45 are transferred, the relay 43 is controlled to drop out since the *c* contacts of the relay 45 disposed between the relay 43 and the line 41 are opened, and upon the expiration of the even CB pulse then present on the line 36 the points of the relay 43 are transferred to their normal condition. As explained above, this causes the relay 53 to be energized.

It should be additionally noted that when the relay 45 picks, the pick coil of the relay 2700 is energized, thereby opening the *a* contacts thereof and preventing termination of the interlock via a pulse taken from the line 2482. On an $E_2$ error where $p$ is blank, the $I_1$ relay 60 (FIG. 6*b*) is energized in the normal fashion, as is the $I_2$ relay 62, since the points of the error relay 45 (FIG. 4*b*) are not transferred until the end of the even cycle following the $E_2$ error. The points of the $I_1$ relay 60 are dropped in the normal manner; however, since the error relay picks near the end of this $I_1$ cycle, the $I_1$ relay 60 (FIG. 6*b*) is repicked near the end of this $I_2$ cycle since the pick coil thereof is connected through the line 61, the diode 145, through the n/o *c* contacts of the $I_2$ relay 62 and through the now transferred *d* contacts of the error relay 45 to the odd pick line 54. Due to the interlock condition determined by the relays 43 and 53 (FIG. 4*b*) which places both odd and even CB pulses on the odd hold line 58 (FIG. 6*b*), the $I_1$ relay 60 is held until the interlock is terminated as described above.

On a $C_2$ error the result is substantially as described above in connection with the description of a $C_1$ error interlock with the exception that the $C_2$, $C_3$ and $C_4$ cycles are taken in the normal manner, the machine being interlocked in a $C_1$ cycle at the end of the $C_4$ cycle, which interlock extends until reset. Thus, it should be clear that upon the occurrence of a parity error the machine of the invention is arranged to enter an interlocked condition wherein the transfer during which the error occurred may be repeated to thereby permit the machine a second opportunity to transfer the data involved correctly.

Means, referred to herein as a character selector, are provided for analyzing selected characters recorded in the various portions of the machine. This permits a single character of data to bring about multiple decisions according to the identity of the character. The character to be analyzed is entered into the character selector by an instruction wherein $T_2=Z$, and any character thus entered causes a closed path to be set up between one of several "in" hubs 2710 (FIG. 37) and an exit hub 2711 corresponding to the character thus entered. The paths between the in hubs and exit hubs are under the control of seven relays 2713 through 2719 (FIGS. 14*a* and 14*b*), the pick coil of each of which is connected beground and the #5 tap of a corresponding THY–2 unit 2720 through 2726. The #8 taps of the units 2720 through 2724 are connected to the $B_0$, $B_x$, $B_1$ and $B_4$ lines 427 through 431, respectively, the #8 tap of the unit 2725 being also connected to the $B_4$ line 431 and the #8 tap of the unit 2726 being connected to the $B_8$ line 432. The #6 tap of each of the units 2720 through 2726 is connected by a line 2727 through the n/o *i* contacts (FIG. 3*b*) of the relay 718, through the n/o *h* contacts of the relay 715, through the n/c *k* contacts of the relay 720, through the n/o *j* contacts of the relay 719, through the n/o *a'* contacts of the $E_2$ relay 66, through a line 2728, through the n/c *d* contacts (FIG. 3*a*) of the error relay 46, through the n/c *e* contacts of the error relay 45, and through the points of CB–17 to +70 volts. The relays 715, 718, 719 and 720 are associated with the $T_2$ portion of the instruction register of the aforementioned points thereof and provide a closed circuit from the line 2727 (FIG. 3*b*) therethrough to the *a'* contacts of the $E_2$ relay 66 whenever $T_2=Z$. Thus, when $T_2=Z$, the line 2727 is at +70 volts during the $E_2$ cycle, thereby providing plate voltage to the character selector thyratrons 2720 through 2726 (FIGS. 14*a* and 14*b*) at this time.

Referring now to FIG. 11*b*, it will be recalled that $E_2$ data is taken from the #10 tap of the PCF–1 unit 982. The line 1753 connected to the #10 tap of the unit 982 is additionally connected to the #4 and #5 taps of a CD–2 unit 2729 (FIG. 11*a*), the #6 and #8 taps of which are connected to the early phase B clock pulse line 405. The #3 and #10 taps of the unit 2729 are connected by a line 2730 to the #3 tap of each of the THY–2 units 2720 through 2726 (FIGS. 14*a* and 14*b*). Thus, $T_2$ data is applied to the #3 tap of each of these thyratrons and, providing $T_2=Z$, it will be clear that one or more of the relays 2713 through 2719 are picked on the $E_2$ cycle when there is a coincidence of pulses on the #3 and #8 taps of the corresponding thyratron, thereby entering the selected character into these relays.

The hold coils of the relays 2713 through 2719 are connected between ground and through their n/o *a* contacts to a line 2731, which line is connected through the points of CB–7 (FIG. 3*a*) to +48 volts as well as through the n/c *f* points (FIG. 3*b*), n/o *j* points, n/c *h* points, n/c *g* points and n/c *i* points of the relays 65, 720, 718, 715 and 719 to a line 2732, which line is connected through the points of CB–8 (FIG. 3*a*) to +48 volts, the aforementioned points of the relays 715, 718, 719 and 720 providing a closed circuit between the line 2731 and the line 2732 except when $T_2=Z$, and the points of the $E_1$ relay 65 being arranged to provide a closed circuit between these lines except during an $E_1$ cycle. Thus, when one of the relays 2713 through 2719 is picked, it is held by both odd and even CB pulses until $T_2$ is again equal to Z, at which time this relay drops out to permit selective reenergization thereof. It should now be clear that when it is desired to enter the character located at a particular address into the character selector relays, it is necessary only to address the character position and to transfer it by an instruction wherein $T_2=Z$, which causes this character to be entered into the relays 2713 through 2719 where it is held until $T_2$ is again made equal to Z. The points of these relays are arranged in several matrices, as described above (see FIG. 37), and when a control panel pulse is entered into the "in" hub 2710 of one or more of these matrices, such a pulse is taken from the exit hub 2711 corresponding to the particular character entered into the character selector for use as may be desired.

A typical application of the machine of the invention is given in the text to follow to demonstrate its utility. Only one such application is illustrated; however, it reveals the potential of this machine for related applications.

Assume that a wholesome firm distributes 25,000 items to 10,000 customers. As orders arrive, they are punched and verified in cards and the data from the cards is entered into the machine. For each such order the machine is to determine the availability of each item, price each item, adjust stock balances, invoice the customer and prepare the accounts receivable record as well as certain memoranda, as will be seen. The machine performs these operations in sequence for each order and simultaneously accumulates usage data for sales analysis.

Some of the steps in programming the machine depend upon the policies of the user. In this application, to determine availability, if there is enough stock on hand to fill the order for an item, the order is filled, but if the order cannot be filled completely the entire quantity is back ordered. The program could be readily changed to cause the quantity on hand to be shipped, with the remainder back ordered, if desired.

Each item in the distributor's inventory is recorded on a track in the disc file in the arrangement shown on line 7 of FIG. 39, the items being coded with numbers between 00001 and 25000 to permit direct access to the disc file by using the item number as an address. Each customer's record is similarly recorded on a track in the disc file and is arranged as shown on line 2 of FIG. 39. The customer's accounts have been assigned the numbers between 30001 and 40000 to permit direct access to the disc records by using the customer number as an address.

When an order is received, it is punched on a card, as mentioned above, arranged as shown on line 1 of FIG. 39. Since cards of the type commonly in use are limited to 80 columns of information, they are punched with the item number and quantity ordered for eight items and additional cards are used if the order is longer.

Assuming that the instructions to be used in the routine set forth in this application are recorded on the program tracks and that the control panel is wired as shown in FIG. 40, it will be seen that when the start key is actuated, a pulse taken from the start hub 144 (FIG. 40) is connected through a distributor to program hubs 0 and 00 to thereby cause program step 00 to be entered into the instruction register, as described previously. The sequence of program steps recorded on the program tracks and set forth in the following pages is then followed by the machine.

| Pgm. Step | From— | | To— | | mn | p | q | Description | Skip to Pgm. Step |
|---|---|---|---|---|---|---|---|---|---|
| | $T_1$ | $a_1b_1$ | $T_2$ | $a_2b_2$ | | | | | |
| 00 | S | 99 | A | 99 | 00 | | | Input to track A | |
| 01 | A | 04 | Y | 99 | 05 | 2 | | Move customer number to address register and seek. | |
| 02 | R | 99 | B | 99 | 00 | | | Move customer record to track B | |
| 03 | B | 99 | C | 99 | 00 | | | Move customer record to track C | |
| 04 | A | 15 | C | 23 | 09 | | | Move customer order number and date to track C. | |
| 05 | L | 89 | C | 99 | 08 | | | Move invoice number from accumulator 8 to track C. | |
| 06 | C | 99 | P | 99 | 00 | 4 | | Move track C to output track for printing invoice. | |
| 07 | A | 20 | Y | 99 | 05 | 2 | | Move item number to address register and seek. | |
| 08 | R | 99 | D | 99 | 00 | | | Move item record from disc to track D. | |
| 09 | D | 62 | L | 39 | 04 | | | Move on-hand quantity to accumulator 3. | |
| 10 | A | 23 | M | 39 | 03 | A | | Subtract quantity ordered from quantity on hand.<br>Test accumulator:<br>If accum. 3 is zero or pos<br>If accum. 3 is neg | <br><br><br>20<br>11 |
| 20 | D | 58 | N | 99 | 05 | | | Load multiplicand | |
| 21 | A | 23 | X | 99 | 03 | | | Multiply price by quantity | |
| 22 | L | 11 | C | 73 | 08 | | | Move product to track C | |
| 23 | M | 11 | L | 49 | 08 | | | Move product to accum. 4 and reset product accum. | |
| 24 | A | 23 | C | 65 | 03 | | | Move quantity shipped to track C. | |
| 25 | D | 62 | C | 62 | 39 | | | Move descriptive data from track D to track C. | |
| 26 | T | 41 | C | 06 | 01 | | | Emit 3 for application code | |
| 27 | L | 39 | C | 77 | 04 | | | Move new balance to track C | |
| 28 | C | 99 | P | 99 | 00 | 4 | | Move track C to output track for printing and/or punching. | |
| 11 | A | 23 | C | 80 | 03 | | | Move quantity back ordered to track C. | |
| 12 | T | 43 | C | 06 | 01 | | | Insert application code 5 | |
| 13 | C | 80 | L | 79 | 03 | | | Move quantity back ordered into accumulator 7. | |
| 14 | D | 70 | L | 79 | 04 | | | Move previous back orders into accumulator 7. | |
| 15 | M | 79 | D | 70 | 04 | | | Replace back order quantity with new quantity. | |
| 16 | D | 74 | C | 74 | 16 | | | Move on-hand, on-order, back-order and minimum balance to track C. | |
| 17 | D | 51 | C | 51 | 28 | | | Transfer data for back order card | |
| 18 | C | 99 | P | 99 | 00 | B | | Move back order record to output track for printing and/or punching.<br>Print or punch back order record | <br><br>34 |
| 29 | L | 39 | D | 62 | 04 | | | Transfer new item balance to track D. | |
| 30 | D | 74 | M | 39 | 04 | C | | Subtract minimum balance from quantity on hand.<br>Test for minimum balance:<br>If accum. 3 is negative<br>If accum. 3 is pos. or zero | <br><br><br>31<br>33 |
| 31 | T | 46 | D | 06 | 01 | | | Emit B for identification of minus min. balance card. | |
| 32 | D | 99 | P | 99 | 00 | 4 | | Transfer track D to output track P for printing and/or punching.<br>Print and/or punch minimum balance minus. | |
| 33 | D | 99 | R | 99 | 00 | | | Return updated record to disc file. | |

| Pgm. Step | From— T₁ | From— $a_1b_1$ | To— T₂ | To— $a_2b_2$ | mn | p | q | Description | Skip to Pgm. Step |
|---|---|---|---|---|---|---|---|---|---|
| 34 | A | 87 | A | 79 | 64 | D | ---- | Slide track A eight positions to the left.<br>Test for blank field:<br>If field not blank<br>If field blank, test for control break.<br>If control break, feed card<br>If no control break, feed card | --------<br><br>07<br><br>35<br>07 |
| 35 | B | 04 | Y | 99 | 05 | 2 | ---- | Move customer number to address register and seek customer record. | -------- |
| 36 | B | 48 | C | 48 | 49 | ---- | ---- | Move customer data from track B to track C. | -------- |
| 37 | L | 49 | C | 71 | 07 | ---- | ---- | Read out invoice total to track C | -------- |
| 38 | B | 26 | L | 49 | 07 | ---- | ---- | Add debit balance to invoice total | -------- |
| 39 | L | 49 | C | 55 | 07 | ---- | ---- | Read out new debit balance to track C. | -------- |
| 40 | L | 49 | B | 26 | 07 | ---- | ---- | Update debit balance on track | -------- |
| 41 | B | 19 | M | 47 | 05 | ---- | ---- | Determine if credit is exceeded | -------- |
| 42 | M | 49 | C | 78 | 07 | ---- | ---- | Read out and reset credit to track C. | -------- |
| 43 | L | 89 | C | 63 | 08 | ---- | ---- | Invoice number to track C | -------- |
| 44 | T | 45 | C | 06 | 01 | ---- | ---- | Identify summary card by emitting code 7. | -------- |
| 45 | C | 99 | P | 99 | 00 | 4 | ---- | Track C to output track P for printing and/or punching. | -------- |
| 46 | T | 39 | L | 89 | 01 | ---- | ---- | Advance invoice number by 1 | -------- |
| 47 | B | 99 | R | 99 | 00 | E | ---- | Return customer file record on track B to disc. | 01 |

Program:

00 This program step causes the customer order data from the input track S to be transferred to track A of the processing unit as indicated in line 1 of FIG. 39.

01 The data in the first five positions of track A contains the customer number and this is sent to the address buffer Y. Additionally, since a "2" is provided in the *p* column of the instruction, the access mechanism 19 of the disc file is controlled to position the transducers at the location of the customer record corresponding to the customer number.

02 When the arm has reached the record defined by the customer number, the customer record is moved by this instruction from the disc file to track B of the processing unit as shown in line 2 of FIG. 39.

03 The customer record is transferred by this instruction to track C to provide a working record which is to be rearranged for printing the invoice.

04 This instruction begins the rearrangement of the data recorded in track C and the customer order number and order date are moved from the order card record on track A to a suitable location on track C.

05 The sixth instruction takes the invoice number from accumulator 8 to track C. (It should be noted that the next invoice number is always present in accumulator 8 since upon completion of each invoice accumulator 8 is increased by one, as will be described later.)

06 Thus far, the heading for the invoice has been set up on track C and it is transferred by instruction 06 to the output track P. Additionally, the read-out control code 4 causes the data recorded on the track P to control a printer to print the invoice heading. Format control on the printer may allow the information to be rearranged as desired.

07 While the heading of the invoice is being printed, the availability of the first item of the order is determined. First, it is necessary to locate the item file in the disc storage unit and bring it to the processing unit, and program step 07 places the item number in the address buffer Y and causes the machine to locate the item file.

08 The item file record is brought from the disc storage unit to track D of the processing unit.

09 The on-hand quantity recorded in the item file is added into accumulator 3.

10 The quantity on order is subtracted into accumulator 3 by this instruction. Now if the accumulator is zero or positive, there is a sufficient quantity of the item on hand to make shipment. If the accumulator is negative, the item must be back ordered. The "A" in the *p* column of the instruction causes the machine to transfer its control from the stored program instructions to the control panel of the processing unit. The A program exit hub (FIG. 40) emits a pulse which is used to test the condition of accumulator 3. The program exit hub A is wired to the input hub of accumulator 3, and if accumulator 3 has a zero or positive balance, thereby indicating that sufficient stock is available for the order to be filled, the program is transferred to program step 20 since the "+" and "0" hubs of accumulator 3 are wired through a distributor to the 0 and 20 hubs of the program counter. If accumulator 3 is negative, however, the control panel wiring transfers the machine to program step 11 since the "—" hub of accumulator 3 is wired through a distributor to the 1 and 10 hubs of the program counter.

20 If there is sufficient stock on hand to make shipment, the program skips from step 10 to step 20. Assuming this is the case, the unit price is loaded by this program step on the multiplicand track and the machine is prepared to obtain an extension.

21 The quantity ordered is used for the multiplier to obtain the extension and when the machine receives this instruction multiplication takes place. As soon as the product is obtained step 22 occurs.

22 The product is transferred by this instruction from accumulators 0 and 1 to track C.

23 The calculated total is added into accumulator 4 wherein the total of all the items on the invoice is accumulated.

24 The quantity is moved to track C to show the quantity shipped.

25 Product, class, code, description, etc., are transferred from track D to track C to arrange the transaction line of the invoice.

26 A "3" taken from the emitter track is inserted by this instruction in the application code column to identify the record.

27 The new balance on hand obtained on step 10 is moved from accumulator 3 to track C.

28 The completed transaction line is moved to the output track P for punching and/or printing, the control code 4 being provided for this purpose.

11 Had there been an insufficient quantity on hand to fill the order, i.e., had accumulator 3 been negative upon completion of program step 10, the quantity on order is transferred from the order record to the item output record, and because there was insufficient stock this will be shown as a quantity back ordered.

12 This instruction places a "5" from the emitter track in the application code columns to denote a back order.

13 The quantity back ordered is added into accumulator 7.

14 Any previous back order is added into accumulator 7 to obtain a new total of back orders.

15 The back order total is inserted in the item record.

16 The on-hand, on-order, back-order and minimum balance amounts are moved by this instruction from track D to track C. This is done to arrange track C for punching a back order record.

17 The item class, item code and description are transferred from the item file record to arrange track C to punch the back order record.

18 The assembled back order record is moved to the output track P and the machine is controlled to punch the back order card and skip to program step 34 since the program exit hub B is wired through a distributor to program hubs 30 and 4 as well as to a punch hub.

29 At this time the balance on hand in the item file record must be updated and tested to insure that it exceeds the minimum balance. If the quantity on hand has dropped below the minimum balance, a card is to be punched to notify the purchasing department. Thus, program step 29 causes the balance on hand in the item file record to be updated.

30 The minimum balance is subtracted from the quantity on hand in accumulator 3, and the "C" in the *p* column of the instruction transfers the control to the control panel to determine the condition of accumulator 3. Referring to FIG. 40, it will be seen that program exit hub C is wired to "in" hub of accumulator 3, and if the accumulator is positive or zero, the quantity on hand exceeds the minimum balance and the control panel wiring transfers the program to step 33 since the "+" and "0" hubs are wired through a distributor to program hubs 30 and 3. If the accumulator is negative, however, the control panel wiring transfers the program to step 31 since the "—" hub of accumulator 3 is connected through a distributor to program hubs 30 and 1.

31 An "8" is emitted from the emitter track into the application code column to identify the record as a minus minimum balance.

32 The record is transferred to the output track and the machine is signaled to punch the card for minus minimum balance.

33 The item record updated is returned by this program step to the disc file. Since the access arm has not been moved, the new item record is written over the old record at this time, thereby replacing it in the disc file.

34 The machine has now completed the processing for the first item ordered. To enable the previous program steps to be used again for the next following item on the order, the machine is now programmed to "slide" the remainder of track A to the left, to bring the second item into the position formerly occupied by the first. This routine is repeated whenever the processing of an item is completed and until a blank field is encountered, at which time the machine recognizes that it has completed the order. Thus, program step 34 moves the second item ordered into the positions formerly occupied by the first item, and all other items following are moved over correspondingly. The blank columns are also moved to the left to control blanks to be written over the positions formerly occupied by the last item on the track.

The D control code recorded in the *p* column of this instruction permits a blank field test to be made on the control panel. So long as something other than a blank is transferred in the sliding operation the machine continues to process the card. When the sliding operation moves only blanks, the entire card has been processed and the machine is controlled to begin the processing of the next card. Referring to FIG. 40, it will be seen that the program exit hub D is wired to the "in" hub of the blank field detector. If data was transferred in the sliding operation, the impulse emerges from the "no" hub (no blank field) and is wired to transfer the programming to step 07, since the "no" hub is connected through a distributor to program entry hubs 00 and 7. A "yes" condition means that the machine has completed the processing of the card, and a further test is made to determine if the following card is a continuation of the order or whether it is a new order. This is done by testing the minor control selector as shown. If the following card is a continuation, the machine is programmed to transfer this card to track A and resume operation on program step 07 since the "yes" hub of the blank field detector is connected to the "in" hub of the minor control selector and the "no" hub of this selector is wired through a distributor to program steps 00 and 7. If the following card is the beginning of a new order, the minor control selector will be transferred and this impulse causes the next card to be moved to track A, but programming is resumed from program step 35 to allow completion of the present invoice and the preparation of the accounts receivable summary card. (It should be noted that each of the last two mentioned distributors is wired to the "load track S" hubs and controls the data on track S to be recorded on track A as mentioned above.)

35 This instruction directs the access arm to return to the customer record in the disc file. While the arm is being positioned, the machine proceeds through program steps 36 through 46.

36 Customer data is transferred from track B to track C to rearrange the summary card.

37 The invoice total is transferred to track C.

38 The present debit balance is added to the invoice total to obtain a new debit balance.

39 The new debit balance is transferred to track C.

40. The debit balance in the customer file record is updated.

41 A check is made to determine if the customer has exceeded his maximum credit allowance.

42 The result from accumulator 4 is transferred to track C and the maximum credit information is printed with the total amount of the invoice. This information may be printed on the margin and torn off before the invoice is sent out, it being provided only to serve as a signal to the credit manager that the customer's credit has been exceeded.

43 The invoice number is transferred to track C.

44 A "7" is emitted to identify the accounts receivable summary card.

45 Track C to the output track P from where the total amount of the invoice and the credit information is taken for printing.

46 The invoice number is increased by one in preparation for the next invoice.

47 The customer file record is returned to the disc file, the "E" in the *p* column of the instruction causing an impulse to be emitted from the program exit hub E on the control panel, and the control panel wiring causes the control to be transferred to program step 01 to resume operations for the next order card.

The various electronic components utilized within the machine of the invention have been shown in the drawings merely as blocks and the blocks have been labeled to indicate the type of component represented thereby. The detailed circuitry of each such block is shown in the corresponding FIGURE 47 through 96 of the drawings. Each of the letter designations shown in the blocks denotes the function of the component in addition to acting as a reference to the detailed circuitry, and it follows that cathode followers are labeled with the letters CF or K; similarly, inverters are labeled with the letters INV or I, and single-shot multivibrators are labeled with the letters SS, etc. Since each of the units represented by the various blocks is well known in the art, only a brief, general description of its function is given here.

Figures 47, 48, 49, 50, 51, 52, 53, 54:
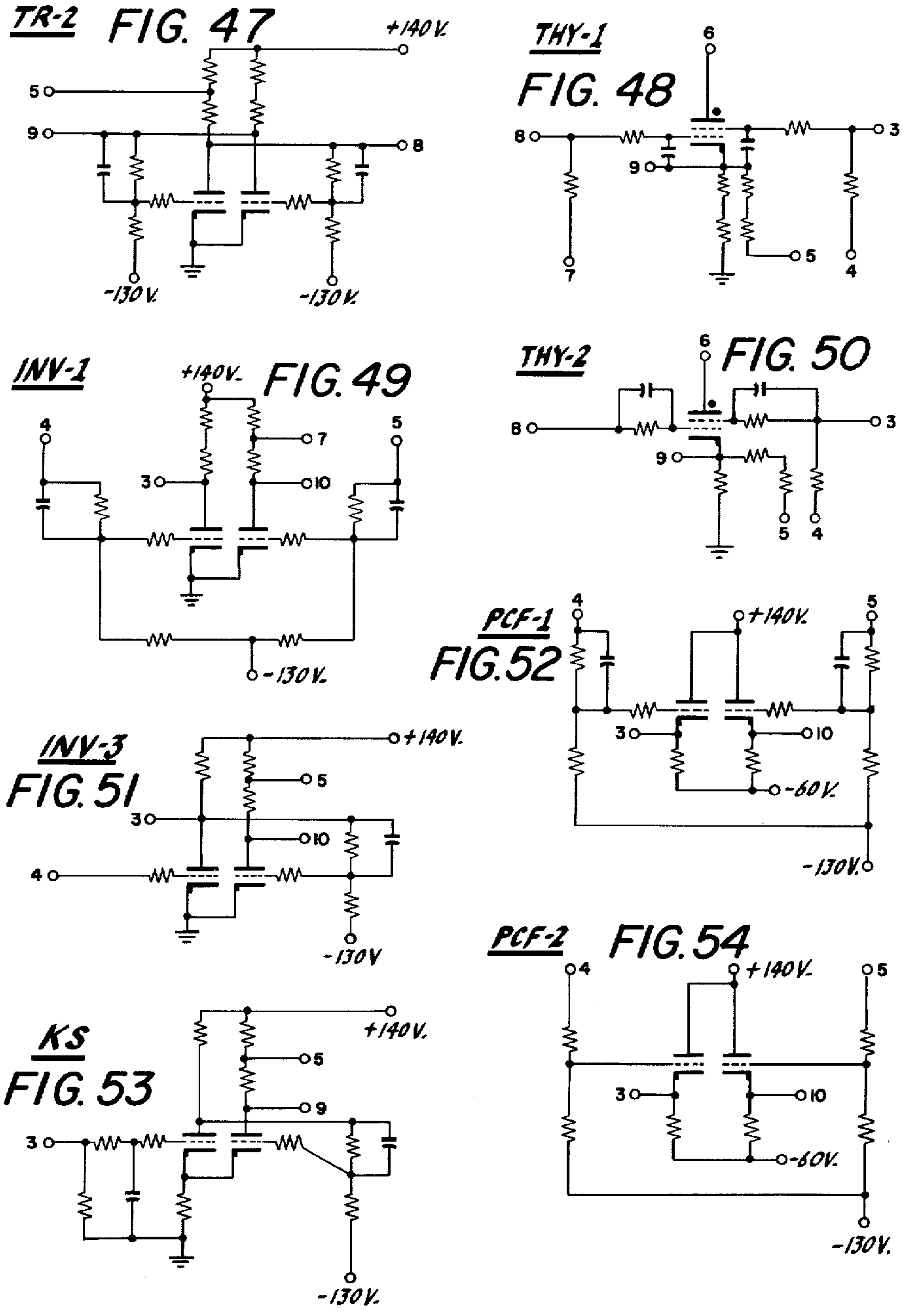

The TR–2 unit shown in FIG. 47 is a trigger operated by lowering the potential of either the #8 or #9 tap thereof, which results in reversing the condition of stability of the trigger if the tap lowered was high preceding the operation. This results in raising the potential of the opposite tap. Output is taken from the #8 tap, #9 tap or #5 tap thereof depending upon the polarity desired.

The THY–1 unit, a thyratron, shown in FIG. 48 is provided to operate a relay associated therewith, which relay is normally connected between ground and the #5 tap thereof. With a positive potential on the #6 tap thereof, the coincidence of positive signals on the #3 and #8 taps of a THY–1 unit causes the thyratron to conduct, thereby energizing the relay. As is the case with thyratrons, the tube conducts, once fired, until the voltage is removed from the #6 tap thereof.

The INV–1 unit, an inverter, shown in FIG. 49 comprises two inverters having input taps #4 and #5 and output taps #3 and #10, respectively. This unit is utilized to invert the signal applied to an input tap in the conventional manner.

A THY–2 unit, another thyratron used to energize a relay, is shown in FIG. 50, which, like the THY–1 unit discussed above, is fired by a coincidence of positive signals on the #3 and #8 taps thereof when a positive potential is applied to the #6 tap thereof. This unit is cut off by disconnecting the #6 tap from the positive potential supplied thereto.

The INV–3 unit, a double inverter, disclosed in FIG. 51 is provided to restore the level of signals applied to the #4 tap thereof and, provided that the output is taken from either the #5 or the #10 tap, no inversion of the input signal takes place. When the output is taken from the #3 tap, however, this unit operates as a simple inverter.

The PCF–1 and PCF–2 units shown in FIGS. 52 and 54 are, as their designations imply, power cathode followers. Each of these units provides dual inputs and outputs which may be operated either independently or in parallel as is deemed necessary under hte conditions determined by the utilization thereof. In each of these units the #4 and #5 taps serve as the input taps, the #3 and #10 taps respectively being the output taps.

The KS unit shown in FIG. 53 is operated by placing a positive signal on the #3 tap thereof, which causes the #5 and #9 taps to rise for the duration of this signal, these last mentioned taps being normally low. This unit is referred to as a "key-Schmidt" and is normally operated either by relay contacts or a switch of some sort. Detrimental effects resulting from bounce of contacts are minimized by the R.C. time constants provided in the grid circuit thereof.

A THY–3 unit is illustrated in FIG. 55, which unit is similar to the THY–1 and THY–2 units described above in that a coincidence of signals upon the #3 and #8 taps thereof causes the thyratron to fire, providing that the #6 or #7 tap thereof is connected to a positive potential. The cathode of this thyratron, however, is connected to the #5 tap, the relay associated therewith being connected between ground and the #5 tap. Thus, the current drawn by the thyratron when fired is utilized to pick the relay. Again, this thyratron is cut off by opening the line between the positive supply potential and the #6 or #7 tap thereof.

The DA unit shown in FIG. 56 comprises four diodes arranged in pairs, the plates of each pair being connected together and returned through a suitable resistor to +140 volts. It will be clear, therefore, that the #3 or #5 tap of each set cannot rise unless the corresponding #8 and #7 or #10 and #9 taps thereof are high. The #3 and #5 taps may be connected together, as they are in many instances in the present machine, to thereby provide a four-input "and" circuit, and as long as ony one of the four taps is low the #3 and #5 taps are low.

The ID–1 unit shown in FIG. 57, an inverter diode unit, requires that the #6 and #4 taps thereof be high to permit the #3 tap to drop, the #3 tap being returned through a suitable resistor to a positive potential as indicated in the drawings where it is used. Similarly, the #5 and #8 taps of this unit must both be high to permit the #10 tap thereof to drop. It will be seen, therefore, that an ID–1 unit provides two "and" units wherein the output signal of each is inverted.

FIG. 57*a* discloses a DD unit comprising four diodes connected as indicated in the circuit wherein it is used. This unit is adapted for use as an "and" circuit, an "or" circuit or a combination thereof, as is desired.

The CD–1 unit shown in FIG. 58, a cathode-diode unit, is similar to ID–1 unit just described. However, in this instance the output is taken from the cathode corresponding to the pair of input taps utilized, each cathode being returned through a suitable load to either ground or a negative potential, as indicated in the drawings of the machine of the invention. Thus, the CD–1 unit provides two "and" units wherein the signal is not inverted, it being the same phase as the input signals.

The ID–2 unit shown in FIG. 59 is substantially identical to the unit shown in FIG. 57; however, no bias is supplied thereto since it is utilized under operating conditions different from the conditions under which the ID–1 unit is utilized.

FIG. 60 discloses a DO unit, a diode "or" unit, and comprises four diodes arranged in pairs. The cathode of each diode of each pair is connected together and is returned through a suitable resistor to −130 volts. Thus, it will be clear that if a positive signal is applied to either the #3 or #4 tap of the DO unit, the #7 tap will rise. Similarly, a positive signal applied to the #5 or #6 tap of this unit causes the #9 tap to rise. Like the DA unit, the #7 and #9 taps of the DO unit may be connected together, where required by the logic of the circuitry in which it is used, to thereby provide a four-input "or" circuit.

FIG. 61 comprises a circuit diagram of an SS–2 unit, i.e., a single-shot multivibrator, and when a negative signal is applied to either the #6 or #7 tap of this unit the condition of stability thereof is switched from the normal condition wherein the right-hand tube thereof is conducting to the opposite condition, thereby raising the potential of the #5 and #9 taps for a period determined by the time constants of the circuit and lowering the potential of the #8 tap for this period. Time constants are built into the unit according to the demands of the application.

Figure 62:
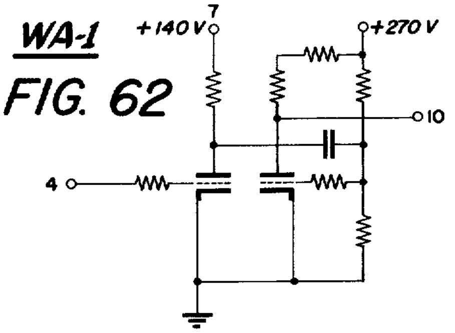
Figure 63:
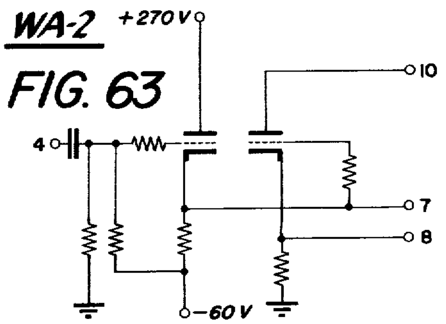

The WA–1 unit shown in FIG. 62, a write amplifier, is provided to drive a unit such as the WA–2 unit shown in FIG. 63. When the #4 tap of the WA–1 unit rises, the #10 tap thereof goes up, and when connected to the #4 tap of a WA–2 unit, the write winding of a transducer connected between the #10 tap of the WA–2 unit and a positive potential is energized since at this time the triode associated with the #10 tap is controlled to conduct, it being biased near cut-off. Thus, positive data signals applied to the #4 tap of the WA–1 unit cause corresponding pulses of current to flow through the write winding of the transducer associated with the #10 tap of the corresponding WA–2 unit.

Figure 64:
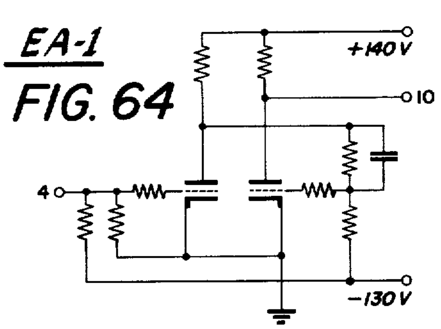
Figure 65:
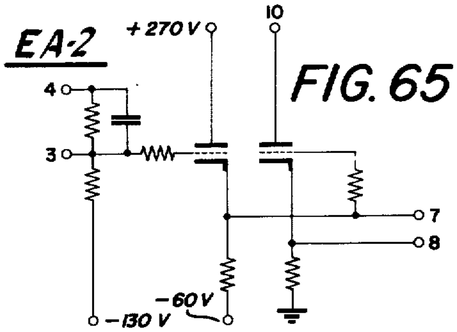

In a similar manner, the EA–1 unit shown in FIG. 64, an erase amplifier, is provided to drive an EA–2 unit such as is shown in FIG. 65. When the #10 tap of an EA–1 unit is connected to the #3 or #4 tap of an EA–2 unit, the erase winding of the transducer associated with the EA–2 unit and connected between the #10 tap thereof and a positive potential is energized as long as the #4 tap of the EA–1 unit is high. When the #4 tap of the EA–1 unit goes up, the #3 tap of the EA–2 unit also rises, thereby raising the potential of the control grid of the triode associated with the #10 tap of the EA–2 unit. Like the WA–2 unit, the control grid of this triode is biased near cut-off, and it is not until the #4 tap of the EA–1 unit goes up that the erase winding of the transducer associated with the EA–2 unit is energized.

Figure 66:
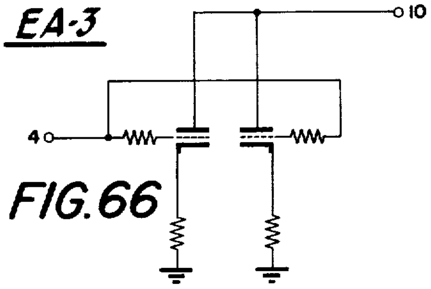

The EA–3 unit shown in FIG. 66 is provided to energize the erase winding of the transducer associated therewith, which winding is connected between the #10 tap thereof and a positive potential. The control grids of this unit are normally biased below cut-off by the circuitry with which it is associated, and when the #4 tap rises both triodes conduct, thereby energizing the erase winding.

Figure 67:
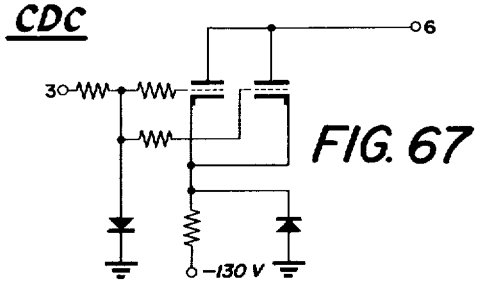
Figure 68:
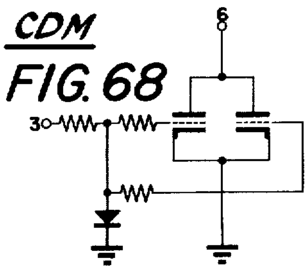

The $CD_c$ unit shown in FIG. 67, as well as the $CD_m$ unit shown in FIG. 68, are provided to drive switch cores utilized in the core buffer. The #6 tap of each of these units is connected through a winding of its associated switch core to a positive potential, and when the #3 tap goes up sufficiently, current is drawn therethrough to cause the switch core associated therewith to reverse its condition of stability.

Figure 69:
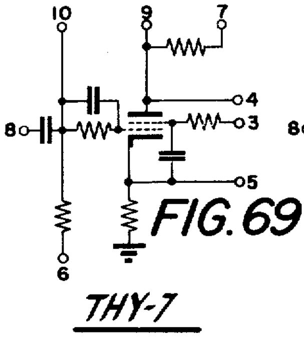
Figure 70:
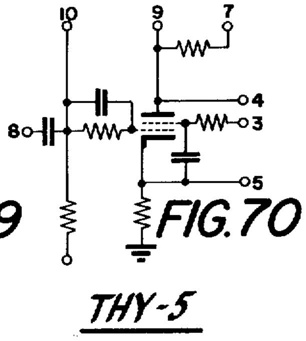

The thyratron units shown in FIGS. 69 and 70, i.e., THY–7 and THY–5 units, are substantially identical and are provided to energize relays associated therewith. When a positive potential is connected to the #7 or #9 tap of these units and a coincidence of positive signals is present on the #3 and #8 taps thereof, a relay connected between the #5 tap and ground is energized since at this time the thyratron is fired, thus raising the #5 tap thereof. Like the thyratrons previously described, these units are cut off to thereby deenergize their associated relays by opening the plate supply thereto.

Figures 71, 72, 73:
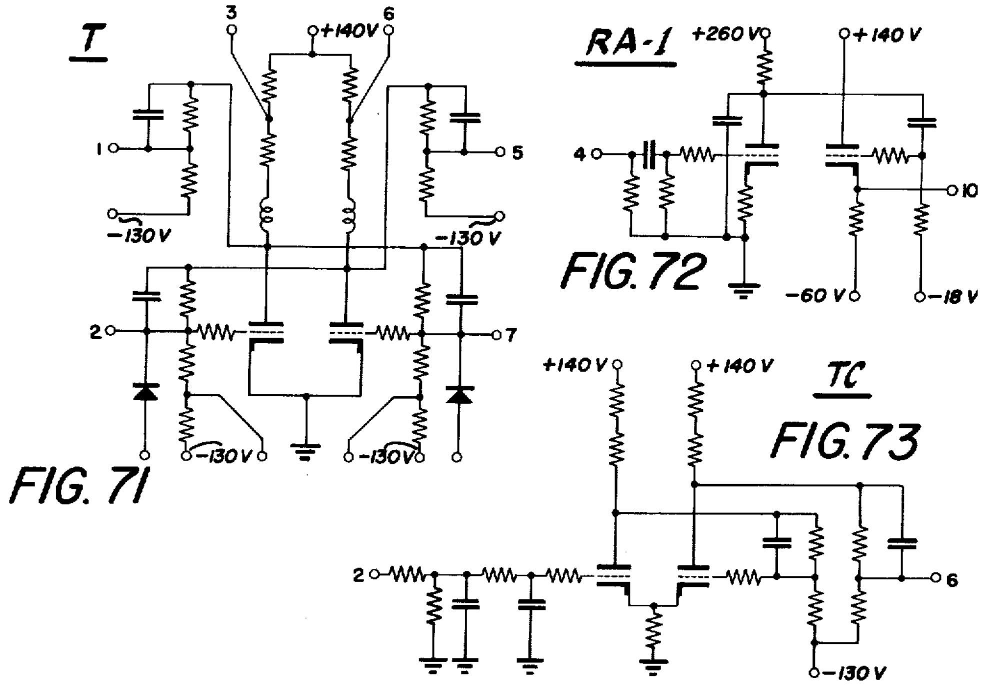
Figure 74:
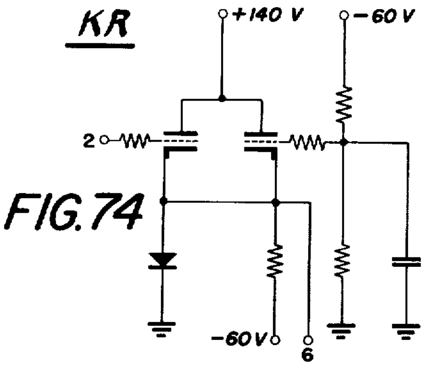
Figure 75:
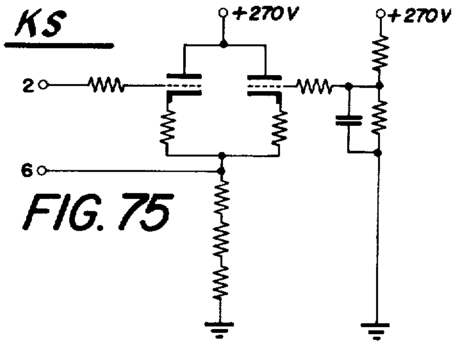
Figures 76, 77, 78, 79:
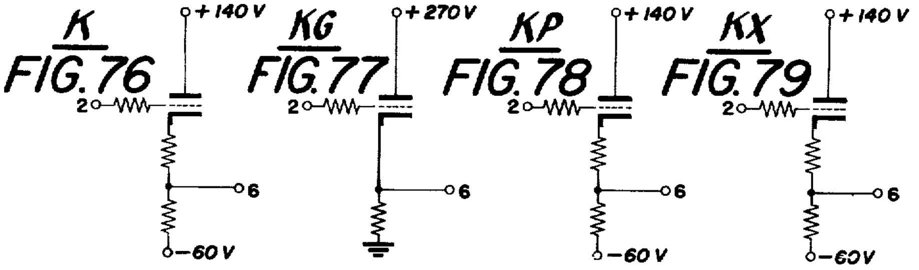

A T unit, i.e., a trigger, is shown in FIG. 71. This trigger is adapted to high speed operation for use in the core buffer and is operated by applying negative-going pulses to the #2 or #7 tap thereof, the output being taken from the #1, #3, #6 or #5 tap, as is desired in the particular application wherein it is used. This unit is reset in the desired condition by applying a positive potential to the #2 or #7 tap through the appropriate diode shown in the drawing, and it will be clear, therefore, that if a positive potential is applied to the #2 tap through the corresponding diode the left-hand tube thereof will be rendered conductive and the right-hand tube will be cut off, thereby raising the potential of the #5 and #6 taps and lowering the potential of the #1 and #3 taps. The trigger is reset in the opposite condition by applying a positive potential to the #7 tap through its corresponding diode.

An RA–1 unit is illustrated in FIG. 72, which unit is a read amplifier. Signals applied to the #4 tap thereof are amplified and inverted by this unit, the output signal being taken from the #10 tap in inverted form.

The $T_c$ unit shown in FIG. 73 is adapted to convert a rise in potential of the #2 tap thereof to a sharp rise in potential which may be taken from the #6 tap. It will be recalled that this unit is utilized in the core buffer to generate a reset signal and that the #2 tap thereof is normally connected to the 140-volt supply. When the #2 tap is momentarily disconnected from this supply to thereby initiate reset, the #2 tap rises from ground to 140 volts, which causes the #6 tap thereof to rise sharply since at this time the left-hand tube is controlled to conduct.

The various K units shown in FIGS. 74 through 79 are cathode followers arranged to operate according to the demands of their application, and each of these units is operated by a signal applied to the #2 tap thereof, which signal is taken in the same phase from the #6 tap.

Figure 80:
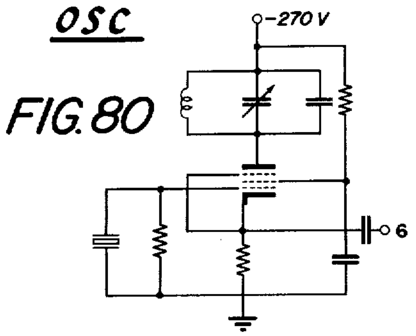

FIG. 80 illustrates the oscillator circuit utilized in the core buffer. This oscillator is under the control of a crystal, as shown, and the output thereof is taken from the #6 tap which is coupled to the cathode.

Figure 81:
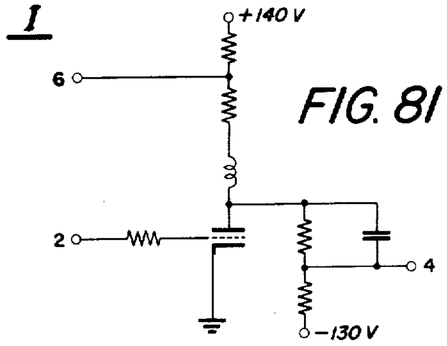
Figure 82:
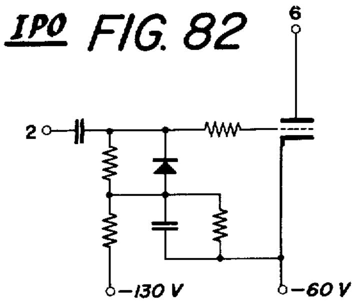
Figure 83:
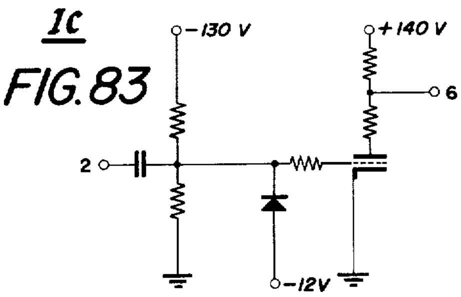

The I unit, the $I_{po}$ unit and the $I_c$ unit shown in FIGS. 81, 82, and 83 are, as their character designations indicate, inverters having input taps #2 and output taps #4 and/or #6. A signal applied to the #2 tap may be taken from the #4 and/or #6 tap thereof in inverted form.

Figure 84:
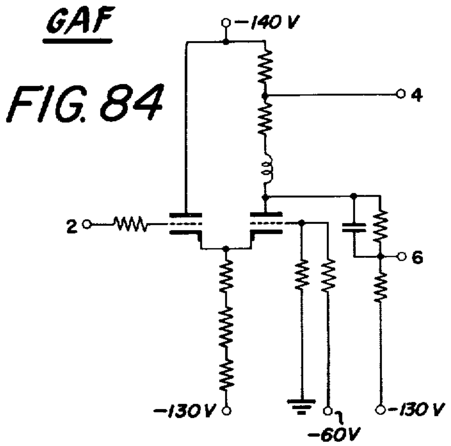

A $GA_f$ unit is illustrated in FIG. 84, which unit is a grounded grid amplifier having an input tap #2 and output taps #4 and #6, and signals applied to the #2 tap are taken from the #4 or #6 tap in the same phase but amplified, since when the #2 tap goes up the cathodes of both triodes go up, thereby controlling the #4 and #6 taps to rise.

Figure 85:
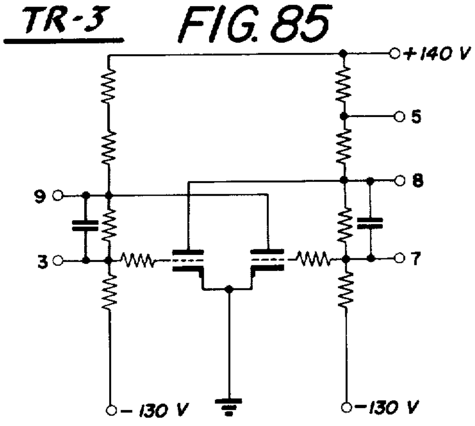

FIG. 85 illustrates the detailed circuit diagram of a TR–3 unit having input taps #3 and #7 and output taps #5, #8 and #9. This trigger is utilized where it is desired to operate it by means of plate-pull-over, since it may be operated by lowering the #8 or #9 tap thereof. This trigger is additionally operated by applying negative shifts in potential to the #3 or #7 tap. Output is taken from the #5, #8 or #9 tap.

Figure 86:
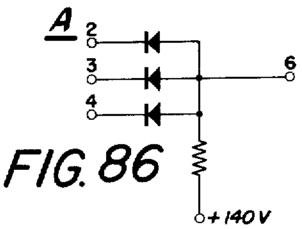

An "and" circuit shown in FIG. 86 is arranged with the plates of the diodes connected in common through a suitable resistor to a postive potential, as well as to the #6 or output tap, and when the cathode of each diode utilized is high, the output tap is high.

Figure 87:
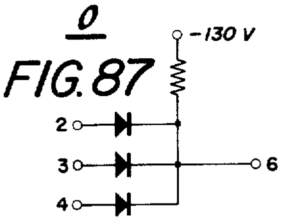

FIG. 87 is an "or" circuit wherein the cathode of each of the diodes is connected in common through a suitable resistor to a negative potential, as well as to the output or #6 tap. When any one of the input taps #2, #3 or #4 goes up, therefore, the output tap #6 rises.

Figure 89:
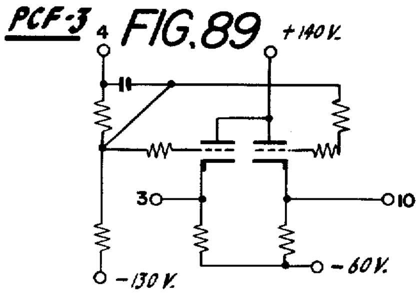

The PCF-3 unit, a power cathode follower, illustrated in FIG. 89, employs two triodes in parallel, and a signal applied to the #4 or input tap is taken from the #3 and/or #10 tap thereof.

Figure 88:
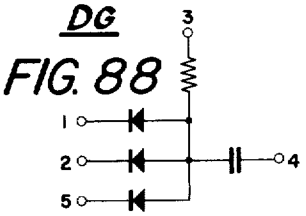

FIG. 88, a DG unit, comprises three diodes having their anodes connected together through a suitable resistor to the #3 or input tap as well as through a condenser to the #4 tap, the output tap. The cathodes of these diodes are connected to the #1, #2 and #5 taps, respectively, which serve as additional input taps. When a positive signal is on the #3 tap, the #4 tap drops with the signal applied to the input tap or taps used. Thus, this unit functions as an "and" circuit followed by an inverter with a saving on tubes.

Figure 90:
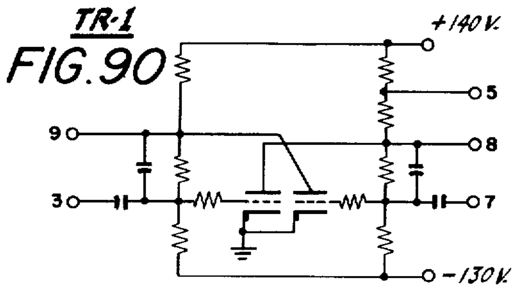

Another trigger, a TR-1 unit, is disclosed in FIG. 90, which trigger is operated by negative shifts applied to the #3 and/or #7 tap. Output is taken from the #5, #8 or #9 tap as is desired.

Figure 91:
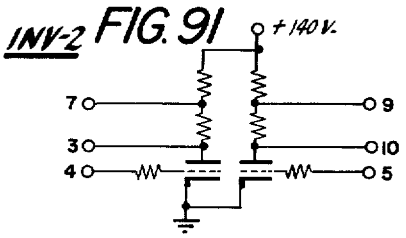

The INV-2 unit shown in FIG. 91 is a dual inverter having input taps #4 and #5 and output taps #3 and #10, respectively. Additionally, tapped outputs may be taken from the #7 and #9 taps.

Figure 92:
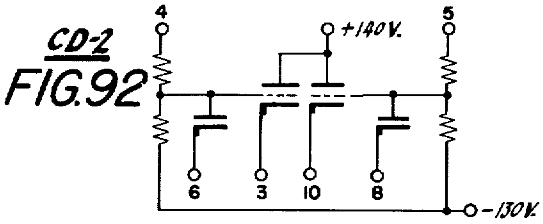

The cathode-diode unit shown in FIG. 92, a CD-2 unit, is similar to the CD-1 unit described previously but is biased differently according to the application thereof.

Figure 93:
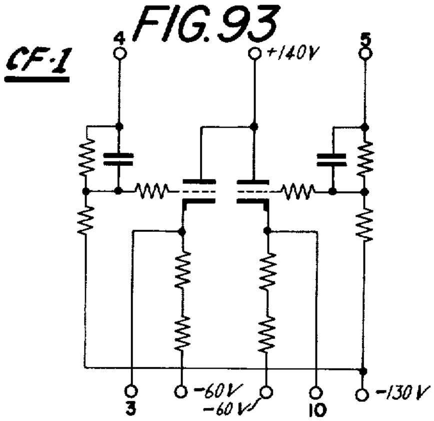
Figure 94:
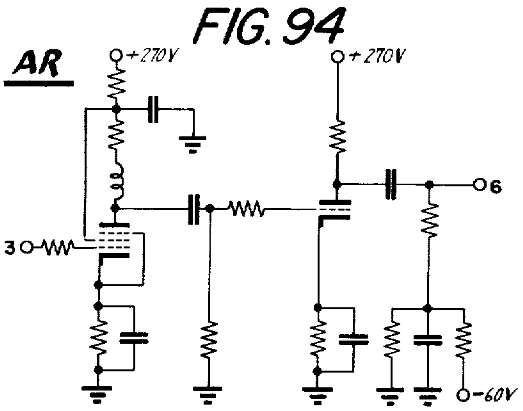
Figure 95:
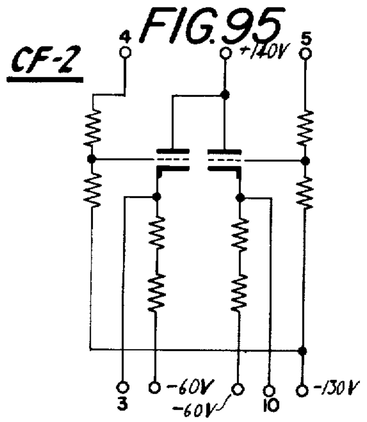

FIGS. 93 and 95 set forth two dual cathode follower circuits a CF-1 and a CF-2, which units have input taps #4 and #5 and output taps #3 and #10, respectively.

An AR unit (FIG. 94), the read amplifier utilized in the core buffer, is adapted to amplify signals taken from the sense winding of the core matrix. When these signals are applied to the #3 tap, they are amplified and inverted by the pentode and are applied to the control grid of the triode, where they are again inverted and are taken from the #6 tap.

Figure 96:
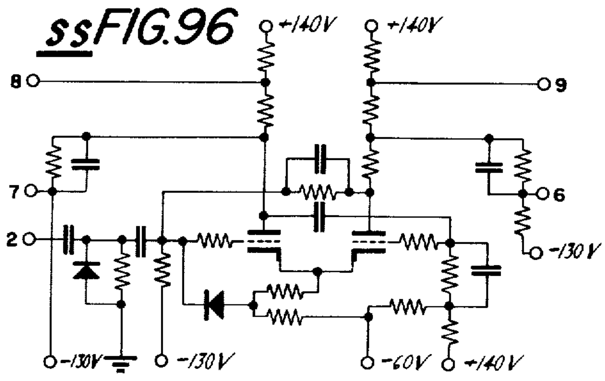

FIG. 96 discloses an SS unit having an input tap #2 and output taps #6, #7, #8 and #9. The right-hand tube normally is cut off and when a positive signal is connected to the #2 tap, the single-shot fires and a positive signal of fixed duration may be taken from the #6 or #9 tap thereof.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Data transfer apparatus comprising a rotatable magnetic drum; a number of electromagnetic transducers arranged in cooperative relationship to said drum to define a plurality of instruction storage tracks and a plurality of data storage tracks; matrixing circuitry connected to said transducers and arranged to divide each said instruction track into several fields with each said field being adapted to store a series of instruction signals representative of a single instruction defining storage locations on a source data storage track, storage locations on a destination data storage track and transfer control indicia; an instruction register having switching elements for receiving instruction signals representative of a single instruction; means including a counter coupled to and controlling said matrixing circuitry for entering instruction signals taken from a field defined by the condition of said counter into said instruction register; means responsive to the operation of said switching elements of said register as controlled by received instruction signals for effecting the data transfer operation defined thereby; means for operating said counter for advancing the condition thereof upon completion of each data transfer operation, said means being rendered inoperative in response to operation of said switching elements by signals representative of transfer control indicia in said register; selector means having an enabling circuit and a transferring circuit; means for connecting said enabling circuit to said matrixing circuitry for operating said selector means according to the nature of data signals in storage locations determined by the data involved in the data transfer; means responsive to operations of said switching elements by said signals representative of transfer control indicia in said register for generating a transfer control signal; means for connecting said transfer control signal generating means to said transferring circuit, and means for connecting said transferring circuit to said counter for setting the same in one of a plurality of predetermined conditions for altering the instruction sequence by controlling the entry of instruction signals in said instruction register from a field defined by said one of said predetermined conditions.

2. Data transfer apparatus as defined in claim 1 and wherein said enabling circuit is arranged to be effective in response to data signals of one nature to actuate said transfer circuits and to be ineffective in response to data signals of nature opposite to said one nature.

3. Data transfer apparatus as defined in claim 1 and wherein said enabling circuit is connected to said matrixing circuit for operation according to the nature of signals in said destination storage track locations.

4. Data transfer apparatus as defined in claim 1 and wherein said transferring circuit comprises an input terminal, a normal output terminal and a transferred output terminal, means for connecting said transfer control signal generating means to said input terminal, and means for connecting said output terminals to said counter to alter the sequence of instructions selected for transfer to said instruction register.

5. Data transfer apparatus as defined in claim 1 and wherein said means for connecting said enabling circuit to said matrixing circuitry is arranged to be effective in accordance with the algebraic sign of the data.

6. Data transfer apparatus comprising a rotatable magnetic drum; a number of electromagnetic transduces arranged in cooperative relationship to said drum to define a plurality of instruction storage tracks and a plurality of data storage tracks; means for generating a plurality of timing waves in synchronism with the rotation of said drum; matrixing circuitry connected to said transducers and said timing wave generating means to divide each said instruction track into several fields with each said field being adapted to store a series of instruction signals representative of a single instruction defining storage locations on a source data storage track, storage locations on a destination data storage track and transfer control indicia; an instruction register having switching elements for receiving instruction signals representative of a single instruction; means including a counter coupled to and controlling said matrixing circuitry for entering instruction signals taken from a field defined by the condition of said counter into said instruction register; means coupled to said timing wave generating means and responsive to the operation of said switching elements of said register as controlled by received instruction signals for effecting the data transfer operation defined theerby; means including said switching elements of said register to which said transfer control indicia are applied for applying one of said plurality of timing waves to said counter for advancing the condition thereof upon completion of each data transfer operation, said means being rendered inoperative in response to operation of said switching elements by signals representative of transfer control indicia in said register; selector means having an enabling circuit and a transferring circuit; means for connecting said enabling circuitry to said matrixing circuitry for operating said selector means according to the nature of data signals in storage locations determined by the data transfer; means responsive to operation of said switching elements by said signals representative of transfer control indicia in said register for applying another of said plurality of timing waves to said transferring circuit, and means for connecting said transferring circuit to said counter for setting the same in one of a plurality of predetermined conditions for altering the instruction sequence by controlling the entry of instruction signals in said instruction register from a field defined by said one of said predetermined conditions.

7. Data transfer apparatus comprising a rotatable magnetic drum; a number of electromagnetic transducers arranged in cooperative relationship to said drum to define a plurality of instruction storage tracks and a plurality of data storage tracks, matrixing circuitry connected to said transducers and including means for generating a plurality of timing waves which define periods dividing each said instruction track into several fields during which each field is scanned by the corresponding transducer, each said field being adapted to store a series of instruction signals representative of a single instruction defining storage locations on a source data track, storage locations on a destination data track and transfer control indicia; an instruction register having switching elements for receiving instruction signals representative of a single instruction; means for gating instruction signals into said register; a counter the conditioning of which defines an instruction track and field, and means under control of said counter and one of said timing waves for gating instruction signals from the track and field defined by the condition of said counter into said register; means responsive to the operation of said switching elements of said register as controlled by received instruction signals for effecting the data transfer operation defined thereby; means including the switching elements of said register to which said signal representative of transfer control indicia are applied for operating said counter for advancing the condition thereof upon completion of each data transfer operation for selecting the next following instruction, said means being inoperative in response to the presence of signals in said register; selector means having an enabling circuit and a transferring circuit, means for connecting said enabling circuit to said matrixing circuitry for actuating said transferring circuit according to the algebraic sign of data stored in a corresponding storage location; means responsive to the operation of the switching elements of said register to which said transfer control indicia are applied for applying one of said timing waves to said transferring circuit; and means for connecting said transferring circuit to said counter for altering the condition thereof by setting it in one of a plurality of predetermined conditions interrupting the normal instruction sequence and reinitiating it at a new point by controlling the entry of instruction signals in said register from a field defined by said one of said predetermined conditions.

8. Data transfer apparatus as defined in claim 7 and incorporating further circuitry in said matrixing circuitry for defining an accumulator, and wherein said enabling circuit of said selector means is connected to said accumulator.

9. Data transfer apparatus as defined in claim 7 and incorporating a data comparison circuit coupled to said matrixing circuitry, and wherein said enabling circuit of said selector means is connected to said data comparison circuit.

10. Data transfer apparatus for controlling the transfer of data signals from selected storage locations on a magnetic drum track to not necessarily corresponding storage locations on another drum track, comprising a rotatable magnetic drum; a plurality of electromagnetic transducers arranged in cooperative relationship to said drum to define a plurality of data storage tracks; matrixing circuitry connected to said transducers and arranged to divide each said track into a plurality of serially disposed storage locations addressable according to the location thereof relative to a reference location on said track; an instruction register having switching elements for receiving and storing signals representative of a data transfer instruction; means coupled to said matrixing circuitry for entering signals representative of a given data transfer instruction in said register, said signals defining a source track, an initial storage location on said source track, a destination track, an initial storage location on said destination track, and the number of storage locations involved in said given data transfer operation; a buffer storage device; means coupled to said matrixing circuitry and controlled by the operation of the switching elements of the register for selecting the transducer associated with said source data track for connection to the input of said buffer storage device; means coupled to said matrixing circuitry and responsive to the operation of the switching elements of said register for initiating connection of said transducer according to said initial storage location on said source track, and means coupled to said matrixing circuitry and responsive to the operation of the switching elements of said register for terminating said connection of said transducer associated with said source data track according to the number of storage locations involved in said given data transfer operation; further means coupled to said matrixing circuitry and controlled by the operation of the switching elements of said register for selecting the transducer associated with said destination data track for connection to said buffer storage device, means coupled to said matrixing circuitry and controlled by the operation of the switching elements of said register for initiating connection of said transducer associated with said destination data track according to said initial storage location on said destination data track, and means coupled to said matrixing circuitry and responsive to the operation of the switching elements of said register for terminating said connection of said transducer associated with said destination data track according to the number of storage locations involved in said given data transfer operation.

11. Data transfer apparatus for controlling the transfer of data signals from selected storage locations on a magnetic drum track to not necessarily corresponding storage locations on another drum track, comprising a rotatable magnetic drum; a plurality of electromagnetic transducers arranged in cooperative relationship to said drum to define a plurality of data storage tracks; matrixing circuitry connected to said transducers and arranged to divide each said track into a plurality of serially disposed storage locations addressable according to the location thereof relative to a reference location on said track; an instruction register having switching elements for receiving and storing signals representative of a data transfer instruction; means coupled to said matrixing circuitry for entering signals representative of a given data transfer instruction in said register, said signals defining a source track, an initial storage location on said source track, a destination track, an initial storage location on said destination track, and the number of storage locations involved in said given data transfer operation; a buffer storage device; means coupled to said matrixing circuitry and controlled by the operation of the switching elements of the register for selecting the transducer associated with said source data track for connection to the input of said buffer storage device; means coupled to said matrixing circuitry and responsive to the operation of the switching elements of said register for initiating connection of said transducer according to said initial storage location on said source track, and terminating means coupled to said matrixing circuitry and responsive to the operation of the switching elements of said register for terminating said connection of said transducer associated with said source data track according to the number of storage locations involved in said given data transfer operation; further means coupled to said matrixing circuitry and controlled by the operation of the switching elements of said register for selecting the transducer associated with said destination data track for connection to said buffer storage device, further means coupled to said matrixing circuitry and controlled by the operation of the switching elements of said register for initiating connection of said transducer associated with said destination data track according to said initial storage location on said destination data track, and additional means coupled to said matrixing circuitry and to said terminating means for terminating said connection of said transducer associated with said destination storage track according to the number of storage locations involved in said given data transfer operation.

12. Data transfer apparatus as defined in claim 11 and incorporating means for generating timing waves defining data storage locations with respect to a reference location on said tracks and comparing means to which timing waves are applied, and wherein said connection initiating and terminating means are operative through said comparing means.

13. Data transfer apparatus as defined in claim 12 and wherein said switching elements of said register representative of said initial storage locations are arranged to be stepped in counting chain fashion and incorporating means to apply timing waves to said switching elements for stepping the latter.

14. Data transfer apparatus having means for comparing data signals stored in selected portions of one magnetic drum track with data signals stored in selected not necessarily corresponding portions of another drum track as a part of a given data transfer, comprising a rotatable magnetic drum, a plurality of electromagnetic transducers arranged in cooperative relationship to said drum to define a plurality of data storage tracks; matrixing circuitry connected to said transducers and arranged to divide each said track into a plurality of serially aligned storage locations; a register having switching elements for receiving and storing instruction signals; means for entering signals representative of a given compare instruction into said register during a first cycle of machine operation, said signals defining a first data storage track, an initial storage location thereon, a second data storage track, an initial storage location thereon, and the number of storage locations involved in said given compare operation; a buffer storage device; means coupled to said matrixing circuitry and controlled by the switching elements of said register for selecting the transducer associated with said first data storage track for connection to said buffer storage device during a second cycle of machine operation; means coupled to said matrixing circuitry and responsive to the operation of said switching elements for initiating said connection when scanning of said initial storage location of said first source track is commenced, means coupled to said matrixing circuitry and responsive to the operation of the switching elements of said register for terminating said connection when the number of storage locations involved in said given compare operations have been scanned; a circuit for comparing signals, said circuit having two inputs and means for indicating the equality of signals applied thereto; means connecting said buffer storage device to one input of said comparing circuit; means coupled to said matrixing circuitry and controlled by the operation of the switching elements of said register for selecting the transducer associated with said second data storage track for connection to the other input of said comparing circuit during a third cycle of machine operation, means coupled to said matrixing circuitry and responsive to the operation of the switching elements of said register for initiating said connection when scanning of said initial storage location of said second data storage track is commenced, and means coupled to said matrixing circuitry and responsive to the operation of the switching elements of said register for terminating said connection when the number of storage locations involved in said comparing operation have been scanned; whereby signals stored in locations on one track are compared with signals stored in locations on another track according to said instruction signals.

References Cited in the file of this patent

UNITED STATES PATENTS

| | | |
|---|---|---|
| 2,634,052 | Bloch | Apr. 7, 1953 |
| 2,636,672 | Hamilton | Apr. 28, 1953 |
| 2,701,095 | Stibitz | Feb. 1, 1955 |
| 2,782,985 | Vibbard | Feb. 26, 1957 |
| 2,789,759 | Tootill et al. | Apr. 23, 1957 |
| 2,796,218 | Tootill | June 18, 1957 |
| 2,797,862 | Andrews et al. | July 2, 1957 |
| 2,800,277 | Williams et al. | July 23, 1957 |
| 2,810,516 | Tootill et al. | Oct. 22, 1957 |
| 2,874,901 | Holmes | Feb. 24, 1959 |
| 2,895,671 | St. Johnston | July 21, 1959 |
| 2,902,214 | Donan et al. | Sept. 1, 1959 |

FOREIGN PATENTS

| | | |
|---|---|---|
| 734,073 | Great Britain | July 27, 1955 |
| 734,485 | Great Britain | Aug. 3, 1955 |
| 742,525 | Great Britain | Dec. 30, 1955 |

UNITED STATES PATENT OFFICE

CERTIFICATE OF CORRECTION

Patent No. 3,026,036 March 20, 1962

John W. Haanstra et al.

It is hereby certified that error appears in the above numbered patent requiring correction and that the said Letters Patent should read as corrected below.

In the grant, line 1, and in the heading to the printed specification, line 3, name of second inventor, for "Roy L. Huag", each occurrence, read -- Roy L. Haug --; column 116, line 55, for "transduces" read -- transducers --; column 117, line 1, for "theerby" read -- thereby --.

Signed and sealed this 2nd day of October 1962.

(SEAL)
Attest:

ERNEST W. SWIDER
Attesting Officer

DAVID L. LADD
Commissioner of Patents